US008951121B2

(12) United States Patent
Lyons et al.

(10) Patent No.: US 8,951,121 B2
(45) Date of Patent: Feb. 10, 2015

(54) MULTIGAME ACTION BUTTON DECK IN A CONCURRENT GAMING SYSTEM

(71) Applicant: Bally Gaming, Inc., Las Vegas, NV (US)

(72) Inventors: Martin S. Lyons, Henderson, NV (US); Bryan M. Kelly, Alamo, CA (US); Sean C. Martin, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 232 days.

(21) Appl. No.: 13/631,672

(22) Filed: Sep. 28, 2012

(65) Prior Publication Data
US 2014/0094298 A1    Apr. 3, 2014

(51) Int. Cl.
*A63F 13/00* (2014.01)
*A63F 13/20* (2014.01)
*G07F 17/32* (2006.01)

(52) U.S. Cl.
CPC ............ *A63F 13/06* (2013.01); *G07F 17/3204* (2013.01); *G07F 17/3209* (2013.01); *G07F 17/322* (2013.01)
USPC .................................. 463/37; 463/30; 463/31

(58) Field of Classification Search
USPC .......... 463/16, 20, 29, 30, 31, 33, 37
See application file for complete search history.

(56) References Cited

U.S. PATENT DOCUMENTS

| 6,860,810 | B2 * | 3/2005 | Cannon et al. | 463/20 |
|---|---|---|---|---|
| 7,438,642 | B2 * | 10/2008 | Walker et al. | 463/30 |
| 8,174,502 | B2 * | 5/2012 | Bolsinga et al. | 345/173 |
| 8,485,899 | B1 * | 7/2013 | Rom et al. | 463/31 |
| 2003/0216174 | A1 * | 11/2003 | Gauselmann | 463/30 |
| 2006/0097991 | A1 * | 5/2006 | Hotelling et al. | 345/173 |
| 2009/0149253 | A1 | 6/2009 | Kelly et al. | |
| 2009/0176572 | A1 | 7/2009 | Reddy et al. | |
| 2010/0113140 | A1 | 5/2010 | Kelly et al. | |
| 2011/0306416 | A1 | 12/2011 | Kelly et al. | |

* cited by examiner

*Primary Examiner* — James S McClellan
(74) *Attorney, Agent, or Firm* — Brooke Quist; Marvin Hein

(57) ABSTRACT

A multi-game action button deck in a concurrent gaming system is disclosed. The system includes at least one gaming machine in communication with a game server via a network, a display manager, a multi-game action button, and a touch sensor. The display manager is configured to display content related to one or more games to be played on the display areas of the gaming machine, wherein the content includes at least one game display area and a virtual button deck display area associated with each game. The display manager resizes and repositions the streaming video content on the display areas of the gaming machine depending on the game themes that are selected and the number of games that are selected. The multi-game action button is displayed on the virtual button deck, wherein the multi-game action button has multiple touch areas to control different combinations of games.

28 Claims, 60 Drawing Sheets

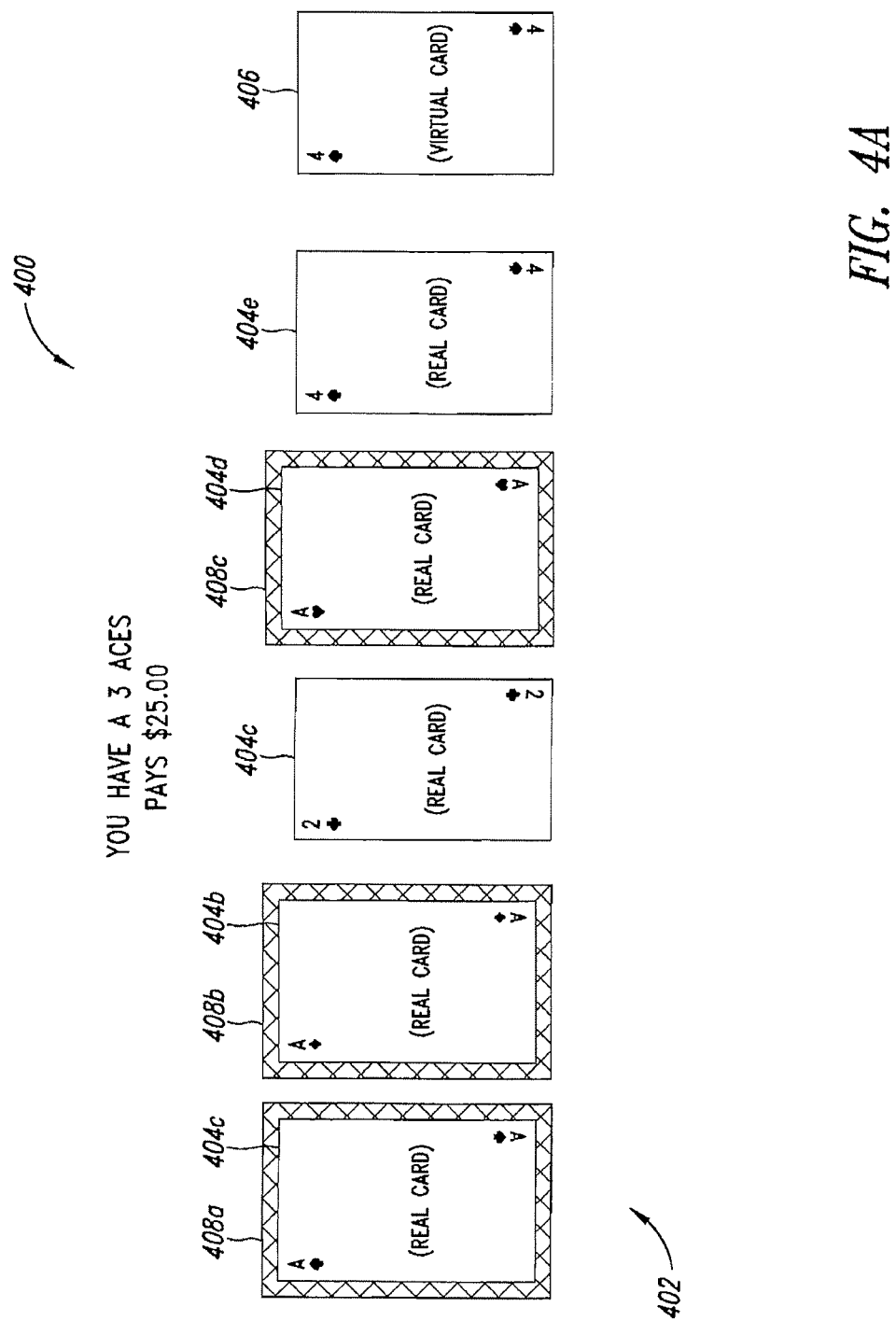

(virtual game layout)

```
                                                    ┌─2500
                                                  ╱
                                                    2502
                                                  ╱
┌──────────────────────────────────────────────────────────────────────┐
│ DETECT PRESENCE/ABSENCE, POSITION OR ORIENTATION OF GAME RELATED PIECE │
└──────────────────────────────────────────────────────────────────────┘
```

*FIG. 25*

```
                                        ┌─2600
                                      ╱
┌──────────────────────────────────────────────────┐
│ OPTICALLY DETECT PHYSICAL ASPECT OF GAME RELATED PIECE │─2602
└──────────────────────────────────────────────────┘
```

*FIG. 26*

```
                            ┌─2700
                          ╱
┌──────────────────────────────────────┐
│ OPTICALLY READ MACHINE-READABLE SYMBOL │─2702
└──────────────────────────────────────┘
```

*FIG. 27*

```
                                                    ┌─2800
                                                  ╱
                                                    2802
                                                  ╱
┌──────────────────────────────────────────────────────────────────────┐
│ INDUCTIVELY/MAGNETICALLY DETECT PHYSICAL ASPECT OF GAME RELATED PIECE │
└──────────────────────────────────────────────────────────────────────┘
```

*FIG. 28*

```
                                          ┌─2900
                                        ╱
┌──────────────────────────────────────────────────────┐
│ WIRELESSLY INTERROGATE RADIO FREQUENCY INDENTIFICATION (RFID) │─2902
│              TRANSPONDER OR RESONANT CIRCUIT          │
└──────────────────────────────────────────────────────┘
```

*FIG. 29*

```
                                        ┌─3000
                                      ╱
                                        3002
                                      ╱
┌──────────────────────────────────────────────────────────┐
│ DETECT PHYSICAL ASPECT OF PLAYING CARD, CHIP, MARKER, MULTISIDED DIE, │
│                TILE, TOKEN, AND/OR SPINNER                │
└──────────────────────────────────────────────────────────┘
```

*FIG. 30*

```
                                ┌─3100
                              ╱
┌──────────────────────────────────────────────┐
│ READ PARTICIPANT IDENTIFICATION MEDIA OR FINANCIAL MEDIA │─3102
└──────────────────────────────────────────────┘
```

*FIG. 31*

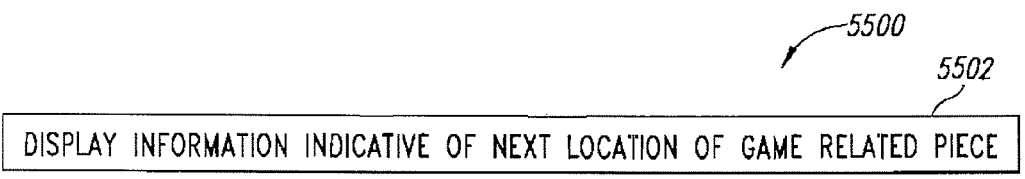
FIG. 55
FIG. 56
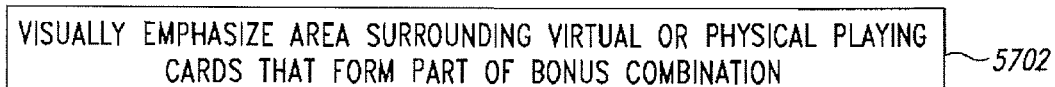
FIG. 57
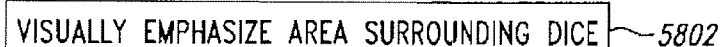
FIG. 58
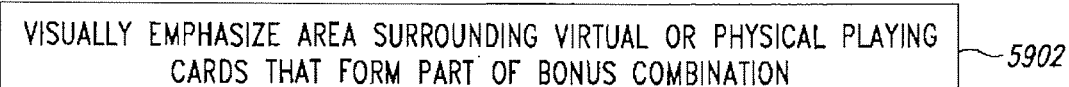
FIG. 59
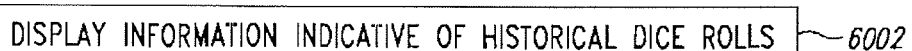
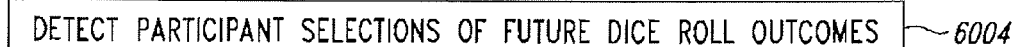
FIG. 60

/— 6700

| RECEIVE INFORMATION INDICATIVE GAME RELATED PIECES ASSOCIATED WITH RESPECTIVE PARTICIPANTS AT RESPECTIVE GAME PLAYING SURFACES |—6702

| RECEIVE INFORMATION INDICATIVE GAME RELATED PIECES ASSOCIATED WITH RESPECTIVE PARTICIPANTS AT RESPECTIVE GAME PLAYING SURFACES PLAYING RESPECTIVE GAMES |—6802

| DETECT CHIPS WITHIN BACK BETTING AREA |—6902

| DETECT CHIPS WITHIN DEMARCATED BACK BETTING AREA |—7002

*FIG. 70*

*Spin Action Button*        *Second Chance Bonus Action Button*

FIG. 88
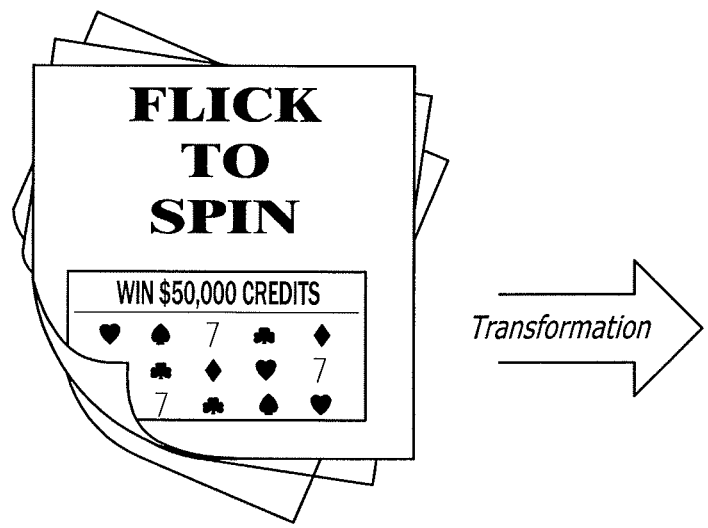
FIG. 89
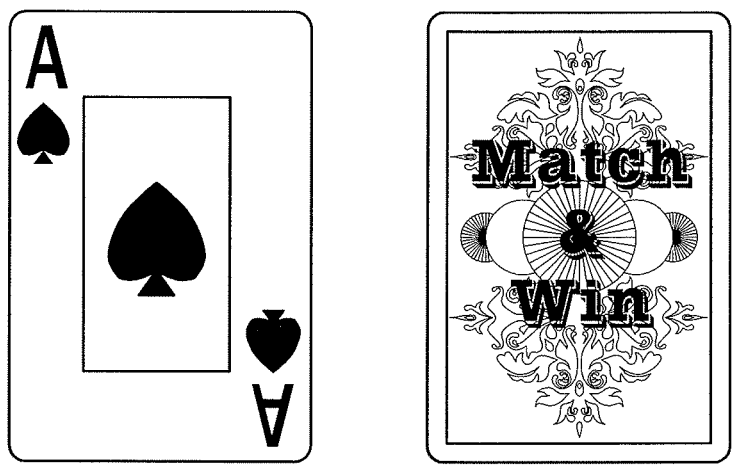

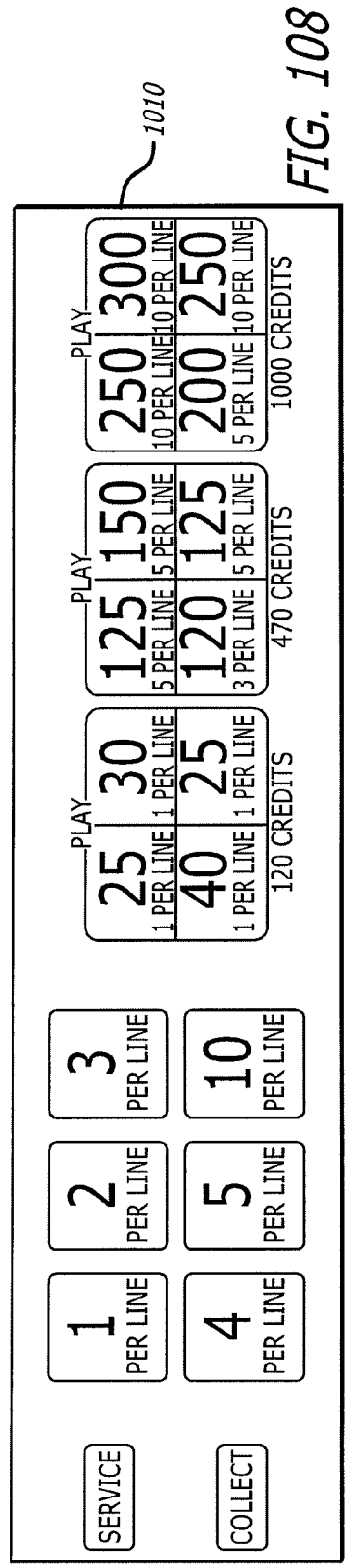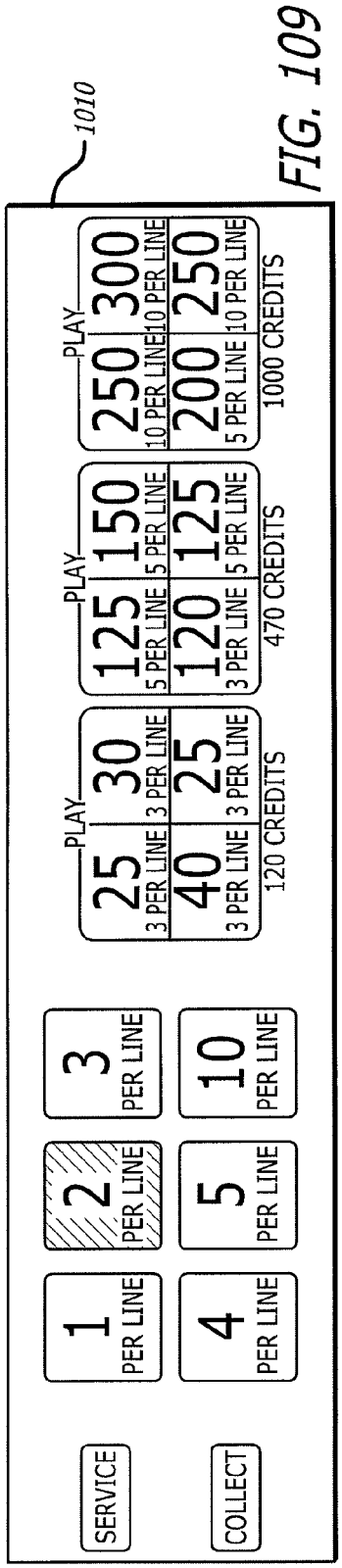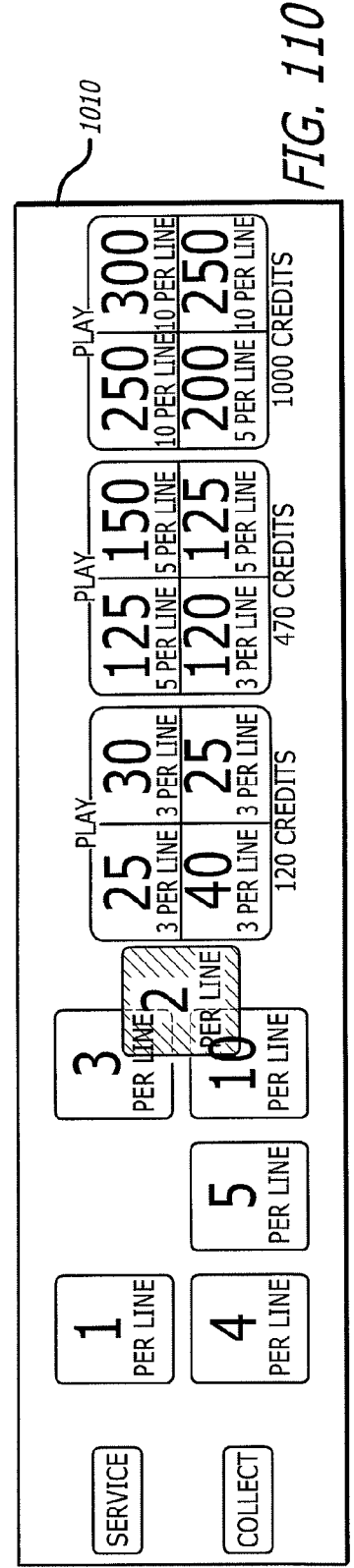

MULTIGAME ACTION BUTTON DECK IN A CONCURRENT GAMING SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS-REFERENCE TO RELATED APPLICATIONS

This application is a related to of U.S. patent application Ser. No. 12/619,625, entitled Gesture Enhanced Input Device, filed Nov. 16, 2009; U.S. patent application Ser. No. 11/938,203, entitled Game Related Systems, Methods, And Articles That Combine Virtual And Physical Elements, filed Nov. 16, 2007; and U.S. Provisional Patent Application No. 60/985,178, filed Nov. 2, 2007, all of which are hereby incorporated by reference in their entirety.

FIELD

This description generally relates to automation of games which may include games with or without wagering.

BACKGROUND

There are numerous types of games that people play for entertainment or educational purposes. Some games are classified as board games. Such games typically include a game layout which is defined or formed by a set of demarcations on a board. Typically, players advance game-related pieces such as tokens, tiles or markers along various paths on the game layout to obtain some goal. The goal may, for example, include being the first player to reach a destination, collecting cards, points or pretend currency, or collecting other game-related pieces such as tokens, tiles, houses, wedges, and the like Examples of board games include chess, checkers, Monopoly, Scrabble, Trivial Pursuit, Battle Ship, Risk, Life, Candyland, Chutes And Ladders, and Go Fish.

Some games are commonly associated with wagering. For example, roulette, craps, and many card games played with playing cards, for instance blackjack, baccarat, various types of poker, Pai Gow poker, and Let It Ride. Sometimes games commonly associated with wagering are played for fun, without the exchange of money and/or for charitable fund raisers which typically involves pretend money. Card games may be played with one or more standard decks of playing cards. A standard deck of playing cards typically comprises fifty-two playing cards, each playing card having a combination of a rank symbol and a suit symbol, selected from thirteen rank symbols (i.e., 2, 3, 4, 5, 6, 7, 8, 9, 10, J, Q, K, and A) and four suit symbols (i.e., diamond-solid, and the like). Some games may include non-standard playing cards, for example, playing cards with symbols other than the rank and suit symbols associated with a standard deck.

Gaming tables have traditionally consisted of a wood structure with a printed felt and an arm pad. There are numerous games played at conventional gaming tables. For example, roulette, craps, and card games are played with playing cards. Table games have long been played on a traditional green felt table, with one or more players sitting at one side of the table and the dealer at the other side of the table standing in the casino pit area. A dealer or an electronic shuffler shuffles the decks of playing cards, which are dealt to the players one by one from a card deck shoe or from a hand held deck. Players place bets or wagers on the table, typically prior to the playing cards being dealt. At the conclusion of the game the dealer judges the hands of the various players, including in some games, the dealers own hand. If a player has a winning hand, the dealer pays the player based upon the size of the wager initially bet and any additional wagers made during game. Losing players have their wagers collected by the dealer. Then, the next round or hand of the game begins.

Pit bosses monitor the amount of wagering by identified players and manually reward players with complimentary benefits commonly referred to as "comps" credited to the player account based upon this wager rate. Often this amount of the comp is significantly off because the pit boss is concurrently monitoring several players at several different tables as well as handling different duties in the pit. This leads to the casino or player being adversely affected.

The pit boss and surveillance cameras monitor the dealer and players to ensure that they are not secretly colluding or are individually acting to defraud the casino. Keen eyes by casino personnel are the only thing that keeps the games honest, and mistakes sometimes happen.

In recent years, electronic systems have been added to table games to aid in the proper comping of players. Typically, such systems electronically detect the size of the bet or wager played by a player. The chips used by players to place bets or wagers may be marked either optically or via wireless interrogation. Chips may be marked with a bar code of some other indicia that is either visible or non-visible to the player. Alternatively, chips may carry radio frequency identification (RFID) transponders. Machine-readable symbol readers or RFID readers recognize the bet or wager by each identified player, and the appropriate comps may be credited to the patron's account based upon the size of wagers. Also, the players' overall value to the casino can be calculated since both wins and losses can be electronically monitored. Table gaming bet or wager recognition has become a significant focus in the casino industry as a way to properly understand total patron value. Each of these technologies has its own fidelity and resolution issues that need to be improved upon.

To aid in fraud detection, table game manufacturers have added the ability to detect the playing cards that are on the playing surface of the gaming table. Some systems read or scan the playing card as the playing cards come out of a deck shoe. Others systems know the order or sequence of playing cards in the card shoe. Some systems may randomly build a card order or sequence, and then also store the order or sequence associated with the deck. Thus, when the playing cards are dealt from the card shoe, the order or sequence is pre-known by the system. Other systems read the playing cards after they are collected at the end of play or hand, and returned to a discard shoe or removed from the gaming table, for example, into a holding area. The goal is to know every playing card that is dealt to each participant, including the dealer, and to look for new or fake playing cards that have been added or substituted into the game by the players or dealers. Some systems monitor all of the metrics of the games so dealer performance can be monitored. Reports may be run to see which dealers are paying out over the typical rate or paying out too much to specific players.

If the playing cards in play are known to the system, then various bonus games or awards, are electronically provided when certain triggering events occur. For example, a certain type of full house (e.g., three of a kind combined with a pair)

could trigger a progressive bonus award to the player or everyone at the same gaming table as the player at that time. This automatic award is clearly an improvement over the manual approaches used to award to players after the playing cards are shown to the dealer and the pit boss. An improved bonus game or bonus card experience that can occur in the middle of a game would be of value to players and the casino. Video card games like video poker have done this effectively over the years, and the same type of experiences needs to be brought to table games.

New table games are often introduced to casino patrons. However, these games require that players are trained on the rules, or the games risk failure. This training takes time and typically slows up wagering and hurts the casino bottom line. Some players will often avoid new table games all together because of the associated learning curve. An improvement to the learning cycle is highly desirable.

Virtual or video based table games could solve many of the aforementioned issues, but they have had limited success to this date. These games suffer, because the players are accustomed to the physical playing cards and chips. It is difficult for a player of traditional table games to give up the tactile feel of playing cards and chips in their hands. There is something special about holding the playing cards and lifting up the corner of a playing card to peek at the markings which makes the table game experience unique. Players enjoy seeing their playing cards come out of the card shoe and slide across the table. The pace and tease of the unknown playing cards is motivating, and almost a compelling factor for most players. A table game product that allows both the new virtual (video) and traditional physical cards and chips would give the player the best of both worlds. Also, it is desirable to improve the casino experience and operation.

Casinos and other gaming establishments are continually looking for ways to make gaming fresher and more exciting for their patrons. For example, many casinos offer the ability to place bonus wagers and/or progressive wagers. New approaches to varying existing gaming and otherwise servicing patrons are highly desirable.

The current physical button offerings, as well as the OLED button panel, require specialized set-up, and configurations to support the types of bet/line configurations offered to our customers.

All existing implementations suffer from a major flaw in that they are limited to what games may be concurrently wagered upon. Specifically, when using fixed label buttons, or equivalent individual buttons with OLED displays, it is essential that each game being concurrently wagered upon have exactly the same configuration of line and bet structure. Accordingly, even though each game may be different, they share an identical number of paylines, and also the same progression of paylines. In addition, the bet progression for each game must also match. In practice, this limitation means that the offered games are quite similar mathematically, as the number of paylines is one of the main drivers of volatility.

There is a continuing need to address these limitations and enable the deployment of arbitrary arrangements of games. The current limitations of being limited to a small subset of games that are dependent upon the first game chosen is detrimental to player choice and player excitement in a gaming environment.

SUMMARY

Briefly, and in general terms, various embodiments are directed to a multi-game action button deck in a concurrent gaming system that includes a gaming machine in communication with a game server via a network, a display manager, multi-game action button, and a touch sensor. The gaming machine includes one or more display areas. The display manager is configured to display content related to one or more games to be played on the display areas of the gaming machine. The content includes a first display area, a second display area, and a virtual button deck display area associated with the play of each game of the one or more games. The content includes streaming video content. The display manager resizes and repositions the streaming video content on the display areas of the gaming machine depending on the game themes that are selected and the number of games that are selected. The multi-game action button is displayed on the virtual button deck. The multi-game action button is segmented in same arrangement as games to be concurrently played are displayed. The multi-game action button has multiple touch areas to control different combinations of games. The touch sensor is configured to detect touch event information on touchscreen buttons to initiate wagering on multiple games at once. The touch sensor sends the touch event information to the display manager, wherein the display manager conducts coordinate transformations and routes the touch event information to a processor executing the game. The touch sensor is configured to detect multiple touch gestures, wherein gestures include simultaneous touches by multiple fingers, consecutive touches by a single finger, touching and sliding of a finger, touching and sliding of multiple fingers, and combinations thereof.

In another embodiment of the multi-game action button deck in a concurrent gaming system, the system includes at least one gaming machine in communication with a game server via a network, a display manager, multi-game action button, and a touch sensor. The display manager is configured to display content related to one or more games to be played on the display areas of the gaming machine. The content includes at least one game display area and a virtual button deck display area associated with each game. The display manager resizes and repositions the content on the display areas of the gaming machine depending on the game themes that are selected and the number of games that are selected. The multi-game action button is displayed on the virtual button deck, wherein the multi-game action button has multiple touch areas to control different combinations of games. The touch sensor is configured to detect touch event information on touchscreen buttons to initiate wagering on multiple games at once. The touch sensor sends the touch event information to the display manager, wherein the display manager conducts coordinate transformations and routes the touch event information to a processor executing the game.

In still another embodiment of the multi-game action button deck in a concurrent gaming system, the system includes one or more gaming machines in communication with a game server via a network, a display manager, multi-game action button, and a touch sensor. The display manager is configured to display content related to one or more games to be played on the display areas of the gaming machine. The content includes at least one game display area and a virtual button deck display area associated with each game. The display manager resizes and repositions the content on the display areas of the gaming machine depending on the game themes that are selected and the number of games that are selected. The multi-game action button is displayed on the virtual button deck, wherein the multi-game action button has multiple touch areas to control different combinations of games. The touch sensor is configured to detect touch event information on touchscreen buttons to initiate wagering on multiple games at once. The touch sensor is configured to detect multiple touch gestures, wherein gestures include simultaneous touches by multiple fingers, consecutive touches by a single finger, touching and sliding of a finger, touching and sliding of multiple fingers, and combinations thereof.

Other features and advantages will become apparent from the following detailed description, taken in conjunction with the accompanying drawings, which illustrate by way of example, the features of the various embodiments.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 4A is a schematic diagram of a portion of a player position of a game playing environment according to one illustrated embodiment, the portion of the player position including a number of physical playing cards and a virtual playing card.

FIG. 25 is a flow diagram of a method of operating a game playing system environment according to an illustrated embodiment, including detecting at least one of a presence/absence of the game-related piece from at least a portion of at least one game playing surface, a position of the game-related piece on the at least one game playing surface, or an orientation of the game-related piece with respect to the at least one game playing surface.

FIG. 26 is a flow diagram of a method of operating a game playing system environment according to an illustrated embodiment, including optical detecting at least one physical aspect of a game-related piece.

FIG. 27 is a flow diagram of a method of operating a game playing system environment according to an illustrated embodiment, including optically reading a machine-readable symbol carried by a game-related piece.

FIG. 28 is a flow diagram of a method of operating a game playing system environment according to an illustrated embodiment, including inductively or magnetically detecting at least one physical aspect of a game-related piece.

FIG. 29 is a flow diagram of a method of operating a game playing system environment according to an illustrated embodiment, including wirelessly interrogating at least one of a radio frequency identification transponder or a resonant circuit carried by the game-related piece.

FIG. 30 is a flow diagram of a method of operating a game playing system environment according to an illustrated embodiment, including detecting a physical aspect of at least one of a playing card, a chip, a marker, a multisided die, a tile, a token, or a spinner or other game-related piece.

FIG. 31 is a flow diagram of a method of operating a game playing system environment according to an illustrated embodiment, including reading at least one of participant identification media or financial media located proximate at least one game playing surface of the game playing system.

FIG. 55 is a flow diagram of a method of operating a game playing system environment according to an illustrated embodiment, including displaying information that is indicative of a next location of the at least one game-related piece.

FIG. 56 is a flow diagram of a method of operating a game playing system environment according to an illustrated embodiment, including visually emphasizing an area surrounding a physical playing card on a game playing surface.

FIG. 57 is a flow diagram of a method of operating a game playing system environment according to an illustrated embodiment, including visually emphasizing an area surrounding at least one of a virtual playing card or a physical playing card on a game playing surface that form part of a bonus combination.

FIG. 58 is a flow diagram of a method of operating a game playing system environment according to an illustrated embodiment, including visually emphasizing an area surrounding each of a number of dice on a game playing surface.

FIG. 59 is a flow diagram of a method of operating a game playing system environment according to an illustrated embodiment, including displaying at least a virtual pair of dice with the same pattern as a physical pair of dice that have been rolled.

FIG. 60 is a flow diagram of a method of operating a game playing system environment according to an illustrated embodiment, including displaying information indicative of a history of previous rolls of dice and detecting selections by participants of an outcome of a future roll of dice.

FIG. 67 is a flow diagram of a method of operating a game playing system environment according to an illustrated embodiment, including receiving information indicative of respective game-related pieces associated with each of at least two different participants at a respective game-playing surfaces playing a single game.

FIG. 68 is a flow diagram of a method of operating a game playing system environment according to an illustrated embodiment, including receiving information indicative of respective game-related pieces associated with each of at least two different participants at a respective game playing surfaces playing in respective games.

FIG. 69 is a flow diagram of a method of operating a game playing system environment according to an illustrated embodiment, including detecting chips within a back betting area associated with a primary participant playing a game.

FIG. 70 is a flow diagram of a method of operating a game playing system environment according to an illustrated embodiment, including displaying a virtual game layout and sensing at least one physical aspect of a game-related piece.

FIG. 88 is a diagram of a Virtual Dice Action Button with Multiple Dice Result.

FIG. 89 is a diagram of a Flick To Spin Action Button.

FIG. 108 illustrates an example configuration of multi-action buttons with editing ability on the Multi-Game Action Button Deck.

FIG. 109 illustrates an initial touch of an editing button on the Multi-Game Action Button Deck.

FIG. 110 illustrates a drag of an editing button icon on the Multi-Game Action Button Deck.

FIG. 115 illustrates a logical flow diagram in which start times of each game are adjusted to match end times.

FIG. 116 illustrates a logical flow diagram in which frame rate of each game are adjusted to match maximum game length time.

DETAILED DESCRIPTION

Figure 1:
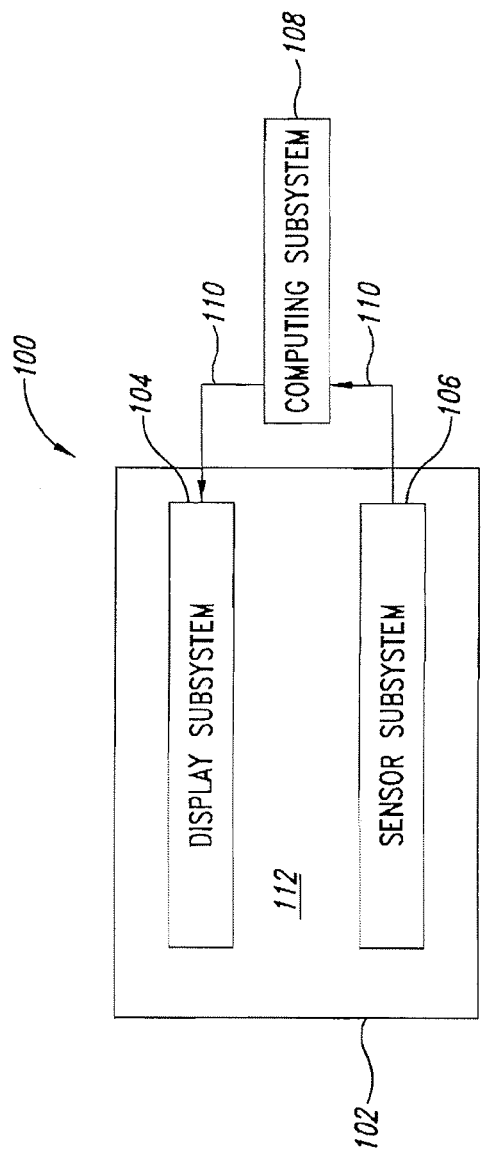
FIG. 1 is a schematic view of a game playing environment according to one illustrated embodiment, including a gaming table, a display subsystem operable to display a virtual game layout, a sensor subsystem configured to sense or detect physical aspects of objects, and a computing subsystem.

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, well-known structures associated with servers, networks, displays, media handling and/or printers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

As used herein the term "physical" refers to tangible elements associated with a game. Such elements may take a variety of forms, including but not limited to playing cards, chips, dice, tiles, spinners, tokens or markers for instance chess pieces, checker pieces, pieces that represent players, houses in Monopoly, ships in Battleship, wedges in Trivial Pursuit, and the like. As used herein, the term "virtual" refers to a logical construct of an element associated with a game and a visual display of the logical construct, where there is no physical counterpart to the particular element in use in the game as the game is being played. For example, a virtual game layout refers to the logical construct of a layout of a game and the visual display of the game layout (e.g., demarcations typically found on a board or felt). As another example, a virtual playing card refers to the logical construct of a playing card which does not represent a physical playing card dealt or drawn in the game. As another example, a virtual chip refers to the logical construct of a monetary value which does not represent a physical chip placed as a wager in the game. As used here in the term "representation" or "visual representation" refers to a visual display of an icon or other graphical element that is representative of a physical object associated with a game. For example, a visual icon may be displayed representing a physical playing card, physical chip or physical dice that are in use in the game.

Description of Game Playing Environments

FIG. 1 shows a game playing environment 100 according one illustrated embodiment.

The game playing environment 100 takes the form of at least one game playing system, for example a table gaming system or an upright or arcade style gaming system. In at least one embodiment, the table gaming system may include a gaming table 102, at least one display subsystem 104 associated with the table gaming 102, at least one sensor subsystem 106 associated with the gaming table 102, and at least one computing subsystem 108 communicatively coupled via communications links 120 to the display subsystem 104 and the sensor subsystem 106.

As described in more detail below, game playing environments 100 or a game playing system may employ virtual game layouts including displays of various demarcations associated with a variety of games. The demarcations may, for example, set out various fields or areas associate with a game. For instance, the demarcations may set out wager or betting areas, a place where playing cards are to be positioned or may set out a path around which tokens are moved.

In particular, the computing subsystem 108 may cause the display subsystem 104 to display the virtual game layout in the form of demarcations on or below a playing surface 122 of the gaming table 102. The sensor subsystem 106 may sense or detect physical aspects of physical objects such as game-related pieces (e.g., playing cards, chips, dice, tokens, tiles, markers, spinners). Additionally, or alternatively, the sensor subsystem 106 may sense or detect physical aspects of physical media, for instance identity media (e.g., loyalty program cards, drivers' licenses, passports, company identification badges) and/or financial media (e.g., credit cards, debit cards, prepaid cards). Additionally or alternatively, the sensor subsystem 106 may sense or detect physical inputs (e.g., selection of keys or icons) by individuals, for example, participants such as players and/or dealers.

The sensor subsystem 106 may provide information regarding the sensed or detected physical aspects, identity or financial media and/or individual inputs to the computing subsystem 108 for processing. The computing subsystem 108 may cause the display subsystem 104 to update the display of certain information based on the information received from the sensor subsystem 106. Additionally or alternatively, the computing subsystem 108 may process the received information, for example, to determine actual value of a patron, place orders, detect suspect playing patterns, perform accounting, evaluate dealer performance, and the like. Details of such processing and further aspects are described as part of the description of the various specific embodiments discussed herein.

Figure 2A:
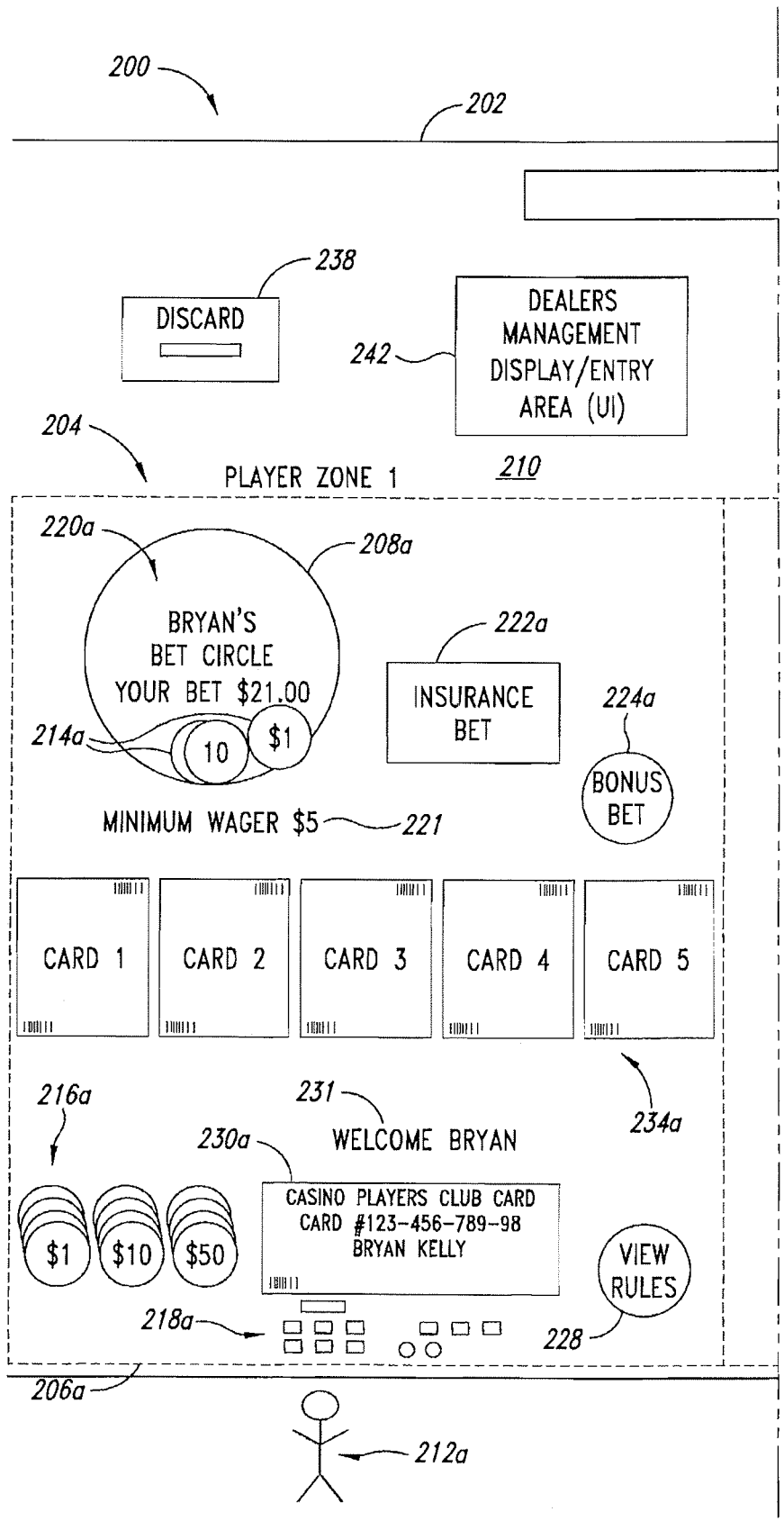
FIGS. 2A, 2B and 2C are schematic diagrams of a game playing environment according to multiple illustrated embodiments, including a gaming table with a virtual game layout including demarcations associated with multiple player positions, a number of physical objects such as playing cards and chips, a number of players and a dealer or attendant may be present in the game playing environment.
Figure 2B:
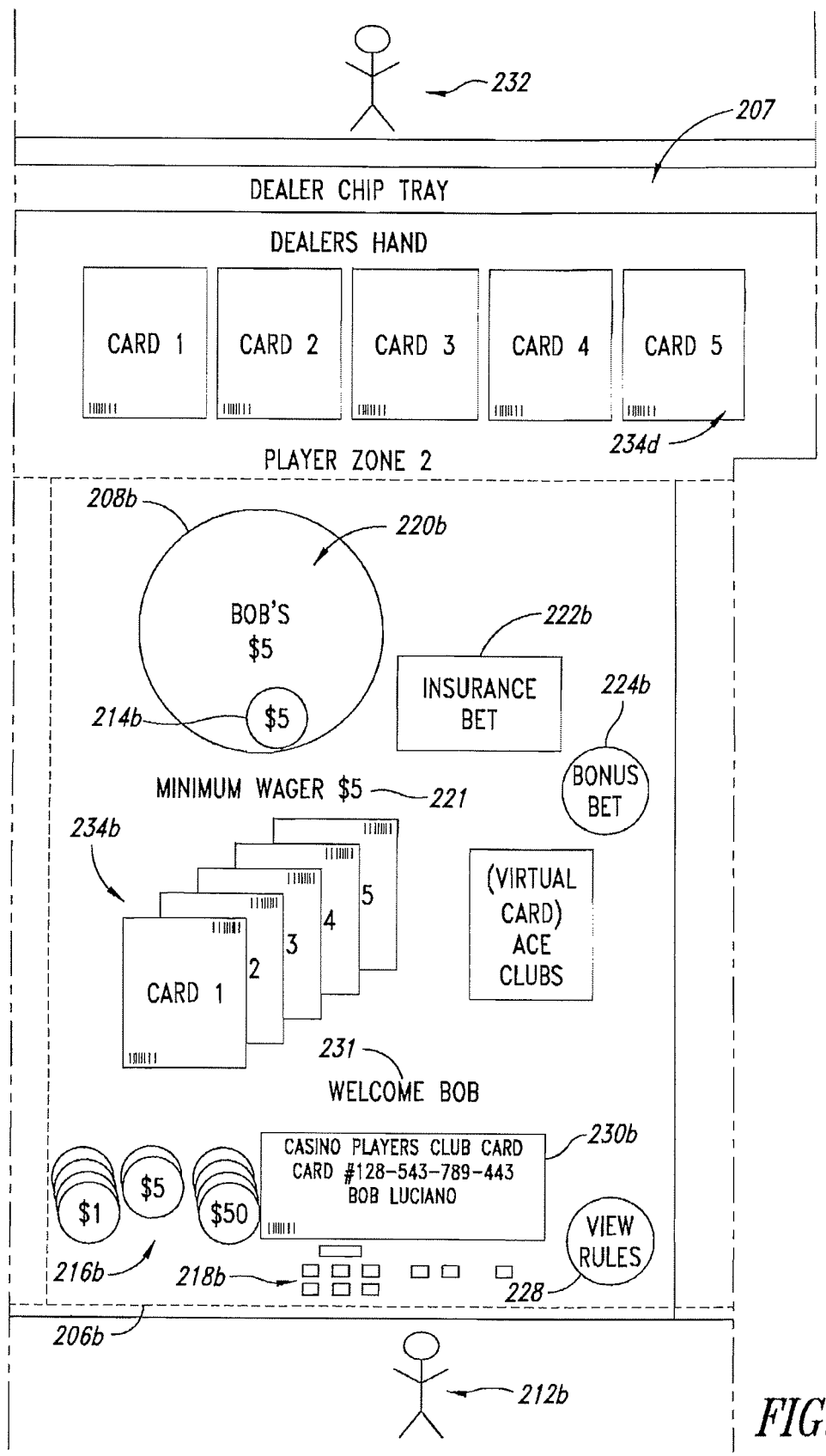
Figure 2C:
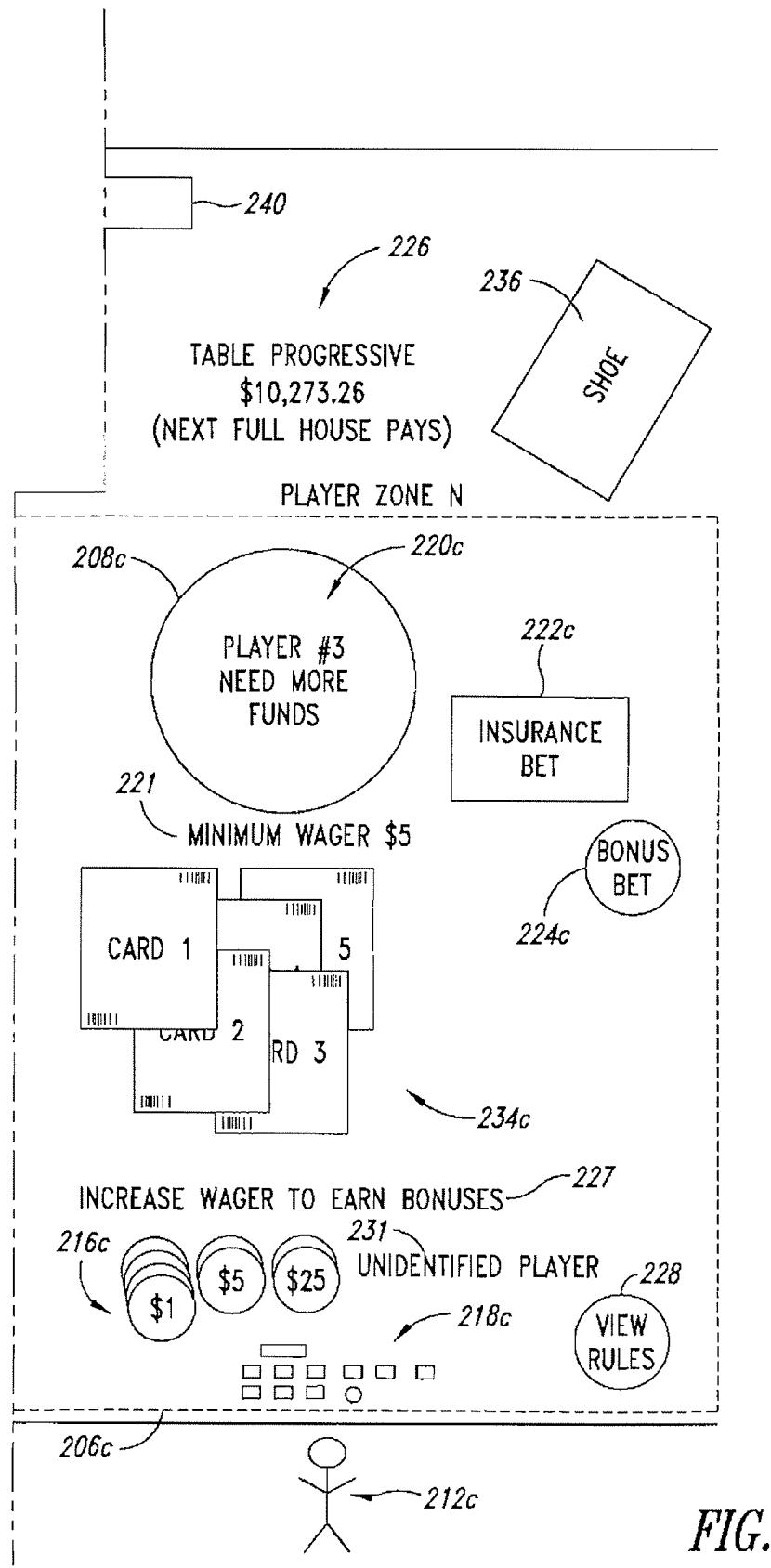

FIGS. 2A, 2B, and 2C show a gaming environment 200 according to multiple illustrated embodiments.

The gaming environment includes a table gaming system 202 having a virtual game layout 204 including various demarcations appropriate to the game of Blackjack. While represented in FIG. 2A as a virtual game layout 204 suitable for Blackjack, the game playing systems described herein, such as a table gaming system 202, may include virtual game layouts for other games. For example, the table gaming system 202 may include virtual game layouts for games which typically involve wagering, for instance, poker, roulette, craps, baccarat, Let It Ride, Pia Gow poker, and the like. Also for example, the table gaming system 202 may include virtual game layouts for games which typically do not involve wagering, for instance chess, checkers, Monopoly, Scrabble, Trivial Pursuit, Battle Ship, Risk, Life, Candyland, and Chutes And Ladders. It is noted that many games commonly associated with wagering may be played without wagering or with pretend money or chips. Likewise, wagers may be placed in or on many games that are not commonly associated with wagering, such as board games. One of the advantages of some of the embodiments described herein is the ability to rapidly change a table gaming system between various games to accommodate the desires of the patrons or casino.

The table gaming system 202 has a number of player positions 206a-206c (collectively referenced as 206) and, optionally a dealer position 207.

The table gaming system 202 may include one or more secondary displays in addition to the principal display(s). The playing surface of the table gaming system 202 may include a single surface computing display or device, or multiple surface computing displays or devices in close proximity to each other. Each player may have a respective portion of zone a of a single surface display or may have their own respective surface display.

In certain games the player positions 206 are typically associated with a primary wagering area, commonly referred to as a betting circle. The virtual primary wagering area on the table gaming system 202 may be visually identified by betting circle demarcations 208 a-208c (collectively 208) displayed on or below a playing surface 210 of the table gaming system 202. A player 212a-212c (collectively 212) may place a bet or wager on the outcome of the game being played or an event in the game being played by locating one or more physical chips 214a, 214b (collectively 214) or other items of value in the respective betting circle demarcations 208a-208c from the player's 212 respective chip reserves 216a-216c (collectively 216). Additionally or alternatively, a player 212 may place a primary wager by entering appropriate information via a respective user interface 218a-218c (collectively 218). Information 220a-220c (collectively 220) about the wager may be displayed, for example within or proximate the betting circle demarcations 108. For example, information 220a, 200b may be displayed indicating a total amount wagered and/or information 220c may indicate that a player has yet to place a wager. The virtual game layout 204 may also include information 221 indicative of a minimum and/or maximum range for the primary wager.

The player positions 206 may also be associated with respective additional wagering areas.

For example, in certain games player positions 206 may include a virtual insurance bet area which allows the player to place an insurance bet or similar wager on the occurrence of particular event (e.g., when the dealer has an Ace showing). The insurance bet area on the table gaming system 202 may be visually identified by insurance bet area demarcations 222a-222c (collectively 222) displayed on or below the playing surface 210 of the table gaming system 202. A player 212 may place an insurance bet by locating one or more physical chips or other items of value in the respective insurance bet demarcations 222. Additionally or alternatively, a player 212 may place an insurance bet by entering appropriate information via a respective user interface 218a-218c.

Also for example, in certain games the player positions 206 may optionally include a virtual bonus wagering area, commonly referred to as a bonus betting circle. The bonus wagering area on the table gaming system 202 may be visually identified by bonus wagering area demarcations 224a-224c (collectively 224) displayed on or below the playing surface 210 of the table gaming system 202. A player 212 may place a bonus bet or bonus wager by locating one or more physical chips or other items of value in the respective bonus betting circle demarcations 224a-224c. Additionally or alternatively, a player 212 may place a bonus wager by entering appropriate information via a respective user interface 218a-218c.

A bonus wager or bet may entitle a player 212 to participate in a bonus. The bonus wager may be in addition to a conventional or primary wager on the outcome of the game being played at the gaming table 102 under the standard rules of the game, and entitles a player to participate in an award of a bonus pool. In some embodiments, placement of the conventional wager will entitle a player to participate in the bonus pool.

The bonus may take any of a variety of forms including a jackpot, progressive jackpot or other type of bonus. For example, if a player has placed a wager, the computing subsystem or some other computing system may increase the bonus pool by an appropriate amount. The amount may be, for example, a fixed amount or a percentage of the wager. In some embodiments, the entire bonus wager may be placed into the bonus pool. In other embodiments, a portion of the bonus wager may be placed in the bonus pool. In other embodiments, a portion of the conventional or primary wager may be placed in the bonus pool. The bonus pool may include contributions from a single gaming table, more than one gaming table, a single pit, multiple pits, a single property or multiple properties. The bonus pool may additionally, or alternatively, include contributions from one or more game operators, casinos or property owners as a promotional prize.

The outcome of the bonus may be based on any of a variety of events, for example an event related to the player's own hand or the dealer's hand, an event occurring at the particular table gaming system 202, and an event occurring at another gaming table, an event occurring at one or more specific properties, a randomly-generated event or value (e.g., outcome of random number generator), and/or a passage of a set or a random amount of time. Likewise, the size or composition of the bonus may be based on any of a variety of factors, for example total amount of bonus wagers by a player, by players at a table, by players at a property, by players across multiple properties, a total amount of primary wagers, an amount of time or number of wagers over a period of time, a set contribution amount by one or more properties, an outcome of a random number generator, and the like. The bonus pool may take the form of money or equivalent (e.g., chips) prizes. Also as noted above, the bonus pool may additionally, or alternatively include goods and/or services. For example, the bonus pool may include automobiles, recreational equipment, vacation packages, and/or services such as meals, shows, drinks, casino club points, cash, promotional game credits, combinations of prize types, and the like, which may be available on the property or off the property.

Bonus-related information 226 about the current status of a bonus may be displayed on or below the playing surface 210 of the gaming table. The bonus related information 226 may include information about the type of bonus (e.g., table progressive), the current size or amount of the bonus (e.g., $10, 273.26), and/or the condition for winning the bonus (e.g., next full house pays). Player-specific, bonus-related information 227 may be displayed on or below the playing surface 210 of the gaming table at one or more player positions 206c. For example, player-specific, bonus related information 227 may indicate that in increase in a primary wager is necessary to earn or to be entitled to participate in the bonus.

In some embodiments, the table gaming system 202 may allow a player 212 to view or otherwise receive information about the rules of various games, for example, the game associated with a currently displayed virtual game layout 204. The table gaming system 202 may, for example, include a user-selectable icon or operable key 228, selection or operation of which produces a display of information about the rules of the game for the current virtual layout 204. In some embodiments, the display may include a narrative or prose explanation of the rules of the games. In some embodiments, the display may include a video showing the game being played. The video may be presented in its own isolated area. Alternatively, the video may incorporate one or more of the demarcations of the currently displayed virtual layout 204. For example, the video may illustrate the placement of certain wagers by displaying images of virtual chips in respective demarcated wager or bet areas or circles. Also, for example, the video may illustrate various playing card combinations displaying images of virtual playing cards at various player positions 206. Such may be more informative and more entertaining than a display of a narrative or prose version of the rules.

In some embodiments the sensor subsystem 106 (FIG. 1) of the table gaming system 202 may be capable of reading information from media 230a, 230b (collectively 230), for example-identity media and/or financial media. In such embodiments, the table gaming system 202 may have a specific area in which the media 230 is located. Information read from the media may allow the collection, tracking and/or analysis of a variety of player specific information such as player worth, any may allow automation of the determination of complimentary benefits (commonly known as "comps") that are issued to reward players 212. The information may also allow customization of player positions 206, for example allow the display of messages 231 tailored to specific players 212.

The table gaming system 202 may also include various system components including: game monitoring units (e.g., Bally MC300), magnetic or smart card reader(s), pin pads, iVIEW player tracking displays, speakers, amplifiers, audio mixers, biometric input devices, printers and other input/output devices. In one embodiment, the sensor subsystem may scan a fingerprint or handprint of a patron such as a player, for use in identifying the player or in authorizing a financial transaction.

In many games, for example Blackjack, a dealer 232 deals physical playing cards 234a-234c to the players 212, and in some games the dealer 232 may deal physical playing cards 234d (collectively 234) to the dealer's own self. The dealer 232 may deal physical playing cards 234 from a handheld deck or from a card shoe 236. The card shoe 236 may, for example, take the form of a playing card handling system, for example, an automatic shuffling machine. The dealer 232 may collect playing cards 234 from the players 212 and the dealer's own self after each hand is played out or after all hands have been played out. The dealer 232 may place the collected playing cards 234 in a discard shoe or receptacle 238. In some embodiments, the card shoe 236 and discard shoe or receptacle 238 are part of a single device that randomizes the playing cards 234.

In many games, the dealer 232 uses a chip tray 240 for storing wagers commonly represented by chips or other physical objects collected from losing players 212 and for paying out winnings to winning players 212.

The table gaming system 202 may include a dealer interface 242 that provides information to the dealer 232 and/or allows the dealer 232 to input information, make selections, control various aspects of the game, view information about specific players 212, and/or request assistance. The dealer interface may include one or more dealer selectable icons and/or dealer operable keys.

Figure 3:
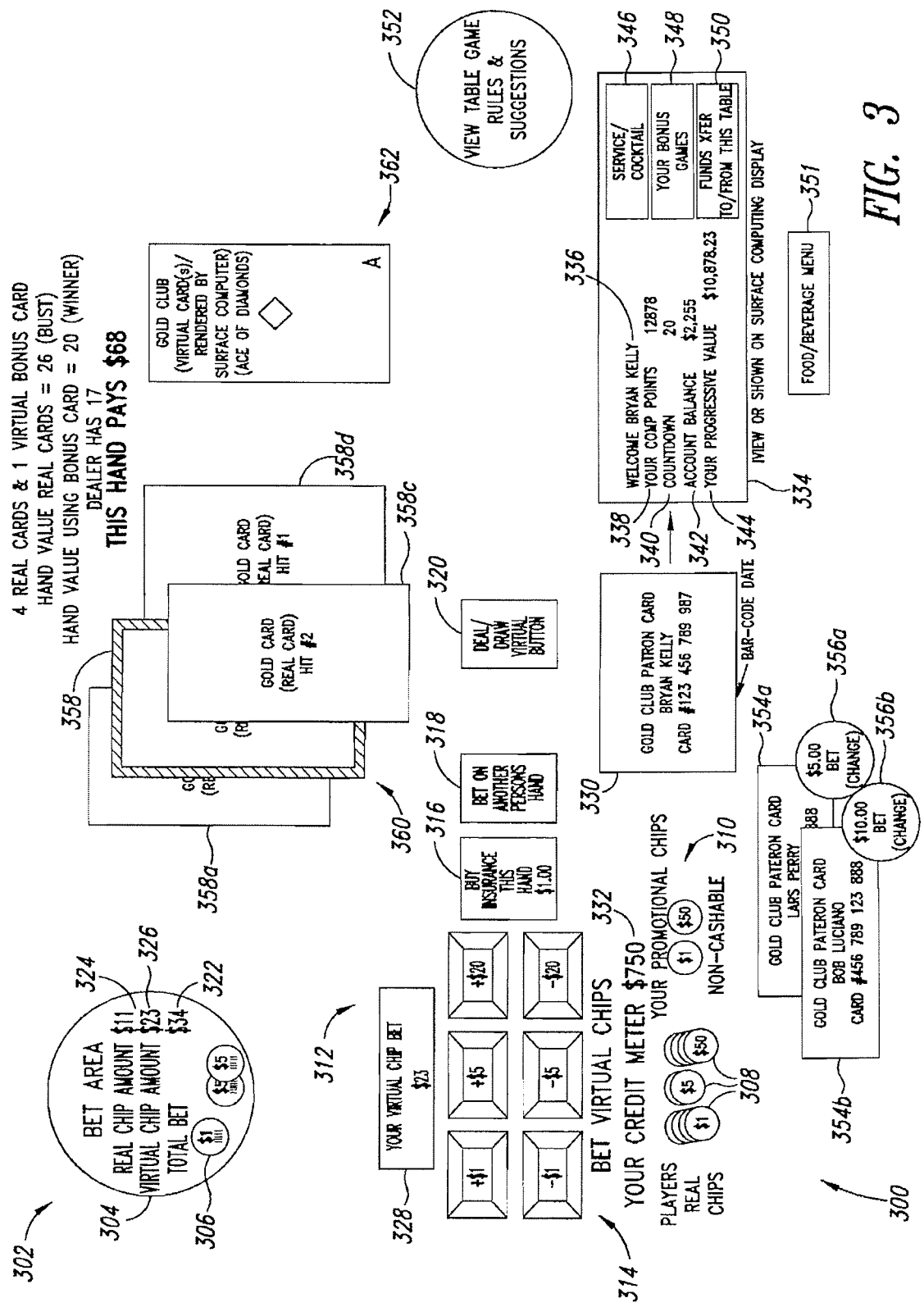
FIG. 3 is a schematic diagram of a player position of a game playing environment according to one illustrated embodiment, the player position including a virtual game layout having demarcations identifying betting or wagering areas and a user interface, virtual playing cards, virtual chips, the player position also including a number of physical objects such as physical playing cards, and chips and media, such as player identity or financial media.

FIG. 3 shows a player position 300 according to one illustrated embodiment, including a virtual game layout 302 for use with one or more physical objects.

The virtual game layout 302 of the player position 300 includes betting circle demarcation 304. Primary wagers or bets may be made by placing an appropriate number of physical chips 306 within the betting circle demarcation 304. As discussed in detail below, the sensor subsystem 106 (FIG. 1) is configured to detect the number and/or value of the physical chips 306 located in the betting circle demarcation 306.

A primary player may store or locate their bank of physical chips 308 in a variety of locations at the player position 300, or the virtual game layout 302 may include chip storage area demarcation (not shown). In some embodiments, the sensor subsystem 106 (FIG. 1) is configured to detect the number and/or value of the physical chips 308 in the player's bank.

In some embodiments, promotional or bonus amounts may be provided to individual players for placing wagers. Such may be a form of comping or other award or reward to a player. Such may, for example, be based on amount wagered, time spent wagering, assessed skill level, and/or previous wagering, and the like. In some embodiments, the amount may not be converted directly into currency, but rather must be wagered or forfeited. In embodiments employing promotional amounts (i.e., amounts restricted to replay on the gaming device), the virtual game layout 302 of the player position 300 may include a virtual promotional amount, for example, in the form of virtual chip icons 310 having a cumulative value equal to that which has been assigned or allocated to the specific player. The virtual chip icons 310 may be placed as a wager, for example in response to player selections via a player user interface 312.

The player user interface 312 may include one or more player selectable icons which may be displayed by the display subsystem 104 (FIG. 1) on or below the playing surface 210 (FIG. 2A) of a gaming table. For example, the player user interface 312 may include player selectable icons 314 that allow the player to increment or decrement a wagered amount on a primary wager. Also for example, the user interface 312 may include player selectable icons 316 that allow the player to place an insurance wager (i.e., "buy insurance") and/or player selectable icons 318 to place a wager as a back betting or secondary player on another player or hand on same or different table. The player user interface 312 may include one or more player selectable icons 320 that allow the player to have a physical or virtual card dealt or drawn.

In some embodiments, the user interface 312 may include a number of player selectable physical keys (not shown in the FIG.) in place of, or in addition to, the various player selectable icons. Alternatively, or additionally, the virtual chips icons 310 may form part of the player user interface 312. For example, a player may place a wager by selecting one or more of the virtual chip icons 310 and/or by selecting a desired wagering or betting area or circle 304. For instance, a player may place a wager by touching a virtual chip icon 310 to select the virtual amount represented by that virtual chip icon 310 and dragging the virtual chip icon 310, for example, with a finger to the desired wagering or betting area or circle 304 to select the desired wagering or betting area or circle 304.

In some embodiments, the virtual game layout 302 may display an indication 322 of a total of the currently wagered amount, as well as an indication 324 of the amount wagered using physical chips and an indication 326 of the amount wagered in promotional chips or amounts represented by the virtual chip icons 310. Such may, for example, be displayed within the betting circle demarcation 304. The virtual game layout 302 may display an indication 328 of the total wager in promotional chips or amount proximate the icons 314.

In some embodiments, the virtual chip icons 310 may be convertible into lower or higher value denominations. For example, a defined selection mechanism may allow a player to vary the number denomination of the virtual chip icons 310. For instance, tapping twice on a virtual chip icon 310 may produce two virtual chip icons, each with half the value of the selected tapped virtual chip icon 310.

The virtual chip icons 310 may advantageously be displayed proximate the location of the physical chips 308, allowing a player to assess their entire bank. In embodiments without a defined player bank area, the virtual chip icons 310 may be displayed proximate a location at which the player's bank is determined to reside. Thus, the virtual layout 302 of the player position 300 may be customized in response to the player's placement of their chips 308.

The virtual game layout 302 of the player position 300 may also include an area or location to place primary player associated physical media 330, for instance identity media (e.g., loyalty program cards, drivers' licenses, passports, company identification badges) and/or financial media (e.g., credit cards, debit cards, prepaid cards, cellular phones, smartcards). The primary player associated physical media 330 identifies the primary player and/or an account that belongs to or is otherwise associated with the primary player. The virtual game layout 302 may, or may not, include demarcations of the primary player media placement area or location. As discussed in detail below, the sensor subsystem 106 (FIG. 1) is configured to read information from the primary player media 330 located in the media placement area or location, or located in other areas on the playing surface 210 (FIG. 1) or otherwise proximate the table gaming system 202. For example, an RFID interrogation system may employ antenna in or around the table gaming system 202 to detect primary player media 330 which carries one or more RFID transponders.

Information read from primary player physical media 330 may allow the primary player to establish credit, for example withdrawing funds from an account or from a prepaid card or charging to an account. The virtual game layout 302 may display an indication 332 of a total amount of credit (e.g., player's account) that the primary player has established. The indication 332 may also reflect amounts that are automatically debited upon each wager from the credited amount (e.g., player's account).

The virtual game layout 302 of the player position 300 may also include an area or location 334 to display player specific information or allow player specific requests to be made. For example, virtual game layout 302 may display a player identifier 336 such as a name, an indication 338 of a current total of comp points that have been awarded to the player, a count down 340, an indication 342 of a total account balance, and an indication 344 of a player specific progressive value. Player selectable icons may be provided for a variety of player requests. For example, a player selectable icon 346 to request service or beverage, a player selectable icon 348 for bonus games and/or a player selectable icon 350 to execute a funds transfer. The virtual game layout 302 may include a menu 351 of food, beverages or other items of services.

As noted previously, the virtual game layout 302 may include a player selectable icon 352 to allow a player to receive information about one or more games, for example, including the rules, video demonstrating the game, and/or suggestions on game play.

The virtual game layout 302 of the player position 300 may also include an area or location to place back betting or secondary player associated physical media 354a, 354b (collectively 354), for example identity media and/or financial media. The back betting or secondary player associated physical media 354 identifies the a back betting or secondary player that is wagering on the play of a primary player or a primary player's hand and/or an account that belongs to, or is otherwise associated with, the back betting or secondary player. The virtual game layout 302 may, or may not, include demarcations identifying the back betting or secondary player media placement area or location. As discussed in detail below, the sensor subsystem 106 (FIG. 1) is configured to read information from the media 354 located in the back betting or secondary player media placement area or location. In some embodiments, the sensor subsystem 106 may read information from the physical media 354 located elsewhere on the table surface 210, or even proximate the player position 302. In such embodiments, precautions should be taken to assure that information read is actually intended to be a wager placement. One approach to assuring such is limiting a range of the sensor subsystem 106. Additionally or alternatively, the system may determine a position of the physical media 354 and associate the determined position with a closest one of the player positions. The position of the physical media 354 may be determined in a variety of ways, for example in absolute or relative coordinates, and/or in Cartesian or polar coordinates. The position of the physical media 354 may, for example, be determined using triangulation, time of flight measurements or differences in time between receipt of responses to interrogation signals.

The virtual game layout 302 of the player position 300 may also include an indication 356a, 356b (collectively 356) of information that is indicative of a wager placed by a back betting or secondary player. For example, the virtual game layout 302 of the player position 300 display an indication 356 that provides an amount or size of a back line bet or wager placed by one or more back betting or secondary players. The indication 356 may be proximate the location of the respective back betting or secondary player associated media 354a, 354b.

A number of physical playing cards 358a-358d (collectively 358) may be positioned on the playing surface 210 in the player position 302. The physical playing cards 358 may have been dealt to the player 212a (FIG. 2A) by the dealer 232. In some games, players 212 may touch and/or move the playing cards 358, while in other games the players 212 are not permitted to touch the playing cards 358.

In some embodiments, the virtual game layout 302 may provide an emphasis indication 360 with respect to one or more physical playing cards 358b. For example, the virtual game layout 302 may include a border, highlight, change in background color, flashing, marqueeing or other visual emphasis to indicate information about one or more particular playing cards 358b.

Some embodiments may employ virtual playing cards and/or virtual bonus cards 362 in addition to, or as a substitute for, physical playing cards 358. The virtual game layout 302 may display the virtual cards 362 on or below the playing surface 210 of the gaming table at the particular player position 302 to whom the virtual card is dealt. The virtual playing cards 362 may be used with the physical playing cards 358 or in place of a respective one of the physical playing cards 358 in forming a hand under the rules of the respective game. Thus, virtual playing cards 362 can be combined with one or more of the physical playing cards 358 to form a winning combination of playing cards. The virtual playing cards 362 may, for example, be dealt or drawn in response to player activation or selection of the player selectable icon 320.

FIG. 4A shows a portion of a virtual game layout 400 that includes a portion of a player position 402, illustrating the use of physical playing cards and virtual playing cards according to one illustrated embodiment.

A player 212a (FIG. 2A) may have been dealt or drawn a total of five physical playing cards 404a-404e (collectively 404). The player may also have been dealt or drawn one or more virtual playing cards 406. The display subsystem 104 (FIG. 1) displays the virtual playing cards 406 on or below a gaming surface 210 (FIG. 2A). A bonus multiplier or other symbol can also be added to a physical playing card by highlighting a specific playing card or group of playing cards in some way.

A winning combination may, for example, consist of the three playing cards 404a, 404b, 404d having the rank of Ace.

The virtual game layout 400 may include an emphasis indication 408a-408c (collectively 408) identifying each of the physical playing cards 404a, 404b, 404d in the winning combination. The emphasis indication 408 may, for example, include a border, highlight, change in background color, flashing, marqueeing or other visual emphasis. Additionally or alternatively, the virtual game layout 400 may include an appropriate message regarding the winning combination (e.g., "You have 3 Aces, Pays $25.00").

Where the game is poker, the winning combination may be a full house, formed by both physical and virtual playing cards, for instance, the three cards having the rank Ace and 402a, 402b, 402d along with two playing cards having the rank four 402e, 404. An emphasis indication 408 in such an embodiment may highlight the virtual playing card 406, as well as the physical playing cards 404 making up the particular winning combination.

Figure 4B:
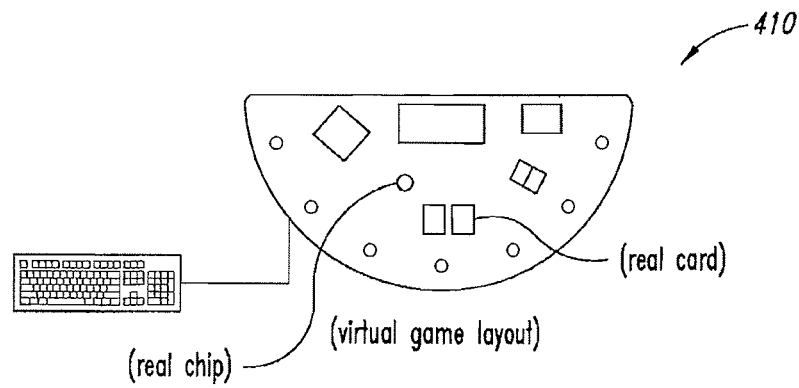
FIG. 4B is a schematic diagram of a portion of a game playing environment according to one illustrated embodiment; the illustrated portion includes a virtual layout of a blackjack table including a physical playing card, a virtual playing card, and a real chip.

FIG. 4B shows a virtual layout of a blackjack table 410 with a set of blackjack demarcations and including, for example, physical playing cards, virtual playing cards including real (i.e., physical) chips according to one illustrated embodiment. In some embodiments, the game playing environment may include user input devices in the form of a keyboard or keypad 412. The keyboard or keypad 412 may be operable to allow entry of, for example, a personal identification number, and/or a wager amount.

Figure 4C:
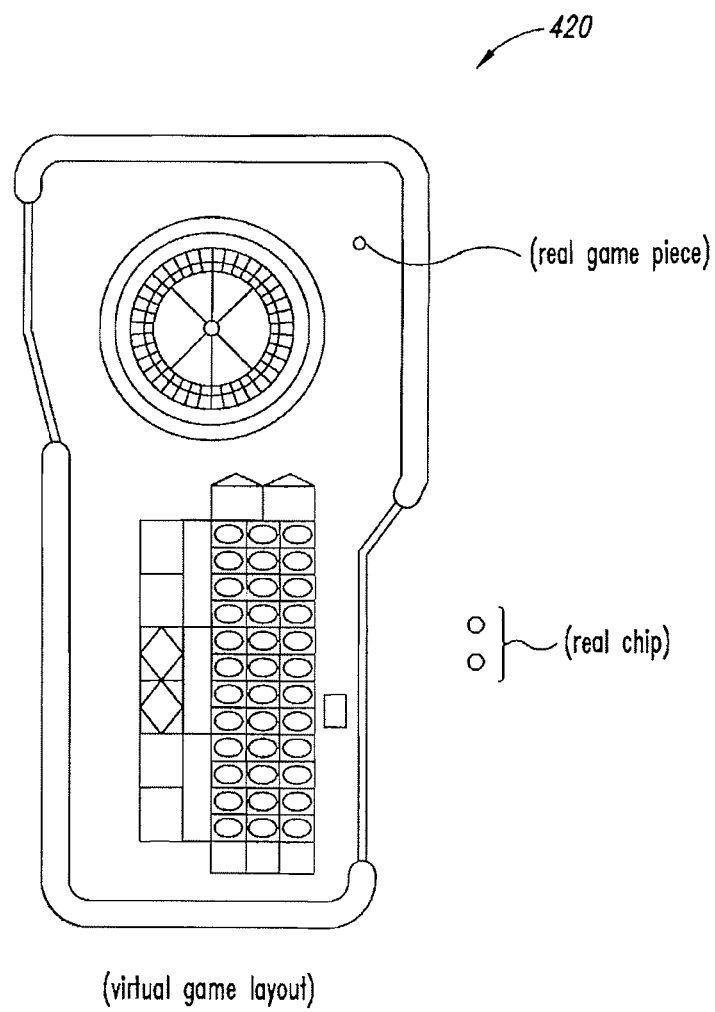
FIG. 4C is a schematic diagram of a portion of a game playing environment according to one illustrated embodiment; the illustrated portion includes a virtual layout of a roulette wheel, a physical game piece, and a real (i.e., physical) chip.

FIG. 4C shows a virtual layout of a roulette wheel 420 with a set of roulette wheel demarcations and roulette table layout demarcations, and including physical game-related pieces including real (i.e., physical) chips. In some embodiments, the game field comprises a representation of a roulette table surface, a wheel, and a ball spinnable about the wheel.

Figure 4D:
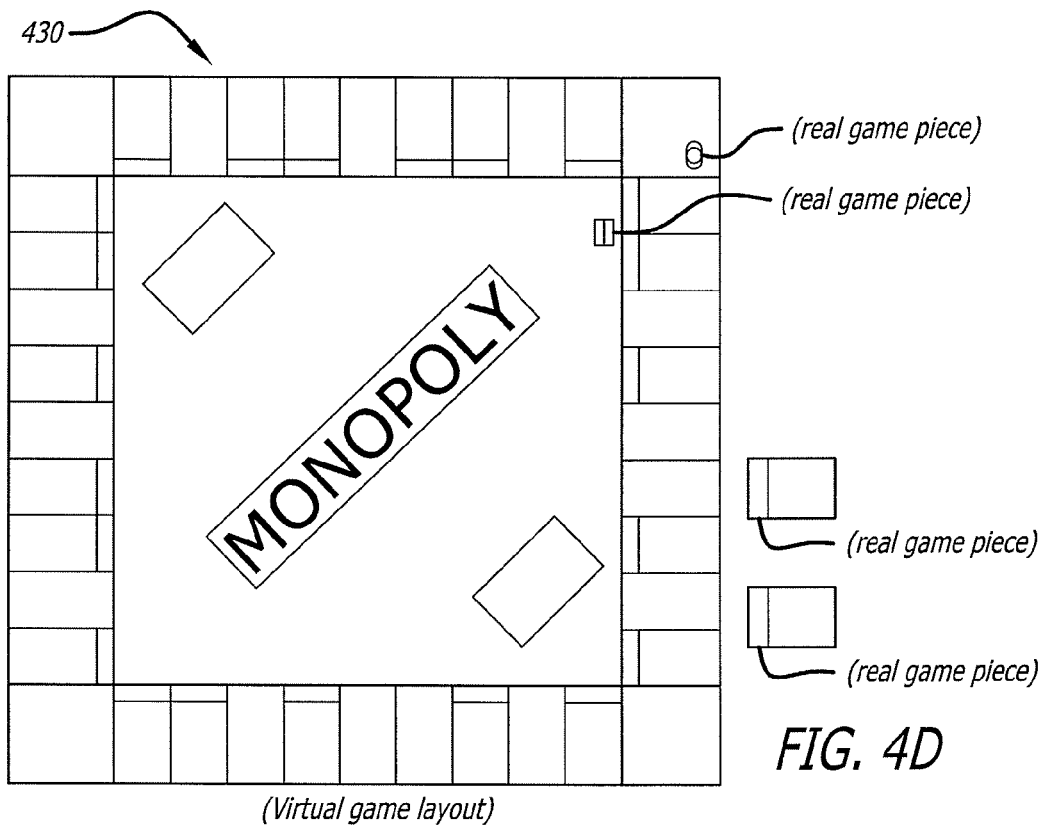
FIG. 4D is a schematic diagram of a portion of a game playing environment according to one illustrated embodiment; the illustrated portion includes a virtual layout of a Monopoly game board and physical game-related pieces.

FIG. 4D shows a virtual layout of MONOPOLY game board 430 with a set of MONOPOLY demarcations, and including physical game-related pieces. In some embodiments, the computing subsystem may detect whether new game-related pieces (e.g., tokens or markers such as chess pieces, tiles, checkers, or houses, hotels, car, shoe, dog, hat, horse and ride, train, wheelbarrow, thimble, sack of money, and the like) other than playing cards are on the playing surface.

Figure 4E:
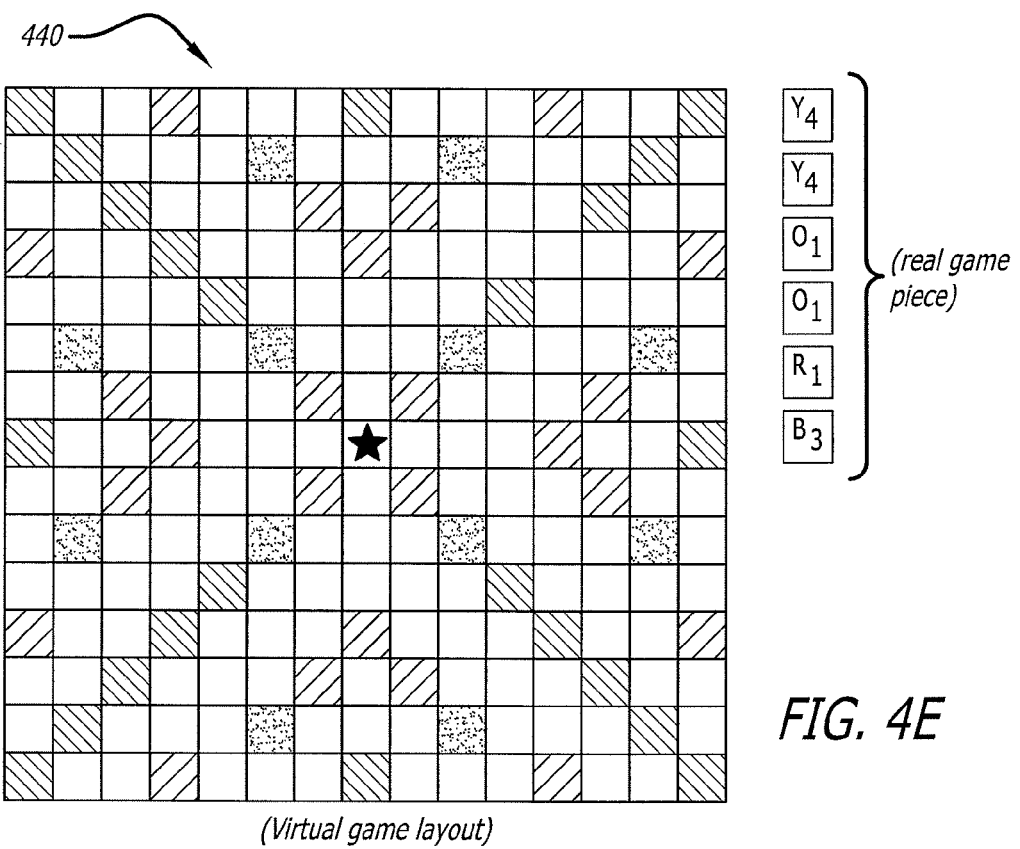
FIG. 4E is a schematic diagram of a portion of a game playing environment according to one illustrated embodiment; the illustrated portion includes a virtual layout of a Scrabble game board and physical game-related pieces.

FIG. 4E shows a virtual layout of a SCRABBLE 440 game board with a set of SCRABBLE demarcations, and including physical game-related pieces in the form of game tiles.

Figure 4F:
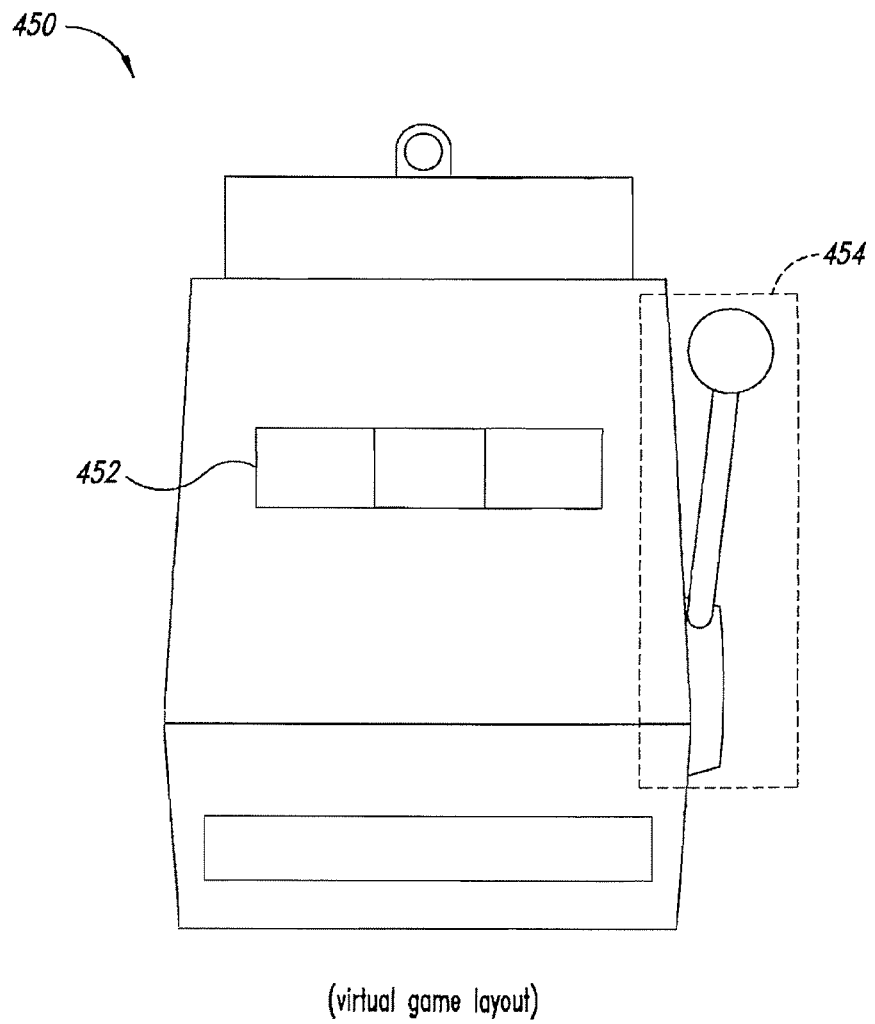
FIG. 4F is a schematic diagram of a portion of a game playing environment according to one illustrated embodiment; the illustrated portion includes a virtual layout of a slot game.

FIG. 4F shows a virtual layout of a slot game 450 with a set of slot game demarcations, and including physical game-related pieces. The slot game demarcations may include a virtual reel 452 comprising three or more symbols (e.g., images of fruits, bells, diamonds, hearts, poker game images, and the like) and a virtual lever 454.

Figure 5:
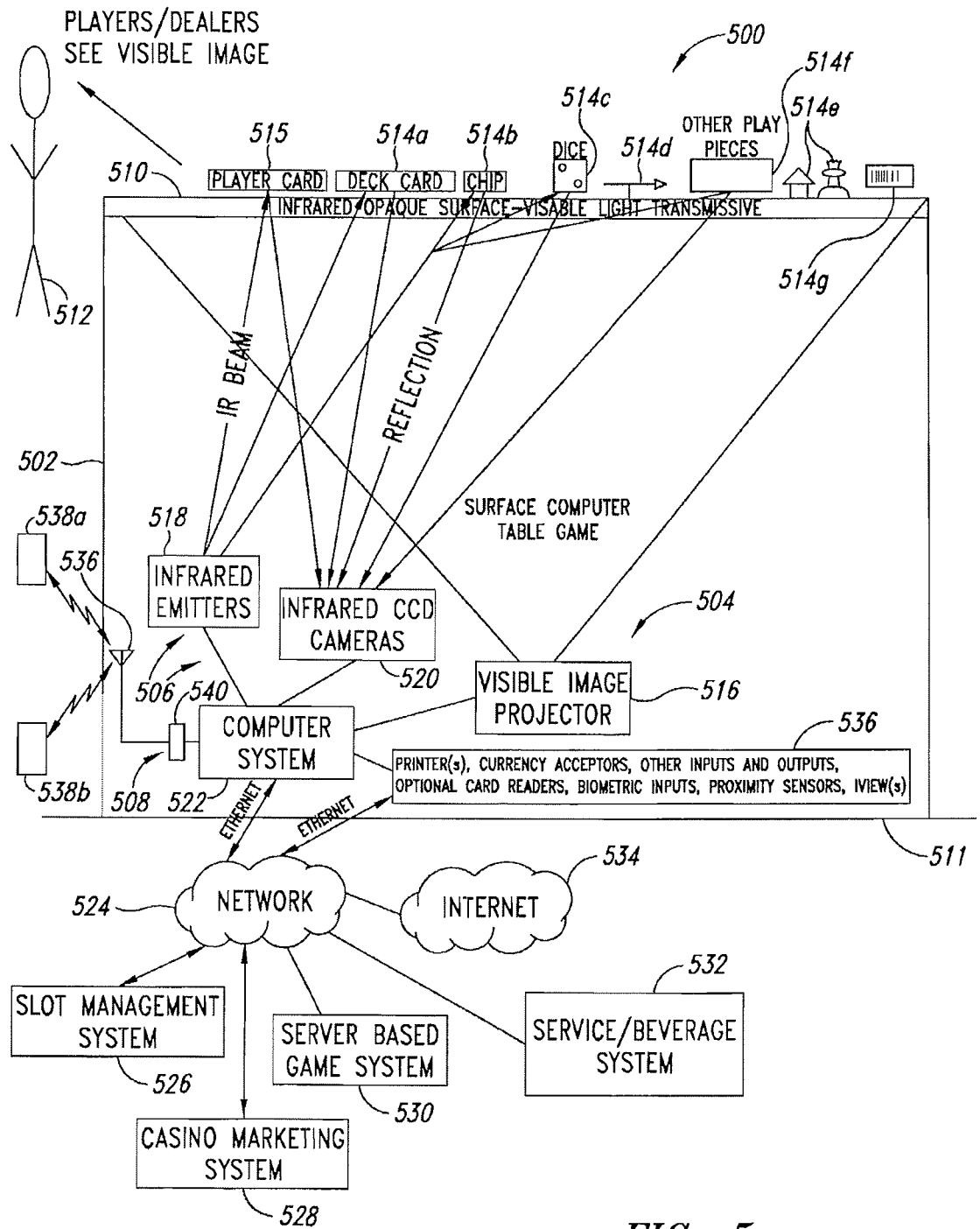
FIG. 5 is a schematic diagram of a table game playing system according to one illustrated embodiment, the table game playing system including gaming table carrying a number of physical objects, a display subsystem including projectors located under the gaming table operable to display a virtual game layout, a sensor subsystem including optical sensors configured to detect physical aspects of the physical objects, and a computing subsystem communicatively coupled with the display and sensor subsystems.

FIG. 5 shows a table gaming system 500 according to one illustrated embodiment.

The table gaming system 500 includes a gaming table 502, display subsystem 504, sensor subsystem 506 and computing subsystem 508 communicatively coupled to the display subsystem 504 and sensor subsystem 506.

The gaming table 502 includes a playing surface 510 that is positioned such that one or more players 512 may play a game thereupon. The playing surface 510 may, for example, be generally horizontal with respect to floor 512 on which the gaming table 502 is located. For example, the playing surface 510 should be positioned to allow the placement of one or more game-related pieces, collectively 514, thereon by the players 512 and/or dealer 232 (FIG. 2A). The gaming table 502 may, for example, take the form of one or more surface computing devices. Game-related pieces 514 may take a variety of forms. For example, game-related pieces 514 may include physical playing cards 514a, chips 514b, dice 514c, spinners 514d, tokens 514e, markers, and other game-related pieces 514f and/or tickets 514g. For example, tickets 514g may bear suitable machine-readable symbols (e.g., bar code, stacked code, area or matrix code). Such tickets 514g may be automatically read, validated and redeemed for credits at the gaming table 502 or credited to an account associated with a player. Also for example, the playing surface 510 may be positioned to allow the placement of one or more pieces of media (e.g., identity media and/or financial media) on the playing surface 510 or proximate thereto.

The playing surface 510 may take the form of material that is clear or at least partially transparent to light in the visible portion of the electromagnetic spectrum. The material also may be transparent or at least partially transparent to infrared portions of the electromagnetic spectrum. The material should be sufficiently strong and scratch resistant to allow thousands of rounds of play to occur thereon without adversely affecting visibility therethrough. In some embodiments, the playing surface 510 is a semi-transparent liquid crystal display (LCD), that allows a band of electromagnetic radiation (e.g., infrared) to pass to illuminate a game-related piece or financial media on the playing surface, while also allowing display of a virtual game layout, virtual game-related pieces and information. A suitable display may be commercially available from PureDepth Inc. of Redwood City, Calif.

The display subsystem 504 may take a variety of forms. FIG. 5 illustrates the display subsystem 504 as including at least one projector 516 located beneath the playing surface 510. The projector 516 displays the virtual game layout by projecting images onto or through the playing surface 510 toward the players 512.

The sensor subsystem 506 may take a variety of forms. FIG. 5 illustrates the sensor subsystem 506 as including one or more light sources 518 and one or more image capture devices 520. The light sources 518 may take a variety of forms, and may be positioned to illuminate one or more game-related pieces 514 and/or media 515 located on the playing surface 510. For example, the light sources 518 may take the form of one or more infrared emitters. The infrared emitters may be collocated, as illustrated in FIG. 5, or may be distributed under the playing surface 510.

The image capture devices 520 may take variety of forms, and may be positioned to capture images of at least a portion of one or more game-related pieces 514 and/or media 515 located on the playing surface 510. For example, the image capture devices 520 may take the form of one or more infrared sensitive cameras, for instance charged coupled device (CCD) based cameras or complementary metal-oxide-semiconductor based (CMOS) cameras. In some embodiments, the image capture devices 520 may be broadband sensors, sensitive over a broad portion of the optical spectrum, for example, sensitive over the range of visible wavelengths (i.e., wavelengths considered as visible to most humans) or over the range of optical wavelengths (i.e., visible wavelengths as well as infrared and ultraviolet). In some embodiments, the image capture devices 520 may be sensitive on only limited portions of the optical spectrum, for example infrared, near-infrared, or narrow bands like laser red (694 nM). Such embodiments may employ one or more filters to selectively pass some wavelengths while blocking other wavelengths. Where multiple cameras are employed, the cameras may be collocated or may be distributed under the playing surface 510.

The computing subsystem 508 can take a variety of forms. FIG. 5 illustrates the computing subsystem 508 as including one or more computer systems 522, each of which may have one or more processors. The computer system 522 is communicatively coupled to at least drive the projector 516 and to at least receive information from the cameras 520. The computing subsystem may be configured to process image data captured by the cameras 520 to determine one or more physical aspects of one or more game-related pieces 514 and/or process information in images of the media 515. In some embodiments, the computer system 522 determines a presence/absence of a game-related piece 514, an identity of a game-related piece 514, a location and/or orientation of a game-related piece 514. The computer system 522 may determine information identifying a holder of a piece of media 515, account identifier, expiration date, prepaid amount, and the like from the piece of media 515. In some embodiments, the computer system 522 determines at least some of the information regarding the game-related pieces 514 and/or media 515 by decoding one or more machine-readable symbols (e.g., bar code symbols, stack code symbols, area or matrix code symbols) carried by the game-related pieces 514 and/or media 515. In such embodiments, the sensor subsystem may take the form of one or more machine-readable symbol readers, such as scanners or imagers that read bar codes, stacked codes, and/or area or matrix codes or other optical patterns (e.g., pips, rank and/or suit symbols, and the like), and the computer systems 522 may include instructions for decoding such machine-readable symbols or for performing pattern matching. Alternatively, or additionally, the sensor subsystem may take the form of one or more image sensors that capture images or image information. In such embodiments, the computer systems 522 may include image processing instructions that allow for that detection of various features, for example, edges. Such instructions may allow for object recognition as well as position or pose determination.

The computer system 522 may be communicatively coupled to one or more other components and/or systems. For example, the computer system 522 may be communicatively coupled by a network 524 to a slot management system 526, a casino marketing system 528, a server based game service 530, a service/beverage system 532, and/or the Internet 534. The computer system 522 (or game monitoring unit(s)) may additionally or alternatively be coupled to one or more printers, currency acceptors, optional card readers, biometric measurement devices, proximity sensors, and/or management systems, collectively illustrated as 536.

The gaming table system 500 may include one or more antennas 536 to provide wireless communications with one or more wireless devices 538a, 538b (collectively 538). The antenna 536 may be coupled to a radio 540, for example, a transmitter, receiver, or transceiver, which may be coupled to the computer system 522. The wireless devices 538 may take a variety of forms. For example, the wireless device 538a may take the form of a handheld mobile communications device, for instance a BLACKBERRY®, TREO®, cellular phone or other such device. Such a wireless device 538a may be operated by a patron, player, or other participant such as a dealer. Such a wireless device 538a may be operated by casino personnel, for instance a dealer, pit boss or security personnel. Also for example, the wireless device 538b may be a piece of automated equipment that monitors some aspect of a game or activity in a casino environment. For example, standalone automatic teller machine (ATM), security camera, card shoe or shuffler. Appropriate software or firmware may identify the operator of a wireless communications device 538, and provide for levels of security. Software or firmware may also provide for secure communications, for example, via encryption.

Figure 6:
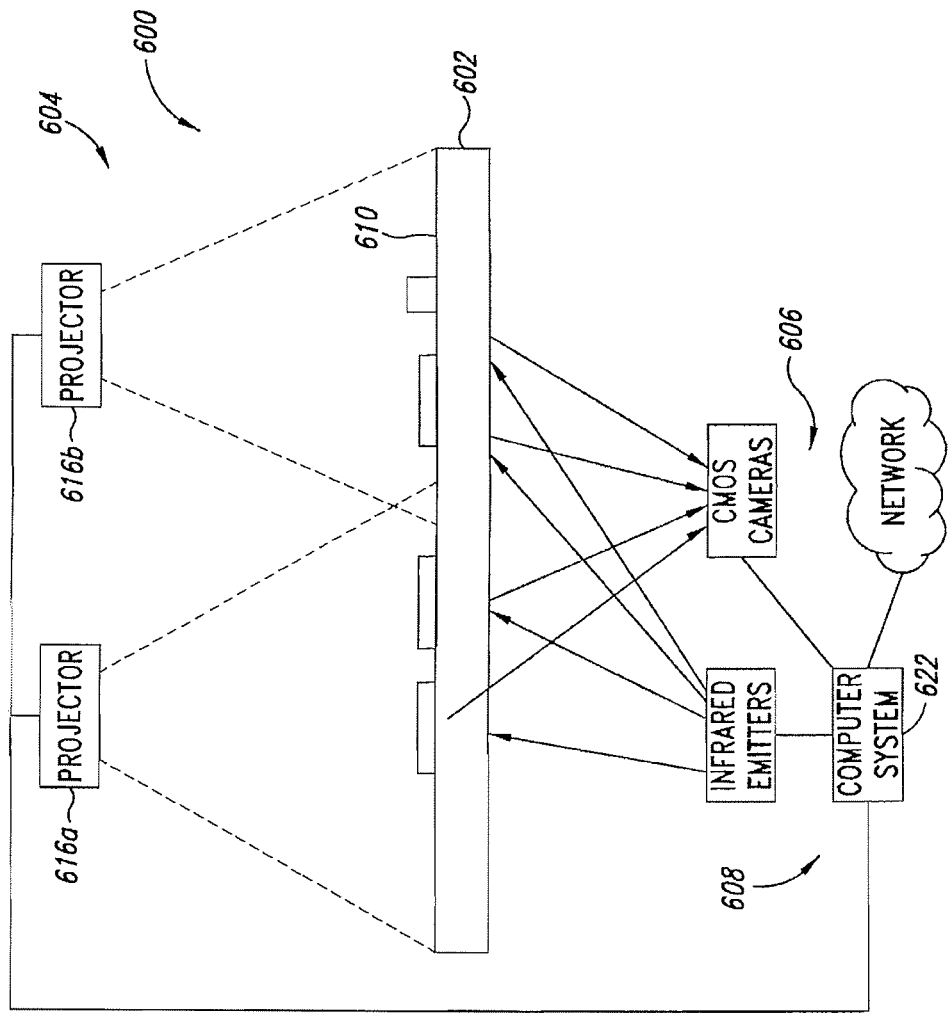
FIG. 6 is a schematic diagram of a table game playing system according to one illustrated embodiment, the table game playing system including a gaming table carrying a number of physical objects, a display subsystem including projectors located relative above a height of the gaming table operable to display a virtual game layout, a sensor subsystem including an optical configured to detect physical aspects of the physical objects, and a computing subsystem communicatively coupled with the display and sensor subsystems.

FIG. 6 shows a table gaming system 600 according to another illustrated embodiment. Many aspects of the embodiment of FIG. 6 are similar to or the same as the embodiment of FIG. 5. Only significant differences are described herein in the interest of brevity.

The table gaming system 600 includes a gaming table 602, display subsystem 604, sensor subsystem 606 and computing subsystem 608 communicatively coupled to the display subsystem 604 and sensor subsystem 606.

In contrast to the embodiment of FIG. 5, the display subsystem 604 includes projectors 616a, 616b positioned above a playing surface 610 of the gaming table 602. The projectors 616a, 616b display the virtual game layout by projecting images onto or through the playing surface 610. The virtual game layout may appear on the playing surface 610 or just under the playing surface 610 on a layer or medium that at least partially reflects or refracts the light. The projectors may be controlled by one or more computer systems 622 of the computing subsystem 608.

Figure 7:
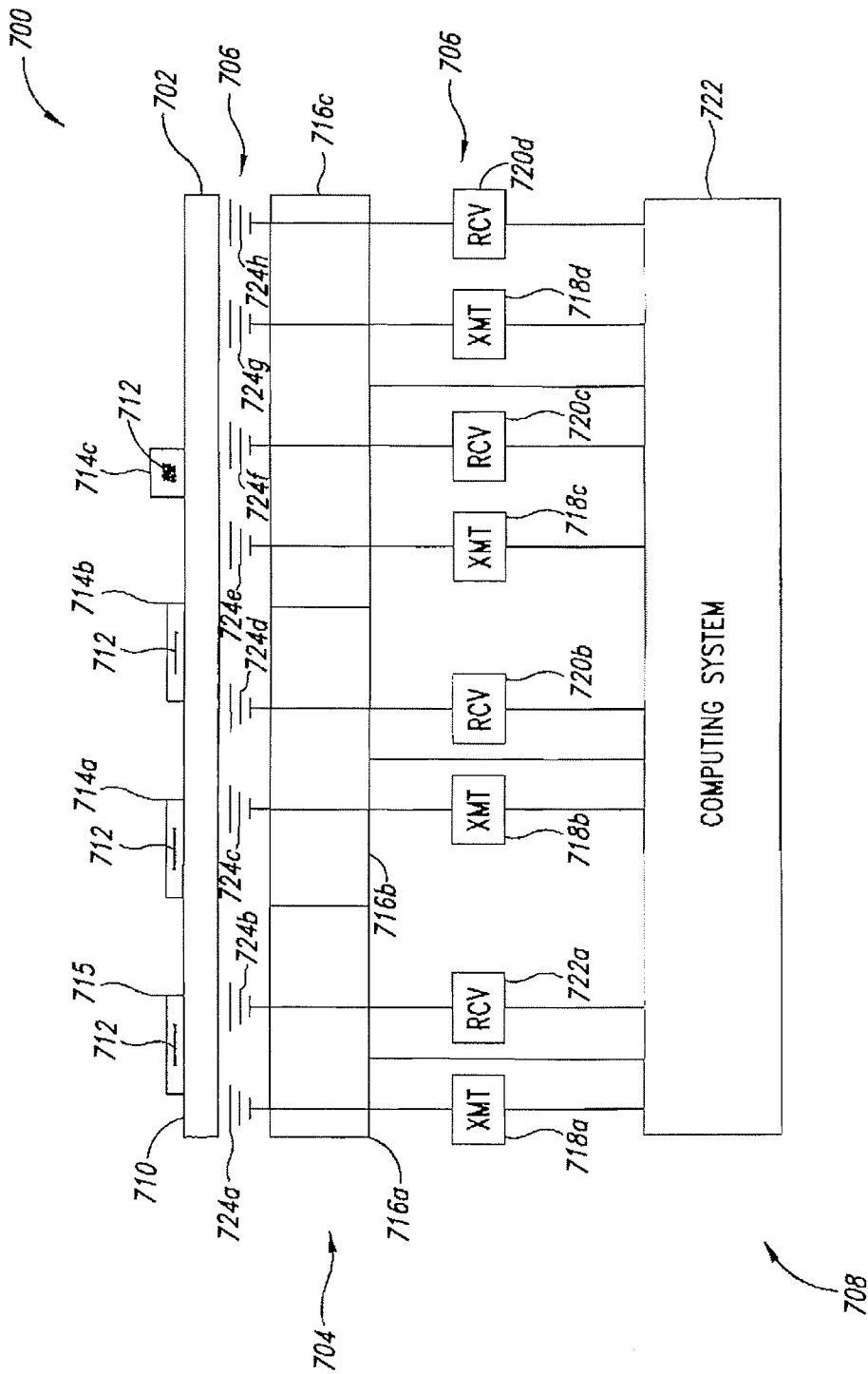
FIG. 7 is a schematic diagram of a table game playing system according to one illustrated embodiment, the table game playing system including gaming table carrying a number of physical objects, a display subsystem including at least one display located under the gaming table operable to display a virtual game layout, a sensor subsystem including wireless transmitters and receivers configured to detect physical aspects of the physical objects, and a computing subsystem communicatively coupled with the display and sensor subsystems.

FIG. 7 shows a table gaming system 700 according to another illustrated embodiment. Many aspects of the embodiment of FIG. 7 are similar to or the same as previously described embodiments. Only significant differences are described herein in the interest of brevity.

The table gaming system 700 includes a gaming table 702, display subsystem 704, sensor subsystem 706 and computing subsystem 708 communicatively coupled to the display subsystem 704 and sensor subsystem 706.

In contrast to the embodiment of FIGS. 5 and 6, the display subsystem 704 includes a number of displays 716a-716c (collectively 716) positioned below a playing surface 710 of the gaming table 702. The displays 716 display the virtual game layout onto or through the playing surface 710. Each of the displays 716 may display a respective portion, the virtual game layout to produce the appearance of a continuous virtual game layout. The displays 716 may take a variety of forms, for example, cathode ray tube (CRT) displays, or flat-panel displays such as liquid crystal (LCD) displays, liquid crystal on silicon (LCOS) displays, plasma displays, digital light processing (DLP) displays, other projection type of displays, surface computing device display such as that proposed by MICROSOFT of Redmond, Wash.

In contrast to the embodiment of FIGS. 5 and 6, the sensor subsystem 704 employs wireless radio transmission to interrogate or otherwise excite transponders 712 carried by various physical objects (e.g., playing cards 714a, chips 714b, dice 714c, and/or identity or financial media 715) on the playing surface 710. In some embodiments, wireless radio transmissions may interrogate objects proximate the playing surface 710, even when those physical objects are not on the playing surface 710. The radio transmission may be in any portion of the electromagnetic spectrum, but typically will be in the radio or microwave frequency portions. As used herein, and in the claims, the terms radio and RF are inclusive of both radio and microwave frequencies, as well as other non-optical (i.e., visible, infrared, ultraviolet) portions of the electromagnetic spectrum.

The sensor subsystem 704 includes a number of transmitters 718a-718d (collectively 718) and a number of receivers 720a-720d (collectively 720), which may in some embodiments be formed as transceivers. The sensor subsystem 704a also includes a number of antennas 724a-724h (collectively 724) coupled to the transmitters 718 and receivers 720. While illustrated with each transmitter 718 and each receiver 720 having a respective antenna 724, in some embodiments, pairs of transmitters 718 and receivers 720 may share a common antenna 724, for example, where the frequency of interrogation or excitation is similar to the frequency of response to the interrogation by transponders 712.

The transponders 712 may take a variety of forms. For example, the transponders may be active (i.e., including a discrete, consumable power source), but typically will be passive (i.e., relying on power derived from an interrogation or excitation signal received from an external power source). Passive forms may include a memory structure that stores information, for example, a radio frequency identification (RFID) transponder. Passive RFID transponders typically backscatter an interrogation signal with the contents of the memory encoded therein. The memory may include a unique identifier that uniquely identifies the particular transponder. Such memory may be read-only, one-time writable or writeable memory. Passive RFID transponders are commercially available from a variety of sources.

Some passive forms may omit a memory, for example, transponders generally classed as electronic article surveillance (EAS) type transponders. Such EAS transponders typically include a resonant circuit that backscatters 712 an interrogation or excitation signal.

One or more computer systems 722 of the computing subsystem 708 may be configured to process information derived by the sensor subsystem 706. For example, the computer system 708 may decode a response from a transponder 712 carried by a physical object to determine a physical aspect of the object, such as the type of object and/or identity of the physical object. Also for example, the computer system 708 may determine a physical aspect such a location, orientation of the physical object based on which antenna or antennas 724 received the signal, the strength of signal and/or triangulation or other position determining techniques, for example, time of flight measurements or differences in time between receipt of responses to interrogation signals. The position may be determined in a variety of ways, for example, in absolute or relative coordinates, and/or in Cartesian or polar coordinates. Where the sensor subsystem employs optical information (e.g., captured via still or video cameras, digital or analog cameras, CCD, opticons or other image capture devices), the position may be determined using image processing techniques to identify the position in absolute or relative coordinates. Such techniques may or may not include machine-vision techniques such as edge detection (e.g., Sobel filter, and the like).

Figure 8:
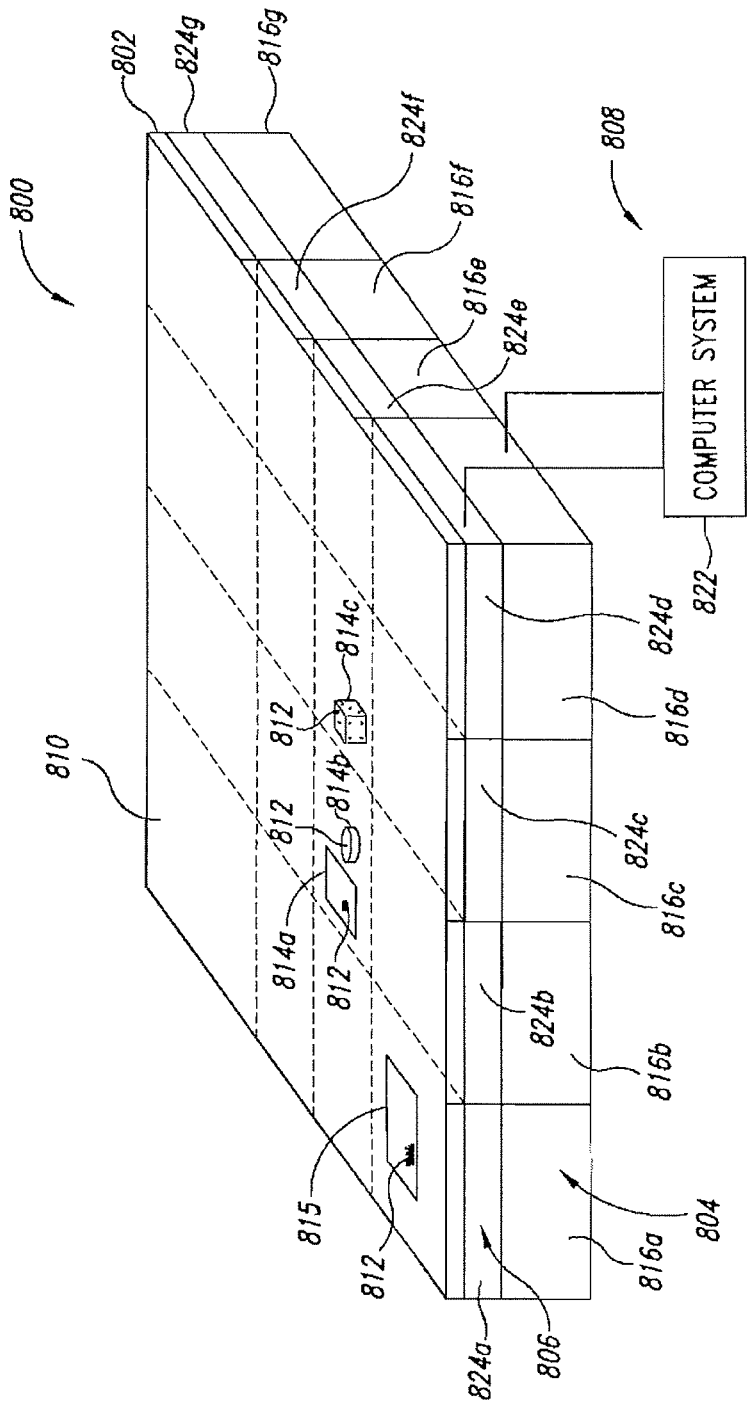
FIG. 8 is a schematic diagram of a table game playing system according to one illustrated embodiment, the table game playing system including a gaming table carrying a number of physical objects, a display subsystem including a plurality of displays located under a contiguous playing surface of the gaming table operable to display a virtual game layout, a sensor subsystem including inductive or magnetic sensors configured to detect physical aspects of the physical objects, and a computing subsystem communicatively coupled with the display and sensor subsystems.

FIG. 8 shows a table gaming system 800 according to another illustrated embodiment. Many aspects of the embodiment of FIG. 8 are similar to or the same as previously described embodiments. Only significant differences are described herein in the interest of brevity.

The table gaming system 800 includes a gaming table 802, display subsystem 804, sensor subsystem 806 and computing subsystem 808 communicatively coupled to the display subsystem 804 and sensor subsystem 806 (only one communications link between the computing subsystem 808 and each of the display and sensor subsystems 804, 806 as shown).

The display subsystem 804 may include a number of displays 816a-816g (collectively 816, not all displays called out in the Figure in the interest of clarity) positioned below a playing surface 810 of the gaming table 702. As illustrated in FIG. 8, the playing surface 810 may be contiguous, while the displays 816 may have some distinct lines of separation between adjacent displays.

The sensor subsystem 806 may include a number of magnetic or inductive sensors 824a-824g (collectively 824, not all sensors called out in the Figure in the interest of clarity). The magnetic or inductive sensors 824 are configured to detect magnetic or ferrous indicia 812 carried by various physical objects (e.g., playing cards 814a, chips 814b, dice 814c, and/or identity or financial media 815). The magnetic or ferrous indicia 812 may take a variety of forms. For example, the magnetic or ferrous indicia 812 may take the form of one or more stripes carried on a surface or an interior of an object. Also, for example, the magnetic or ferrous indicia 812 may take the form of a distribution of magnetic or ferrous particles in or on the object. In some embodiments, the distribution may be random, providing a high likelihood of a unique signature for each object.

One or more computer systems 822 of the computing subsystem 808 may be configured to process information derived by the sensor subsystem 806. For example, the computer system 808 may decode a signal indicative of the magnetic or ferromagnetic indicia 812 carried by a physical object to determine a physical aspect of the object, such as the type of object and/or identity of the physical object. Also, for example, the computer system 808 may determine a physical aspect such as location, orientation of the physical object based on which sensor 824 produced the signal, the strength of signal and/or triangulation or other position determining techniques.

Figure 9:
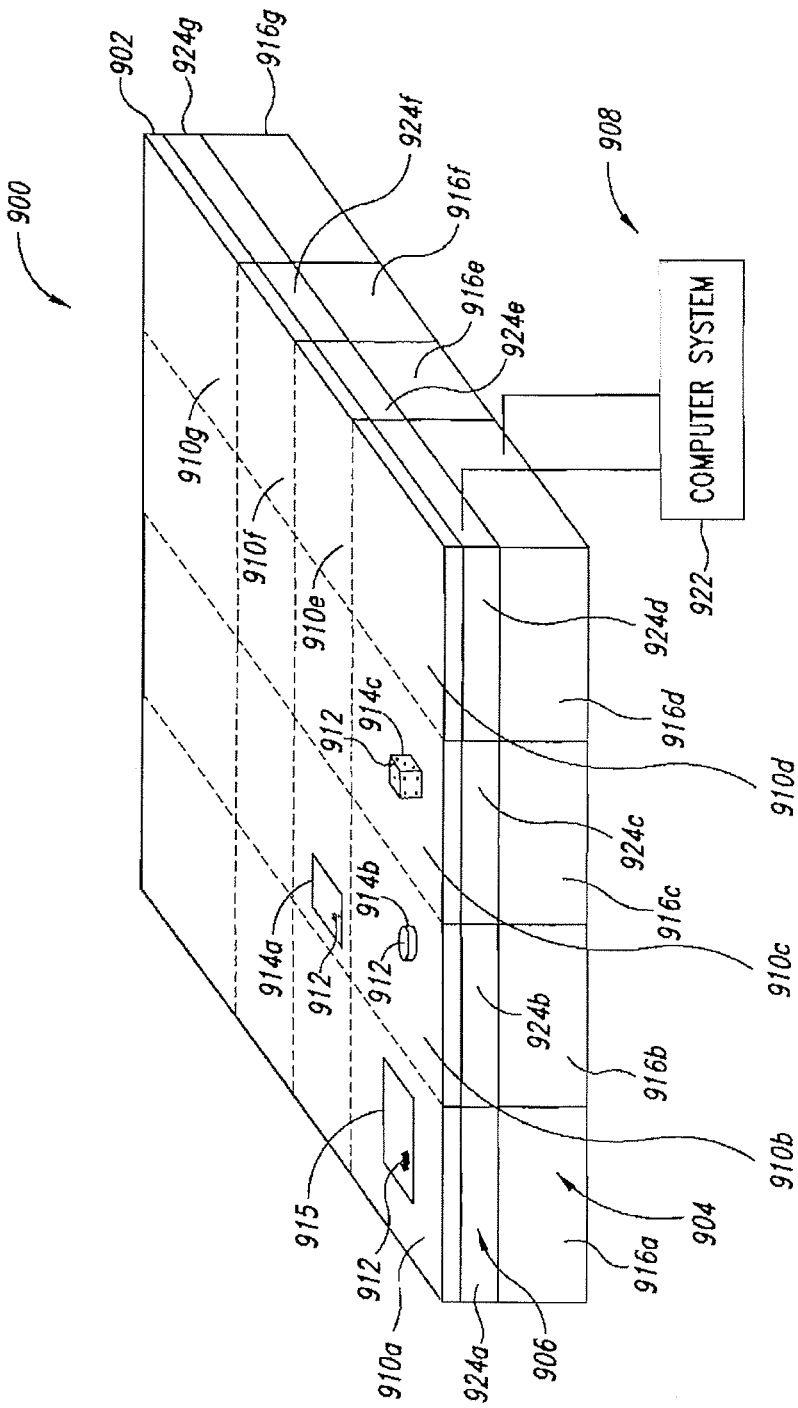
FIG. 9 is a schematic diagram of a table game playing system according to one illustrated embodiment, the table game playing system including a gaming table carrying a number of physical objects, a display subsystem operable to display a virtual game layout, a sensor subsystem configured to detect physical aspects of the physical objects, and a computing subsystem communicatively coupled with the display and sensor subsystems, where the display and sensor subsystems are implemented as touch sensitive display devices.

FIG. 9 shows a table gaming system 900 according to another illustrated embodiment. Many aspects of the embodiment of FIG. 9 are similar to or the same as previously described embodiments. Only significant differences are described herein in the interest of brevity.

The table gaming system 900 includes a gaming table 902, display subsystem 904, sensor subsystem 906 and computing subsystem 908 communicatively, coupled to the display subsystem 904 and sensor subsystem 906 (only one communications link between the computing subsystem 908 and each of the display and sensor subsystems 904, 906 and shown).

The display subsystem 904 may include a number of displays 916a-916g (collectively 916, not all displays are called out in the Figure in the interest of clarity) positioned below number of playing surfaces 910 of a gaming table 702. As illustrated in FIG. 8, the playing surface 910 may have some distinct lines of separation between adjacent playing surface 910. As in the previously described embodiments, the playing surfaces 910 may take the form of a protective (e.g., scratch resistant) layer overlying the sensor subsystem 906 and/or display subsystem 904. In some embodiments, the playing surfaces 910 may be integral with the sensor subsystem 906 and/or display subsystem 904. In other embodiments, the playing surfaces 910 may be a distinct component from the sensor subsystem 906 and/or display subsystem 904, for example overlying and spaced from the sensor subsystem 906 and/or display subsystem 904.

As described previously, the sensor subsystem 906 may include number of magnetic or inductive sensor 924a-924g (collectively 924, not all sensors are called out in the Figure in the interest of clarity). The magnetic or inductive sensors 924 are configured to detect magnetic or ferrous indicia 912 carried by various physical objects (e.g., playing cards 914a, chips 914b, dice 914c, and/or identity or financial media 915).

Also, as described previously, one or more computer systems 922 of the computing subsystem 908 may be configured to process information derived by the sensor subsystem 906.

Figure 10:
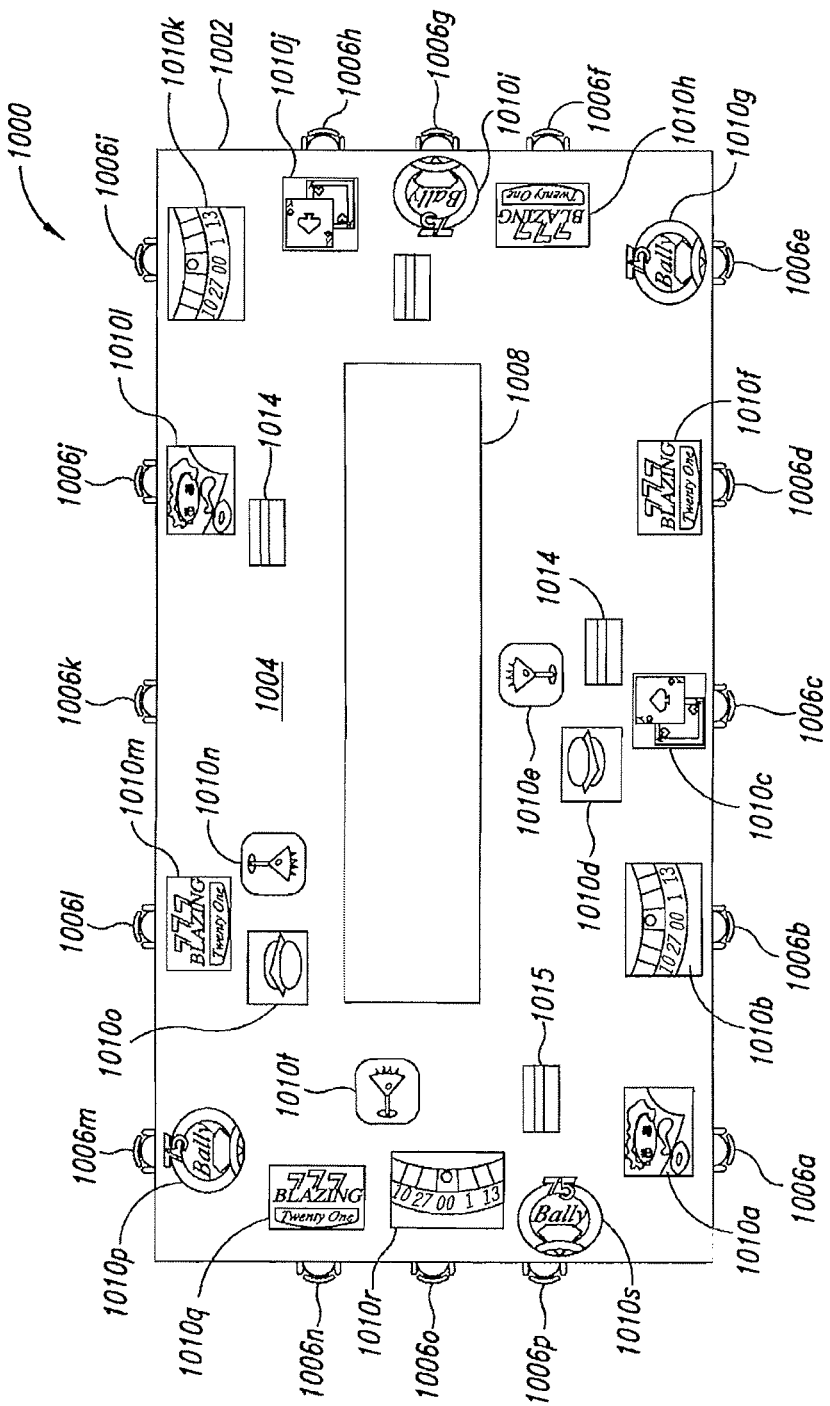
FIG. 10 is a top plan view of a game playing environment according to one illustrated embodiment, the game playing environment including a circular or oval bar with a number of player positions spaced therearound.
Figure 11:
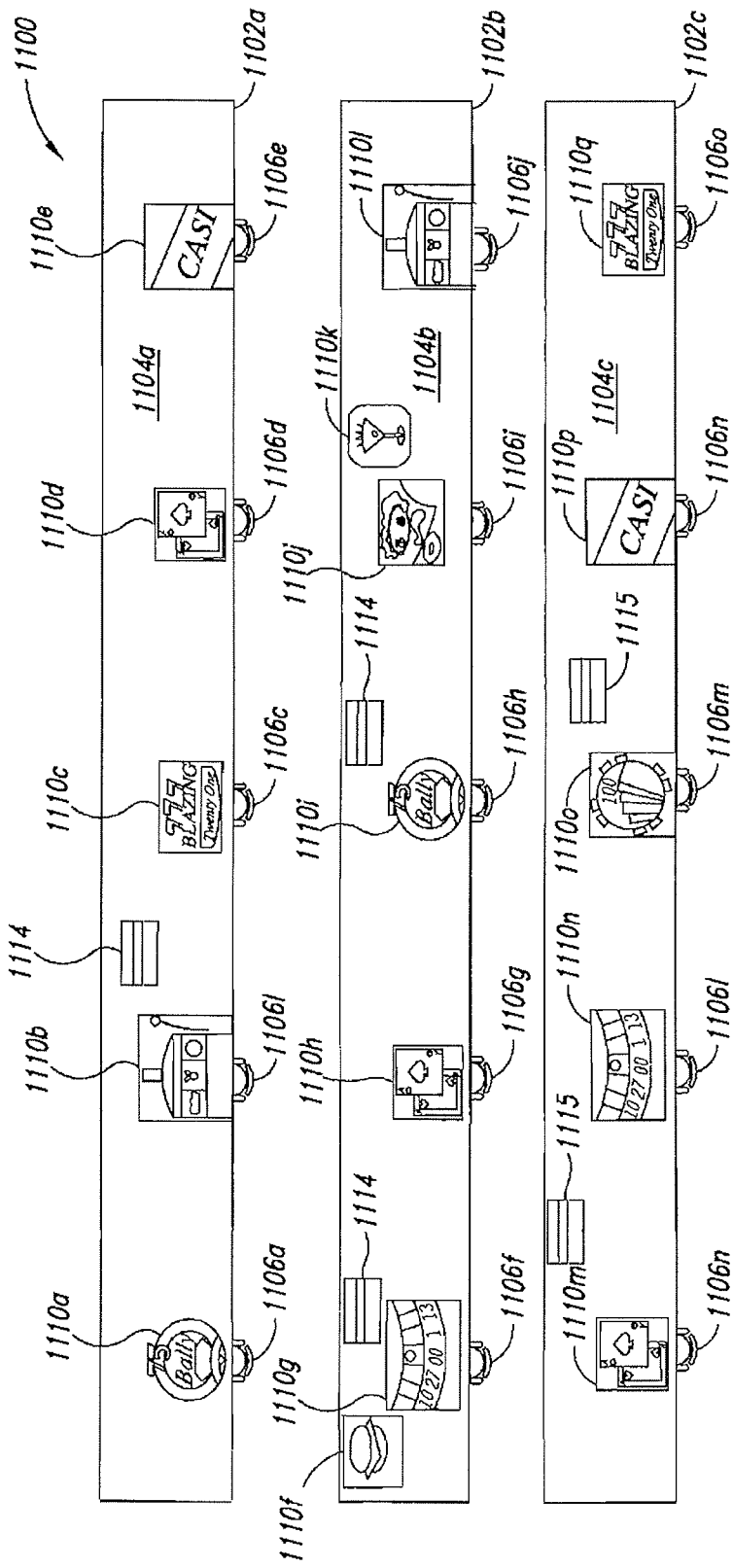
FIG. 11 is a top plan view of a game playing environment according to one illustrated embodiment, the game playing environment including a number of elongated or rectangular gaming tables, each with a number of player positions spaced therealong.

FIG. 10 shows a table gaming system 1000, according to another illustrated embodiment. Many aspects of the embodiment of FIG. 10 are similar to or the same as previously described embodiments. Only significant differences are described herein in the interest of brevity.

The table gaming system 1000 includes a gaming table 1002 in the form of a bar, for example a circular or oval bar. The gaming table 1002 includes a playing surface 1004. The table gaming system 1000 also includes a display subsystem, sensor subsystem and computing subsystem, which may be identical or similar to those previously described.

The gaming table 1002 may have a plurality of player positions, indicated by seats (e.g., chairs or stools) 1006a-1006p (collectively 1006) distributed about the gaming table 1002. The gaming table 1002 may also have an attendant position 1008, which may provide convenient access to the player positions 1004. One or more attendants, for example a dealer, barkeeper, server and/or cashier, may occupy the attendant position 1008.

The display subsystem includes one or more displays or projectors (collectively) configured to produce a display 1010a-1010s (collectively 1010) viewable from each player position 1006, and optionally from the attendant position 1008. The produced display 1010 may include at least one virtual game layout and/or other information, data, menus, graphical user interfaces, advertisements videos, rules, suggestions, and/or other visual elements. For example, the produced display 1010a, 1010j may be a video, movie, television show, live or recorded sports events, casino messages or other form of entertainment. The produced display 1010b, 1010k, 1010r may be a virtual game layout for roulette. The produced display 1010c, 1010j may be a virtual game layout of a card game such as Blackjack, poker, or other card games. The produced display 1010d, 1010o may be a menu of food items from which a player or other patron may choose and/or electronically place an order. The produced display 1010e, 1010n, 1010t may be a menu of drinks or beverages from which a player or other patron may choose and/or electronically place an order. The produced display 1010f, 1010h, 1010m, 1010R may be a virtual game, for example, a video slot game (e.g., BLAZING SEVENS). The produced display 1010g, 1010i, 1010p, 1010s may be an advertisement or promotion, for instance, a random drawing or a bonus game.

As previously described, various forms of media 1014, 1015 may be read by the sensor subsystem and transaction completed.

Figure 12:
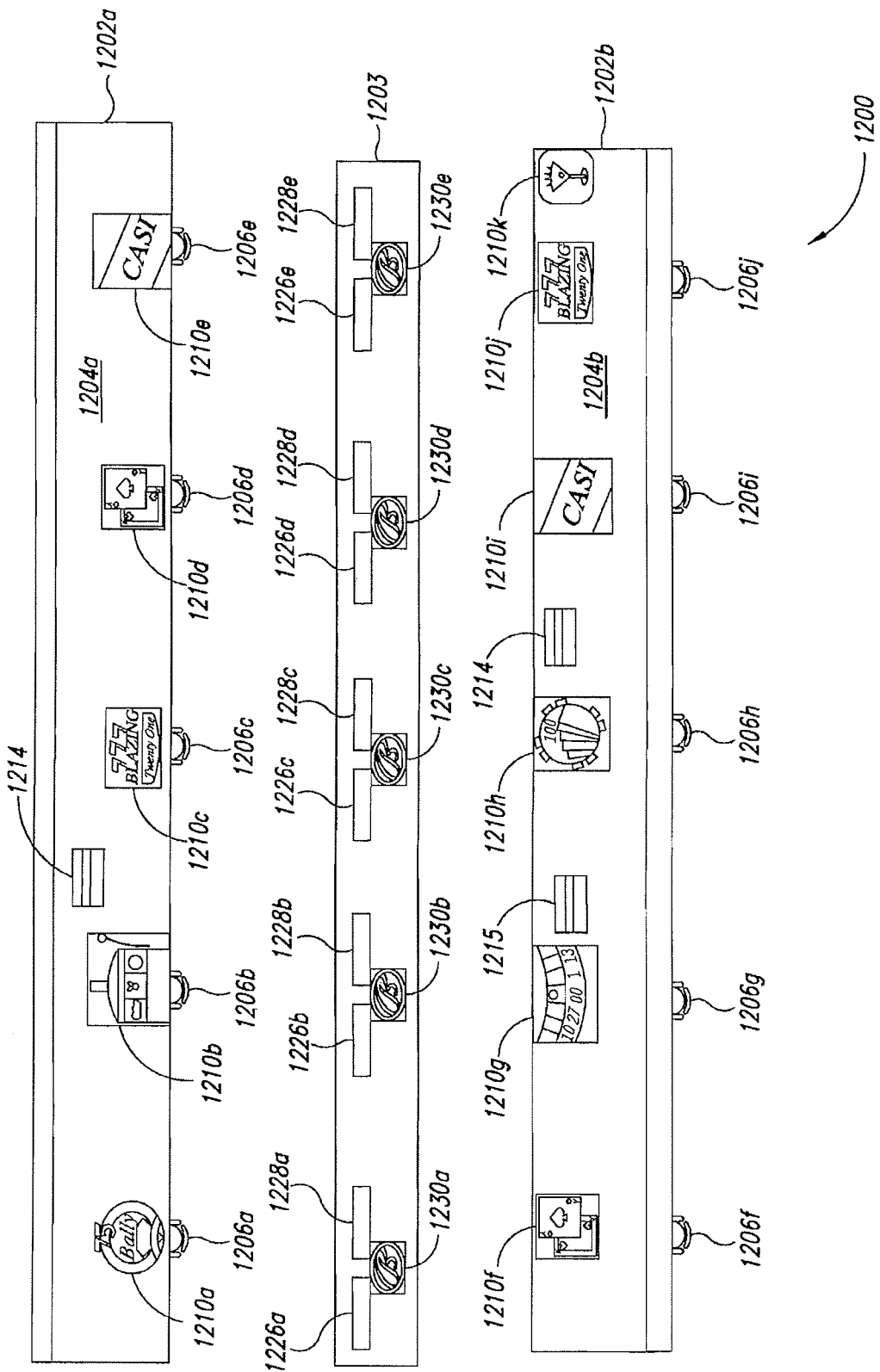
FIG. 12 is a top plan view of a game playing environment according to one illustrated embodiment, the game playing environment including a number of elongated or rectangular gaming tables, each with a number of player positions spaced therealong and a bar top unit including printers, bill validators, and casino management system interfaces.

FIG. 12 shows a table gaming system 1200, according to another illustrated embodiment. Many aspects of the embodiment of FIG. 12 are similar to or the same as the previously-described embodiments. Only significant differences are described herein in the interest of brevity.

The table gaming system 1200 includes a number of gaming tables 1202a-1202c (collectively 1202) in the form of a bar or table, for example, a rectangular bar or table. The table gaming system 1200 includes playing surfaces 1204a-1204c. The table gaming system 1200 also includes a display subsystem, sensor subsystem and computing subsystem, which may be identical or similar to those previously described.

The gaming tables 1202 may have a plurality of player positions, indicated by seats (e.g., chairs or stools) 1206a-1206o (collectively 1206) distributed about the gaming tables 1202. There may be sufficient space between respective gaming tables 1202 for one or more attendants (e.g., dealer, bar keeper, server and/or cashier) to access the various player positions 1206.

The display subsystem includes one or more displays or projectors (collectively) configured to produce a display 1210a-1210o (collectively 1210) viewable from each player position 1206, and optionally viewable by an attendant. The produced display 1210 may include at least one virtual game layout and/or other information, data, menus, graphical user interfaces, advertisements videos, rules, suggestions, and/or other visual elements. For example, the produced display 1210j may be a video, movie, television show or other form of entertainment. The produced display 1210g, 1210n may be a virtual game layout for roulette. The produced display 1210d, 1210h, 1210m, 1210o may be a virtual game layout of a card game such as Blackjack, poker, or other card games. The produced display 1210f may be a menu of food items from which a player or other patron may choose and/or electronically place an order. The produced display 1210k may be a menu of drinks or beverages from which a player or other patron may choose and/or electronically place an order. The produced display 1210b, 1210h, 12101, 1210q may be a virtual game, for example, a video slot game (e.g., BLAZING SEVENS). The produced display 1210a, 1210h may be an advertisement or promotion (e.g., a random drawing). The produced display 1210e, 1210n may be a directory or a user interface that provides access to a player's own account within a casino management system and Slot Management System (e.g., the Bally Gaming IVIEW display system). This may allow a player to determine and/or apply comps that have been awarded to the player, to determine or access credit balances and perform other transactions, and/or to receive news, announcements and promotions.

As previously described, various forms of media 1214, 1215 may be read by the sensor subsystem and transaction completed.

FIG. 12 shows a table gaming system 1200, according to another illustrated embodiment. Many aspects of the embodiment of FIG. 12 are similar to or the same as previously described embodiments. Only significant differences are described herein in the interest of brevity.

The table gaming system 1200 includes a number of gaming tables 1202a, 1202b (collectively 1202) in the form of a bars or tables, for example rectangular bars or tables, and a side bar or bar top unit 1203 positioned between the gaming tables 1202. The side bar or bar top unit 1203 may be positioned differently in other embodiments. The side bar or bar top unit 1203 may have cushioned sides. The table gaming system 1200 includes playing surfaces 1204a, 1204b. The table gaming system 1200 also includes a display subsystem, sensor subsystem and computing subsystem, which may be identical or similar to those previously described.

The gaming tables 1202 may have a plurality of player positions, indicted by seats (e.g., chairs or stools) 1206a-1206j (collectively 1206) distributed about the gaming tables 1202. There may be sufficient space between gaming tables 1202 and the bar top 1203 unit for one or more attendants (e.g., dealer, barkeeper, server and/or cashier) to access the various player positions 1206.

The display subsystem includes one or more displays or projectors (collectively) configured to produce a display 1210a-1210k (collectively 1210) viewable from each player position 1206, and optionally viewable by an attendant. The produced displays 1210 may be identical or similar to those previously described. Also as previously described, various forms of media 1214, 1215 may be read by the sensor subsystem and transaction completed.

The side bar or bar top unit 1203 may include one or more printers 1226a-1226e (collectively 1226) which may be networked to the computing subsystem (not shown in the Figure). The printers' 1226a-1226e may allow printing of receipts, vouchers, and promotional literature, for example, where the environment is not paperless.

The bar top unit 1203 may include one or more bill validators 1230a-1230e (collectively 1230). The bill validators 1203 may be employed to validate currency and negotiable instruments.

The bar top unit 1203 may optionally include one or more interfaces 1232a-1232e (collectively 1232) to a casino management system (e.g., Bally Gaming iVIEW display system), for example, where such an interface is not provided at the gaming tables 1202.

Figure 13:
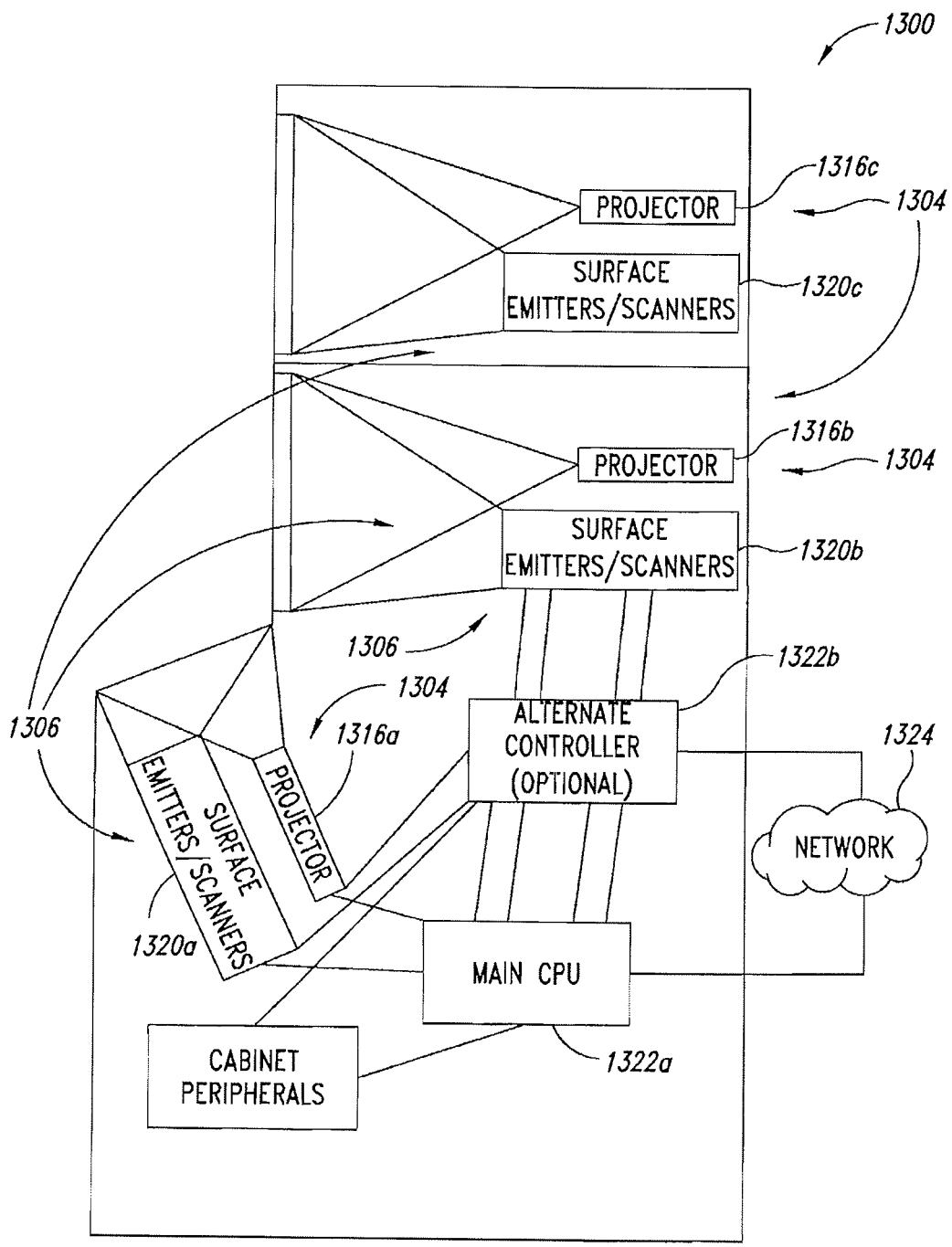
FIG. 13 is a schematic diagram of an upright or arcade style or casino style game playing system according to one illustrated embodiment, the upright or arcade/casino style game playing system including a number of display subsystems, sensor subsystems and computing subsystems communicatively coupled with the display and sensor subsystems.

FIG. 13 shows an upright or arcade/casino style gaming system 1300, according to another illustrated embodiment. Many aspects of the embodiment of FIG. 13 are similar to or the same as previously described embodiments. Only significant differences are described herein in the interest of brevity.

The upright or arcade style gaming system 1300 includes a display subsystem 1304, sensor subsystem 1306 and computing subsystem 1308.

The display subsystem 1304 may take a variety of forms. FIG. 13 illustrates the display subsystem 1304 as including one or more projectors 1316*a*-1316*c* (collectively 1316) located so as to produce respective displays visible to a player. Some embodiments may employ projectors that are externally located with respect to a housing of the upright or arcade style gaming system 1300, for example as described in reference to FIG. 6. Still other embodiments may employ displays (e.g., CRT displays, or flat panel displays such as LCD displays, LCOS displays, plasma displays, DLP displays, and the like), such as those discussed in reference to the embodiment of FIG. 7.

The sensor subsystem 1306 may take a variety of forms. FIG. 13 illustrates the sensor subsystem 1306 as including one or more light sources and/or image capture devices 1320*a*-1320*c* (collectively 1320). The light sources may take a variety of forms, and may be positioned to illuminate one or more playing surfaces 1310*a*-1310*c* (collectively 1310). For example, the light sources may take the form of one or more infrared emitters. The infrared emitters may be co-located at various positions with respect to each of the playing surfaces 1310 as illustrated in FIG. 13, or may be distributed under the playing surfaces 1310. The image capture devices may take a variety of forms, and may be positioned to capture images of the playing surfaces 1310. For example, the image capture devices may take the form of one or more infrared sensitive cameras; for instance, charged coupled device (CCD) based cameras or complementary metal-oxide-semiconductor based (CMOS) cameras. Where multiple cameras are employed, the cameras may be collocated with respect to respective ones of the playing surfaces 1310 or multiple cameras may be distributed under each of the playing surfaces 1310.

The computing subsystem 1308 can take a variety of forms. FIG. 13 illustrates the computing subsystem 1308 as including one or more main computer systems (e.g., Bally Alpha gaming device platform) 1322*a* and an alternative controller 1322*b*. The computing subsystem 1308 is communicatively coupled to at least drive the projectors 1316 and to at least receive information from the image capture devices 1320. The computing subsystem 1308 may also be communicatively coupled to various peripherals of the upright or arcade/casino style gaming system 1300, for example, bill validators, coin acceptors, control panels and user interfaces, connectors that allow downloads of games or game reconfiguration. For example, in some embodiments, the computing subsystem 1308 may include one or more input/output ports communicatively coupled to cabinet security switches, dual port or IP based bill/ticket acceptors, dual port or IP based printers, cabinet alarms, game meters (electronic and physical), bar code scanners, and/or laser scanners, or optional Game monitoring units (GMU's).

The computing subsystem 1308 may be configured to process image data captured by the image capture devices 1320 to determine one or more physical aspects of one or more game-related pieces 1314 and/or process information in images of the media 1315. In some embodiments, the computing subsystem 1308 determines a presence/absence of a game-related piece, an identity of a game-related piece, a location and/or orientation of a game-related piece. The computing subsystem 1308 may determine information identifying a holder of a piece of media, account identifier, expiration date, prepaid amount, and the like from the piece of media. In some embodiments, the computing subsystem 1308 determines at least some of the information regarding the game-related pieces and/or media by decoding one or more machine-readable symbols (e.g., bar code symbols, stack code symbols, area or matrix code symbols) carried by the game-related pieces and/or media. In such embodiments, the sensor subsystem 1306 may take the form of one or more machine-readable symbol readers, such as scanners or imagers that read bar codes, stacked codes, and/or area or matrix codes, and the computing subsystem 1308 may include instructions for decoding such machine-readable symbols. The computing subsystem 1308 may execute instructions stored on a memory that allows the computing subsystem to determine information about one or more game playing pieces based on information received from the game playing pieces via the sensor subsystem and/or from other information collected or sensed by the sensor subsystem. For example, the computing subsystem may determine the type of game playing piece, value of the game playing piece, player to which the game playing piece is associated, position and/or orientation of the game playing piece, and the like.

The computing subsystem 1308 may be communicatively coupled to one or more other components and/or systems. For example, the computer system 1322 may be communicatively coupled by a network 1324 to a slot management system, accounting system, a casino marketing system, a server-based game service, a service/beverage system, bonus system, download or reconfiguration system, dynamic button deck, and/or the Internet 1334. The computing subsystem 1308 may additionally or alternatively be coupled to one or more printers, currency acceptors, optional card readers, biometric measurement devices, proximity sensors, and/or management systems, collectively illustrated as 1336.

Various embodiments may employ touch screen technologies. For example, various embodiments may employ a resistive system, capacitive system or surface acoustic wave system to detect physical aspects; for example, player and/or dealer selections.

Resistive systems may include a glass panel that carries an electrically-conductive layer and an electrically-resistive layer, which layers are separated by spacers. The glass panel may be part of a display. The structure may also include a scratch resistant covering or layer. A current runs through the conductive layer, and the conductive and resistant layers contact at a location where touched, changing the electrical field. A controller, processor or driver converts the change in electrical field into position data, which is mapped to the virtual game layout.

Capacitive systems may include a glass panel that carries a charge storage layer. The glass panel may be part of a display. In use, when a player or dealer touches the charge storage layer, charge is transferred to the user, which changes the charge on the capacitive layer. Circuits sense or measure the change in charge. A processor, controller or drive determine position data from the change in charge, which is mapped to the virtual game layout.

Alternatively, the surface may include one or more pressure sensitive layers, which may detect differences in pressure asserted by a game playing piece of player identity media. For example, one or more raised protrusions (e.g., similar to Brail cells) or printed elements (e.g., barcode elements) may be sensed and decoded.

Surface acoustic wave systems may employ a pair of transducers along perpendicular axes of a glass panel and reflectors that reflect an electrical signal sent from one transducer of each pair to the other transducer of the pair. The receiving transducer of each pair senses or measures disturbances of electrical wave. A processor, controller or driver can determine position data based on the disturbances, which is mapped atop the virtual game layout. While more costly than the other touch screen systems, surface acoustic wave systems advantageously allow transmission of almost all light. Surface acoustic wave systems are also advantageously sensitive to touches by any object, in contrast to capacitance-based touch screen systems. A surface computing display such as one announced by MICROSOFT of Redmond Wash. may be employed in the upright or arcade/casino style gaming system 1300.

Figure 14:
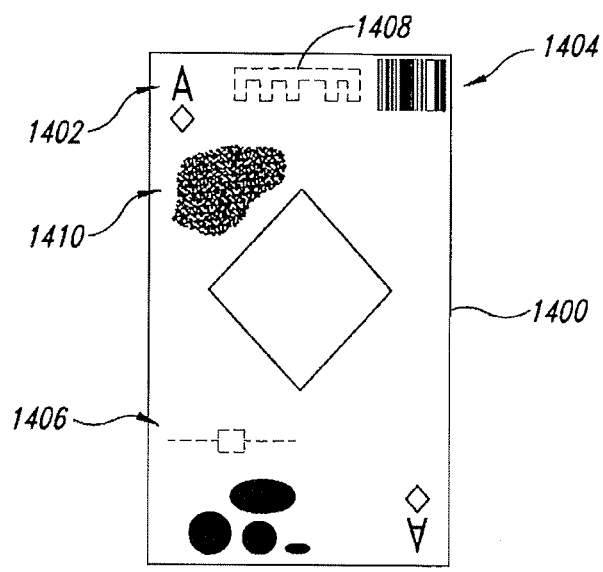
FIG. 14 is a top plan view of a game-related piece in the form of a physical playing card according to one illustrated embodiment, the playing card including human-readable markings such as rank and/or suit symbols, and one or more of machine-readable symbols, RFID transponder, EAS type transponder, or other machine-readable indicia.

The display subsystem and/or the touch screens may, for example, present a graphical user interface (GUI) with one or more user selectable icons FIG. 14 shows a game-related piece according to one illustrated embodiment.

The game-related piece takes the form of a physical card 1400, which may be a playing card. The card 1400 may have human-readable markings 1402 which may, for example, take the form of standard rank (e.g., 2-Ace) and suit symbols (e.g., Heart, Spade, Diamond, Club). The card 1400 may include machine-readable markings 1404 (e.g., bar code symbol, stacked code symbol, area or matrix code symbol, pips). The machine-readable markings 1404 may be invisible to humans, for example, visible only in the infrared portion of the electromagnetic spectrum. The machine-readable markings 1404 may be located on the face and/or back of the card 1400.

Additionally or alternatively, the card 1400 may include a transponder. The transponder may take a variety of forms. For example, the transponder may take the form of a passive transponder, such as an RFID circuit 1406 or EAS resonator 1408. Additionally or alternatively, the card 1400 may include the magnetic or ferromagnetic indicia 1410. The magnetic or ferromagnetic indicia 1410 may take a variety of forms. For example, the magnetic or ferromagnetic indicia 1410 may be printed or otherwise deposited on a surface of the card 1400, or on an inner layer of the card 1400 between the face and the back. The magnetic or ferromagnetic indicia 1410 may be deposited within the card 1400, for example, as particles distributed in the medium (e.g., paper, cardboard, Mylar, Vellum) from which the card 1400 is made.

Figure 15:
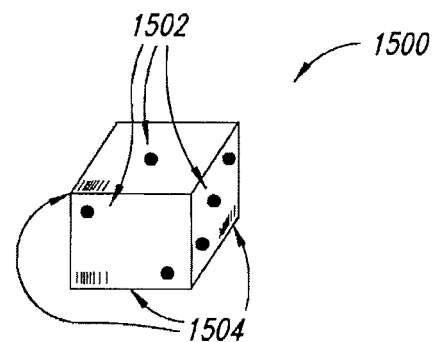
FIG. 15 is a top plan view of a game-related piece in the form of a physical die according to one illustrated embodiment, the playing card including human-readable markings such as spots, and one or more of machine-readable symbols or other machine-readable indicia.

FIG. 15 shows a game-related piece according to one illustrated embodiment.

The game-related piece takes the form of a multi-sided die 1500. The die 1500 may have human-readable markings 1502 which may, for example, take the form of standard spot patterns (e.g., one-six spots). The die 1500 may have machine-readable markings 1504 (e.g., bar code symbol, stacked code symbol, area or matrix code symbol). The machine-readable markings 1504 may be invisible to humans; for example, visible only in the infrared portion of the electromagnetic spectrum. The machine-readable markings 1504 may be located on one or more faces of the die 1500. In some embodiments, the spots are the machine-readable markings.

Figure 16:
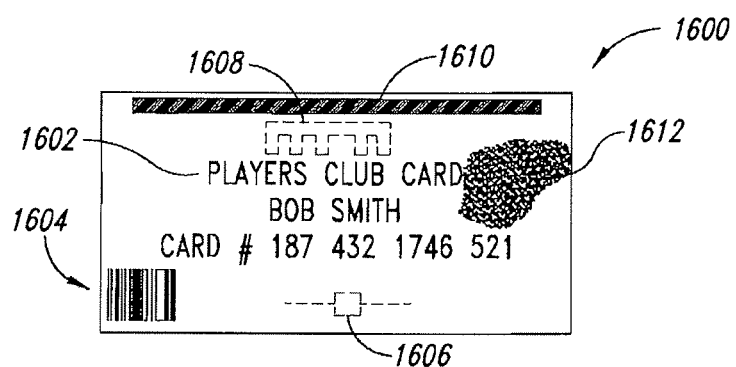
FIG. 16 is a top plan view of a physical piece of media such as a loyalty program card or financial card according to one illustrated embodiment, the playing card including human-readable markings such as name, account number, expiration date, and one or more of machine-readable symbols, magnetic stripe, RFID transponder, EAS type transponder, or other machine-readable indicia.

FIG. 16 shows a piece of media, according to one illustrated embodiment.

The piece of media may take the form of a card 1600; for instance, an identity card (e.g., loyalty program card, driver's license, and passport) or a financial card (e.g., credit card, debit card, prepaid card, and voucher). The card 1600 may have human-readable markings 1602 which may, for example, take the form of alpha-numeric characters (e.g., name, account number). The card 1600 may have machine-readable markings 1604 (e.g., bar code symbol, stacked code symbol, area or matrix code symbol). The machine-readable markings 1604 may be invisible to humans; for example, visible only in the infrared portion of the electromagnetic spectrum. The machine-readable markings 1604 may be located on the face and/or back of the card 1600. As noted previously, image processing such as machine vision techniques (e.g., feature or edge detection for instance via a Sobel filter) may be employed to identify game playing pieces and/or player identity or financial media.

Additionally or alternatively, the card 1600 may include a transponder. The transponder may take a variety of forms. For example, the transponder may take the form of a passive transponder, such as an RFID circuit 1606 or EAS resonator 1608. Additionally or alternatively, the card 1600 may include magnetic or ferromagnetic indicia. The magnetic or ferromagnetic indicia may take a variety of forms. For example, the magnetic or ferromagnetic indicia may be printed or otherwise deposited on a surface of the card 1600, or on an inner layer of the card 1600 between the face and the back, or for example, as a stripe 1610. The magnetic or ferromagnetic indicia 1610 may be deposited within the card 1600, for example, as particles 1612 distributed in the medium (e.g., paper, cardboard, Mylar, Vellum) from which the card 1600 is made.

Discussion of a Suitable Computing Environment

Figure 17:
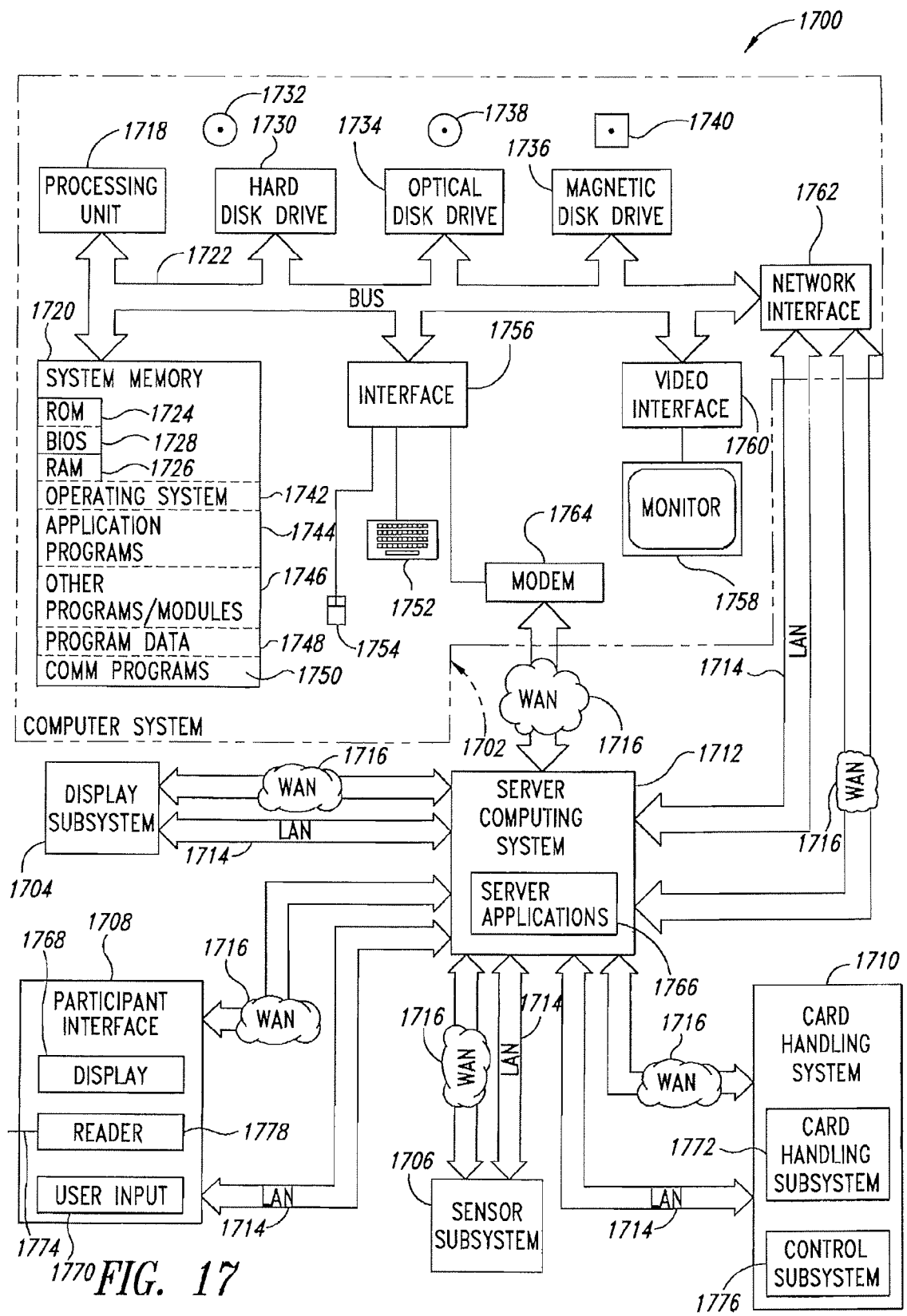
FIG. 17 a schematic diagram of a computer system according to one illustrated embodiment, suitable for use with various embodiments of the game playing environment and game playing systems described herein.

FIG. 17 and the following discussion provide a brief, general description of a suitable gaming system environment 1700 in which the various illustrated embodiments can be implemented. Although not required, the embodiments will be described in the general context of computer-executable instructions, such as program application modules, objects, or macros being executed by a computer. Those skilled in the relevant art will appreciate that the illustrated embodiments as well as other embodiments can be practiced with other computer system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 17 shows the gaming system environment 1700 comprising one or more computer systems 1702, display subsystems 1704, sensor subsystems 1706, participant interfaces 1708, playing card handling other gaming systems 1710, and/or server computing systems 1712 coupled by one or more communications channels, for example, one or more local area networks (LANs) 1714 or wide area networks (WANs) 1716. The gaming system environment 1700 may employ other computers, such as conventional personal computers, where the size or scale of the system allows.

The computer system 1702 may take the form of a conventional mainframe or mini-computer that includes a processing unit 1718, a system memory 1720 and a system bus 1722 that couples various system components including the system memory 1720 to the processing unit 1718. The computer system 1702 will at times be referred to in the singular herein, but this is not intended to limit the embodiments to a single computing system since in typical embodiments, there will be more than one computing system or other device involved. Non-limiting examples of commercially available systems include, but are not limited to, an 80.times.86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation. One suitable device is the Bally Alpha motherboard and suitcase, which has been certified as a regulated gaming device in hundreds of jurisdictions throughout the World. Such may include instructions to top generate random numbers or may include a dedicated random number generator. As used herein, random numbers and variations thereof, such as a random number generator, includes pseudo random numbers and software or devices to generate pseudo-random numbers. Some embodiments may include server-based outcomes or random number generators. Such outcomes or prize award values may be reverse mapped back into a game experience or bonus experience for the player at the game table or arcade/casino gaming system. Such a game experience may be enhanced by providing the information via server generated images and/or video streamed data sent to a client device.

The processing unit 1718 may be any logic processing unit, such as one or more central processing units (CPUs), digital signal processors (DSPs), application-specific integrated circuits (ASICs), field programmable gate arrays (FPGAs), and the like. Unless described otherwise, the construction and operation of the various blocks shown in FIG. 17 are of conventional design. As a result, such blocks need not be described in further detail herein, as they will be understood by those skilled in the relevant art.

The system bus 1722 can employ any known bus structures or architectures, including a memory bus with memory controller, a peripheral bus, and a local bus. The system memory 1720 includes read-only memory ("ROM") 1724 and random access memory ("RAM") 1726. A basic input/output system ("BIOS") 1728, which can form part of the ROM 1724, contains basic routines that help transfer information between elements within the computer system 1702, such as during start-up.

The computer system 1702 also includes a hard disk drive 1730 for reading from and writing to a hard disk 1732, and an optical disk drive 1734 and a magnetic disk drive 1736 for reading from and writing to removable optical disks 1738 and magnetic disks 1740, respectively. The optical disk 1738 can be a CD-ROM, while the magnetic disk 1740 can be a magnetic floppy disk or diskette. The hard disk drive 1730, optical disk drive 1734 and magnetic disk drive 1736 communicate with the processing unit 1718 via the system bus 1722. The hard disk drive 1730, optical disk drive 1734 and magnetic disk drive 1736 may include interfaces or controllers (not shown) coupled between such drives and the system bus 1722, as is known by those skilled in the relevant art. The drives 1730, 1734 and 1736, and their associated computer-readable media 1732, 1738, 1740, provide non-volatile storage of computer readable instructions, data structures, program modules and other data for the computer system 1702. Although the depicted computer system 1702 employs hard disk 1730, optical disk 1734 and magnetic disk 1736, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, Secure Disks SD, CF media (compact flash), and the like.

Program modules can be stored in the system memory 1720, such as an operating system 1742, one or more application programs 1744, other programs or modules 1746 and program data 1748. The system memory 1720 may also include communication programs 1750; for example, a Web client or browser 1750 for permitting the computer system 1702 to access and exchange data with sources such as Web sites of the Internet, corporate intranets, or other networks as described below, as well as other server applications on server computing systems such as those discussed further below. The browser may be markup language-based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from America Online and Microsoft of Redmond, Wash. The communication programs 1750 may additionally or alternatively include one or more server applications that allow the computer system 1702 to function as a server. Browser support may cause the display subsystem or other user inference to render server-based content related to the gaming, relating to identified players and their accounts, advertisements, service and other offers to the players, electronic funds transfer. Server pushed and client rendered content can be shown to the player at the same time on different portions of the playing surface or other user interface.

While shown in FIG. 17 as being stored in the system memory 1720, the operating system 1742, application programs 1744, other programs/modules 1746, program data 1748 and browser 1750 can be stored on the hard disk 1732 of the hard disk drive 1730, the optical disk 1738 of the optical disk drive 1734 and/or the magnetic disk 1740 of the magnetic disk drive 1736. Operators, such as casino personnel, can enter commands and information into the computer system 1702 through input devices such as a touch screen or keyboard 1752 and/or a pointing device such as a mouse 1754. Other input devices can include a microphone, joystick, game pad, tablet, touch screen, scanner, and the like. These and other input devices are connected to the processing unit 1718 through an interface 1756 such as a serial port interface that couples to the system bus 1722, although other interfaces such as a parallel port, a game port or a wireless interface or a universal serial bus ("USB") or FIREWIRE can be used. A monitor 1758 or other display device(s) is coupled to the system bus 1722 via a video interface 1760, such as a video adapter. The computer system 1702 can include other output devices, such as speakers, printers, and the like.

The computer system 1702 can operate in a networked environment using logical connections to one or more remote computers and/or devices; for example, the server computing system 1712. The server computing system 1712 can be another personal computer, a server, another type of computer, or a collection of more than one computers communicatively linked together and typically includes many or all of the elements described above for the computer system 1702. The server computing system 1712 is logically connected to one or more of the computer systems 1702 under any known method of permitting computers to communicate, such as through one or more LANs 1714 and/or WANs 1716 such as the Internet. Such networking environments may take the form of wired and/or wireless enterprise-wide computer networks, intranets, extranets, and the Internet. Other embodiments include other types of communication networks including telecommunications networks, cellular networks, paging networks, and other mobile networks.

When used in a LAN networking environment, the computer system 1702 is connected to the LAN 1714 through an adapter or network interface 1762 (communicatively linked to the system bus 1722). When used in a WAN networking environment, the computer system 1702 may include a modem 1764 or other device, such as the network interface 1762, for establishing communications over the WAN 1716. The modem 1764 is shown in FIG. 17 as communicatively linked between the interface 1756 and the WAN 1716. In a networked environment, program modules, application programs, or data, or portions thereof, can be stored in the server computing system 1712. In the depicted embodiment, the computer system 1702 is communicatively linked to the server computing system 1712 through the LANs 1714 and/or WAN 1716, for example with TCP/IP middle layer network protocols. However, other similar network protocol layers are used in other embodiments, such as User Datagram Protocol ("UDP"). Those skilled in the relevant art will readily recognize that the network connections shown in FIG. 17 are only some examples of establishing communication links between computers, and other links may be used, including wireless links.

The server computing system 1712 is also communicatively linked to one or more other computing systems or devices, such as the display subsystem 1704, participant interface 1708, and/or playing card handling system and/or other gaming systems, which may be through the LAN 1714 or the WAN 410 or other networking configuration such as a direct asynchronous connection (not shown).

The server computing system 1712 includes server applications 1766 for the routing of instructions, programs, data and agents between the computer system 1702, display subsystem and/or other gaming systems 1704, playing card handling system 1710 and/or participant interface 1708. For example, the server applications 1766 may include conventional server applications such as WINDOWS NT 4.0 Server, and/or WINDOWS 2000 Server, available from Microsoft Corporation or Redmond, Wash. Additionally, or alternatively, the server applications 1766 can include any of a number of commercially available Web servers, such as INTERNET INFORMATION SERVICE from Microsoft Corporation and/or IPLANET from Netscape. The client gaming device may also include a Web server to serve up content and data to other table game devices or servers when remote devices request data, for example using Microsoft .NET, ASPX, Java, DHTML, FLASH, or Shockwave.

The server computing system 1712 may also include one or more random number generators. The random number generator may be implemented as a dedicated device, or alternatively, the random number generator functionality may be implemented as instructions executed by a processor. The random number generator may be used to select one or more winners of a bonus from a plurality of chances.

The participant interface 1708 may include one or more displays 1768 and user input devices 1770. The participant interface 1708 may take the form of one or more of the components of the various embodiments of the display and sensor subsystems previously described. Alternatively, or additionally, the participant interface 1708 may employ a display and/or user input device that is separate from the display and sensor subsystems. For example, the displays 1768 and user input devices 1770 may take the form of touch screen displays, as previously discussed. Also for example, the user input devices 1770 may take the form of a keyboard or keypad. The participant interface 1708 may additionally or alternatively include one or more sound transducers, such as a speaker and/or microphone.

The participant interface 1708 may include one or more readers 1778 operable to information from media 1774; for example, player identification from player identity media (e.g., loyalty program or player club card, driver's license, and the like.) or financial information from financial media (e.g., credit card, debit card, prepaid card, cellular phone, PDA). For example, the readers 1778 may take the form of one or more magnetic strip readers operable to read player identification information encoded into one or more magnetic stripes. Alternatively, or additionally, the readers 1778 may take the form of one or more optical machine-readable symbol readers operable to read player identification information encoded into one or more machine-readable symbols (e.g., barcode symbols, stacked code symbols, area or matrix code symbols). For example, the readers 1778 may take the form of one or more RFID readers or interrogators operable to read player identification information encoded into one or more RFID carriers (e.g., tags or cards). All Bally Table View product features may be available on the surface computing display.

The participant interface 1708 may include one or more controllers, memories and may store and execute one or more applications for providing information to, and collecting information from the participants. For example, players, dealers or other casino personnel may select between various game, both wagering and non-wagering games via the participant interface 1708. Also for example, the players may select payout or house odds and/or house advantage via the participant interface 1708, for example via a GUI. The participant interface 1708 may provide the player with a selection of predefined payout or house odds and/or house advantages, or may receive payout or house odds and/or house advantage defined by the player. The participant interface 402 may permit the players to select from a variety of bonus gaming options. Likewise, the participant interface 1708 may provide the dealer with the selected payout or house odds and/or house advantage for the various players, and may permit the dealer to enter the payout or house odds or house advantage for the various player positions. The participant interface 1708 may provide the player and/or dealer with information regarding the player's opportunity to participate in a bonus pool. For example, the information may include the player's absolute number of chances, relative chances, size of bonus pool, qualification status, and time remaining to qualify for the bonus pool and/or factors to enhance the player's opportunity to participate in the bonus pool.

Additionally, the participant interface 1708 may include instructions for handling security such as password or other access protection and communications encryption. The participant interface 1708 can also provide statistics (win, loss, time, and the like) to the players 120 and/or dealer 124. The statistics may be provided in real-time or almost real-time. Statistics for all play at a table may be displayed at the table and/or at other tables or locations in the casino property. Further, the participant interface 1708 may allow the player 120 to request drinks, food, and/or services. The participant interface 1708 may allow the dealer 124 to request assistance; for example, requesting more chips or new playing cards. Other information may include one or more of player identification data, preference data, statistical data for the particular player and/or other players, account numbers, account balances, maximum and/or minimum wagers, currency converters, and the like.

The gaming system environment 400 may employ various playing card handling systems 1710, and may include one or more playing card handling subsystems 1772 and one or more controller subsystems 1776, which may include one or more programmed microprocessors, application-specific, integrated circuits (ASICs), memories or the like. Playing card handling systems 1710 may, for example, detect an order in which playing card are dealt. Playing card handling systems 1710 may, for example, employ means for mechanical randomizing or ordering playing cards. The playing cards may have conventional markings (e.g., ranks 2-ACE and suits of Spades, Hearts, Clubs and Diamonds) or unconventional markings (e.g., slot machine symbols such as lemons, cherries, and the like), and/or special bonus cards). Playing card handling systems 1710 may for example, computationally determine an order (e.g., randomized, sorted, and the like) in which playing cards will be dealt, and may provide the playing cards in the determined order. For example, such playing card handling systems 1710 may employ mechanical means to physically arrange or provide the playing cards in the computationally generated order. Such mechanical means may, for example, include one or more playing card receivers such as carousels, stacks of compartments, elevators, pickers, ejectors, grippers, and the like. Also for example, playing card handling systems 1710 may employ indicia forming means for forming playing card markings on playing card media to provide the playing cards in the computationally generated order. Such indicia forming means may, for example, take the form of one or more print heads operable to print one or more playing card markings (e.g., rank and/or suit) on playing card media in the computationally-defined order. The print head can take any of a variety of forms, such as a thermal print head, ink-jet print head, electrostatic print head, or impact print head. In other embodiments, the indicia forming means may take the form of a magnetic write head, similar to those employed to encode information into magnetic stripes. In other embodiments, the indicia forming means may take the form of an inductive write head, a radio frequency transmitter, or transmitter of other frequencies of electromagnetic radiation, including but not limited to optical magnetic radiation (e.g., visible light, ultraviolet light, and/or infrared light). Printing may be done on almost any physical game-related piece, for example playing cards and dice. Printing may add indicia that is indicative of a bonus or to add various dimensions or levels to the play of conventional games. For example, symbols traditionally associated with slot machines may be added to playing cards, dice or other game-related pieces. Indicia may even be printed on physical chips, which may entitle a player who receives the chip to a bonus or to participate in a bonus game or drawing.

In some embodiments, the playing card media takes the form of playing card blanks without any markings. In other embodiments, the playing card media takes the form of playing card blanks with some playing card designs, but without playing card value markings (e.g., rank and/or suit symbols). Thus, the playing media may include identical ornamental designs on the backs of the playing card blanks, with the faces left blank for the playing card value markings. In still other embodiments, the playing card media may take the form of existing playing cards, from which the playing card value markings will be erased, prior to being reformed or otherwise generated. In some embodiments, the playing card media may take the form of a fiber based media, for example card stock, vellum, or polymer based media. In some embodiments, the playing card media takes the form of an active media, for example a form of electronic or "e-paper," smart paper, organic light emitting diodes, and/or ink code, which allows the formation and erasure of markings via electrical, magnetic, or electromagnetic radiation. Smart paper is a product developed by Xerox Palo Alto Research Center, of Palo Alto, Calif. The smart paper consists of a flexible polymer containing millions of small balls and electronic circuitry. Each ball has a portion of a first color and a portion of a second color, each portion having an opposite charge from the other portion. Applying a charge causes the balls to rotate within the polymer structure, to display either the first or the second color. Charges can be selectively applied to form different ones or groups of the balls to form the respective markings on the playing cards. The markings remain visible until another charge is applied. Alternatively, the playing card handling systems 1710 can be adapted to employ color-changing inks such as thermochromatic inks (e.g., liquid crystal, leucodyes) which change color in response to temperature fluctuations, and photochromatic inks that respond to variations in UV light. Such materials may be employed to provide special or bonus markings on the physical game-related pieces. Visual indicia on physical game-related pieces (e.g., playing cards, dice, and the like) may be selectively activated. For example, indicia (e.g., human-readable markings, machine-readable markings, standard symbols such as rank and suit symbols or pips, non-standard symbols, bonus marking, and the like) may not be visible until activated by a suitable stimulus. The stimulus may take a variety of forms, for example, light or electromagnetic energy of certain wavelength(s), electrical current and/or voltage, heat, force or stress, and/or chemicals.

Some suitable playing card handling systems are discussed in detail in U.S. patent publication No. 2002-0187821 A; published Dec. 12, 2002; U.S. Pat. No. 6,638,161, issued Oct. 28, 2003; U.S. patent publication No. 2004-0259618 A; U.S. patent application Ser. No. 11/352,416, filed Feb. 10, 2006; Ser. No. 11/428,249, filed Jun. 30, 2006; Ser. No. 11/428,258, filed Jun. 30, 2006; Ser. No. 11/428,286, filed Jun. 30, 2006; Ser. No. 11/428,253, filed Jun. 30, 2006; Ser. No. 11/428,240, filed Jun. 30, 2006; Ser. No. 11/480,321, filed Jun. 30, 2006; Ser. No. 11/480,349, filed Jun. 30, 2006; Ser. No. 11/479,930 filed Jun. 30, 2006; Ser. No. 11/480,273, filed Jun. 30, 2006; Ser. No. 11/480,345, filed Jun. 30, 2006; Ser. No. 11/480,295, filed Jun. 29, 2006; Ser. No. 11/478,360, filed Jun. 29, 2006; and Ser. No. 11/479,963, filed Jun. 29, 2006.

Other gaming systems which may be part of the gaming environment 1700 may include one or more sensors, detectors, input devices, output devices, actuators, and/or controllers such as programmed microprocessor, DSP, ASIC and/or Field Programmable Gate Array (FPGA) or the like. The controllers may execute one or more gaming applications. The gaming applications can include instructions for acquiring wagering and gaming event information from the live gaming at the gaming table. The other gaming systems may collect information via images (visible, infrared, ultraviolet), radio or microwave electromagnetic radiation, and/or by detecting magnetic, inductance, or mechanical energy. The other gaming systems may, for example, employ optical machine-readable symbol readers, operable to read non-standard playing card markings from the playing cards, and/or identifiers from chips and/or player identification media such as casino club cards. Such markings or identifiers may, for example, take the form of machine-readable symbols such as a barcode, matrix or area code, or stacked code symbols. Such optical machine-readable symbol readers may take the form of a scanner or an imager. The other gaming systems may, for example, employ sensors operable to read standard playing card markings (e.g., rank, suit, pips). The other gaming systems may, for example, employ one or more magnetic strip readers or inductive sensors to read a magnetic stripe or other indicia carried on or in the playing cards, chips and/or player identification media. The other gaming systems may, for example, employ one or more radio frequency readers; for example, a radio frequency identification (RFID) interrogator where the playing cards, chips or player identification media carry RFID tags or circuits.

Such other gaming systems may, for example, be implemented in the card shoe 128, playing card handling system 120, dedicated discard shoe (not shown), chip tray, or other areas at or proximate to a gaming table. The gaming applications can also include instructions for processing, at least partially, acquired wagering and gaming event information; for example, identifying the position and amount of each wager and/or the value of each hand of playing cards. The gaming applications may include statistical packages for producing statistical information regarding the play at a particular gaming table, the performance of one or more players including indications of skill level, and/or the performance of the dealer and/or game operator. The gaming applications can also include instructions for providing a video feed and/or simulation of some or all of the participant positions. Gaming applications may determine, track, monitor or otherwise process outcomes of games, amounts of wagers, average wager, player identity information, intermediate score or hands, winning combinations achieved, play rates, wager rates, session time, complimentary benefits information ("comps"), player performance data including indications of player skill or theoretical advantage or use of counting schemes, dealer performance data, chip tray accounting information, playing card sequences, and the like. Some suitable applications are described in one or more of commonly assigned U.S. patent application Ser. No. 60/442,368, filed Apr. 21, 1999; U.S. Pat. No. 6,460,848, issued Oct. 8, 2002; U.S. Pat. No. 6,652,379, issued Nov. 25, 2003; U.S. Pat. No. 6,685,568, issued Feb. 3, 2004; U.S. patent publication No. 2002-0187821 A, published Dec. 12, 2002; U.S. Pat. No. 6,638,161, issued Oct. 28, 2003; and U.S. patent publication No. 2004-0259618 A.

Some embodiments may communicatively couple one or more of the systems 1702, 1712, 1710, subsystems 1704, 1706 and/or participant interfaces 1708 without the use of the server computing system 1712, or alternatively via multiple server computing systems.

Figure 18A:
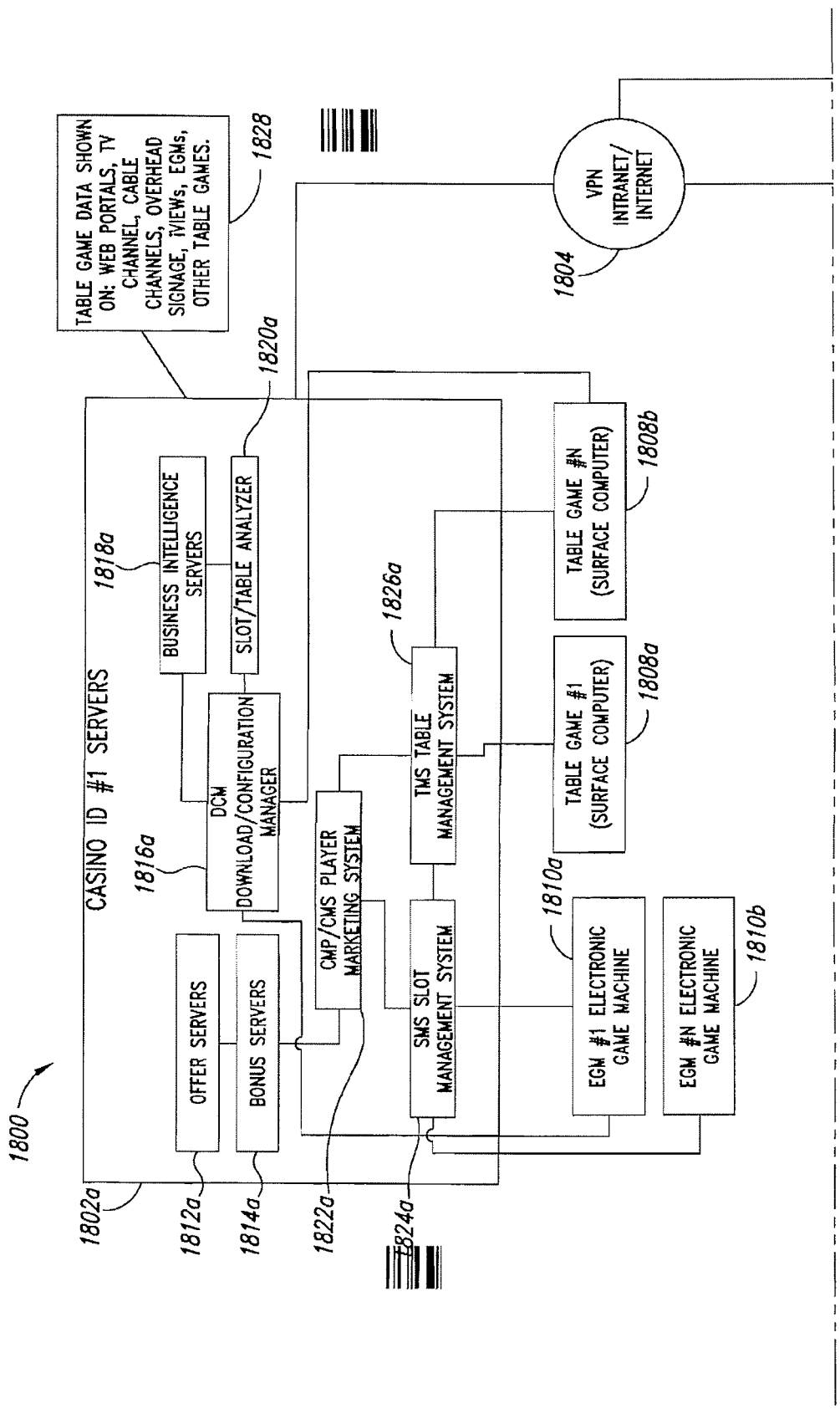
FIGS. 18A and 18B are schematic diagrams of a game playing environment network according to multiple illustrated embodiments.

FIG. 18A and the following discussion provide a brief, general description of a suitable gaming system environment 1800 in which the various illustrated embodiments can be implemented. Although not required, the embodiments will be described in the general context of computer-executable instructions, such as program application modules, objects, or macros being executed by a computer. Those skilled in the relevant art will appreciate that the illustrated embodiments, as well as other embodiments can be practiced with other computer system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices.

Figure 18B:
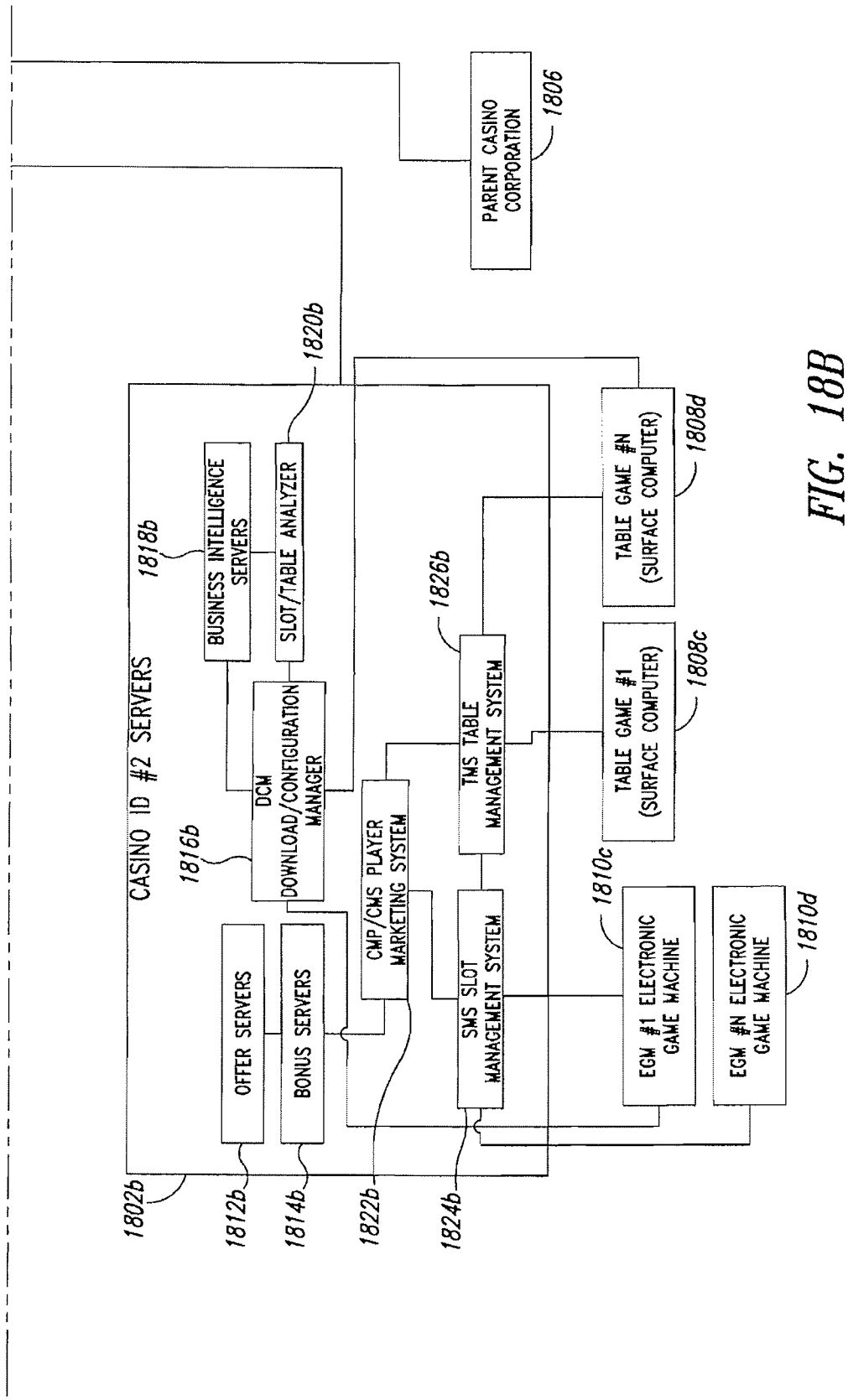

FIGS. 18A and 18B show the gaming system environment 1800 comprising one or more server systems 1802a, 1802b (collectively 1802) communicatively coupled by a network; for example, a VPN Intranet of Internet network 1804. The VPN Intranet of Internet network 1804 is also communicatively coupled to a parent system, for example the corporate systems 1806 of a parent casino organization.

Each of the server systems 1802 is communicatively coupled with one or more game devices or systems, for instance table game systems 1808a-1808d (collectively 1808) and/or electronic game machines (e.g., upright or arcade style gaming systems, slot machines, video poker machines, video blackjack machines, and the like) 1810a-1810d (collectively 1810). The table game systems 1808 may, for example, take the form of the various previously described embodiments of table game systems. The electronic game machines 1810 may, for example, take the form of the various previously described embodiments of upright or arcade style gaming systems, or other types of electronic gaming systems; for example, video gaming systems that employ virtual game-related pieces.

The server systems 1802 may be located on respective casino premises. Alternatively, the server systems 1802 may be located on a casino's premises; for instance, in respective portions of the premises (e.g., respective pits, rooms or floor), or may be collocated. Alternatively, the server systems 1802 may be remotely located from the casino and/or remotely located from the table game systems 1808 and electronic game machines 1810.

The server systems 1802 may include one or more software programs, routines or functions, or may include one or more circuits to implement various functions.

For example, the server systems 1802 may include one or more offer servers 1812a, 1812b (collectively 1812).

For example, the server systems 1802 may include one or more bonusing servers 1814a, 1814b (collectively 1814). The bonusing servers 1814 may determine bonus winners. For instance, the bonusing servers 1814 may determine when a player receives a particular bonus card, playing card or combination of playing cards. Also for instance, the bonusing servers 1814 may determine and/or produce random numbers, which may be used to identify a bonus winner or to allocate a card, playing card or combination of playing cards to a player or table. Also, for instance, the bonusing servers 1814 may track time or track a duration since a last bonus award, and produce a bonus-qualifying event or otherwise, award a bonus based on the same. Additionally, or alternatively, the bonusing servers 1814 may track player participation or qualification in the bonus. For instance, the bonusing servers 1814 may determine whether a player has placed a bonus wager and/or a primary wager. Also, for instance, the bonusing server may determine other aspects of a player's wager which may entitle the player to participate in the bonus pool; for example, length of time spent wagering, player worth to the casino, amount wagered, number of visits to the casino. The bonusing servers 1814 may track contributions to a bonus pool. For instance, the bonusing servers 1814 may track contributions by casino properties, number and/or amount of bonus wagers, number and/or amount of primary wagers, and the like.

For example, the server systems 1802 may include one or more download configuration managers 1816a, 1816b (collectively 1816). The download configuration managers 1816 may allow the various gaming systems to be configured remotely over the network 1804. For example, such may allow the downloading and updating or modifying of game software, operating systems, firmware, either to the computer system 1702 and/or peripherals at will from a central download/configuration system (e.g., BALLY DCM). For instance, the table and/or arcade system gaming systems may be configured to handle new games or variations in games; for example, with new or modified virtual game layouts. Also for instance, the table and/or arcade system gaming systems may be configured to execute new, upgraded or different software with new hardware, such as new, upgraded or different components of the display subsystem, sensor subsystem or computing subsystem. Also, for instance, the table and/or arcade system gaming systems may be configured to execute new, upgraded or different software on existing hardware. Such a configuration may avoid time intensive and costly manual configuration. The download configurations managers 1816 may further track the various hardware and software installed at each gaming table. For example, download configurations managers 1816 may maintain a database of the specific hardware and hardware functionality for each table gaming system and/or specific software including version numbers and software functionality for each gaming table. In this manner, download configuration managers may simplify the maintenance of gaming tables and configuration of new hardware and/or software. All of the software in the table or arcade style gaming device cabinet may be authenticated with digital hashes and signatures to guarantee regulatory compliance.

The download configuration manager 1816 may be communicatively coupled with one or more business intelligence servers 1818a, 1818b (collectively 1818). The download configuration manager 1816 may be communicatively coupled with one or more slot and/or table analyzers 1820a, 1820b (collectively 1820). The business intelligence servers 1818 and the slot and table analyzers 1820 may, for example, suggest schedule changes for the table games to casino personnel, which may or may not require either configuration or complete software changes. Some changes may be prescheduled by a central system (e.g., server systems 1802 or one or more systems of the parent casino corporation 1806) and the table gaming or arcade-style gaming system will go through automatic changes, preferably while players are not present.

For example, the server systems 1802 may include one or more player marketing systems 1822a, 1822b (collectively 1814). Player marketing systems 1822 may track player's play, accommodations, and purchases and provide promotions based on such tracked information. For example, the server systems 1802 may include one or more slot management systems 1824a, 1824b (collectively 1824). The slot management systems 1824 track slot play, and may implement bonuses, for example, progressive bonuses on the slot machines. For example, the server systems 1802 may include one or more table management systems 1826a, 1826b (collectively 1826). The table management system tracks play at gaming tables, for example including amounts wagered, discrepancy in play, card counting, dealer efficiency, chip reserves, and the like. One or more of the server systems 1802a may be communicatively coupled to one or more display devices 1828. One or more of the server systems 1802a may include an offer server's module. For example, signage throughout the casino property may present table gaming data to other players and non-players, including information about bonuses, for instance progressive bonuses.

Figure 19:
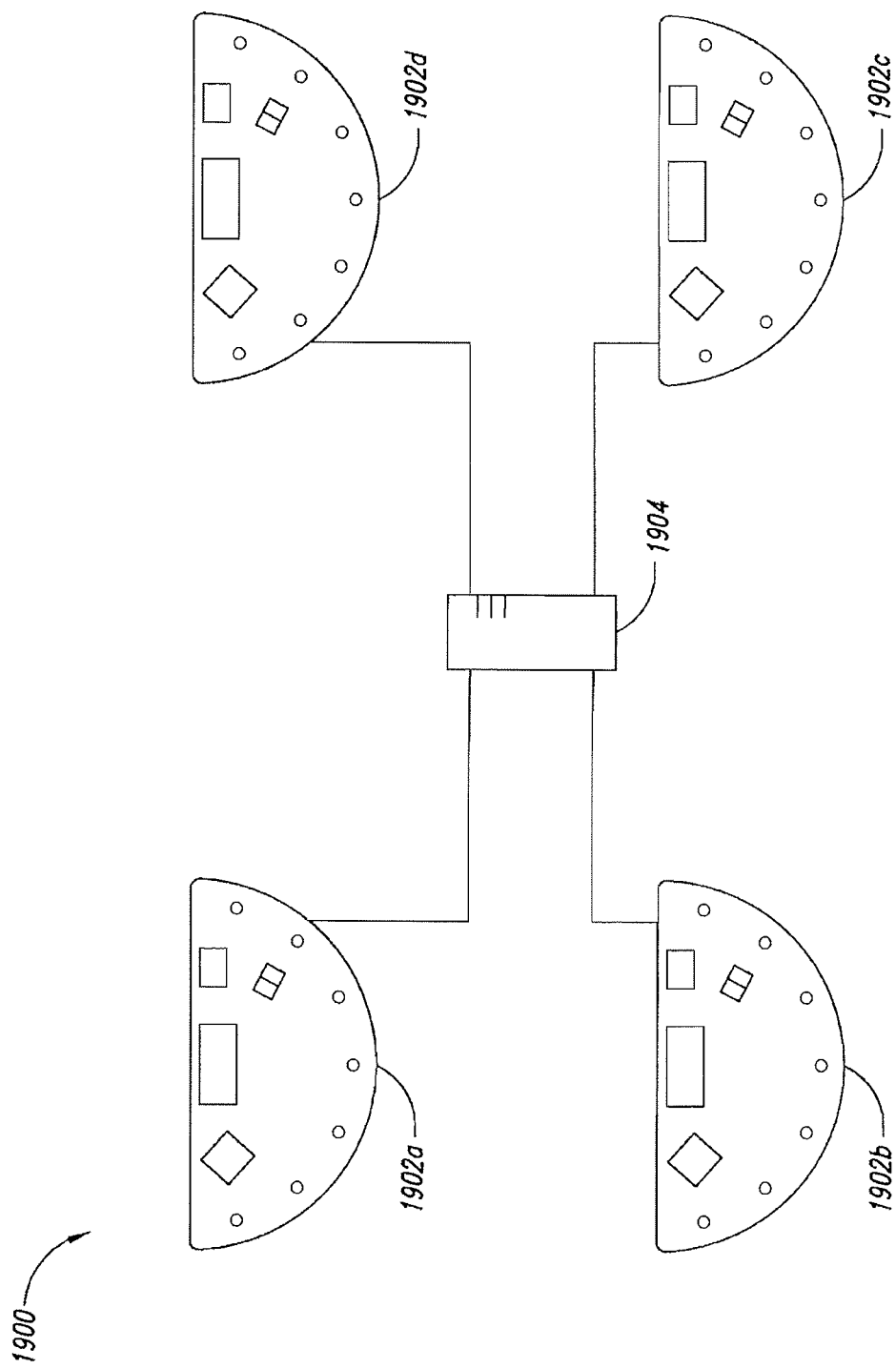
FIG. 19 is a schematic diagram of a game playing environment including a number of gaming tables associated with or constituting a gaming pit and a computing system, according to another illustrated embodiment.

FIG. 19 shows a gaming environment 1900, according to one illustrated embodiment.

The gaming environment 1900 takes the form of a pit, including a plurality (e.g., four) of gaming tables 1902a-1902d communicatively coupled via the computer system 1904. The various gaming tables 1902a-1902d may each include a respective display subsystem and sensor subsystem, and share a common computing subsystem (e.g., computer system 1904). Alternatively, the various gaming tables 1902a-1902d may take the form of one or more of the previously described embodiment of gaming tables, and/or upright or arcade/casino style gaming system, each including respective display, sensor and computing subsystems. In such an embodiment, the computer system 1904 may simply function as a communications server, or may synchronize various operations between the various gaming tables 1902a-1902d.

The computer system 1904 may take variety of forms, for example, the computer system 1702 previously discussed with reference to FIG. 17.

Figure 20:
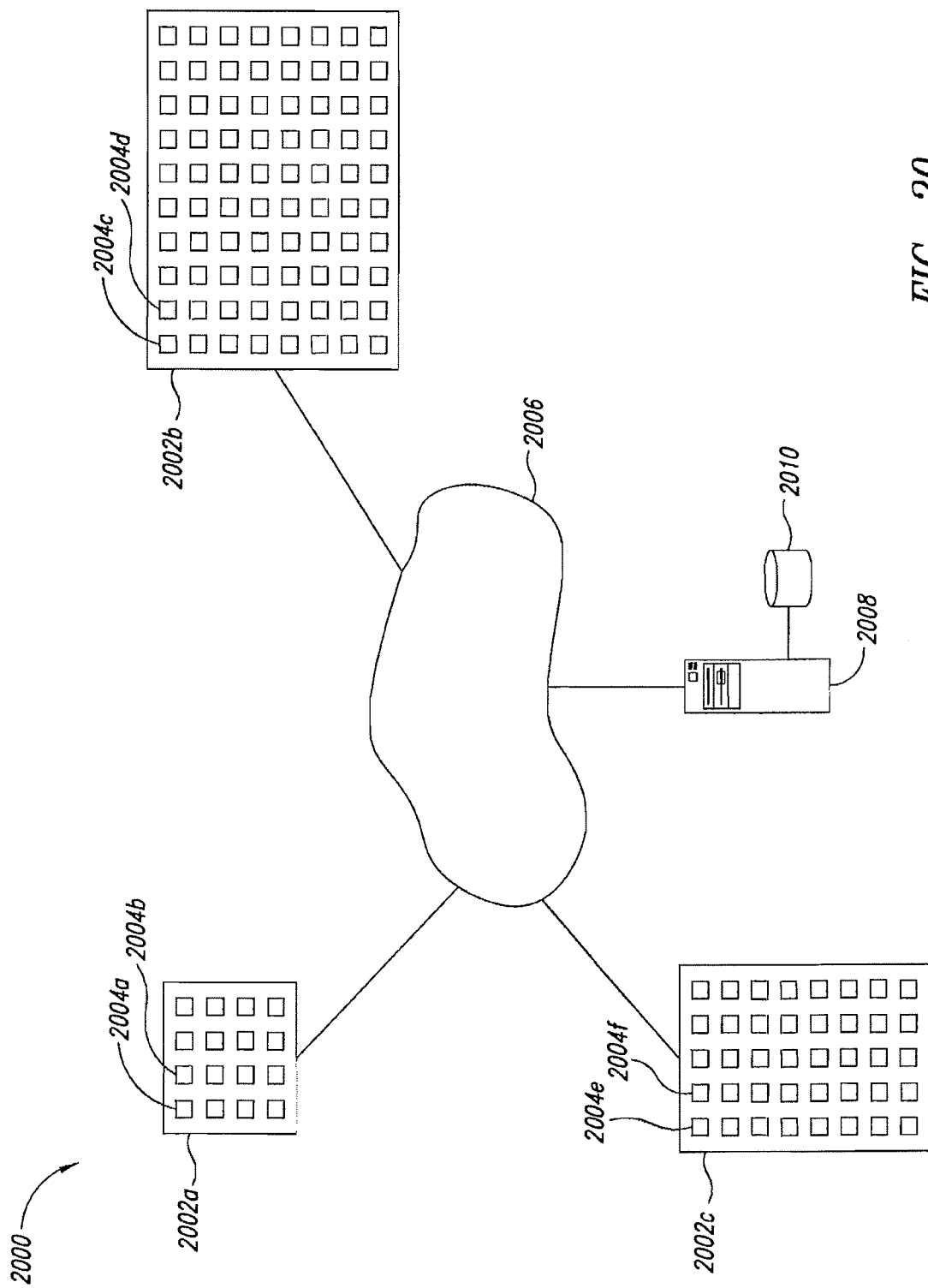
FIG. 20 is a schematic diagram of a game playing environment including a number of properties, each including a plurality of gaming pits with one or more gaming tables, a computing system, and a network communicatively coupling the computing system with the properties, according to another illustrated embodiment.

FIG. 20 shows a multi-property gaming environment 2000 according to one illustrated embodiment. The multi-property gaming environment 2000 includes two or more properties 2002a-2002c (collectively 2002). The properties 2002 may be distinct locations, for example distinct casinos. One or more of the properties 2002 may be commonly owned by a single business entity or may be commonly owned by multiple business entities. Additionally, or alternatively, some or all of the properties 2002 may be separately owned by distinct business entities. One or more of the properties 2002 may be located in the same city, town, county, state or country. Additionally, or alternatively, one or more of the properties 2002 may be located in different cities, towns, counties or states or countries.

Each property 2002a-2002c may include one or more pits 2004a-2004f (only six called out in FIG. 20), which may include one or more gaming tables or gaming systems. The pits 2004a-2004f may, for example, take a form similar to that shown in FIG. 19.

The properties 2002 are communicatively linked by one or more networks 2006, computer system 2008 and associated memory 2010 storing instructions and a database. The network(s) 2006 may take the form of local area networks (LANs), wide area networks (WANs) or other networks. The network(s) 2006 may include wired and/or wireless communications links. The networks(s) 2006 may include digital and/or analog communications links. The network(s) 2006 may employ other networking technologies, some of which are discussed in more detail herein.

The memory 2010 may store instructions for operating the gaming environment 2000, along with a database populated with information related to bonus wagers, chances at a bonus pool as well as the bonus pool itself. For example, the database may reflect a total number of chances provided to respective players for a bonus pool. Each of the chances may, for example, reflect a single chance or opportunity to participate in the bonus pool. As such, the chances may be virtual (i.e., computer data). For example, a player may be provided with zero, one or more chances to participate or win all or a portion of a bonus pool. This may be implemented in a fashion similar to a lottery, with each chance having the same probability of winning as each other chance. The total number of chances for a given bonus pool may be variable, or may be fixed. As discussed below, the chances may be provided based on one or more of a variety of factors. Also for example, the database may reflect a total amount of a bonus pool. The database may reflect amounts contributed by individual players either via conventional wagers or bonus wagers. The database may reflect amounts contributed by individual gaming tables, individual pits 2004, individual properties 2002, individual business entities such as the casinos or other corporate of business sponsors (e.g., advertisers) and/or a consortium of property owners or casinos.

Figure 21:
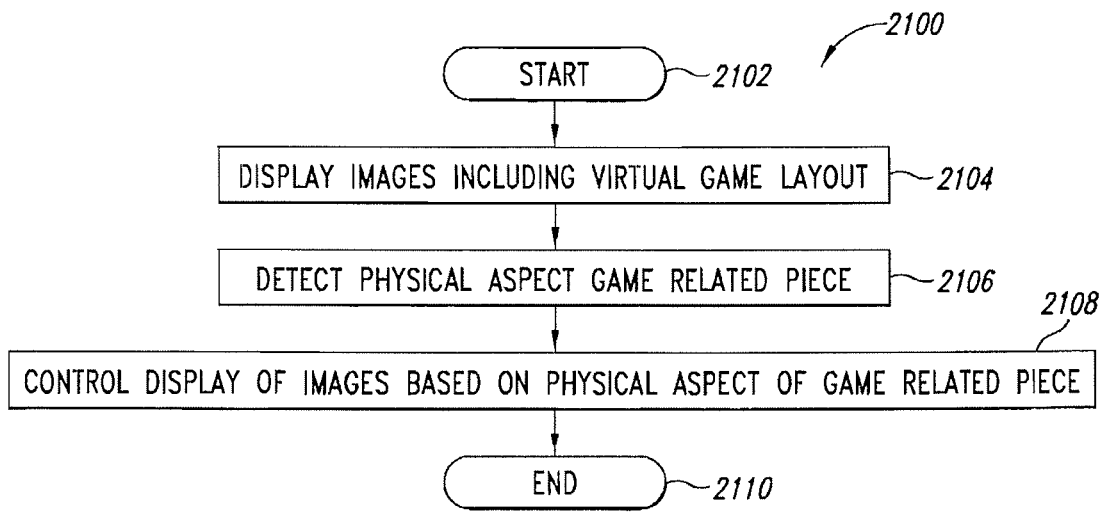
FIG. 21 is a flow diagram of a method of operating a game playing system environment according to an illustrated embodiment, including displaying a virtual game layout and sensing at least one physical aspect of a game-related piece and controlling images based on the sensed physical aspects.

FIG. 21 shows a method 2100 of operating a gaming system environment, according to one illustrated embodiment. At 2102, the method 2100 starts. The method may, for example, start in response to the powering or turning ON of one or more components of the gaming system environment or other event. At 2104, the display subsystem displays images related to one or more games to be played on at least a first game playing surface. The images include a virtual game layout that includes a number of demarcations of at least one area associated with the play of the games. At 2106, the sensor subsystem detects at least one physical aspect of at least one game-related piece when the game-related piece is at least proximate the first game playing surface. At 2108, the computing subsystem controls the images displayed based at least in part on information indicative of the sense of at least one physical aspect of the at least one game-related piece.

The method 2100 terminates at 2110 until called or started again by an appropriate signal. Alternatively, the method 2100 may repeat, operating as a continuous thread or process by passing control back to 2104.

Figure 22:
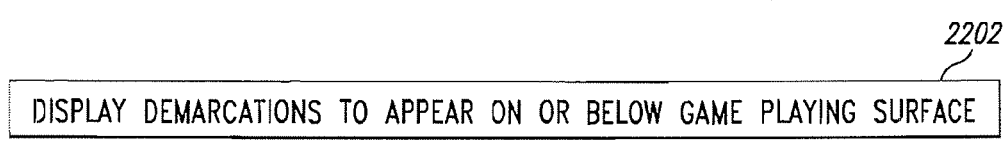
FIG. 22 is a flow diagram of a method of operating a game playing system environment according to an illustrated embodiment, including displaying images such that demarcations at least appear to be on or below the first game playing surface.

FIG. 22 shows a method 2200 of operating a gaming system environment, according to one illustrated embodiment. At 2202, the display subsystem displays the images such that the demarcations at least appear to be on or below the first game playing surface. This may be suitable to implement the act 2104 (FIGS. 21A, 21B).

Figure 23:
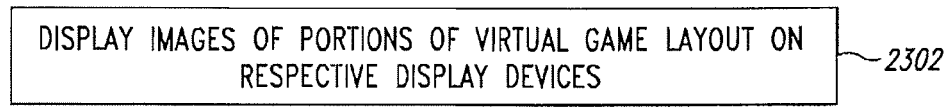
FIG. 23 is a flow diagram of a method of operating a game playing system environment according to an illustrated embodiment, including displaying images of a respective portion of a virtual game layout on each of a plurality of display devices such that the virtual game layout formed by the portions of the virtual game layout is continuous.

FIG. 23 shows a method 2300 of operating a gaming system environment, according to one illustrated embodiment. At 2302, the display subsystem displays images of a respective portion of the virtual game layout on each of a plurality of display devices such that the virtual game layout formed by the portions of the virtual game layout is continuous. Thus, the display subsystem may display on or below multiple playing surfaces if those playing surfaces were one contiguous playing surface. This may be suitable to implement the act 2104 (FIGS. 21A, 21B).

Figure 24:
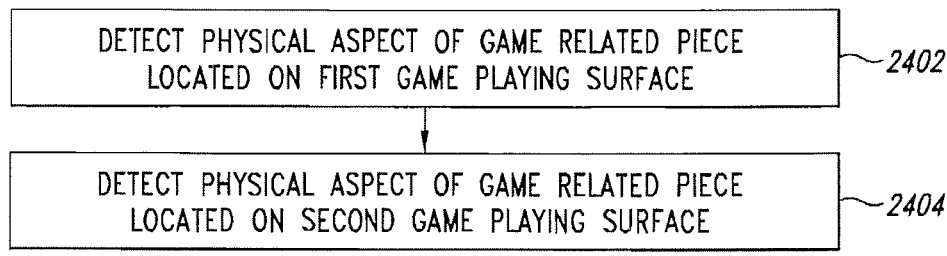
FIG. 24 is a flow diagram of a method of operating a game playing system environment according to an illustrated embodiment, including detecting at least one physical aspect of a single game-related piece when the game-related piece is located on a first game playing surface and on a second game playing surface.

FIG. 24 shows a method 2400 of operating a gaming system environment, according to one illustrated embodiment. At 2402, the sensor subsystem detects or otherwise senses at least one physical aspect of a single game-related piece when the game-related piece is located on the first game playing surface. At 2404, the sensor subsystem detects or otherwise senses at least one physical aspect of a single game-related piece when the game-related piece is located on the second game playing surface. Thus, the sensor subsystem may track the movement of game-related pieces over multiple game playing surfaces. This may be suitable to implement the act 2106 (FIGS. 21A, 21B).

FIG. 25 shows a method 2500 of operating a gaming system environment, according to one illustrated embodiment. At 2502, the sensor subsystem detects or otherwise senses at least one of a presence/absence of the game-related piece from at least a portion of at least one game playing surface, a position of the game-related piece on the at least one game playing surface, or an orientation of the game-related piece with respect to the at least one game playing surface. This may be suitable to implement the act 2106 (FIGS. 21A, 21B).

FIG. 26 shows a method 2600 of operating a gaming system environment, according to one illustrated embodiment. At 2602, the sensor subsystem optical detects the at least one physical aspect of the game-related piece. This may be suitable to implement the act 2106 (FIGS. 21A, 21B).

FIG. 27 shows a method 2700 of operating a gaming system environment, according to one illustrated embodiment. At 2702, the sensor subsystem optically reads a machine-readable symbol carried by the game-related piece. This may be suitable to implement the act 2602 (FIG. 26).

FIG. 28 shows a method 2800 of operating a gaming system environment, according to one illustrated embodiment. At 2802, the sensor subsystem inductively or magnetically detects or otherwise senses the at least one physical aspect of the game-related piece. For example, the sensor subsystem may detect magnetic or ferromagnetic particles carried by the game-related pieces, for instance as a stripe or distribute on or on the game-related piece. This may be suitable to implement the act 2106 (FIGS. 21A, 21B).

FIG. 29 shows a method 2900 of operating a gaming system environment, according to one illustrated embodiment. At 2902, the sensor subsystem wirelessly interrogating at least one of a radio frequency identification transponder or a resonant circuit carried by the game-related piece. For example, the sensor subsystem may transmit a wireless interrogates signal at an interrogation frequency and may detect a response signal, for instance backscattered by the transponder at a response frequency. This may be suitable to implement the act 2106 (FIGS. 21A, 21B).

FIG. 30 shows a method 3000 of operating a gaming system environment, according to one illustrated embodiment. At 3002, the sensor subsystem detects a physical aspect of at least one of a playing card, a chip, a marker, a multi-sided die, a tile, a token, or a spinner or other game-related piece. For example, the sensor subsystem may optically read a machine-readable symbol carried by the game-related piece. For example, the sensor subsystem may detect magnetic or ferromagnetic particles carried by the game-related pieces, for instance, as a strip on the game-related piece. For example, the sensor subsystem may transmit a wireless interrogation signal at an interrogation frequency and may detect a response signal, for instance backscattered by the transponder at a response frequency. This may be suitable to implement the act 2106 (FIGS. 21A, 21B).

FIG. 31 shows a method 3100 of operating a gaming system environment, according to one illustrated embodiment. At 3102, the sensor subsystem reads at least one of participant identification media or financial media located proximate at least one game playing surface of the game playing system. This may be automatically performed in addition to the acts of method 2100 (FIGS. 21A, 21B).

Figure 32:
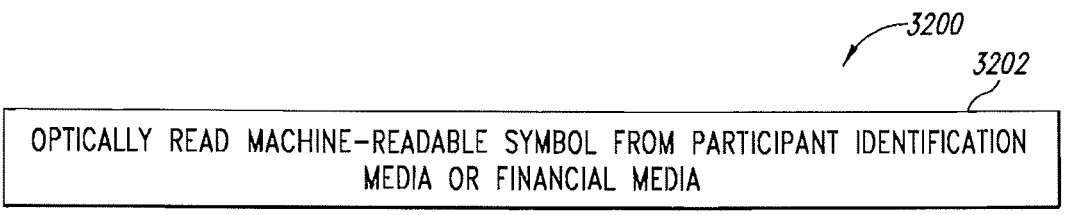
FIG. 32 is a flow diagram of a method of operating a game playing system environment according to an illustrated embodiment, including reading at least one machine-readable symbol from at least one of participant identification media or financial media located on at least one game playing surface of the game playing system.

FIG. 32 shows a method 3200 of operating a gaming system environment, according to one illustrated embodiment. At 3202, the sensor subsystem optically reads at least one machine-readable symbol from at least one of the participant identification media or financial media located on at least one game playing surface of the game playing system. For example, the sensor subsystem may optically scan or image one or more machine-readable symbols carried by the media. This may be suitable to implement the act 3102 (FIG. 31).

Figure 33:
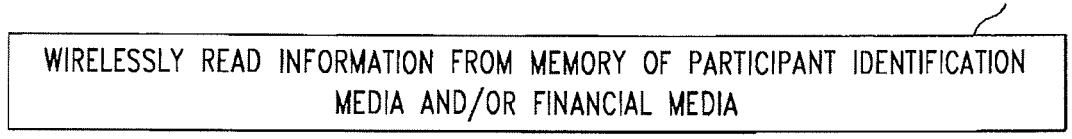
FIG. 33 is a flow diagram of a method of operating a game playing system environment according to an illustrated embodiment, including wirelessly reading information from at least one memory of at least one of participant identification media or financial media located at least proximate at least one game playing surface of the game playing system.

FIG. 33 shows a method 3300 of operating a gaming system environment, according to one illustrated embodiment. At 3302, the sensor subsystem wirelessly reads information from at least one memory of at least one of the participant identification media or financial media located at least proximate to at least one game playing surface of the game playing system. For example, the sensor subsystem may transmit a wireless interrogation signal at an interrogation frequency and may detect a response signal, for instance, backscattered by a transponder at a response frequency. This may be suitable to implement the act 3102 (FIG. 31).

Figure 34:
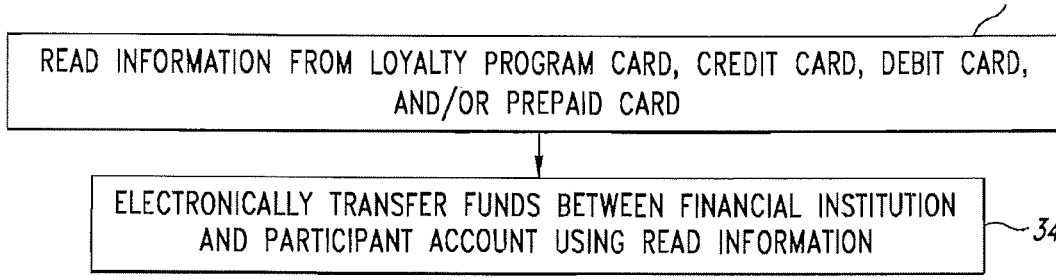
FIG. 34 is a flow diagram of a method of operating a game playing system environment according to an illustrated embodiment, including reading information from at least one of a loyalty program card, a credit card, a debit card, or a prepaid card located proximate at least one game playing surface of the game playing system.

FIG. 34 shows a method 3400 of operating a gaming system environment, according to one illustrated embodiment. At 3402, the sensor subsystem reads information from at least one of a loyalty program card, a credit card, a debit card, or a prepaid card located proximate to at least one game playing surface of the game playing system. For example, the sensor subsystem may optically scan or image one or more machine-readable symbols carried by the media. Also for example, the sensor subsystem may transmit a wireless interrogation signal at an interrogation frequency and may detect a response signal; for instance, backscattered by a transponder at a response frequency. This may be suitable to implement the act 3102 (FIG. 31). At 3404, the computing system or some other system electronically transfers funds between a financial institution and a participant account based, at least in part, on information read from at least one of a loyalty program card, a credit card, a debit card, or a prepaid card.

Figure 35:
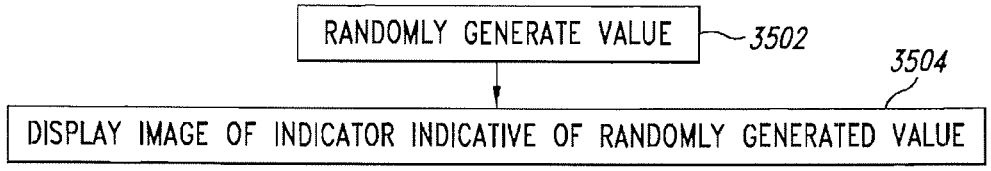
FIG. 35 is a flow diagram of a method of operating a game playing system environment according to an illustrated embodiment, including randomly generating a value and displaying an image of an indicator that is indicative of the randomly-generated value.

FIG. 35 shows a method 3500 of operating a gaming system environment, according to one illustrated embodiment. At 3502, the computing subsystem or some other subsystem such as a random number generator, randomly generates a value. At 3504, the display subsystem displays an image of an indicator that is indicative of the randomly generated value. The image may, for example, be used to vary play of a game or provide a bonus. This may be automatically performed in addition to the acts of method 2100 (FIGS. 21A, 21B).

Figure 36:
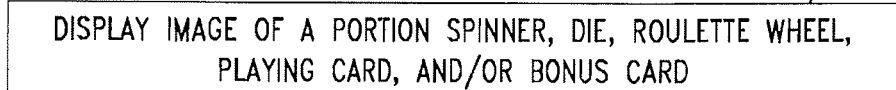
FIG. 36 is a flow diagram of a method of operating a game playing system environment according to an illustrated embodiment, including displaying an image of an indicator that is indicative of the randomly generated value in the form of at least one of a portion of a spinner, a die, a roulette wheel, a playing card, or a bonus card.

FIG. 36 shows a method 3600 of operating a gaming system environment, according to one illustrated embodiment. At 3602, the display subsystem displays an image of an indicator that is indicative of the randomly generated value in the form of at least one of a portion of a spinner, a die, a roulette wheel, a playing card, or a bonus card. The image may, for example, be used to vary play of a game or provide a bonus. This may be suitable to implement the act 3504 (FIG. 35).

Figure 37:
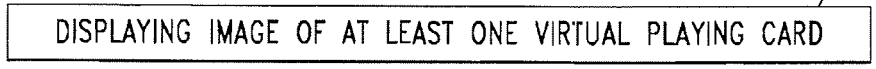
FIG. 37 is a flow diagram of a method of operating a game playing system environment according to an illustrated embodiment, including displaying an image that is indicative of a randomly generated value in the form of at least one virtual playing card that is combinable with at least one physical playing card to form a winning combination.

FIG. 37 shows a method 3700 of operating a gaming system environment, according to one illustrated embodiment. At 3702, the display subsystem displays an image that is indicative of the randomly generated value in the form of at least one virtual playing card that is combined with at least one physical playing card to form a winning combination. The image may, for example, be used to vary play of a game or provide a bonus. This may be suitable to implement the act 3504 (FIG. 35).

Figure 38:
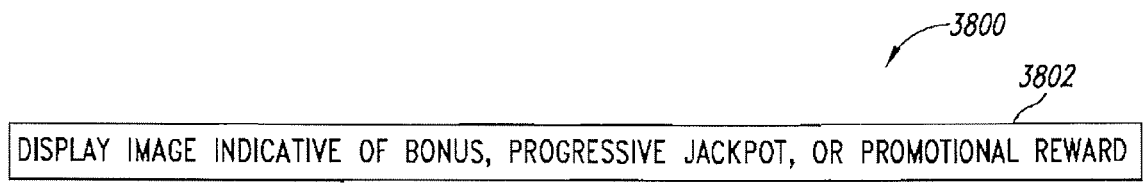
FIG. 38 is a flow diagram of a method of operating a game playing system environment according to an illustrated embodiment, including displaying an image of an indicator that is indicative of a randomly generated value in the form of at least one of a bonus, a progressive jackpot, or a promotional reward.

FIG. 38 shows a method 3800 of operating a gaming system environment, according to one illustrated embodiment. At 3802, the display subsystem displays an image of an indicator that is indicative of the randomly generated value in the form of at least one of a bonus, a progressive jackpot, or a promotional reward. This may be automatically performed in addition to the acts of method 2100 (FIGS. 21A, 21B).

Figure 39:
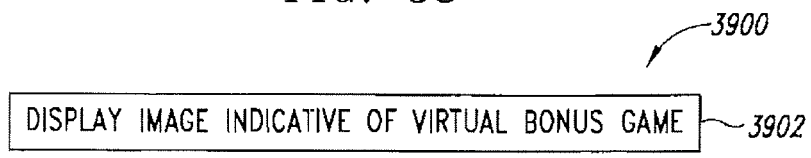
FIG. 39 is a flow diagram of a method of operating a game playing system environment according to an illustrated embodiment, including displaying an image of an indicator that is indicative of a virtual bonus game.

FIG. 39 shows a method 3900 of operating a gaming system environment, according to one illustrated embodiment. At 3902, the display subsystem displays an image of an indicator that is indicative of a virtual bonus game. This may be suitable to implement the act 3802 (FIG. 35).

Figure 40:
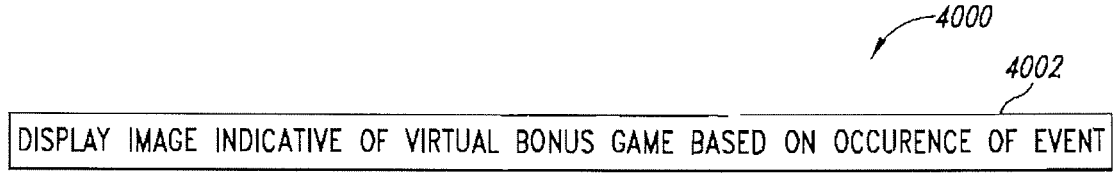
FIG. 40 is a flow diagram of a method of operating a game playing system environment according to an illustrated embodiment, including displaying an image of an indicator that is indicative of a virtual bonus game based on an occurrence of an event.

FIG. 40 shows a method 4000 of operating a gaming system environment, according to one illustrated embodiment. At 4002, the display subsystem displays an image of an indicator that is indicative of a virtual bonus game based on an occurrence of an event. The event may take any of a variety of forms. For example, a player playing for a set period of time, exceeding a defined amount wager either in a single play or cumulatively, incurring losses exceeding a defined amount, the appearance of one or more physical and/or virtual playing cards in the player's hand, at a table or elsewhere, passage of a set time, or occurrence of a random event. This may be suitable to implement the act 3802 (FIG. 38).

Figure 41:
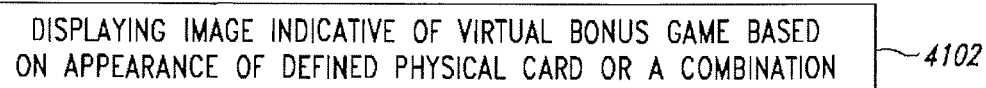
FIG. 41 is a flow diagram of a method of operating a game playing system environment according to an illustrated embodiment, including displaying an image of an indicator that is indicative of a virtual bonus game based on an occurrence of an appearance of a defined physical card or a combination of physical cards.

FIG. 41 shows a method 4100 of operating a gaming system environment, according to one illustrated embodiment. At 4102, the display subsystem displays an image of an indicator that is indicative of a virtual bonus game based on an occurrence of an appearance of a defined physical card or a combination of physical cards. This may be suitable to implement the act 4002 (FIG. 40).

Figure 42:
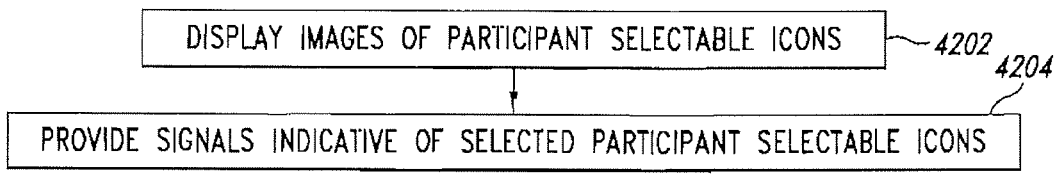
FIG. 42 is a flow diagram of a method of operating a game playing system environment according to an illustrated embodiment, including displaying images of a number of participant selectable icons and provides signals indicative of selected ones of the participant selectable icons in response to detection of participant selection of the participant selectable icons.

FIG. 42 shows a method 4200 of operating a gaming system environment, according to one illustrated embodiment. At 4202, the display subsystem displays images of a number of participant selectable icons. At 4204, the computing subsystem or another subsystem provides signals indicative of selected ones of the participant selectable icons in response to detection of a participant selection of the participant selectable icons. This may allow player or other patrons to interact with the gaming system, to request games, to execute funds transfers, and the like. This may be automatically performed in addition to the acts of method 2100 (FIGS. 21A, 21B).

Figure 43:
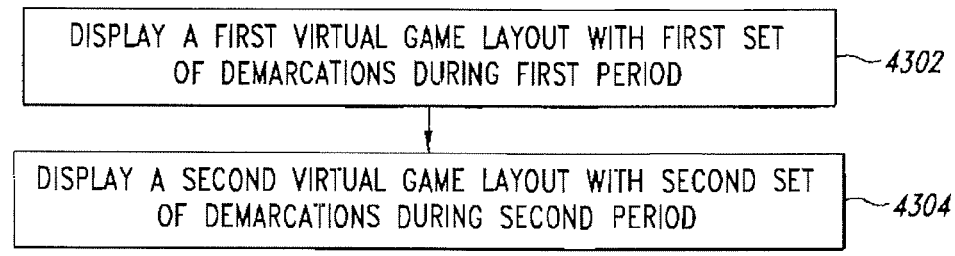
FIG. 43 is a flow diagram of a method of operating a game playing system environment according to an illustrated embodiment, including displaying a first virtual game layout with a first set of demarcations during a first period and a second virtual game layout with a second set of demarcations during a second period, the second set of demarcations different from the first set of demarcations.

FIG. 43 shows a method 4300 of operating a gaming system environment, according to one illustrated embodiment. At 4302, the display subsystem displays a first virtual game layout with a first set of demarcations during a first period. At 4304, the display subsystem displays a second virtual game layout with a second set of demarcations during a second period, the second set of demarcations different from the first set of demarcations. Thus, the display subsystem may allow the table gaming or other gaming device to be electronically reconfigured to provide different games at different times. This may reduce the time and effort currently required to reconfigure conventional felt top gaming tables. This may be performed in addition to the acts of method 2100 (FIGS. 21A, 21B).

Figure 44:
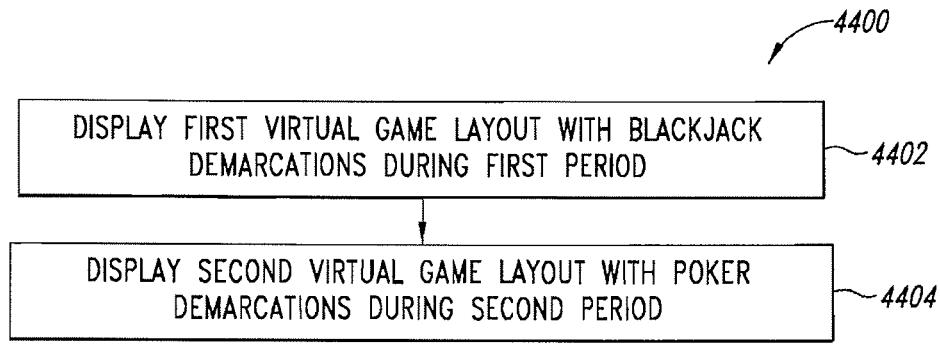
FIG. 44 is a flow diagram of a method of operating a game playing system environment according to an illustrated embodiment, including displaying a first virtual game layout with a set of blackjack demarcations during a first period and a second virtual game layout with a set of poker demarcations during a second period.

FIG. 44 shows a method 4400 of operating a gaming system environment, according to one illustrated embodiment. At 4402, the display subsystem displays a first virtual game layout with a set of blackjack demarcations during a first period. At 4404, the display subsystem displays a second virtual game layout with a set of poker demarcations during a second period. The display subsystem may display virtual game layouts of other games, including baccarat and roulette. This may be suitable to implement the acts of method 4300 (FIG. 43).

Figure 45:
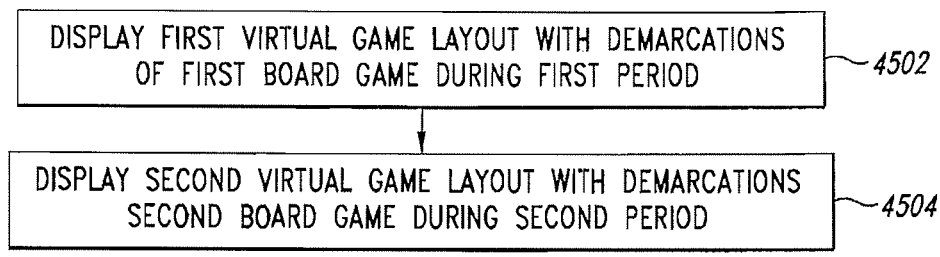
FIG. 45 is a flow diagram of a method of operating a game playing system environment according to an illustrated embodiment, including displaying a first virtual game layout with a set of demarcations of a first board game during a first period and a second virtual game layout with a set of demarcations of a second board game during a second period.

FIG. 45 shows a method 4500 of operating a gaming system environment, according to one illustrated embodiment. At 4502, the display subsystem displays a first virtual game layout with a set of demarcations of a first board game during a first period. At 4504, the display subsystem displays a second virtual game layout with a set of demarcations of a second board game during a second period. The display subsystem may display virtual game layouts of most board games. This may be suitable to implement the acts of method 4300 (FIG. 43).

Figure 46:
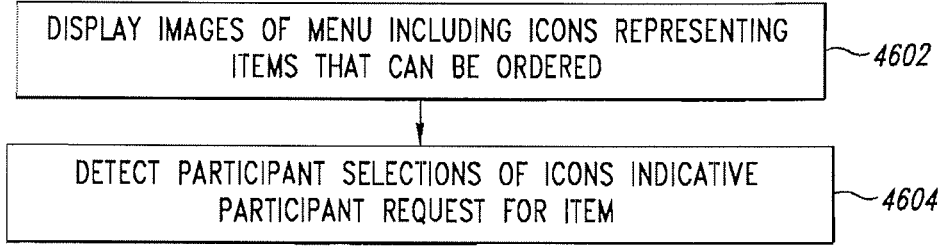
FIG. 46 is a flow diagram of a method of operating a game playing system environment according to an illustrated embodiment, including displaying images of a menu including icons representing a number of items that may be ordered and detecting participant selections of the icons indicative of a participant request for the item represented by the selected one of the icons.

FIG. 46 shows a method 4600 of operating a gaming system environment, according to one illustrated embodiment. At 4602, the display subsystem displays images of a menu including icons representing a number of items that may be ordered. At 4604, the sensor subsystem detects participant selections of the icons indicative of a participant request for the item represented by selecting one of the icons. This may allow player or other patrons to order items such as food, beverages, souvenirs, gifts, tickets, or to order services such as room service, valet service, and the like. This may be automatically performed in addition to the acts of method 2100 (FIGS. 21A, 21B).

Figure 47:
FIG. 47 is a flow diagram of a method of operating a game playing system environment according to an illustrated embodiment, including displaying images indicative of participant account information for at least one participant in the at least one game. The information may cover a variety of accounts and account types.

FIG. 47 shows a method 4700 of operating a gaming system environment, according to one illustrated embodiment. At 4702, the display subsystem displays images indicative of participant account information for at least one participant in the at least one game. The information may cover a variety of accounts and account types. For example, the information may relate to an account the casino has set up for the player. For example, the information may relate to an account associated with the particular game being played by the player, such as an account associated with a credit meter or virtual chips. For example, the information may be related to an account a financial institution has set up for the player, such as a bank account, checking account, money market account, debit account or prepaid account, which may or may not be associated with a piece of financial media. This may be performed in addition to the acts of method 2100 (FIGS. 21A, 21B).

Figure 48:
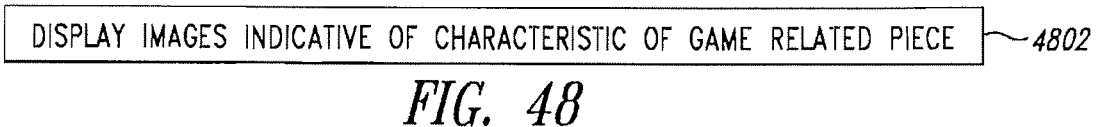
FIG. 48 is a flow diagram of a method of operating a game playing system environment according to an illustrated embodiment, including displaying images indicative of at least one characteristic of the game-related piece.

FIG. 48 shows a method 4800 of operating a gaming system environment, according to one illustrated embodiment.

At 4802, the display subsystem displays images indicative of at least one characteristic of the game-related piece. For example, the images may be a virtual representation of the physical game-related piece. For example, the images may include text or numbers or other indicia indicative of an identity of the physical game-related piece, a value of the physical game-related piece, a position and/or orientation of the physical game-related piece on the playing surface, a player who controls the physical game-related piece. This may be performed in addition to the acts of method 2100 (FIGS. 21A, 21B). For example, in games where one piece captures another (e.g., chess, checkers) special graphics may be displayed in a vicinity of where the capture occurred to enhance the game playing experience. Also, for example, in games where game-related piece associated with one player overtakes a game-related piece associated with another player as the game-related pieces travel a game layout, a visual emphasize may be provided when such an event occurs.

Figure 49:
FIG. 49 is a flow diagram of a method of operating a game playing system environment according to an illustrated embodiment, including determining a value indicative of a net worth of a patron based at least in part on information received from a sensor subsystem that is indicative of the at least one physical aspect of the game-related piece sensed by a sensor subsystem.

FIG. 49 shows a method 4900 of operating a gaming system environment, according to one illustrated embodiment. At 4902, the computing subsystem or some other system (e.g., CMS/CMP system) determines a value indicative of a net worth of a patron based at least in part on information received from a sensor subsystem that is indicative of the at least one physical aspect of the game-related piece sensed by a sensor subsystem. For example, the value may be a function of one or more of an amount wagered, time spent wagering, amount of losses, actual hold, actual hold versus theoretical hold, skill level rating, and/or expenditures at one or more casino properties. This may be performed in addition to the acts of method 2100 (FIGS. 21A, 21B).

Figure 50:
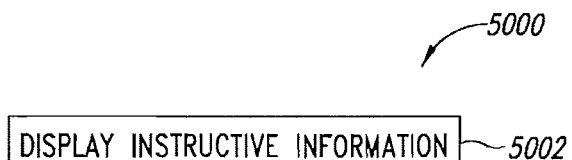
FIG. 50 is a flow diagram of a method of operating a game playing system environment according to an illustrated embodiment, including displaying instructive information regarding the at least one game.

FIG. 50 shows a method 5000 of operating a gaming system environment, according to one illustrated embodiment. At 5002, the display subsystem may display instructive information regarding the at least one game. For example, the instructive information may include information about rules, strategy or tactics of game play. The instructive information may, for example, be presented in text, audio, video or audio visual formats. This may be performed in addition to the acts of method 2100 (FIGS. 21A, 21B).

Figure 51:
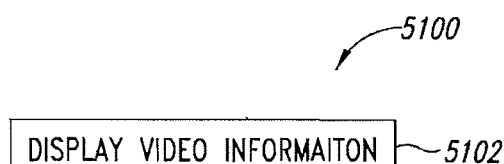
FIG. 51 is a flow diagram of a method of operating a game playing system environment according to an illustrated embodiment, including displaying video information regarding the at least one game.

FIG. 51 shows a method 5100 of operating a gaming system environment, according to one illustrated embodiment. At 5102, the display subsystem may display video information regarding the at least one game. This may be suitable to implement the act 5002 of method 5000 (FIG. 51).

Figure 52:
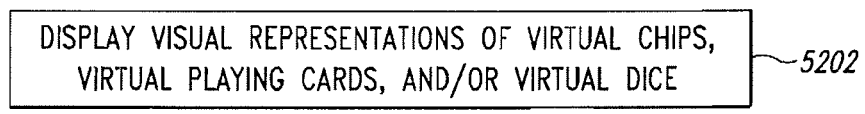
FIG. 52 is a flow diagram of a method of operating a game playing system environment according to an illustrated embodiment, including displaying representations of virtual playing pieces, for example virtual chips, virtual playing cards, or virtual dice.

FIG. 52 shows a method 5200 of operating a gaming system environment, according to one illustrated embodiment. At 5202, the display subsystem displays representations of virtual chips, virtual playing cards, or virtual dice. The virtual chips may, for example, represent credit from a financial transaction or an award to the player such as a bonus. The virtual playing cards may be in addition to physical playing cards. The virtual playing cards may, for example be a bonus awarded to the player. The virtual dice may, for example, represent a free dice roll awarded to a player or players; for example, as a bonus. This may be performed in addition to the acts of method 2100 (FIGS. 21A, 21B).

Figure 53:
FIG. 53 is a flow diagram of a method of operating a game playing system environment according to an illustrated embodiment, including displaying information that is indicative of a previous location of the at least one game-related piece.

FIG. 53 shows a method 5300 of operating a gaming system environment, according to one illustrated embodiment. At 5302, the display subsystem displays information that is indicative of a previous location of the at least one game-related piece. This may allow a game-related piece to be returned to the correct location on the playing surface, for example, after a player intentionally or unintentionally moves the playing piece. This may be performed in addition to the acts of method 2100 (FIGS. 21A, 21B). Additionally, a game state that represents a state of the game (e.g., number and/or location of game-related pieces, number of amounts of wagers, other historical information representing the play of the game) may be stored by the computer or server for recovery purposes or to allow a pause and resume feature later.

Figure 54:
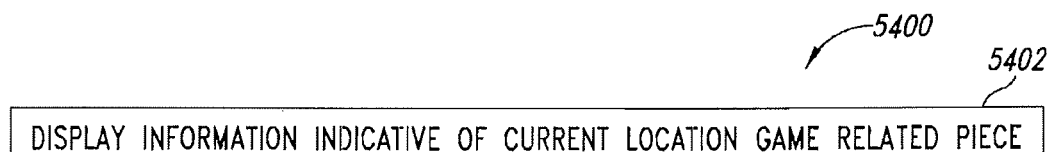
FIG. 54 is a flow diagram of a method of operating a game playing system environment according to an illustrated embodiment, including displaying information that is indicative of a current location of the at least one game-related piece.

FIG. 54 shows a method 5400 of operating a gaming system environment, according to one illustrated embodiment. At 5402, the display subsystem displays information that is indicative of a current location of the at least one game-related piece. This may allow a game-related piece to be placed in the correct location on the playing surface, for example after being unintentionally knocked off, or when resuming a game. This may be performed in addition to the acts of method 2100 (FIGS. 21A, 21B).

FIG. 55 shows a method 5500 of operating a gaming system environment, according to one illustrated embodiment. At 5502, the display subsystem displays information that is indicative of a next location of the at least one game-related piece. This may assist a player in placing or moving a game-related piece to the correct location on the playing surface, for example, after a roll of dice, spin of a spinner or dealing of a playing card. This may be performed in addition to the acts of method 2100 (FIGS. 21A, 21B). A course of movement or final location can be visually emphasized, for example, by highlighting, marqueeing, and the like, to aid the player in moving physical game-related pieces.

FIG. 56 shows a method 5600 of operating a gaming system environment, according to one illustrated embodiment. At 5602, the display subsystem visually emphasizes an area surrounding a physical playing card on a game playing surface. This may assist a player locating or drawing the player's attention to one or more playing cards. This may be useful, for example, where the playing card entitles the player to a bonus. For example, a special feature or multiplier may be associated with a physical playing card. For instance, a player may be paid or otherwise awarded a bonus or extra bonus (e.g., 2 times the standard payout) if a visually emphasized playing card is used in forming a winning combination. This may be performed in addition to the acts of method 2100 (FIGS. 21A, 21B).

FIG. 57 shows a method 5700 of operating a gaming system environment, according to one illustrated embodiment. At 5702, the display subsystem visually emphasizes an area surrounding at least one of a virtual playing card or a physical playing card on a game playing surface that forms part of a bonus combination. This may assist a player locating or drawing the player's attention to playing cards. This may be useful, for example, where the playing card(s) form at least a portion of a particular winning combination. This may be performed in addition to the acts of method 2100 (FIGS. 21A, 21B).

FIG. 58 shows a method 5800 of operating a gaming system environment, according to one illustrated embodiment. At 5802, the display subsystem visually emphasizes an area surrounding each of a number of dice on a game playing surface. This may assist a player locating dice as the dice roll or stop on the playing surface. This may be performed in addition to the acts of method 2100 (FIGS. 21A, 21B).

FIG. 59 shows a method 5900 of operating a gaming system environment, according to one illustrated embodiment. At 5902, the display subsystem displays at least a virtual pair of dice with same pattern as a physical pair of dice that have been rolled. This may assist player remotely located from where the dice stop in ascertaining the value of a roll. In some embodiments, a bonus may be awarded to one or more players if an outcome of a virtual dice roll and an outcome of a roll of physical dice are the same. This may be performed in addition to the acts of method 2100 (FIGS. 21A, 21B).

FIG. 60 shows a method 6000 of operating a gaming system environment, according to one illustrated embodiment. At 6002, the display subsystem displays information indicative of a history of previous rolls of dice. At 6002, the sensor subsystem detects or otherwise senses selections by participants of an outcome of a future roll of dice. This may facilitate additional wagering opportunities. For example, some players may wish to wager on a certain number being thrown that number has not appeared over a long series of dice rolls. This may be performed in addition to the acts of method 2100 (FIGS. 21A, 21B).

Figure 61:
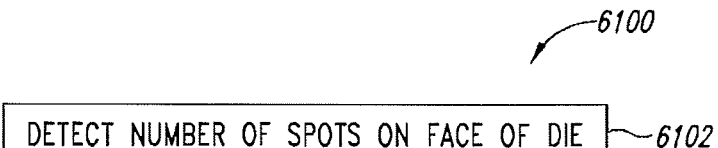
FIG. 61 is a flow diagram of a method of operating a game playing system environment according to an illustrated embodiment, including detecting a number of spots on a face of at least one die.

FIG. 61 shows a method 6100 of operating a gaming system environment, according to one illustrated embodiment. At 6102, the sensor subsystem detects a number of spots on a face of at least one die. For example, the sensor subsystem may optically detect the number of spots on a downward facing face or an upward facing face of the die. This may facilitate games played with physical dice. This may be performed in addition to the acts of method 2100 (FIGS. 21A, 21B).

Figure 62:
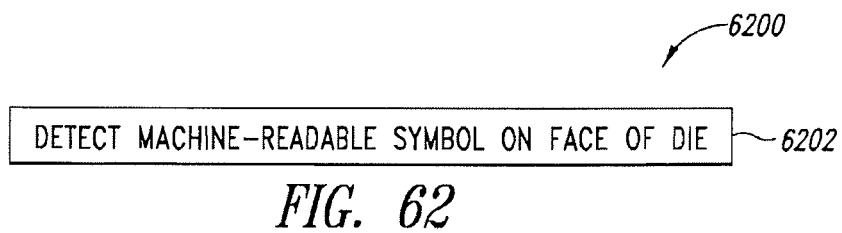
FIG. 62 is a flow diagram of a method of operating a game playing system environment according to an illustrated embodiment, including detecting a machine-readable symbol on a face of at least one die.

FIG. 62 shows a method 6200 of operating a gaming system environment, according to one illustrated embodiment. At 6202, the sensor subsystem detects a machine-readable symbol on a face of at least one die. For example, the sensor subsystem may optically detect the number of one or more machine-readable symbols on a downward facing face or an upward facing face of the die. This may facilitate games played with physical dice. This may be performed in addition to the acts of method 2100 (FIGS. 21A, 21B).

Figure 63:
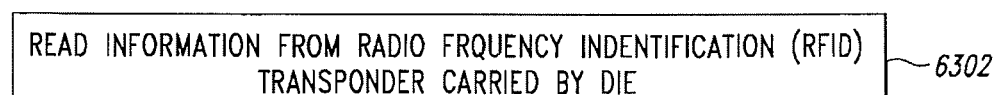
FIG. 63 is a flow diagram of a method of operating a game playing system environment according to an illustrated embodiment, including reading information from a radio frequency identification transponder carried by at least one die.

FIG. 63 shows a method 6300 of operating a gaming system environment, according to one illustrated embodiment. At 6302, the sensor subsystem reads information from a radio frequency identification transponder carried by at least one die. For example, the sensor subsystem may wirelessly interrogate a transponder carried by the die at an interrogation frequency and detect a response signal from the die, for example, a backscattered signal at response frequency. The response may encode a casino identifier, table identifier and/or die identifier, allowing the authenticity of the dice to be ascertained against a central database or list of approved dice. This may be performed in addition to the acts of method 2100 (FIGS. 21A, 21B).

Figure 64:
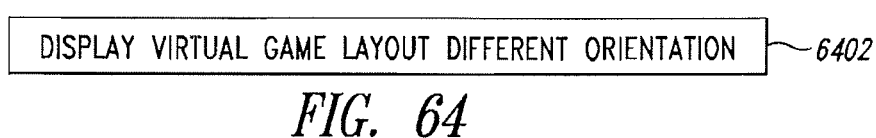
FIG. 64 is a flow diagram of a method of operating a game playing system environment according to an illustrated embodiment, including displaying the virtual game layout at a different orientation than previously displayed between portions of the games.

FIG. 64 shows a method 6400 of operating a gaming system environment, according to one illustrated embodiment. At 6402, the display subsystem displays the virtual game layout at a different orientation than previously displayed between portions of the games. For example, the display subsystem may reorient the virtual game layout to match each of a number of respective player positions located around a gaming table. For example, text may be presented right side up to each player as the player's respective turn in the game occurs. Other variations are possible. This may be performed in addition to the acts of method 2100 (FIGS. 21A, 21B).

Figure 65:
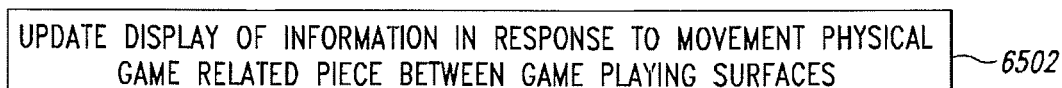
FIG. 65 is a flow diagram of a method of operating a game playing system environment according to an illustrated embodiment, including updating a display of information in response to a movement of a physical game-related piece between at least two game playing surfaces.

FIG. 65 shows a method 6500 of operating a gaming system environment, according to one illustrated embodiment. At 6502, the display subsystem updates a display of information in response to a movement of a physical game-related piece between at least two game playing surfaces. Thus, the display subsystem is able to seamlessly operate with multiple playing surfaces, which may be adjacent or spaced from one another. This may be performed in addition to the acts of method 2100 (FIGS. 21A, 21B).

Figure 66:
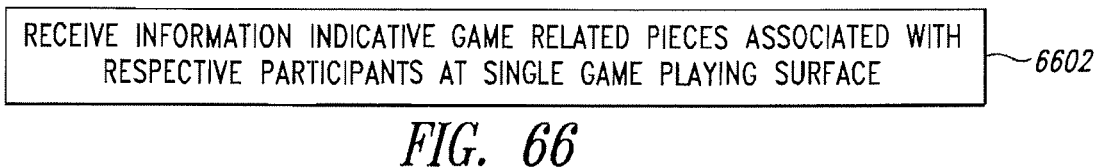
FIG. 66 is a flow diagram of a method of operating a game playing system environment according to an illustrated embodiment, including receiving information indicative of respective game-related pieces associated with each of at least two different participants at a single game playing surface playing a single game.

FIG. 66 shows a method 6600 of operating a gaming system environment, according to one illustrated embodiment. At 6602, the sensor subsystem receives information indicative of respective game-related pieces associated with each of at least two different participants at a single game playing surface, playing a single game. Thus, the sensor subsystem is able to seamlessly operate with multiple players playing the same game on the same playing surface. This may be performed in addition to the acts of method 2100 (FIGS. 21A, 21B).

FIG. 67 shows a method 6700 of operating a gaming system environment, according to one illustrated embodiment. At 6702, the sensor subsystem receives information indicative of respective game-related pieces associated with each of at least two different participants at respective game playing surfaces playing a single game. Thus, the sensor subsystem is able to seamlessly operate with multiple players playing respective games on the same playing surface. This may be performed in addition to the acts of method 2100 (FIGS. 21A, 21B).

FIG. 68 shows a method 6800 of operating a gaming system environment, according to one illustrated embodiment. At 6802, the sensor subsystem receives information indicative of respective game-related pieces associated with each of at least two different participants at respective game playing surfaces, playing in respective games. Thus, the sensor subsystem is able to seamlessly operate with multiple players playing respective games on respective playing surfaces. This may be performed in addition to the acts of method 2100 (FIGS. 21A, 21B).

FIG. 69 shows a method 6900 of operating a gaming system environment, according to one illustrated embodiment. At 6902, the sensor subsystem detects chips within a back betting area associated with a primary participant playing a game. Thus, the sensor subsystem facilitates back betting or wagering by a secondary player on a primary player, or other outcome. This may be performed in addition to the acts of method 2100 (FIGS. 21A, 21B).

FIG. 70 shows a method 7000 of operating a gaming system environment, according to one illustrated embodiment. At 7002, the sensor subsystem detects chips within a demarcated back betting area associated with a primary participant playing a game. Whether physical chips constitute a wager may depend on the relative position of the chips with respect to a demarcated area, such as a bet circle. Thus, the sensor subsystem facilitates tracking and identification of wagers made with physical chips or virtual chips. This may be performed in addition to the acts of method 2100 (FIGS. 21A, 21B).

Figure 71A:
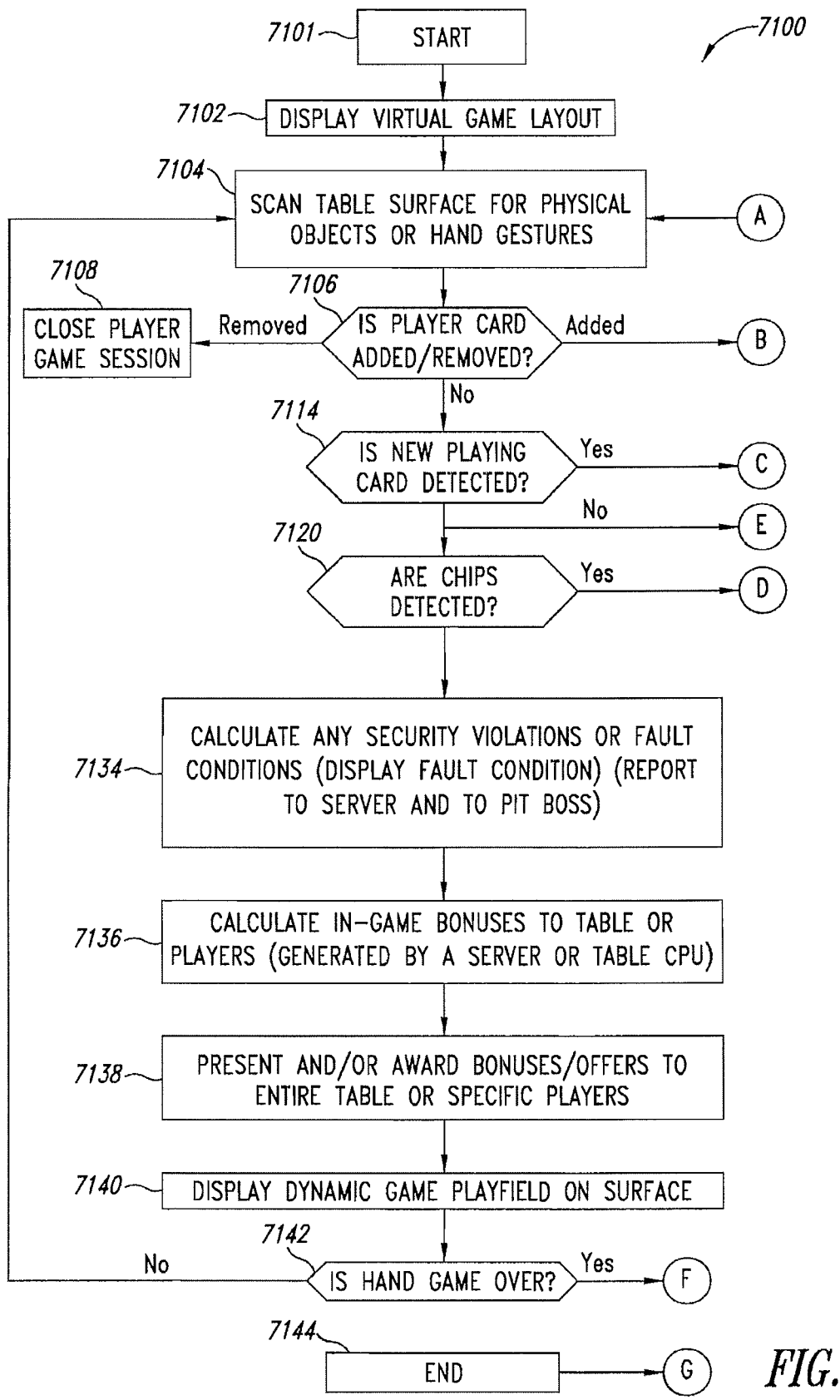
FIGS. 71A and 71B are flow diagrams of a method of operating a game playing system environment according to an illustrated embodiment, including displaying a virtual game layout and sensing at least one physical aspect of a game-related piece.
Figure 71B:
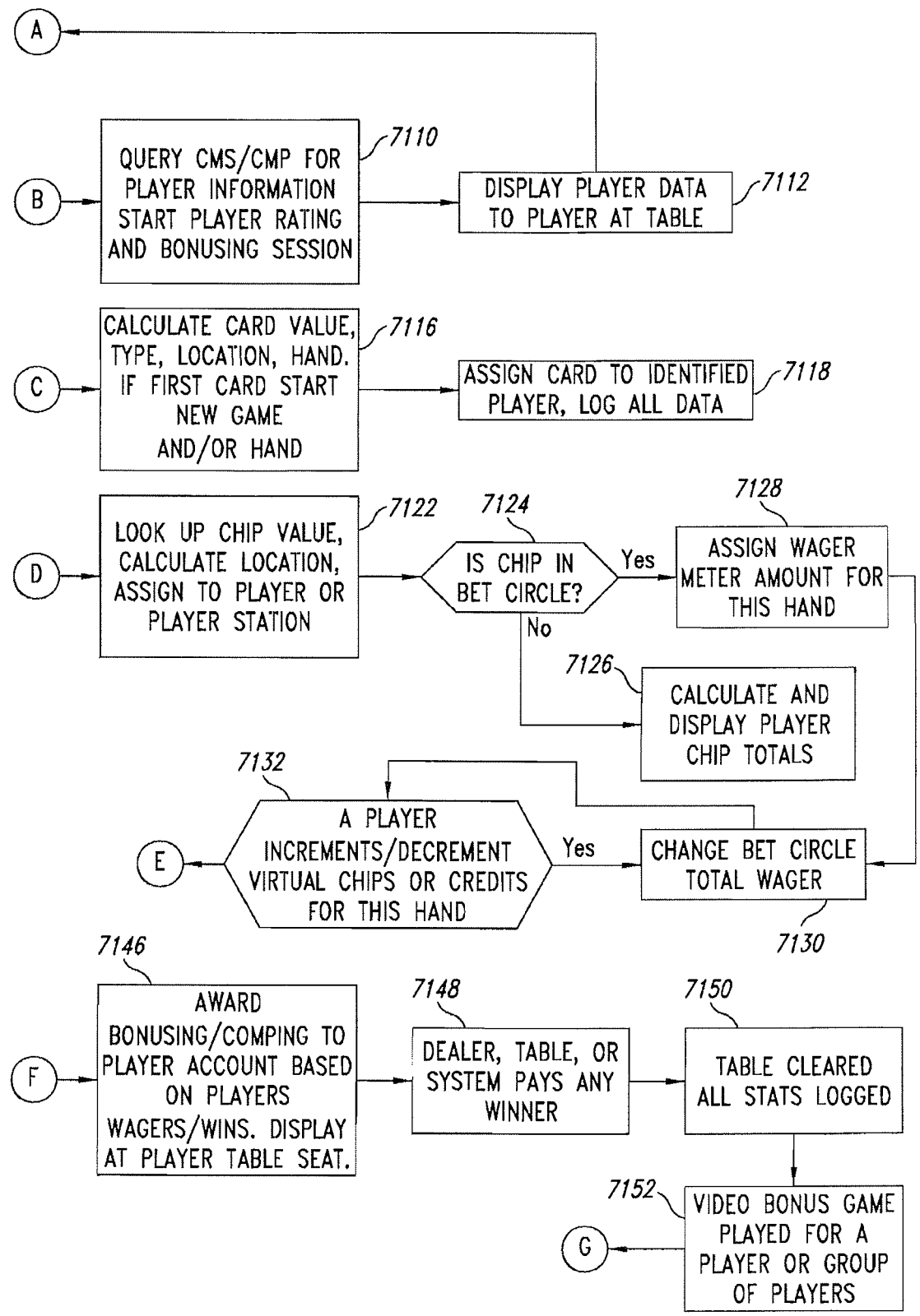

FIGS. 71A and 71B show a method 7100 of operating a gaming system environment, according to one illustrated embodiment. While illustrated in terms of games played with physical playing cards and chips, the method 7100 may be generalized to other types of games including games played using physical objects other than playing cards and chips.

The method 7100 starts at 7101, for example in response to the powering or turning ON of one or more components of the gaming system environment or other event. At 7102, the display system displays a virtual game layout on or below a playing surface of a table gaming or arcade/casino style gaming system. As described above, the display subsystem may display the virtual game layout via one or more projectors or displays which may, for example, be positioned above or under the playing surface.

At 7104, the sensor system determines if there are physical objects which can be read on the playing surface or whether any hand gestures are occurring. For instance, the sensor subsystem may scan the playing surface(s) using one or more transducers. For example, the sensor system may optically read information from one or more game-related pieces such as playing cards, chips, tokens, tiles, spinners, and the like, or one or more pieces of media such as identity or financial media. Also, for example, the sensor system may wirelessly interrogate the volume proximate the playing surface or may magnetically or inductively attempt to read information from physical objects on the playing surface. For example, the sensor system senses movement of a body part, such as a hand or fingers via one or more infrared or microwave, or ultrasonic motion sensors, or a touch sensitive interface.

At 7106, the gaming system determines whether a player's identity card (e.g., loyalty program card, driver's license, and the like) has been added or removed. If a player's identity card has been removed, the computing subsystem closes the associated gaming session for the player at 1708.

If a player's identity card has been added, the computing subsystem queries the casino management system (CMS) for information about the player 7110. The computing subsystem or CMS may also start a player rating session and/or a bonusing session. During the player rating session, the CMS or a dedicated system tracks aspects of the player, such as, amounts wagered, time wagered, average wagered amounts, actual hold, actual hold versus theoretical hold, performance relative to basis strategy and/or performance relative to various counting strategies. During the player rating session, the CMS or a dedicated system tracks information about the player that may be used to award bonuses to the player. At 7112, the display subsystem may display player related data to the respective player at the table or arcade-type gaming system or device. Control may then return to 7104. Identified players may be eligible for bonusing, for example, based upon club level, identity of the player, and/or other casino data.

If no player identity cards have been added or removed, or if further player cards have been added or removed, control passes to 7114. At 7114, the computing subsystem determines whether a new playing card is on the playing surface. The computing system may rely on information from the sensor system to detect the appearance or removal of playing cards from the playing surface. In some embodiments, the computing subsystem may detect whether new game-related objects (e.g., tokens or markers such as chess pieces, tiles, checkers, or houses, car, hat, and the like in MONOPLOY®) other than playing cards are on the playing surface. If no new playing cards are detected on the playing surface, control passes directly to 7120. If a new game-related piece is detected on the playing surface, control passes to 7116.

At 7116, the computing subsystem determines a physical aspect of the game-related piece. For example, the computing subsystem may determine a value (e.g., rank and/or suit of playing card), location, and/or hand to which the playing card belongs. If the new playing card is the first card, the computing subsystem starts a new game and/or hand. At 7118, the gaming system assigns the playing card to a particular player, and may log any relevant data. For example, the computing subsystem may assign or otherwise associate a playing card with a player, player position or seat to which the playing card was dealt or drawn, or who placed the chip as a wager. Such may be determined by logically associating a location of the playing card with a player position or virtual demarcation associated with the player position, and/or with media that identifies the player located in the player position. In some embodiments, the computing subsystem may additionally determine the type of gaming related piece detected (e.g., playing card, chip, token, marker, tile, spinner, the control passes to 7120.

At 7120, the computing subsystem determines if there are chips on the playing surface. If no chips are detected on the playing surface, control passes directly to 7134. If chips are detected on the playing surface, control passes to 7122.

At 7122, the computing subsystem determines a chip value, a location of the chip, and assigns the chip to a player or player position. The computing subsystem may rely on information from the sensor subsystem. In some embodiments, the sensor subsystem may make the determination. At 7124, the computing subsystem determines whether the chip is in a wagering or betting area or position. Again, the computing subsystem may rely on information from the sensor subsystem, or may rely on the sensor subsystem to perform the determination. If the chip is not in a wagering or betting area or position at 7126, the computing subsystem calculates the player chip total and causes the display subsystem to display the chip totals. If the chip is in a wagering or betting area or position, the computing subsystem assigns the wager meter amount to determine the total wager for the hand. At 7130, the computing subsystem updates the display of the total wager (e.g., display within bet circle).

At 7132, the computing subsystem determines whether the player has incremented or decremented the wager. If the player has not incremented or decremented the wager, control returns directly to 7120 to process additional wagers. If the player has not incremented or decremented the wager, control may then return to 7130.

At 7134, the computing subsystem determines if any security valuations and/or fault conditions have occurred. If such conditions are determined to exist, the gaming system may display an appropriate message to the dealer, the player pit boss and/or a server or casino management system. Fault conditions may, for example, include attempts to change a wager after the start of a game, or a round or hand of a game, attempt to swap, change or unauthorized movement of a game-related piece (e.g., playing card, dice, and the like).

At 7136, the computing subsystem or other system determines if there are any in-game bonuses to be awarded to the table or individual players. Such may be generated by a server (e.g., bonusing servers 1814a, FIG. 18A) or a computing subsystem associated or located at the particular gaming table. At 7138, the computing subsystem presents and/or awards bonus or promotional offers to the table or individual players. A player may be awarded a bonus award and other players at the table or group of tables get a consolation prize. These awards or prizes may be automatically credited to the respective credit meter or player account associated with each player. Credits or prizes may be restricted (to use at the same gaming table or machine as awarded and/or in time) or non-restricted credits or to the player's club points.

At 7140, the computing subsystem dynamically updates the display of the virtual game layout, along with associated information.

At 7142, the computing subsystem determines whether a round, hand or the game is completed. If the round, hand or game is not completed, the method 7100 may repeat, operating as a continuous thread or process by passing control back to 7104 to detect new game-related pieces. For example, a thread or process may cause the display subsystem to update the graphics displayed, to denote the appearance of new game-related pieces, the disappearance (e.g., removal) of game-related pieces, and/or movement of game-related pieces.

If the round, hand or game is completed, at 7146 the computing subsystem awards bonuses and/or comps to player accounts, for example, based on players wagers, winnings, and the like The display subsystem may display such awards to the player or players, on or below the playing surface. At 7148, the computing subsystem may credit any winners, or prompt the dealer or table to pay any winners. Optionally at 7150, the computing subsystem may clear a log of statistics for the table. At 7152, the computing subsystem may provide a video bonus game for play by one or more players. The method 7100 may terminate at 7144 until called or started again by an appropriate signal, or alternatively may repeat, operating as a continuous thread or process by passing control back to 7104. Some embodiments may allow for concurrent game playing by a player. For example, a player may play a first game using a physical game-related piece, while concurrently playing one or more additional games, for example, using one or more virtual playing pieces. The game play may occur in the same period or may occur sequentially. One or more of the games, for instance the additional games, may be a promotional game, for example, awarded to the player based on some criteria (e.g., amount of time spent playing, amount wagered, amount lost, ability) or based on a random event. Wagers and awards may be debited and/or credited either manually or automatically to a credit meter or other account associated with the particular player.

Figure 72:
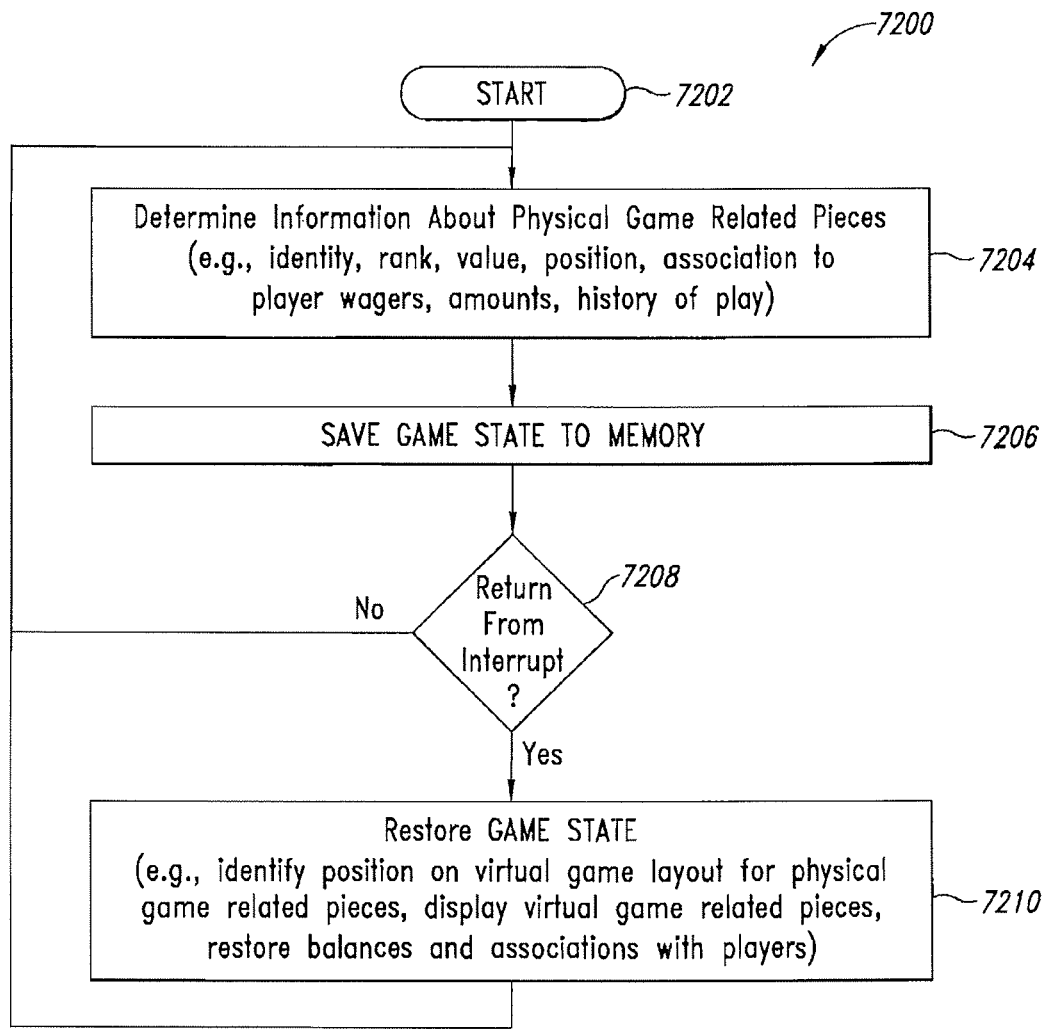
FIG. 72 is a flow diagram of a method of operating a table gaming system environment to save and restore a state of a game, according to one illustrated embodiment.

FIG. 72 shows a method 7200 of operating a table gaming system environment according to one illustrated embodiment.

The method 7200 starts at 7200. For example, the method 7200 may start in response to power being supplied to the table gaming system, operation of a switch, or the occurrence of an event on or proximate the table gaming system.

From time-to-time the sensor subsystem determines information about at least one physical game-related playing piece being used in a game at 7204. Determining information about at least one physical game-related playing piece being used in a game may include determining an identity of the at least one physical game-related piece. For instance, the sensor subsystem may determine an identity of a playing card, for example, rank and/or suit or a unique identifier. Also for instance, the sensor subsystem may determine a rank of a playing piece, for example King, Queen, Knight, Bishop, Rook, or Pawn in a game of chess. Also, for instance, the sensor subsystem may determine an identity and/or value of a game-related piece, for example, a chip. Determining information about at least one physical game-related playing piece being used in a game may include determining an association between the at least one physical game-related piece and at least one player. For example, associating physical playing cards with a player or player position, and/or associating physical chips with a player or player position. As a further example, associating a marker or token with a player. Determining information about at least one physical game-related playing piece being used in a game may include determining a position of the game-related piece on a virtual game layout. For instance, the sensor subsystem may determine a position of a marker or other token on a path (e.g., path of a board game).

The sensor subsystem may, for example, determine the information periodically. The sensor subsystem may, for example, determine the information in response to the occurrence of certain events at the gaming table, for instance, dealing of playing cards, roll of dice, placement of wagers and/or movement of a marker, a token or other game-related pieces. The sensor subsystem may, for example, determine the information in response to an activation signal generated by activation of one or more switches by a dealer, pit boss, security personnel and/or players or other patrons. The sensor subsystem may, for example, determine the information at random times. The sensor subsystem may execute one or more threads or processes to periodically continue in response to an event or to randomly determine the information.

From time-to-time, a state of the game is saved to a computer-readable memory at 7206. One or more threads or processes may be executed to save the state of the game periodically to continue in response to an event or randomly. The computer-readable memory may be static or dynamic, may be spinning media (e.g., hard disk, floppy disk, optical disk) or solid state media (e.g., RAM, Flash), and the like.

At 7208 the computing subsystem determines whether an interruption has occurred. The interruption may have been a loss of power, a suspension of play by the dealer or other casino personnel, or the occurrence of an event occurring at or proximate the gaming table system. The computing subsystem may, for example, check a flag or detect an application of power after an interruption of power.

On return from an interruption, the computing system restores the state of the game at 7210. Restoring the state of the game may, for example, include displaying a visual identification of a position for the physical game-related pieces on a virtual game layout by the display subsystem. Restoring the state of the game may, for example, include displaying one or more virtual game-related pieces. Restoring the state of the game may, for example, include logically associating one or more game-related pieces with one or more players in game logic that defines a particular game. Restoring the state of the game may, for example, include restoring balances, credits, or debits in one or more accounts associated with one or more players. The game may then continue as if the game had not been interrupted.

The method 7200 may repeat, as one or more threads or processes, or may end until started again.

The above-described embodiments offer numerous advantages over current systems.

The various embodiments may be provided in table top, bar top, slant top and/or upright embodiments including various forms associated with conventional and video slot machines. The playing surfaces should provide an environmental seal, for example, a hermetic seal to protect the various components located therein. Thus, the components are protected against drink spills and/or smoke.

The gaming systems described herein may be used in a wide variety of different fields, but will typically be used in a casino table game area environment, or alternative in poker club environments. In alternate embodiments, this technology can be used in bars, arcades, restaurants, clubs, bingo halls, keno halls, sports-book betting, or other non-traditional gaming locations. In certain embodiments this technology can be used at a user's home for supporting card/dice or other amusement entertainment games on the surface computing device. For example, a coffee table that is a surface computing device would be an ideal home table gaming platform. Players may use real (i.e., physical) playing cards or other play pieces on the surface computing device, and as long as the pieces can be machine read (e.g., carry an optically recognizable bar code or pattern or wireless transponder) then the traditional game can be enhanced with a video or virtual game layout but with actual physical game-related pieces. The game of chess, for example, would be an ideal game to play at home on the surface computing coffee table. Each player could move physical chess pieces around the virtual game layout projected on or under a playing surface. The virtual game layout may dynamically change based upon events occurring in the game. For instance, a powerful visual effect may be displayed underneath the affected related game; for example, when a piece captures another piece.

Secondary bonuses or goals for players can be visually or virtually represented on the playing surface. The player may receive enhanced scoring if the player achieves such goals.

Scoring for one or more players may be visually or virtually represented on the playing of the surface computing device. Board style or home games may be enhanced by the use of virtual game layouts and object sensing of the surface computing device, versus the static layout of traditional cardboard-type boards. Game-related pieces may come with machine-readable symbols, transponders or other markings. For example, game-related pieces may bear optical bar code symbols pre-affixed, pre-printed, stamped, or etched on a bottom of the game-related piece. Alternatively, a kit may be purchased separately to affix bar code symbols to the bottom of the game-related pieces. The assignment of bar code symbols to game-related pieces may be performed using the playing surface of a surface computing device. For example, an image of each chess piece would be displayed on the playing surface, and the player would put the actual playing piece onto the playing surface over or next to the image. The bar code symbol may be read and assigned by a software game application. From that point forward, play with the game-related piece can be tracked and analyzed. In some embodiments, the game-related pieces may be pre-associated in the game software provided by the game manufacturer.

The game software may include logic to produce visual and/or audio effects at the optimal time, once certain moves of the real (i.e., physical) playing pieces are made or other events in the game occur. The virtual game layout may be displayed with the locations of the game-related pieces marked to allow the game to be reset should the physical game-related pieces accidentally or intentionally be knocked off the playing surface. The game-related pieces may be identified by player name or color or other identifying marks that allow each player to know their own game-related pieces, if multiple players use similar looking game-related pieces. Thus, a player would not only know that a Bishop belongs at an identified position of the virtual game layout, but also know to which player the Bishop belongs. Each player may be given the opportunity to enter their name or other key identifier to mark all of their game-related pieces on the virtual game layout. One advantage of the virtual game layout is the ability to dynamically change the appearance between each round or game; for example, to add new depth to games. This keeps an ever changing experience for the player, keeping the game experience fresh. Consequently, traditional board games can be enhanced using the virtual game layout and sensing of physical aspects of game-related pieces.

A management system, for example the Bally Gaming download and remote configuration management system, may allow scheduled downloads and reconfiguration of the playing surface of a table gaming or arcade/casino style gaming system from one or more servers, for example as taught in U.S. provisional patent application Ser. No. 60/716,713, filed Dec. 9, 2005, and U.S. nonprovisional patent application Ser. Nos. 11/530,450 and 11/530,452, both filed Aug. 9, 2006. The system may allow a casino operator to manage groups of table gaming or arcade/casino style gaming systems, reducing the effort required to download or configure large numbers of table gaming or arcade/casino style gaming systems. For example, new software may be downloaded to groups of table gaming or arcade/casino style gaming systems from a central location, and the table gaming or arcade/casino style gaming systems may be configured from the central location. Accordingly, this operational efficiency reduces maintenance costs and minimizes table gaming or arcade/casino style gaming system downtime due to maintenance or table gaming or arcade/casino style gaming system set-up. Standardized classes may be employed, such as Gaming Standards Association (GSA) download and configuration classes. For example, the G2S Player class would allow multiple players on the same surface computer table game device identifier to be bound to the same device session.

The teachings herein are applicable to a variety of games. For instance, games that are not commonly associated with wagering, for example: board games including chess, checkers, Monopoly®, Scrabble®, Trivial Pursuit®, Battle Ship®, Risk®, Life®, Candyland®, Backgammon, Yahtzee®, Axis & Allies®, Pictionary®, Dungeons & Dragons®, Clue®, Hangman®, Operation®, Sony®, Uno®, Parchessi®, and Chutes And Ladders® Also, for instance, games that are commonly associated with wagering. for example: roulette, craps and other dice games, and bingo, as well as many card games played with playing cards, for instance, blackjack, baccarat, various types of poker including Texas-Hold'em, Cribbean Stud Poker, Three Card Poker, Pai Gow poker, Big Six, Spanish 21, Casino War, 357 Poker, Hearts, Let It Ride, and also Macau-style card games and tile based games.

These table and/or upright or arcade/casino style gaming systems may be linked together in a local area network (LAN), wide area network, internet, or wirelessly to provide for group play or competitive gaming spanning different gaming systems or tables. For example, people playing chess can be in different cities or locations and be able to see each others pieces move on their respective display. Each player would move their real physical game-related piece (e.g., chess piece) on the virtual game layout, and the same move would be visually represented by a virtual game-related piece at the remote gaming device (e.g., surface computing display remotely located from one where the move was made).

The teachings, herein, may be suitable for traditional games that use one or more dice. Physical dice may produce a random number, which the gaming system may use to automatically move the virtual game-related pieces (e.g., forward) or to advance the game in another manner, and/or which may be used to determine whether a prize is awarded (e.g., Baccarat). It is noted that dice used with more or less than six sides in a game many employ one or more die. Home games often use a spinner manually spun by a player to produce a random outcome to advance the game in some manner. The random outcome of a spinner is an effective means to create ever varying game outcomes from one game to the next. In an alternate embodiment, a spinner that is manually spun has included a structure or instructions that allow an orientation of a pointer to be determined or ascertained by the sensor subsystem of the gaming system. For example, a barcode or optical pattern may be affixed to a portion of the spinner (e.g., bottom) or the entire spinner may be optically, magnetically or inductively detectable by the sensor subsystem. In some embodiments, the spinner (e.g., pointer) or the background (i.e., selections) may be a visual or virtual representation of the playing surface. Wherever the physical spinner would stop spinning, it would point to some portion of the virtual background or selections to denote an advancement or other game relevant data. Thus, the virtual game layout may change from move-to-move, round-to-round, or game-to-game, and can be player centric (i.e., customized for each player). Typically, the spinner is mounted on a piece of cardboard, which bears a fixed printed pattern. The gaming system allows the pattern or selections to change, and/or may provide enhanced visual effects such as highlighting to create an exciting visual and ever changing experience for the players. A physical spinner or pointer and a virtual representation of selections underneath the spinner, may allow for new table gaming experiences. Games employing a physical spinner to randomize play are popular. That popularity may be enhanced by dynamically changing selections which the spinner may point over most traditional board games. The spinner may, for example, be mounted to the playing surface with a suction cup.

The virtual game layout of the playing surface allows new virtual bonus games or virtual game-related pieces to be awarded to players, in addition to the real physical cards dealt by a dealer. These virtual bonus cards awarded or won may be represented by appropriate visual indicators displayed on or below the playing surface by the display subsystem.

For example, a player may be given a virtual bonus card and if the player busts (i.e., goes over 21) in blackjack based on the physical playing cards, the virtual playing card will replace one of the physical playing cards that provides the optimal result for the player. Optionally, a player can choose the physical playing card to be replaced. Thus, a player is given a chance to recover from a bust. Once the virtual playing card is revealed and used, the visual representation of the virtual playing card is removed for future games. Alternatively, the virtual playing card may be valid for a series of games or alternatively may be valid in perpetuity. A player may be given the opportunity to choose when to use the virtual bonus card or not.

In other embodiments, one or more of a player's physical playing cards may be visually enhanced with appropriate visual effects displayed on or below the playing surface around or proximate the location of the physical playing card on the playing surface. This may denote if a certain hand is achieved with a combination of playing card(s), for example, if the player is entitled to a bonus prize. A non-limiting example is a progressive award. In some embodiments, bonus playing cards or a bonus playing card counter may be stored in a player account for use at any time by the player. In some embodiments, bonus playing cards may have a time in which the bonus playing card must be used before the bonus playing card expires.

The specific virtual bonus playing cards could be determined from an outcome of a random number generator. Thus, a player may have two of the same playing cards at any one time. One virtual (visual representation rendered by a display subsystem) and another physical playing card. In other embodiments, the random number generator or software may preclude certain virtual playing cards to be given to a player if a corresponding physical play is already in play or will be coming into play shortly in embodiments where the system knows the order of the cards in the shoe.

In one embodiment, a joker or other specially marked card may be dealt to the player from the dealers shoe and can be later used in this game or other games to exchange for a new free playing card to be dealt at the time of the player's choosing. This would typically occur when the player wishes to use a new play to improve their hand. Alternately, a virtual bonus card may be given to the player, with a representation visually rendered on or below the playing surface. Such a virtual bonus card could be used in a manner similar to the physical playing card.

Virtual playing cards visually represented on or below the playing surface may be dealt or rendered face down. Covering the playing surface proximate the visual representation of the virtual playing card with the player's hand causes the display subsystem to temporarily display the face of the playing card. In some embodiments, the face of the virtual playing card may be displayed while the playing surface is covered by a player's actual hand. Touching the playing surface proximate a corner of the representation of the virtual playing card causes the display subsystem to display a portion of the face of the virtual playing card, in a similar fashion to bending an edge of a physical playing card. This way other players would not be able to see the face of the virtual playing card. Another touch on the playing surface or removing a finger from the display screen or onscreen button proximate the corner of the representation of the virtual playing card may cover the face of the playing card back up again.

Bonus games may be provided via the display subsystem. For example, if a player is to be awarded a bonus for any reason, the section or portion of the playing surface in front of that player may include a visual representation of the bonus game displayed. The bonus game may be completely virtual, being visually rendered by the display subsystem, for example, based on an output of a random number generator of the game system. In some embodiments, the bonus game may use both physical and virtual playing cards. The bonus game may even be a completely different genre of game title, for example, a video slot machine.

In some embodiments, a winning event on a hand of one player may trigger a group bonus game. For example, virtual bonus games may be displayed in front of each player at the table, or the entire playing surface may switch to a bonus mode or round of play. In this case, if the outcome of the bonus round is good, all players would share in the bonus award. In alternate embodiments, the winning player in the group play bonus would win the main prize, while the other players may win consolation prizes. Consolation prizes may be of fixed size or a percentage of the main prize award.

Bonus games won may be visually indicated by visual indicators on the playing surface. In some embodiments, players may be awarded bonus promotional chips or credits or virtual credits that must be used in play on the table game or other gaming device where awarded. Such promotional chips or credits cannot be cashed out with the cashier. A bonusing server could award these bonus promotional chips or credits to a specific player or seat at the table either randomly or based on some predetermined logic. The display subsystem may visually represent bonus promotional chips or credits with appropriate visual indicators (e.g., circular with value markings) on or below the playing surface proximate the player's own physical chips. These bonus promotional chips or credits may be awarded to either identified or non-identified players. Unused bonus promotional chips may be cleared by the dealer or sent back to the players account for later use barring any expiration rules.

Some embodiments may provide a player one or more free bonus dice throws in dice based games. Timing of the free bonus dice throws may be determined by the table game system, the casino host or the player. The display subsystem may represent the free bonus dice roles with appropriate visual indicators displaying on or below the playing surface. These free bonus dice rolls may be used by the player to replace any bad previous roll. These free bonus dice rolls may allow a player to throw physical dice on the playing surface, or alternatively to "throw" virtual dice on the playing surface. For example, the player may activate a switch which causes the computing subsystem to produce one or more random values representative of the possible outcome of a dice throw. Also, for example, the display system may visually represent (e.g., animation) a roll of virtual dice across the surface display in a manner that replicates the way physical dice roll across a surface of a gaming table. The display subsystem may produce a visual representation that mimics a physical dice throw (e.g., animation or a dice shaped icon), with an outcome that is determined based on the random value(s). These free bonus dice rolls may be saved in a player account for later use on a different table or in a different game on a different time or day. Unused free bonus dice rolls may have an expiration time limit, so if not used by a certain date/time, the free bonus dice rolls may expire.

At certain times of the day, the display subsystem may provide different content on the playing surface. For example, the display subsystem may display sporting events, advertisements, casino marketing media, or access to the casino Web portal. Also, for example, the display subsystem may display an interface that serves as customer kiosks for the patrons to use, serves as electronic game machines (EGMS) to provide traditional video poker, video slots or other pay to play or free play gaming for the patrons. The display subsystem may display a user interface that allows patrons to manage player accounts, review and order food or cocktails, shop for merchandise or services, or redeem prizes.

In certain markets, like Macau players, referred to herein as secondary players, often place back bets on live table games played by others, referred to herein as primary players. Various embodiments discussed herein may help to automate back betting. For example, a secondary player or back better can simply place a piece of media (e.g., identity card such as a loyalty program card or a driver's license, or financial media such as credit, debit or prepaid card, or a cellular phone or PDA) down on the playing surface table proximate a player's position on which the secondary player wishes to wager. The sensor subsystem reads information from the piece of media. The location of the media indicates one which the primary player or the secondary player is placing a wager or bet on. The computing subsystem of the gaming system may identify the secondary player or back better from the read information and may use funds from one of the secondary player's accounts to fund the back betting. For example, an identity or identify information of the back better may be pre-associated with a player account, with or without prior wagering of funds. This may occur even though the secondary player is not actually sitting at the table or playing directly, but rather the secondary player is placing a wager or bet on a primary player or outcome of a primary player's hand. The computing subsystem may automatically apply winnings to the account of the secondary player or back better. Alternatively, the display subsystem may display virtual chips in the amount of the winnings, or a credit meter may be incremented based upon the winnings for this back better.

In some embodiments, the gaming table or gaming system may automatically re-price itself at various times of day or be controlled by a Download/Configuration server, a dealer or pit boss. Additionally, or alternatively, the exchange rate of player account credits to game credits or game chips may be modified from time-to-time.

In alternate embodiments, the secondary player or back better may enter or place secondary wagers or back bets via a wireless communication device. The communication device may allow the entry of account information to identify a source of funds, for example by keying, swiping a magnetic stripe on a card, or wireless interrogation of a transponder carried by the card. Additionally, or alternatively, the wireless communications device may be associated with an account which may serve as a source of funds. For example, wireless communication devices are typically associated with a service account (e.g., a service provider account). Such a service provider account may serve as the source of funds. The wireless communication device may provide a user selectable icon that allows the user to identify the service provider account as the source of funds, or to identify some other account. For example, the wireless communication device may store information for two or more accounts from which the user may choose from to fund the wagering.

In some embodiments, the wireless communication device may wirelessly and electronically bind to a specific gaming system or table or table seat or station. For example, this may be based on a proximity of the wireless communication device to a gaming system such as a table or arcade/casino style gaming system. The electronic binding may be established through one or more proximity sensors or radios (e.g., transmitter, receiver or transceiver), which may form part of the sensor subsystem of the gaming system or may form a separate wireless device subsystem. The proximity sensors or radio may wirelessly detect and/or communicate with a transponder or a radio (e.g., transmitter, receiver or transceiver) of the wireless communication device. Alternatively, the proximity sensors or radio may wirelessly detect or wirelessly communicate with a transponder or radio carried by media (e.g., a loyalty program or club card, credit, debit or prepaid card). Such communication may employ Ultra Wide Band (UWB) frequencies, which may be particularly advantageous where proximity sensing is desired. Otherwise, the communication may employ Bluetooth, IRDA, Wi-Fi, or other wireless protocols. Some entries or selections made by a player via the wireless communication device may be displayed by the display subsystem. For example, the placement of wagers may be displayed via suitable information and/or icons on the surface of the gaming table.

Since the dealt physical playing cards are recognized by the sensor subsystem, the wireless communication device may display a representation of the actual hand of the primary player to secondary player or back better using the wireless communication device. This allows the secondary player or back better to follow the play even when the secondary player's or back better's view of the game is blocked. A user interface may be provided at the gaming system, for example, as user selectable icons displayed on or below the playing surface that allows the secondary player or back better to select a table to bet on, a player to bet on, and to set an amount of the wager or bet. Additionally, or alternatively, a user interface may be provided on the wireless communication device, or on some other peripheral device to allow the secondary player or back better to make such selections. A secondary player or back better may, for example, choose to match the bet by the primary player, or may bet a percentage or any multiple of the bets of the primary player. In alternate embodiments, a primary player who is playing one game, may also desire to place a side wager or secondary wager on the play of another player. The other player may be playing in the same game (e.g., at the same table) or at another game (e.g., at another table). For example, a back better may be provided with a bonus game or bonusing as if the back better was actually sitting at the gaming table or gaming device.

Physical media may be read by the sensor subsystem of the gaming system. The display subsystem may render visual representations of virtual media, for example, in front of a secondary player or back better who is wagering on the play of the primary player. Visual or virtual representation of the outcomes of the wagers may be presented or otherwise rendered at both a position associated with the primary player and a position or device associated with the secondary or back betting player.

Some embodiments may implement a virtual craps table gaming system. For example, the sensor subsystem may determine the orientation and/or location of physical dice thrown by a player on the playing surface. For instance, the sensor subsystem may read the spot patterns or machine-readable symbols printed on the faces of the dice. Such spots or machine-readable symbols may indicate which face is up. Thus, the sensor subsystem includes a scanner or imager positioned under the playing surface, the machine-readable symbol read off a face lying flat on the playing surface should indicate that the opposed face of the die is facing up. Thus, diametrically opposed faces of the die may be marked with the reverse machine-readable symbols from the actual value of the face.

The sensor subsystem may detect the location of the dice as the dice moves across the playing surface. The display subsystem may produce an enhanced visual indication of the location of the dice. For example, the display subsystem may illuminate or highlight the area of the playing surface surrounding the dice. Additionally or alternatively, the display subsystem may produce a visual indication indicative of the faces of the dice that are face up on the playing surface. This may assist players who are located at a far end of a table to easily see the dice value. The sensor subsystem may allow thrown dice to be tracked, and visual representations of such to be presented to the players.

Secondary game offers to players may occur where players bet on dice rolls based upon historical play. For example, there has not been a six rolled in the last 20 rolls, the casino may offer a progressive or other prize for an additional wager or as a bonus when the next six is rolled. The table gaming system or associated system may detect such historical situations, calculate the odds, cause the display of historical data and/or monitor the progressive bonus automatically.

In some embodiments, the dice may have an RFID transponder that uniquely associates the dice with the casino property or table. RFID interrogators may be placed under, within, or around the gaming table or playing surface to ensure compliance. The virtual layout of the craps table may be easily modified before, during or just after play to create ever changing playfields.

A player may be identified at the table gaming system in any one or more of a variety of ways. For example, the sensor subsystem may read information from a piece of media (e.g., identity or financial media) placed on the playing surface by a player. The sensor subsystem may employ an optical device such as a scanner or imager, or may employ a wireless device such as a wireless RFID or EAS type interrogator. Also, for example, a biometric reader may be located at each player position. The biometric reader may take a variety of forms, for instance, a fingerprint reader, iris scan, microphone and voice recognition software may be used, or hand vein pattern detection. In alternate embodiments, a patron's written signature may be digitized and verified against a signature database. For example, a player may sign on a surface computer display with finger or stylus). Biometric analysis may be performed at the gaming system (e.g., table or arcade style gaming systems) or may be performed by a remotely located remote system computer system.

Also, for example, a player's identity and proximity may be detected by the sensor subsystem or other subsystem of the gaming system. For instance, a transponder carried by a piece of media or a wirelessly communication device which is carried by or otherwise associated with a player may be wireless detected via wireless interrogation. The piece of media may take any of a variety of forms, for instance a loyalty program card, driver's license, credit, debit or prepaid card. Proximity data acquired by the gaming system may, for example, include a location in the casino (e.g., x, y, and z coordinates or GPS data). The gaming system or some other system may associate the proximity data with a player identifier. Based on at least one part of the location coordinates, the system may create a logical relationship between the player identifier and a particular gaming system, a table identifier, seat identifier and/or player position identifier.

As another example, a standalone card reader (e.g., magnetic or smart card reader) that is distinct from the sensor subsystem may be provided at each player's position for the player to insert or swipe their media (e.g., loyalty program or patron card, driver's license, credit, debit or prepaid card).

As a further example, a dealer or a pit boss may manually assign the player to the specific table seat at a management user interface of the gaming system. The management user interface may include user selectable icons displayed on the playing surface, or on a separate display or input device such as the Bally Table View product. This assignment is usually performed by entering the player's patron card number into the user interface or swiping the club card at the dealer's or pit boss's terminal. The dealer or pit boss typically unassigns the player when the player leaves the table. Such closes the bonusing and session account for the player at the particular table gaming or arcade-style gaming system.

The game-related pieces may be marked in a variety of ways. For example, game-related pieces may have one or more machine-readable symbols, for instance, bar code symbols, stacked code symbols, area or matrix code symbols or other machine-readable indicia. The machine-readable symbols may take any form or geometric shape or pattern that is defined by the particular machine-readable symbology. The machine-readable symbols may be visible to the players or may be invisible to the players, for instance, formed using an invisible ink (e.g., infrared reflective) printed on or affixed to some manner to the game-related piece. The machine-readable symbol may encode a casino identifier and/or game piece identifier. Where the game-related pieces are playing cards, the game piece identifier may, for example, include a rank identifier indicative of a rank (e.g., Heart, Spade, Club, Diamond), a suit identifier indicative of a rank (e.g., 2-Ace) and/or a deck identifier indicative of a specific deck to which the playing card belongs. In some embodiments, the machine-readable symbol may encode a unique game piece identifier, which is mapped via a database to particular information regarding the game-related piece. Thus, a ranks, suit and deck may be determined from a unique playing card identifier encoded in a machine-readable symbol carried by a playing card. While such an approach may slow the performance of a gaming system, the approach reduces the amount of information which must be encoded, and hence the area occupied by the machine-readable symbol. Where the game-related piece is a die, the spots on the die may be machine-read, for example, by the sensor subsystem. Additional visible or non-visible markings may also be used or used in lieu of the spots on the die, for example, to encode a unique identifier for the die. The unique identifier may be logically related to other information using a database.

Also, for example, game-related pieces may include one or more wireless transponders which encode information regarding the game-related pieces. Transponders may, for example, take the form of RFID transponders with one or more identifiers stored in memory. Transponders may include one or more EAS type transponders with information encoded in form or shape of the backscatter antenna structure. The encoded information may take the form of one or more identifiers, such as described with respect to machine-readable symbols.

Also, for example, game-related pieces may include one or more magnetic stripes or distributions of magnetic or ferro-magnetic particles which encode information regarding the game-related pieces. The encoded information may take the form of one or more identifiers, such as described with respect to machine-readable symbols.

Players may wish to transfer funds into an account associated with a credit meter or display of virtual chips on the playing surface. Such a transfer may be performed in a variety of ways.

A player may hand a dealer or a pit boss cash or a cash voucher. In such a situation, the dealer or pit boss may assign the funds to a specific seat at the table where the player is sitting. The assignment may be made via a dealer management interface, which may be displayed on or below the playing surface or may be a secondary display such as Bally's Table view or a separate device.

A player may place physical casino chips on a playing surface. The sensor subsystem may read the chips, and the display subsystem may display a representation indicative of total quantity and/or amount or value of the physical chips in response. As described previously, the sensor subsystem may employ cameras or CCDs under, above or surrounding the playing surface, or may employ other sensors, for instance, wireless interrogators. The dealer or player can convert the physical chips into virtual chips via an approval process. The dealer collects the physical chips in response, since the value of such has been credited to an account of the player or virtual credit meter.

A player may identify him or herself at the gaming system by placing a piece of media (e.g., loyalty program or patron club card, driver's license, credit, debit or prepaid card) on the playing surface. A sensor subsystem may read the media, and a CMP/CMS system may identify the player from the read information. The display subsystem may display indicia representing cash and/or point balances of one or more accounts associated with the player. The player may employ a user interface to transfer funds from their account, for example, to a credit meter of the gaming system or as virtual chips. The transfer may require entry and approval of a personal identification number (PIN), biometric data, and/or password. The user interface may include one or more user selectable icons displayed on or below the playing surface, or some separate device such as a PIN pad, keypad or keyboard; for example, located at each seat. Transfers may employ appropriate security protocols and encryption, for example AFT or WAT transfer protocols of SAS or the GSA G2S class, respectively.

A player may initiate a cash systems credit card transfer on the playing surface using the patron's loyalty program or club card. The display subsystem or another system (e.g., Bally Gaming's iVIEW display) may display a list of credit cards pre-associated by the player with the player's loyalty program or club account. The player may select a specific debit/credit card account, and the amount of transfer. The player may be required to enter a PIN and/or password to approve the transaction. The funds may automatically be transferred into the account associated with the player's loyalty program or club card. A second transaction may then transfer funds to the credit meter and/or/virtual chips associated with the player from the account associated with the player's loyalty program or club card. The second transaction may occur with, or without, further player interaction.

A player may initiate a funds transfer by placing a piece of financial media on the playing surface; for example, a credit card, debit card or prepaid card. The sensor subsystem reads information from the financial media. For example, the sensor subsystem may optically read one or more machine-readable symbols on the financial media. The machine-readable symbol may be stamped into the financial media during manufacture; for example, by a bank or other entity that issues the financial media. The machine-readable symbol may be applied to the financial media during or after manufacture, for example, as a label. The machine-readable symbol allows the financial media and/or player to be uniquely identified. Alternatively, the sensor subsystem may be a wireless interrogate or a transponder carried by the financial media. Alternatively, the sensor subsystem may magnetically or inductively read information from a magnetic strip or other material carried by the financial media. The transponder or magnetic strip or other material may encode a unique identifier. The display subsystem may visually present an ATM-type interface to the player; for example, positioned next to piece of financial media on the playing surface. The interface table may allow the player to enter an amount of funds to transfer, and optionally a PIN and/or password to authorize the transaction. A debit/credit transfer from an account associated with the player (e.g., bank, credit, debit or prepaid card account) to the credit meter or virtual chip meter is completed.

Some embodiments may employ a bill or currency acceptor or validators for the entire table or one per player position. Once a credit, cash, or promotional credit voucher is inserted into the WBA bill/ticket validator, the appropriate funds are credited to an account associated with the player or to a credit meter that is associated with the player at the table or arcade style gaming system. If only a single bill/ticket validator is present at the gaming system, then the credit value is shown to the dealer or pit boss, who can direct the credit to the appropriate player's credit meter or account. The display subsystem may provide an interface on or under the playing surface that allows the funds to be credited to the credit meter or the account of a specific player. Funds could be credited with, or without, identifying the player by name.

Some embodiments may allow wireless transfer of funds from a personal computing device and/or wireless communication device capable of performing funds transfer; for example, from an eWallet inside the device or from a remote financial institution or other points or cash funds account. Personal computing and/or wireless communication devices may take a variety of forms; for example a cell phone, iPhone, personal digital assistant (PDA), laptop computer, BLACKBERRY, TREO and other such devices. The device may establish wireless communication with the table or arcade style gaming system or with a casino patron account. Funds may be debited from or credited to the device or a remote financial account. The communication protocol may take a variety of forms; for example, Bluetooth or Wi-Fi, but other standard networking protocols are envisioned as long as the protocols support security via authentication and/or encryption of the transmissions and transactions.

Some embodiments may allow players to transfer funds from the server based (e.g., CMP/CMS) patron accounts to machine credit meters or virtual token meters of specific table or arcade-style gaming systems. Such transfers may, for example, occur automatically at the commencement of each game play. The transfer may, for example, employ the GSA WAT class protocol. Alternatively, in an entirely server-based gaming system where all credits are maintained on the server, there would not be a funds transfer from the server to the table game meters. The funds would be decremented from the player account automatically at commencement of play in the amount of the wager. Reports of these transactions may be automatically generated and made electronically available to the player and/or authorized casino personnel.

In some embodiments, the table or arcade style gaming system and/or associated systems may enforce responsible gaming practices for players and casinos. For example, if a player has played a certain amount of time, a certain amount of wagers, or has a certain amount of losses, or combinations of these, further play on the virtual game layout may be blocked for the particular player. The system may produce an alert (e.g., visual, aural) such that a dealer is notified of the player crossing certain predetermined thresholds and further bets or currency conversions are disallowed. The player session may be suspended and the remaining player funds can be printed out of a printer on a cash voucher, handed to the player in the form of chips or cash, sent to the player account or any combination of these acts may occur. Once the responsible gaming triggers or events have expired, then the player may resume play on the table or arcade style gaming system, and/or at other gaming devices throughout the casino or spanning casino properties. To enforce responsible gaming, a player may be required to identify oneself prior to play, otherwise play may be prevented by the dealer, the system or both.

Detection of bets or wagers may take a variety of forms. For example, a player may manually increment a bet meter by selecting various user-selectable icons which may, for example, be displayed on or below the playing surface at the player position by a display subsystem. The displays subsystem may update a representation of a bet meter associated with the player position to indicate an increase, while updating a representation of a credit meter or virtual token meter to indicate a consequent reduction.

Also, for example, a player may place one or more casino chips into a demarcated wagering area such as a bet circle that forms part of the virtual game layout displayed on or below the playing surface by the display subsystem. The sensor subsystem may detect a number and/or amount or value of the chips. For instance, the chips may be optically coded and the sensor subsystem may read a chip identifier, chip value and/or casino identifier. Bally Technologies currently employs a series of color transitions about the peripheral edge of the chip to optically identify the value of a chip and the issuing casino. Such patterns are distinguishable to readers (optical scanners and imagers). These chip identifiers may be associated to a value via a database, such as a lookup table. Alternatively, or additionally, the chips may have wireless transponders, such as, RFID transponders or EAS type transponders, which may be wireless interrogated via interrogation devices of the sensor subsystem. The interrogation devices may read a unique identifier, chip value and/or casino identifier from each chip. Again, the identifiers may be associated to a value via a database. The interrogation devices may determine a sum total of the chips in each demarcated area.

As another example, a player may employ a combination of the virtual chips or credit meter betting and/or detection of physical chips. The total value of credits bet with the credit meter and with physical chips may be combined to a total credit bet or wager for the game play.

If the appropriate minimum/maximum bets conditions are not met by a player or players, the table or arcade style gaming system may indicate such (visually, aurally), for example, causing the display subsystem to display an indication of the discrepancy and/or a message that encourages players to provide sufficient funds to begin play. If the sensor subsystem is not able to read the physical chips located in the demarcated wagering area or bet circle, the gaming system may produce a suitable indication; for example, a visual indication that notifies one or more participants that the physical chips need to be spread out to get an accurate reading.

Under certain conditions, a player may be provided an opportunity to buy insurance for a hand or to double down a bet. At this time, the player may have to apply more funds into the active game. Any of the above approaches may be used.

Some non-limiting examples of suitable machine-readable symbologies may include EAN-13, EAN-8, UPC-A, UPC-E, Code 11, Interleaved 2 of 5, Industrial 2 of 5, Standard 2 of 5, Codabar, Plessey, MSI, PostNet, Code 39, Code 93, Code 39i, Code 128, LOGMARS, PDF417, DataMatrix, Maxicode, QR Code, ISSN, SISAC, and the like. As described above, symbols formed of symbol characters selected from an appropriate symbology may be applied to game-related pieces such as playing cards, chips, dice, tokens, tiles, markers spinners and/or pieces of media such as loyalty program or patron club cards, credit cards, debit cards and/or prepaid cards.

In some embodiments, the sensor subsystem employs optical recognitions (e.g., scanning or imaging) which may, for example be used to read a machine-readable symbol using infrared (IR), visible light or other wavelengths of electromagnetic energy. Processing of the read symbols may employ conventional machine-readable processing techniques, for example, edge/pattern detection algorithms. In some embodiments, machine-readable symbol processing logic may be used to identify or determine a unique identifier from a pattern. The identifier may be associated with other information via a database or lookup table. Consequently, a gaming system may employ a unique identifier to obtain additional information. For example, a database may associate unique identifiers with the values of respective physical chips carrying the identifiers. Also, for example, a player identifier (e.g., ID 123456789 or Bryan Kelly-Platinum level player) may be read from a piece of media such as a loyalty program or patron club card. As a further example, the sensor subsystem may read a card identifier from a playing card. A database may relate the card identifier to a playing card rank and/or suit, as well as a casino identifier. The display subsystem may produce an appropriate visual display on the virtual gaming layout indicative of a characteristic or identity of a physical object (game-related pieces, pieces of media, and the like). The display subsystem may also produce visual cues around or near the physical objects to indicate to the players and/or dealer that the physical object has been properly detected or read by the sensor subsystem. Any fault or non-reading condition can be timely addressed by the appropriate personnel or player.

The table and/or arcade style gaming system may allow certain patron club levels or player types to receive enhanced and/or modified games, extra features and/or options. For example, a high level player (e.g., gold members) may receive different bonus cards or more bonus cards than other levels (e.g., silver members). Each player type or level may receive different bonus games and/or bonus features unique to the particular level. These extra features may be targeted to one or more players at the table, and typically are designed so as not to affect play of the other players in the game. However, in some embodiments, bonus features may affect other players, even adversely affecting other players. Also, the table gaming or arcade/casino style gaming system may be configured to reward specific actions by a player or events, for example, providing a bonus to the player upon occurrence of the action or event. Such may, for instance, include providing a bonus game, bonus playing card, bonus dice throw, and/or bonus spin upon a significant loss or loss rate by the player in a primary game. The bonus game, bonus playing card, bonus dice throw, and/or bonus spin may be displayed by the display subsystem. Such a bonus game, bonus playing card, bonus dice throw, and/or bonus spin may combine with the primary game in progress or be separate or distinct from the primary game. Examples of bonuses include a progressive win, one or more bonus games, one or more bonus playing cards, one or more bonus dice rolls, one or more insurance markers, additional game-related pieces or free play to be used at the time of the players choosing.

Bonuses may be awarded on occurrence of a variety of events. For example, a bonus may be awarded when a player wagers a defined amount or defined cumulative amount, either on one bet or over a period of time. A bonus may be awarded when a player loses a defined amount on one bet or over a period of time. A bonus may be awarded when a player plays for a defined period of time, wagers at a defined rate (e.g., amount per time), and/or if a total value of a player to the casino exceeds one or more thresholds. The display subsystem may display a list of bonuses and/or activities that earn bonuses on or below the playing surface. The list of bonuses may be customized to each player. The display may include user-selectable icons which a player may activate to select between various offered bonuses. For example, bonuses may include: services, an additional chance to win the primary game, a bonus game, a physical prize, or a right to participate in some compelling event that enhances the total player experience. Awarding of bonuses may be related to the table seat, player identifier, player club level, casino identifier, a jurisdictional identifier, table identifier, group of tables, and/or combinations thereof. These player preferences may be stored in the player account for automatic retrieval at the next table gaming session time, allowing the gaming system to offer a player their preferred games or other bonuses.

Table games inherently provide a good environment for implementing group play (e.g., cooperative play between two or more players). The various table gaming system embodiments previously discussed facilitate group play, allowing players to, for example, exchange game-related pieces (e.g., playing cards, chips, tokens, markers, tiles, and spinners) since the table gaming system can track which players have which game-related pieces. Such may facilitate team play. For example, two or more players may be able to join together with their physical game-related pieces and compete with other players or teams of players located at the same gaming table or spanning multiple gaming tables. The display subsystem(s) may display visual representations of the physical game-related pieces and/or virtual game-related pieces to each team. The display may show either the team's own game-related pieces, the other teams' game-related pieces, or both. The combination of the virtual game layout and physical game-related pieces enables players at different seats or locations to play completely different games from each other. For example, there may be a common dealer dealing the playing cards to the players, but each player can play by different rules. The computing subsystem may track by player which game, pay tables and/or rules apply.

Alternatively, or additionally, some games require a minimum number of players may be required to start a table game; for example, two players in addition to the dealer to begin play. If there are not enough players at a first gaming table to start the game, the gaming system may allow players at other gaming tables to join in the game at the first gaming table. Some embodiments may provide a virtual player; for example, placing wagers with virtual chips and playing out virtual hands. This may allow a game to proceed where there would not otherwise be a sufficient number of players, and/or may enhance the entertainment experience for physical players. Such may be particularly suitable for games where players are not in competition with one another, but rather compete against the dealer or house, since the decisions of the virtual player will be unlikely to adversely affect the physical player. Such may also be applied to games where players compete against one another; for example, by using a random number generator to determine the actions (e.g., hit or stay, change wager, and the like) that the virtual player will take.

This may even span casino properties. Such an approach may, for example, allow a large poker tournament to be conducted without requiring players to travel to a common site. The players could, for example, play from multiple local sites hosting the competition play, and play against players at remote sites via networked table gaming systems, such as those previously described. Some players may play using virtual playing cards while others may play using physical playing cards, and still others may play using a combination of virtual and physical playing cards. In some embodiments, the display system(s) may display all of the other player's visible cards and wagers to each player. Such may enhance to player experience, as if all players were physically present at the same gaming table. The display subsystem(s) may display visual representations of the physical playing cards dealt to or held by the dealer or other game-related pieces throughout the casino and/or spanning multiple casino. The grouping of players from different gaming tables may be done by a dealer or pit boss. Alternatively, a group play server may automatically assign players to appropriate gaming tables as necessary to fill the gaming tables. Alternately, a player may be presented with a list of remote gaming tables having openings and may select a gaming table to join, or a player may create ones own virtual table to invite others to play at.

At the end of a hand of play, the dealer may distribute the appropriate funds to the player; for example, in the form of physical chips, or electronic credits, for instance to a player account, table credit meter, or virtual chips associated with the player. The sensing subsystem can read physical chips awarded to the player and compare the award against a known pay table for the game and the amount of the player's wager to ensure that the payout was correct. The gaming system may provide an indication (visual, aural) if the payout is incorrect. The notification may be to the player, the dealer, pit boss or other casino personnel. In some embodiments, the computing subsystem or some other system may automatically determine and award the appropriate payout, with or without dealer interaction. The appropriate payout may be determined using a known pay table stored electronically and the amount of the player's wager. The appropriate payout may be automatically added to the credit meter, virtual chips, or directly placed into a player account associated with the player. The display subsystem may display the proper payout to the player and/or dealer on or below the playing surface. This display may be sufficiently large, such that one or more surveillance cameras can capture the displayed values for later use if needed. The display subsystem may provide visual prompt to the player, inquiring whether the player would like their wager and/or winnings to ride on the outcome of a next game or hand (e.g., double or nothing). Some embodiments may employ credit meters, virtual chips and player accounts in lieu of physical chips, advantageously relieving the dealer from having to calculate payouts or manual handle physical chips. Such may also advantageously eliminate the need to service tables to replenish the table bank.

Using a surface computing approach may provide numerous advantages over traditional touch screens. For example, a surface computing system is capable of handling multi-touch interaction, recognizing dozens and dozens of touches simultaneously, including fingers, hands, gestures and objects placed on the playing surface. Surface computing recognizes many points of contact simultaneously, not just from one finger as with a typical touch screen, but up to dozens and dozens of items at once. Additionally, users can actually "grab" digital information with their hands and interact with content through touch and gesture, without the use of a mouse or keyboard. Users can place physical objects on the surface to trigger different types of digital responses, including the transfer of digital content. The surface computing environment facilitates interaction between virtual or animated objects and physical objects. Also, the surface computing interface rarely or never needs recalibration as compared to traditional touch screens. Further, the horizontal form factor associated with surface computing makes it easy for several people to gather around a surface computer together, providing a collaborative, face-to-face experience. Further, the surface computing device can be designed to be easily cleaned and provide a water tight surface.

Employing a virtual or video representation of a game layout allows casino owners to dynamically reprogram or assign which table games are available on the floor at any one time. For example, if there are too many black jack tables, some may be quick and easily reconfigured into another type of game; for example, baccarat. This allows for optimal configuration of the table game floor to maximize revenue. For example, in the middle of the week a casino can open the table games up to traditional video slot stations without requiring a dealer at the table. Surface computing table games allow the casino to dynamically re-apportion their floor mix from table games to traditional video games at the time of their choosing to maximize revenue.

In some embodiments, the playing surface, a portion thereof, the playfield, the game-related or play pieces may be varied or changed. Some non-limiting examples of possible changes include: rotation, moved, or scaled. Such changes may be applied, for example, by a player, a dealer, or the gaming system itself to create a more optimal viewing and entertainment presentation. User hand gestures or button presses may allow the surface or portion of the surface to move around. This is optimal for a turns-based game experience where each player takes turns in succession to another. Once a person's turn is over, then the entire virtual surface re-orientates itself to the next player whose turn it is.

Software may be updated over a network or other communications channel, eliminating the inconvenience of manually changing software. Changing game software, buttons, and displays may all be accomplished via software downloaded to the table or arcade-style gaming system.

All game functions may occur on the playing surface interface. Media such as a loyalty program card, a player's card or even an identity card or financial card may allow table ratings, slot ratings, promotional activity, electronic funds transfer (EFT) transfers, as well as traditional player tracking and accounting functions. Such media may be automatically read when placed in the playing surface of a gaming table. Such media may, for example, include machine-readable symbols and/or transponders such as RFID or EAS circuits. In some embodiments, appropriately equipped digital music players and/or cellphones may be located on the playing surface to hold EFT transfers or other player data.

The various previously-described embodiments bring a truly interactive experience to the player; for example, offering the player help with various games, basic rules and/or strategies. A dealer can be a real person or electronic. The type of game being played at the gaming table can be easily changed to suit the player's demand. Thus, game offerings may be modified, for example, during peak times, without changing the table configuration. With machine-readable chips and playing cards (e.g., machine-readable symbols, RFID or EAS type transponders), cheating and dealer or player error will be detectable with the surface table gaming system automatically recognizing which playing cards are in play and which chips have been wagered. Players may be able to "buy in" chips by locating a credit, debit or prepaid card or other media on the playing surface.

Table gaming systems could be used to open new areas of a resort to gaming, beyond the traditional gaming floors or rooms. For example, the table gaming system may be used as a restaurant table. A player would be able to play while waiting for food, and/or play while dining. Such may allow a group in the restaurant to play at a four top and have cocktails, appetizers, lunch, or dinner while playing a game either together or separately based on the table configuration.

Table gaming systems may be set up in hotel rooms or poolside. Menu and ordering functions may provide quicker, more accurate service to patrons. Orders for room service may be printed or electronically logged based on the selections made from a table gaming system location in a patron's room. Patrons would also be able to play games while in their rooms, away from the traditional gaming floors. Thus, gaming could be expanded throughout a resort if the jurisdiction allows gaming beyond the traditional gaming areas.

The table gaming systems may also allow menus to be displayed, and orders for food and beverages placed in traditional gaming floor or rooms, enhancing the gaming atmosphere. The table gaming systems may allow expansion of game types, for example, bring board type games to the more traditional casino or resort experience.

The table gaming systems may dramatically change the look of the casino floor. Gaming may be provided in rectangular bars and/or carousels that are serviced by servers based on orders submitted by the players through the table surface interface, while the players continue to play. Long table tops may better accommodate patrons. Patrons may even have their own access to the news and other information via connections to the Internet or World Wide Web from the table surface interface. Some embodiments provide a fully paperless solution where cards and media are read from the playing surface and accounts are also debited and credited though the table surface interface.

Additionally, or alternatively, displays may be carried or otherwise associated with one or more communication devices; for example, handheld wireless communication devices such as, personal digital assistants (PDAs), BLACKBERRY® or TREO® type devices, and/or cellular phones. The computing subsystem can cause display of virtual game layouts including, gaming related information regarding the game as well as other information.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the teachings, as will be recognized by those skilled in the relevant art. The teachings provided herein can be applied to other playing card distributing systems, not necessarily the exemplary playing card handling systems generally described above.

For example, in some embodiments, the playing cards used are standard playing cards from one or more standard decks of fifty-two (52) playing cards. The standard playing cards have a uniform back, and the faces each bear a respective combination of a first primary symbol and a second primary symbol. The first primary symbol is selected from a standard set of playing card rank symbols comprising: 2, 3, 4, 5, 6, 7, 8, 9, 10, J, Q, K, and A; and the second primary symbol is selected from a standard set of playing card suit symbols comprising diamond-solid, and the like. One or more of the primary symbols may identify a value of the playing card under the rules of a specific card game. For example, in black jack or twenty-one, the ranks 2-10 are worth 2-10 points respectively, the ranks J-K are each worth 10 points, and the rank A is worth 10 or 1 point at the player's option. In other embodiments, the playing cards may have other symbols, graphics, backings, and the like, and may even be modified within the playing card handling system 120 to add, enhance, or alter the value or significance of the playing card. In one embodiment, the playing cards are dual-sided playing cards as described in U.S. patent application Ser. No. 10/902,436, which published on Jun. 2, 2005.

Some of the methods discussed above employ the generation of random numbers or values and some of the structures discussed above refer to random number generators (RNGs). While referred to herein and in the claims as being a random number or value and/or RNG, such terms encompass numbers and values as well as generators that are not truly random in the mathematical sense, such as those sometimes referred to as being pseudo-random. In some embodiments, the random number generator may take the form of a discrete analog or digital component. In other embodiments, the RNG may take the form of a controller such as a microcontroller, microprocessor, digital signal processor, application-specific integrated circuit or field programmable gate array executing suitable instructions to provide an RNG function.

In some embodiments, the RNG randomly determines or selects one or more chances from a domain of chances. In some embodiments, the domain may be fixed, while other embodiments may vary the domain. For example, the domain may be varied to match the number of chances provided to the players, or to adjust a probability of winning or payout. In some embodiments, parameters for a RNG function may be selected or varied to achieve a desired set of odds or payout. In some embodiments, the particular RNG function may be selected to achieve a desired set of odds or payout.

In one embodiment of a gesture-enhanced input device, a video-based button deck is created for use in games on the Alpha II gaming platform, including stepper-based games, video-based games, card-based games (e.g., black jack, poker, and the like), and ticket-based games (e.g., keno, bingo, and the like). In various embodiments, the display of the gesture enhanced input device is offered as an upgrade or a standard feature. A video-based selection display of the gesture-enhanced input device provides simplified set-up and configuration, as well as new game play offerings not supported by another panel. In one embodiment, the gesture-enhanced input device actually moves the virtual buttons to a player's present location on the touch-enabled deck. In this regard, the gesture-enhanced input device is customizable to an individual player's needs, includes button size, shape, location, speed of play, and the like. In one embodiment, a gesture-enhanced input device is configured to resize a virtual button deck to compensate for the height, arm length, hand size, finger size, and finger length of a player. In one such embodiment of the gesture enhanced input device, aspects of the virtual button deck are resized based upon player performance of the game being played. The importance of the player (e.g., gold club member, and the like) may also be used as a criteria for resizing button deck characteristics and/or adding or deleting various button deck functions or attributes.

In another aspect of the gesture enhanced input device, the deck provides an expanded set of options to support advanced types of player input, known as "gestures." These gestures are generally defined as any input more than a single touch, (e.g., "touching and sliding" to spin a top box wheel, turn a help pay table page, and the like). The system for gesture support is easily extensible by game designer to adapt to new functionality.

Referring now to components of the gesture-enhanced input device, in one specific, non-limiting embodiment, the deck is a hybrid design with the main portion of the panel including a touch screen capable LCD with a resolution of 1280 by 238 pixels. Preferably, a two inch round physical button for SPIN/REPEAT BET is mounted to the right of the panel in this non-limiting embodiment. In this embodiment, the physical button is included to provide tactile movement and "button feel" that players are accustomed to a physical button in order to aide in acceptance of this gesture enhanced input device in the field. In other embodiments, only a touch screen capable LCD (or other touch screen device) is utilized, without any type of physical button on the panel. The video screen functionality of the gesture-enhanced input device enables a player to select a wager amount and lines played using touch screen capabilities rather than physical buttons.

With respect to game level control, in one aspect of a preferred embodiment, the gesture enhanced input device provides support for different button "states" depending upon player input. In one embodiment, the button "states" include: available, inactive, mouse/finger over, and selected. The available button state demonstrates that sufficient credits are available to allow this button selection. The inactive button state demonstrates that sufficient credits are not available to allow this selection. Referring now to the "Mouse/finger over" button state, if a patron touches and slides from one button to the next, this activates the button/selection but does not commit to the selection. If patrons slide over an inactive button a prompt appears, explaining the button activation. Such instructions may include: (1) If over an Inactive selection: "Add more credits to activate," or (2) If over an Ante Bet: "Activates the bonus bet option." With respect to the selected button state, a player must touch and release the button to select a wager. If a player is performing a "mouse/finger over" action, a second touch selects the option.

In still another aspect of the gesture-enhanced input device, a sound effect package is synced with button usage. In this regard, the sound design incorporates both a mechanical button sound, together with a chord based tonal range (e.g., C major), where lower frequency tones are used for lower bet amounts, and higher tones for higher amounts).

Additionally, one embodiment of the gesture enhanced input device provides support for an "Aloha Bet," which is otherwise known as "ALL IN" or "Bet All Credits," with respect to reel games. In such an embodiment, this option wagers as many credits as possible based upon the available credits in the machine when selected. Preferably, this bet initially attempts to cover all lines at one credit. If sufficient credits are not available or if there are remaining credits, the bet is increased by one credit per line evenly across all lines, in line order, until "Max Bet" is reached. If there are not sufficient credits to cover all available lines evenly, the bet is distributed in pay line order until all available credits are exhausted or Max Bet is reached. At this point, the reels are spun. Any residual credits are converted to a ticket and printed prior to spinning the reels.

Referring now to the customization functionality provided by the gesture enhanced input device, in one embodiment dynamic fonts are utilized with buttons that are provided. In this regard, multi-language support is provided by the gesture enhanced input device to support current languages and character sets, as well as for ease of localization. In another embodiment, the gesture-enhanced input device supports various panel configurations for human interface customizations. Additional buttons and functionality may be added as needed.

Figure 73:
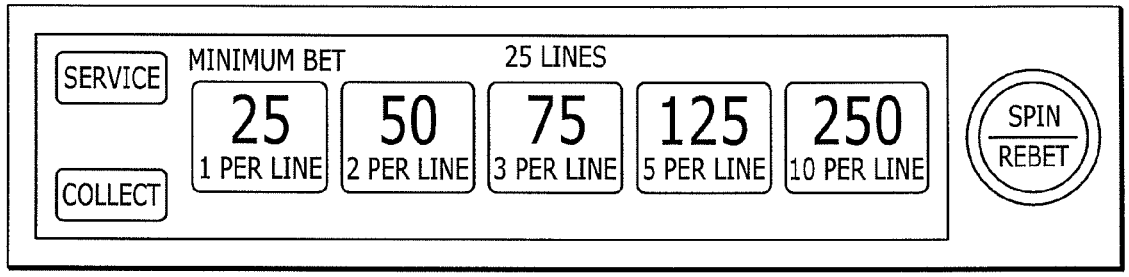
FIG. 73 is a diagram of a virtual easy select style button panel.
Figure 74:
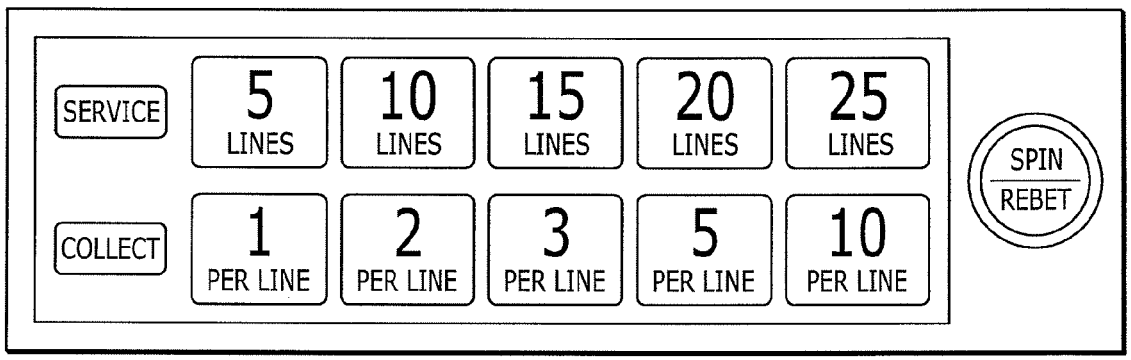
FIG. 74 is a diagram of a virtual traditional style button panel.
Figure 75:
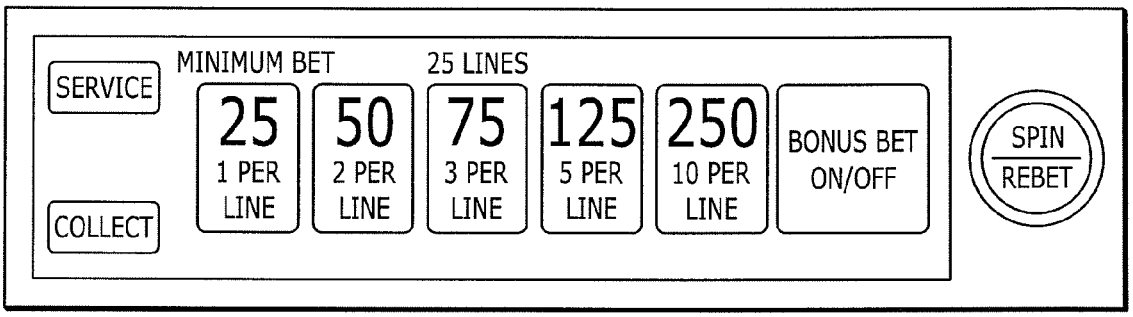
FIGS. 75 and 76 are diagrams for ante bet wagering configuration.
Figure 76:
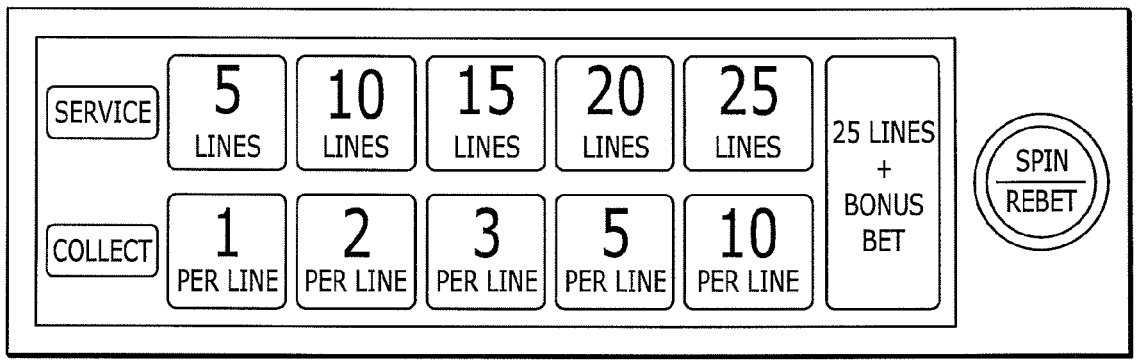
Figure 77:
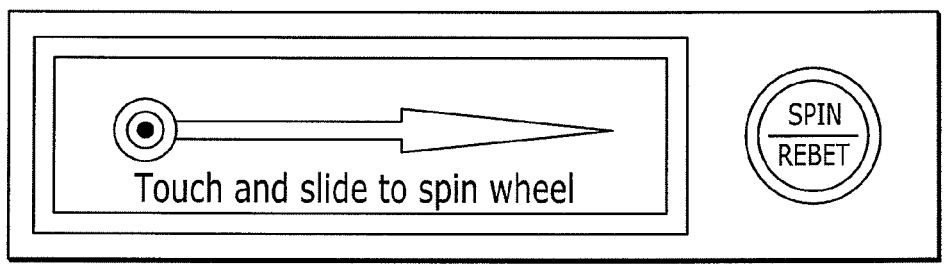
FIG. 77 is a diagram for Bonus Play/Gestures.
Figure 78:
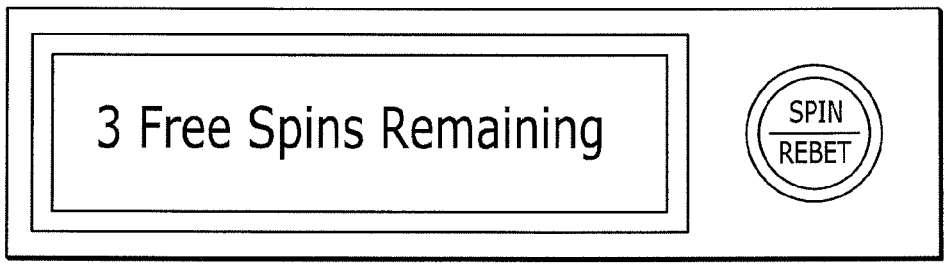
FIG. 78 is another diagram for Bonus Play/Gestures.

Referring now to FIG. 73, an Easy Select Style desk is shown using the gesture-enhanced input device. This configuration mimics the functionality found on the Easy Select button panel. Referring now to FIG. 74, a traditional style desk is shown using the gesture enhanced input device. This configuration mimics the functionality of a traditional button panel. Referring now to FIGS. 75 and 76, an Ante bet desk is shown using the gesture enhanced input device. This configuration is designed to enable "Ante bet" wagering. Referring now to FIGS. 77 and 78, a Bonus Play/Gestures and new game play desk is shown using the gesture enhanced input device. The performance of the panel should be substantially identical to the mechanical buttons. In this regard, button performance should be instantaneous, with no delay between input and action.

Figure 79:
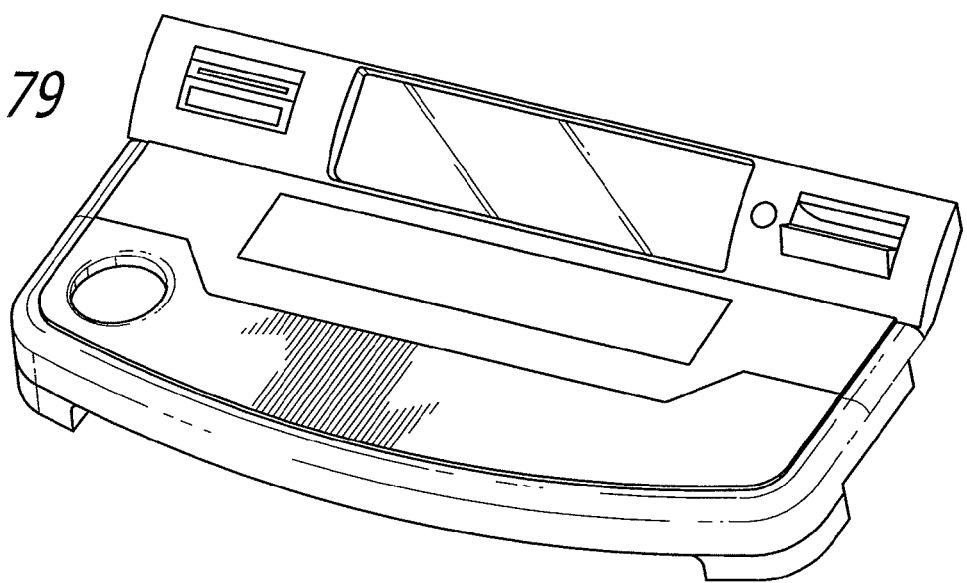
FIG. 79 is a diagram of a Virtual Button Deck.
Figure 80:
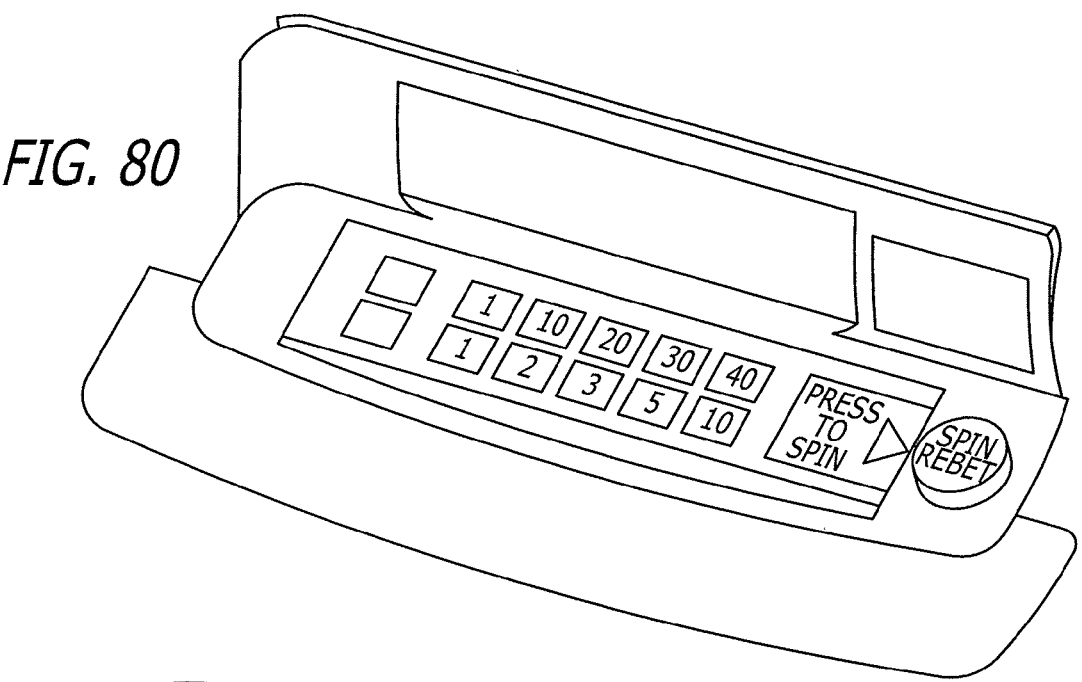
FIG. 80 is another diagram of a Virtual Button Deck.

Another aspect of a gesture enhanced input device comprises a multi-touch virtual button deck that includes a touch screen display in the place of game buttons, with a haptic feedback response that registers when a selection has been made. The multi-touch embodiment includes a similar display but employs a touch screen that has multi-touch capabilities to enhance game play control. In one embodiment shown in FIGS. 79 and 80, the display is mounted so that the touch screen is flush with the game deck. Any function and/or operation that is desired by the game requirements may be software coded to be provided by the multi-touch display. Additionally, the button configuration may be changed on the fly, such as in the middle of a game, in response to a player action, a computer program action, an operator action, or combinations thereof.

Figure 81:
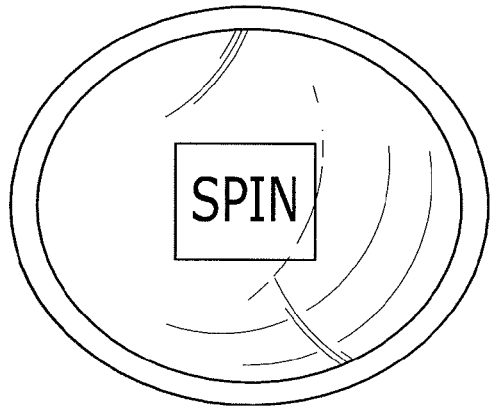
FIG. 81 is a diagram of a Virtual Dice Action Button prior to game commencing.

Referring now to FIG. 81, a representation of a "dice bubble" is drawn on the virtual button deck display. A "dice bubble," when built physically rather than virtually, consists of a transparent plastic hemisphere attached to a sprung metal plate. The dice bubble contains one or more dice, and when a user presses down on the plastic hemisphere, it causes the dice to bounce around and randomly land on a new result. A dice bubble is commonly used in board games as a means of players throwing dice without worrying about losing dice.

In this embodiment, a representation of a dice bubble is rendered on the virtual button deck, and a player interacts with it by pressing a touchscreen which overlays the dice bubble. Preferably, the touchscreen is enabled with haptic technology, and touching the touchscreen results in a brief vibration of the touchscreen. This vibration is calibrated to match a sound that is recorded by a real dice bubble. It is expected that this recording is also played back in conjunction with the haptic vibration to further reinforce the realistic feel of a virtual dice bubble.

Figure 82:
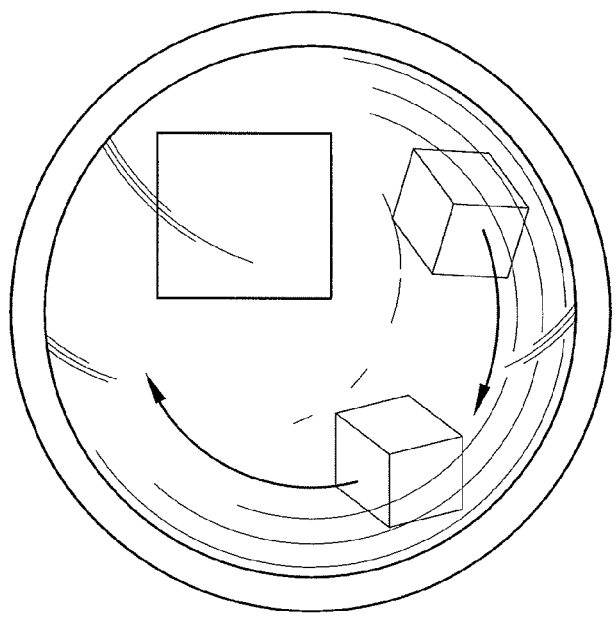
FIG. 82 is a diagram of a Virtual Dice Action Button during game cycle.

Preferably, the dice bubble action button is used to replace the 'Spin' button that is normally found on a virtual button deck. Otherwise stated, as shown in FIG. 82, pressing the dice action button would cause the virtual dice within the graphical image of the dice bubble to bounce around and would also simultaneously cause a new conventional game cycle to commence on the main screen of the gaming machine.

Figure 83:
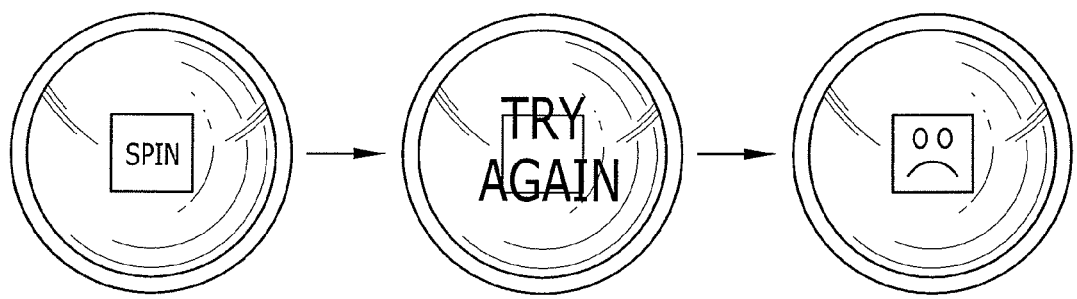
FIG. 83 is a diagram of a Virtual Dice Action Button states for loss result.

Optimally, the dice bounces around for less time than the length of a game cycle. This enables a player to first focus on the result being shown on the virtual dice button, and then on the results being shown on the main gaming machine display. FIG. 83 shows one possible virtual dice game outcome as a sequence of graphical images. The left most image is shown to the player prior to the game commencing, and then after the virtual dice bounces around, the middle image is shown for a brief period, until the rest of the game completes on the main screen. Once the game cycle has finished, for a brief period of time the right most image, a sad face, is shown on the virtual dice button.

Figure 84:
FIG. 84 is a diagram of a Virtual Dice Action Button states for win result.
Figure 85:
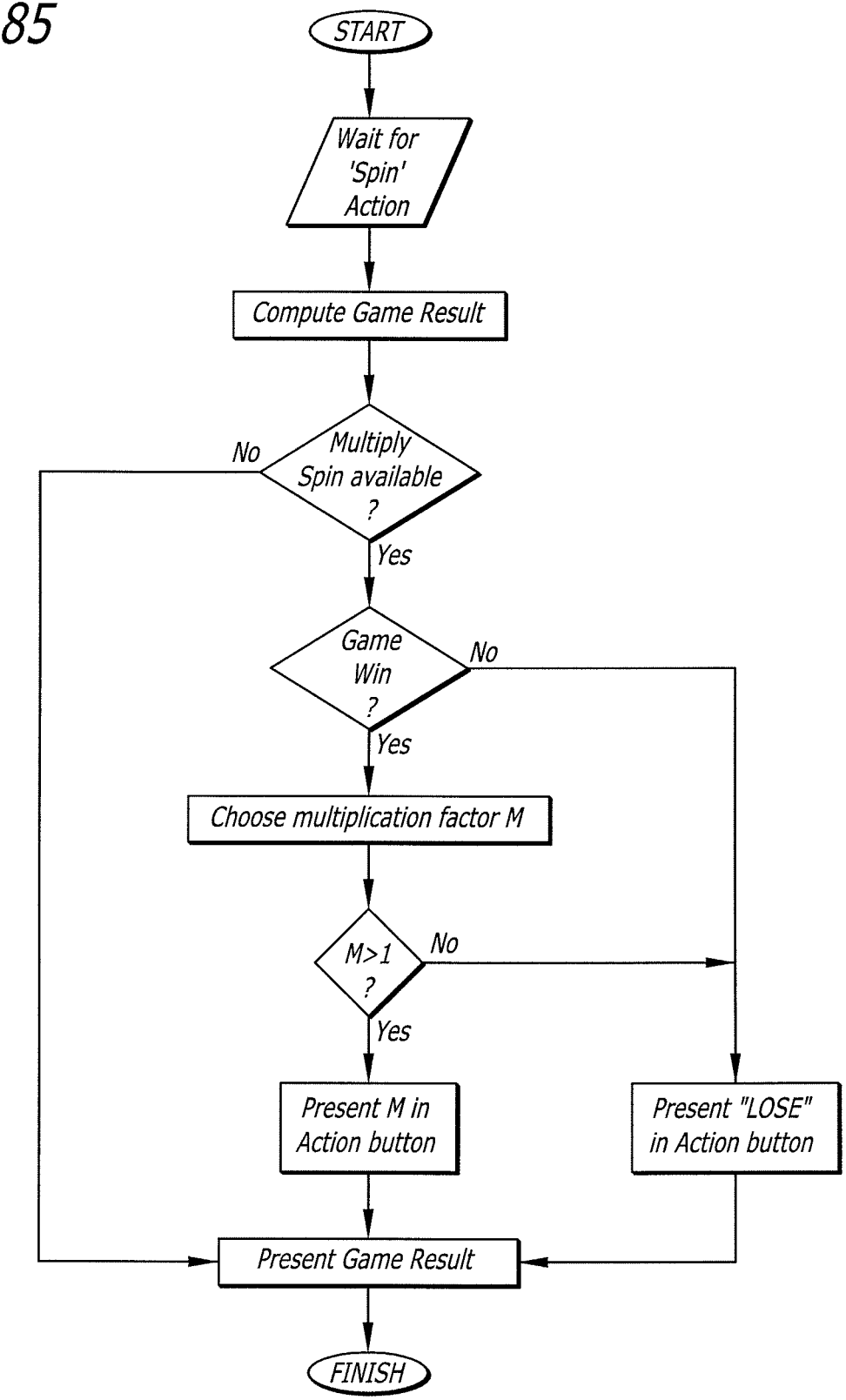
FIG. 85 is a diagram of a Multiply Action Button Process.

An advantage can be seen in FIG. 83 in that the images to be shown on the virtual dice result are not restricted to a small set (such as numbering 1-6). Rather, they may show any arbitrary image. It can also be seen that the number of possible virtual outcomes may be higher than 6 (which would be the limit of a physical dice cube). Certain outcomes may be biased using well known techniques such as those disclosed by Telnaes in the early 1980s. FIG. 84 shows a winning result for a player. The result image is of "2×" which means that whatever wins the player has won on the concurrent main game; the result to be paid is doubled. FIG. 85 shows a process that may be used to produce this result. Specifically, FIG. 85 shows a diagram of a Multiply Action Button process.

In FIG. 85, at the point a player presses the Action Button, the game result is computed (so that the reels in a video slot game may spin to the resulting positions), and it is determined if the win multiplier action is enabled. The multiplier action may be enabled by a number of means, such as: (1) A player may place an extra ante-bet to enable the action button features. Such ante-bets may result in periodic multipliers occurring, paid for by the ante-bet. (2) The casino management system may choose to enable the action button feature for a particular player or players, based upon past play, a current bonus level or other criteria. (3) The action button multiplier may be enabled by the methods disclosed in the previous "Player Centric in Game Bonusing" disclosure. (4) The presence of the action button multiplier feature may be built into the underlying game mathematics, with a resultant drop in amounts to be paid in the base paytable.

If the action button is enabled, the game result is checked to see if a win occurred. If a win did not occur, there is no point in multiplying a zero win, so the spin action button automatically shows a loss result, this may be presented to a player as "Better luck next time" or "Try Again" as in FIG. 83.

If a win did occur, a multiplication factor (M) is computed by use of a random number generator. Typically, this would be configured to bias towards low multipliers, again using methods such as Telnaes. If the result is that M=1, then the "Try Again" result is shown, but if M>1 then the corresponding multiplier is shown on the action button. In any case, the game result is then presented as normal, with any multiplier affecting the amount paid.

Figure 86:
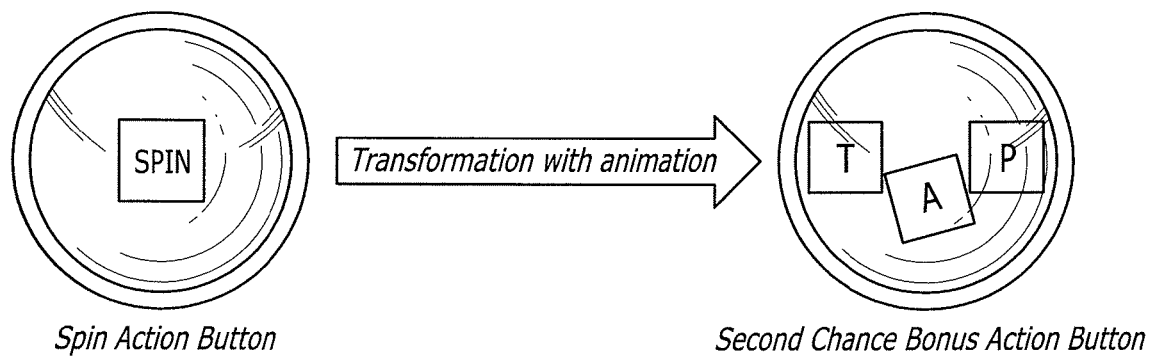
FIG. 86 is a diagram of a Virtual Dice Action Button—Second Chance.

FIG. 86 shows an alternative implementation in which a second chance feature may be presented to the player via the virtual action button. In this implementation, a player completes a game cycle, and if the game had a losing result, the virtual action button may display an image indicating that a second chance is to be offered to win a prize. The same possible means of deciding when to present the second chance virtual action button are listed above (i.e., ante bet, system choice or underlying mathematics). Once presented, the player presses the action button portion of the virtual button deck, and a bonus cycle takes place as shown in the progression in FIG. 84.

Figure 87:
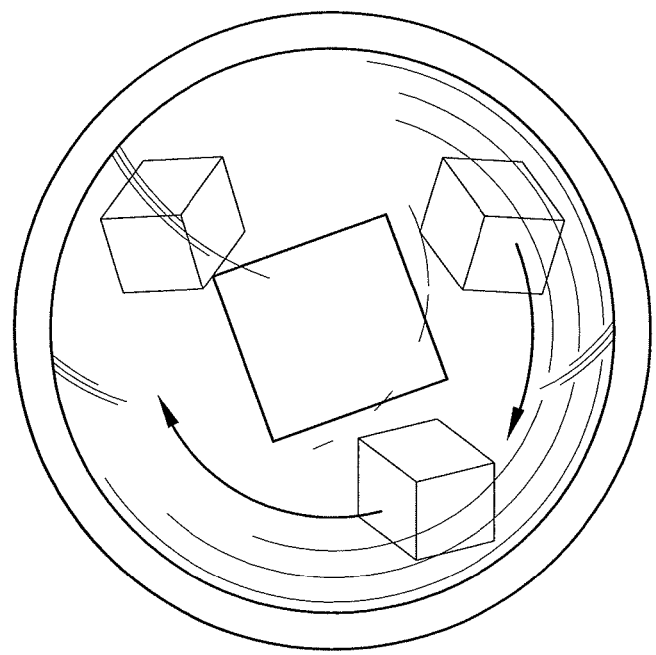
FIG. 87 is a diagram of a Multiple Dice Action Button during a spin.

FIG. 87 shows another aspect of this invention in that multiple dice may be present in the virtual action button. Specifically, FIG. 87 shows a diagram of a Multiple Dice during spin. Unlike a real dice bubble, dice may be easily added or removed from the virtual button. So a player may start out with one die, and earn further dice as part of a progressive bonus feature. The number of dice won by a player may be saved between sessions using the Save State Service. Each additional die may gain a player further chances to win during a second chance or concurrent dice bonus feature.

FIG. 88 shows a diagram of a Virtual Dice Action Button with Multiple Dice Result. In FIG. 88, the player has earned 3 dice, and during the bonus game, the presence of one seven symbol causes the player to win. It may be seen that the more dice the player has, the more chance they would have of making such a winning combination. It is also important to note that the virtual dice may extend a winning combination made in the main game. For example, if a player has obtained a winning line of three to seven symbols, the presence of a seven symbol in the virtual dice action button may turn this combination into a winning line of four symbols.

FIG. 89 shows another virtual action button, entitled "Flick To Spin." This feature presents the "Flick to Spin" action button to the player during normal play. When activated (e.g., using the triggering methods described above), the "Flick To Spin" graphic is replaced on the virtual button deck by a pair of playing cards, with one face down and one face up. In one embodiment, the player is also presented with informational text telling them to flick the face down card by making a flicking gesture across the virtual button deck display.

Figure 90:
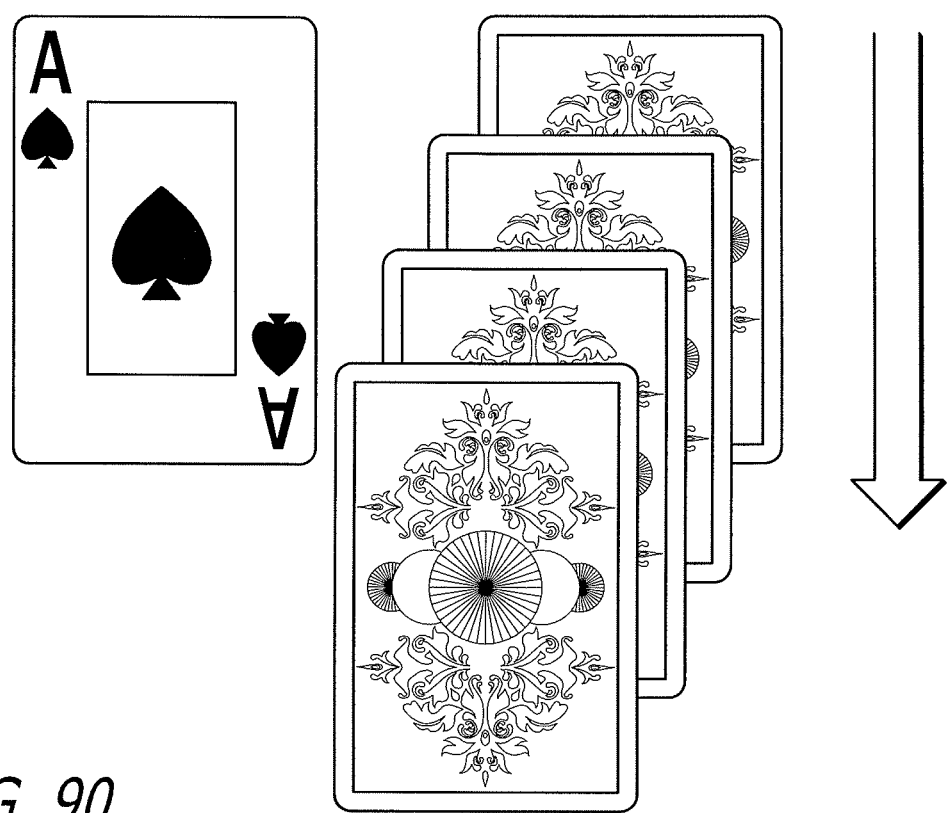
FIG. 90 is a diagram of a Flick to Spin Game Animation.
Figure 91:
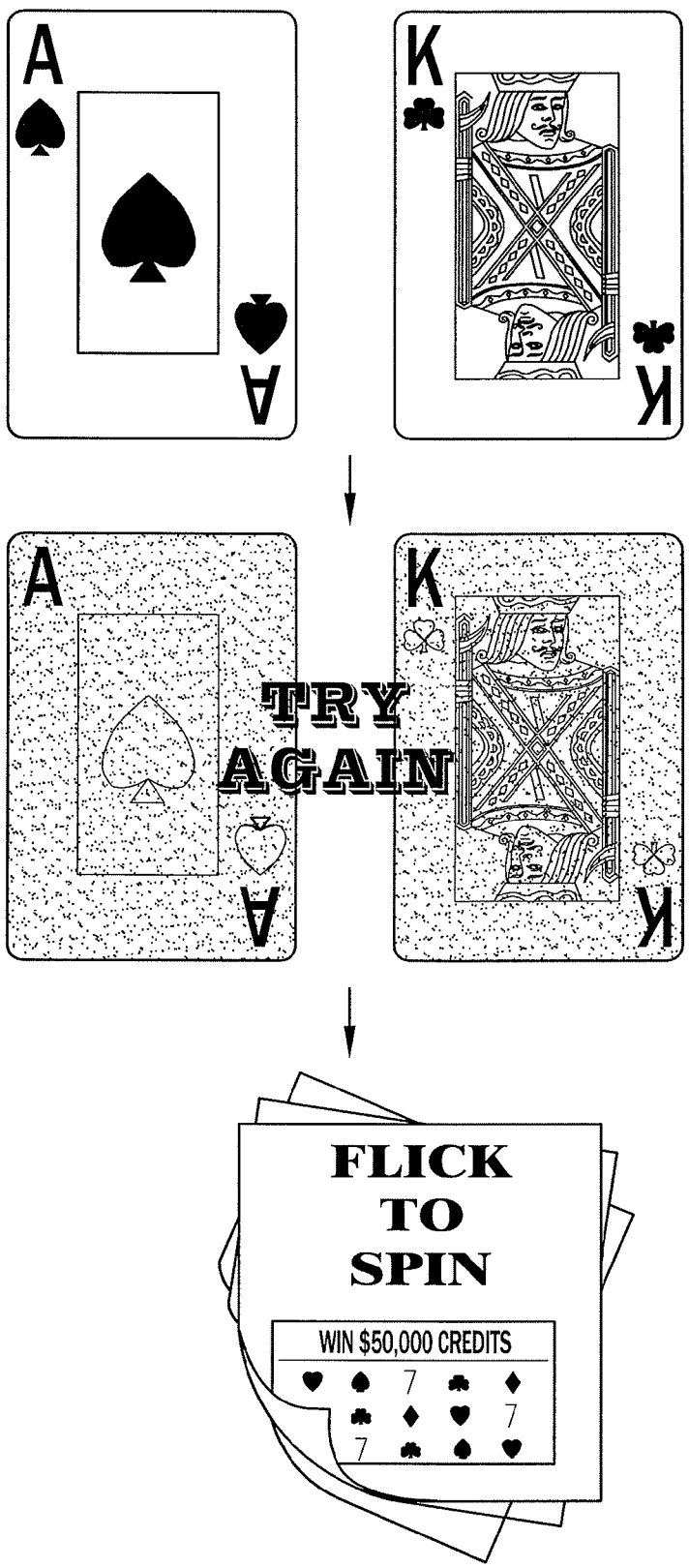
FIG. 91 is a diagram of a Flick to Spin Action Button Lose Result.
Figure 92:
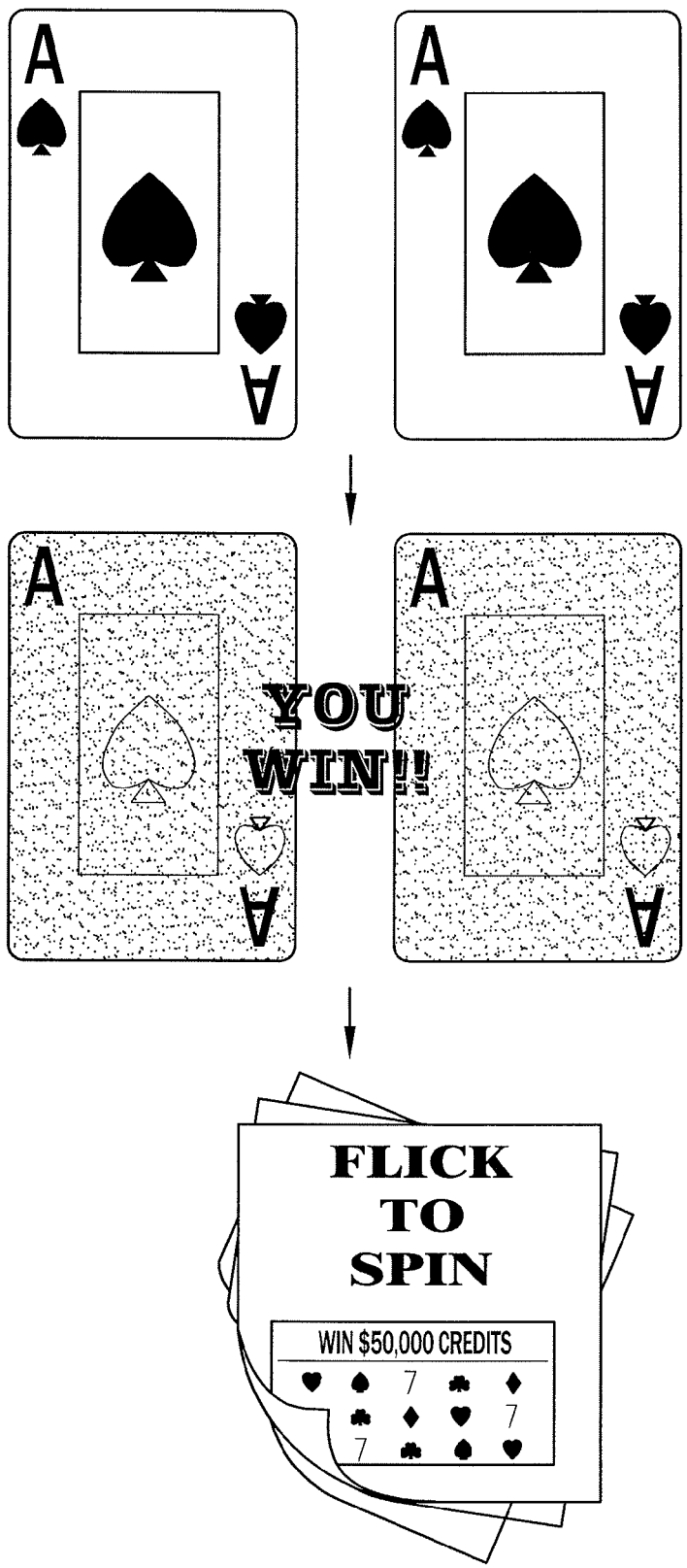
FIG. 92 is a diagram of a Flick to Spin Action Button Win Result.

The player makes a flicking gesture, and the display reacts as in FIG. 90, which shows a Flick to Spin Game Animation. The effect to the player represents a card being slid from the deck and turned over. Once turned over the bonus result is shown; if the player has lost, the player would be informed as in FIG. 91. FIG. 91 shows a diagram of a Flick to Spin Action Button Lose Result. If the player has won, the player would be informed as in FIG. 92, and awarded a suitable prize. FIG. 92 shows a diagram of a Flick to Spin Action Button Win Result. The matching condition may be the same rank of cards (two aces), the same suit of cards (two spades) or the same card (two ace of spades). Since the probability of these types of matches differs, different levels of prizes may be awarded. Once the bonus game has completed, the cards are removed from the virtual button deck display, and again replaced with the original "Flick to Spin virtual button."

Figure 93:
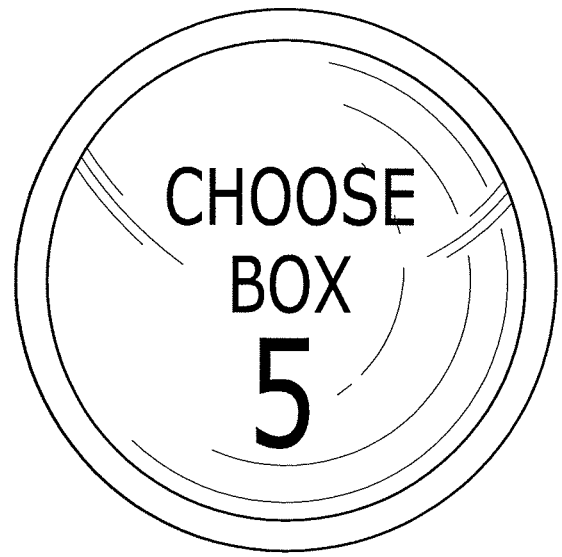
FIG. 93 is a diagram of a Fortune Teller Action Button with game hint.
Figure 94:
FIG. 94 is a diagram of a Fortune Teller Action Button with anticipation.

FIG. 93 and FIG. 94 show another aspect of this invention. FIG. 93 shows a diagram of a Fortune Teller Action Button with game hint. FIG. 94 shows a diagram of a Fortune Teller Action Button with anticipation. The virtual action button may act as a "fortune teller," much like a magic crystal ball. The messages that the virtual action button could pass to a player could be quite definite, as in FIG. 93, or somewhat vague, as in FIG. 94.

Preferably, the fortune teller virtual action button would use methods described previously in the "Responsible Reinforcement of Superstitious Behavior" disclosure. In the event of a win being determined at the beginning of a game cycle, the fortune teller action button would "predict" this win, as in FIG. 94, to build anticipation to the player of the coming win. It can be seen that a number of messages could be placed in the virtual action button at this time—larger wins could be "predicted" by messages such as "It looks VERY promising!" Since a fortune teller may not be 100% accurate, the prediction may be somewhat less than perfect. This may be achieved by using a random number generator set to give the correct prediction some amount of the time (e.g., 75%). When the RNG determines that an incorrect prediction is to be made, the message displayed would be chosen such that even in the result of a loss, the virtual action button may display a "Success is predicted" message. Conversely, a big win may be heralded with an incorrect prediction of "I'm not optimistic;" a message that may not ever be shown with a losing result. The presence of such a message followed by the winning result may add humor and entertainment to the game experience at a time when a player is enjoying a large win.

FIGS. 93 and 94 show another possible use of a fortune teller action button. In this scenario a player has reached a second screen bonus game, where they are to choose between a number of boxes, each containing different prize values. Due to some triggering condition, the fortune teller action button gives a prediction to the player to help them choose. So, if box 3 contains the biggest prize, the action button may reflect this. Again, this prediction may not be 100% accurate. The activation of such a hint may be derived from the "Player Centric In Game Bonusing" methods described previously, or based on standard triggers listed above for the virtual dice action button. Using a player centric system bonusing method could mean that players who are being particularly targeted by a casino would receive more hints during features, and thus better expected returns.

An embodiment of the gesture enhanced input device uses of the virtual button deck to deliver previously impossible concepts, uses of haptic technology to deliver a realistic feel for a "dice bubble," provides greater entertainment and complexity for a player, and provides leverage Player Centric In Game Bonusing and Responsible Superstition methods. This embodiment relies upon the virtual button deck, preferably with haptic technology as developed by a number of companies such as Samsung.

The chances may take a variety of forms. The chances may take the form of virtual chances, such as in the form of electronic or other data that represent or are otherwise indicative of a value (e.g., integer or serial number) or identity (e.g., alpha-numeric string). The virtual chances may be provided or allocated to a player from a domain of virtual chances. Provision or allocation may take place in a computer-readable memory or other storage element; for example as relationships in a database or other data structure. The domain of virtual chances may be fixed or generated on the fly.

As disclosed above, a gesture enhanced input device may comprise a Multi-Game Action Button Deck in a Concurrent Gaming System that may include a touch screen display with a haptic feedback response that registers when a selection has been made. In some embodiments, the Multi-Game Action Button Deck (or "virtual deck") in a Concurrent Gaming System enables a player to individually select and play one or more games from a plurality of presented or displayed games. The plurality of presented or displayed games may be the same or different based on, for example, credit denomination, minimum bet, maximum bet, bet progression, themes, titles, game cycle, frame rate, number of pay lines, pay line progression, or the like.

In some embodiments, a gaming machine may present or display two, three, four, or more games to the player. Each game may be the same, or one or more games may be different. In an embodiment involving four games, two games may be MAYAN TREASURES® titled video slot games and two games may be LIGHTNING SEVENS® titled video slot games. One MAYAN TREASURES® game may have a credit denomination of $0.01 whereas the other MAYAN TREASURES® game may have a credit denomination of $1.00. The two LIGHTNING SEVENS® themed games may be the same in every respect (i.e., two instances of the same game are available to the player). Among the plurality of presented or displayed games, a player may individually select which game(s) to play among the displayed plurality.

In another embodiment, two games may be MAYAN TREASURES® titled video slot games, one game may be a LIGHTNING SEVENS® titled video slot game, and another game may be a TOTAL BLAST® titled video slot game. In this example, the two MAYAN TREASURES® games may be the same in every respect. For embodiment, the credit denomination, the number of pay lines, the pay line progression, and bet progression may be the same. The LIGHTNING SEVENS® game may have a different number of pay lines, pay line progression, and bet progression from the MAYAN TREASURES® games and the TOTAL BLAST® game. The TOTAL BLAST® game may have a different number of pay lines, pay line progression, and bet progression from the MAYAN TREASURES® games and the LIGHTNING SEVENS® game.

Among the plurality of displayed games, one or more games may be downloaded to (or otherwise temporarily or permanently reside on) the gaming machine presenting the plurality of games and executed on a processor local to the gaming machine. One or more games may be streamed to the gaming machine over a network and executed on a processor remote to the gaming machine (e.g., a server). Commonly owned U.S. patent application Ser. No. 13/273,555 teaches methods and systems that relate to streaming and compressing data, which is hereby incorporated by reference in its entirety. In addition, commonly owned U.S. patent application Ser. No. 13/273,611 teaches methods and systems that relate to reducing the memory footprint of graphical resources on video memory, which is hereby incorporated by reference in its entirety. Thus, while the embodiments disclosed herein may relate to streaming game content, those of ordinary skill in the art will appreciate that other embodiments may involve non-streaming implementations or combinations thereof.

The gaming machine may include a display manager to manage displaying the plurality of games on one or more displays of the gaming machine. Commonly owned U.S. patent application Ser. No. 12/350,938 (now U.S. Pat. No. 8,241,123) and Ser. No. 12/350,939 teach a display manager that may be used by the gaming machines disclosed herein and are hereby incorporated by reference in their entirety. In other embodiments, the gaming system may include one or more display managers. For example, a game server running one or more games may include a display manager such that the game data transmitted to the gaming machine has already been processed by the display manager. In another example, a game server and one or more gaming machines connected to the game server over a network may include a display manager. In yet another example, a game server, one or more gaming machines, and/or a network component, such as a router, may include a display manager.

Figure 95:
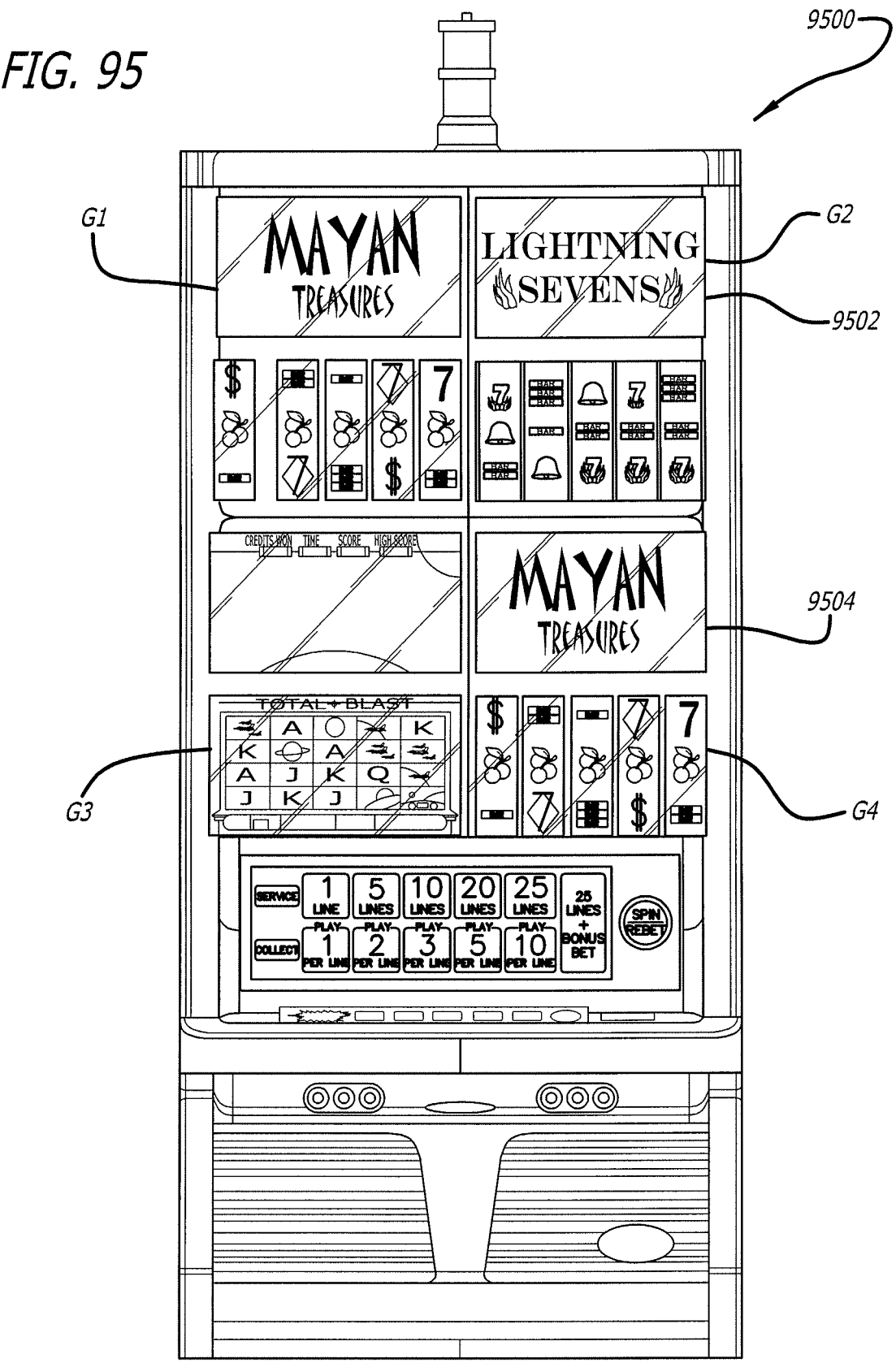
FIG. 95 illustrates four concurrent games across two monitors.

Referring now to FIG. 95, one embodiment of a Multi-Game Action Button Deck in a Concurrent Gaming System is shown. In this embodiment, a gaming machine 9500 having a first display 9502, a second display 9504, and a third display 9506 (a virtual deck) is shown. Continuing, in this embodiment, four primary games G1, G2, G 3, and G4 are displayed, individually selectable, and concurrently playable by the player. Games G1-G4 may be the same or different. The gaming machine 9500 may include a display manager to manage displaying primary games G1-G4 on the first, second, and third displays, such as the display manager disclosed in commonly owned U.S. patent application Ser. No. 12/350, 938 (now U.S. Pat. No. 8,241,123) and Ser. No. 12/350,939. The orientation of the first and second displays may vary depending on the embodiment. For example, the first display 9502 may be position above the second display 9504 in some embodiments whereas the first and second displays may be positioned side-by-side in other embodiments. In yet other embodiments, a single display may be used to display the four games or more than two displays may be used.

In the embodiment of the Multi-Game Action Button Deck in a Concurrent Gaming System that is shown, the first display 9502 presents primary games G1 and G2 having three display components having graphical data corresponding thereto, and the second display 9504 presents primary games G3 and G4 also having three display components having graphical data corresponding thereto. The first display component for each game may include graphical data such as game play graphics (e.g., slots, cards, dice, or the like) associated with the game. As depicted in FIG. 95, the first display component for each game includes video slot reels since primary games G1-G4 are video slot games. The second display component for each game may include graphical data such as game information. Game information may include instructions regarding how to play the corresponding game and other game-related information (e.g., pay line configurations, bet progression, symbol combinations, or the like). As depicted in FIG. 95, the second display component for each game may include the game title corresponding to the first display component. The third display 9506 (or virtual deck) component for each game may include graphical data for the virtual deck 9506 (e.g., virtual wager buttons, primary game graphics, secondary game graphics, or the like). FIGS. 97-100 illustrate four examples of graphical data that may be presented on the virtual deck 9506.

In other embodiments of the Multi-Game Action Button Deck in a Concurrent Gaming System, the graphical data corresponding to the first and second display components may depend on the state of the game. For example, the second display component may also include game play graphics for primary games G1-G4 or secondary games associated therewith. In yet other embodiments, one or more games G1-G4 may have less than or more than two display components (that are not the virtual deck) having graphical data corresponding thereto that are managed, or otherwise processed, by a display manager.

As disclosed herein, one or more games may be streamed to a gaming machine (or a plurality of gaming machines) over a network such as the internet, an intranet, or the like.

Figure 96:
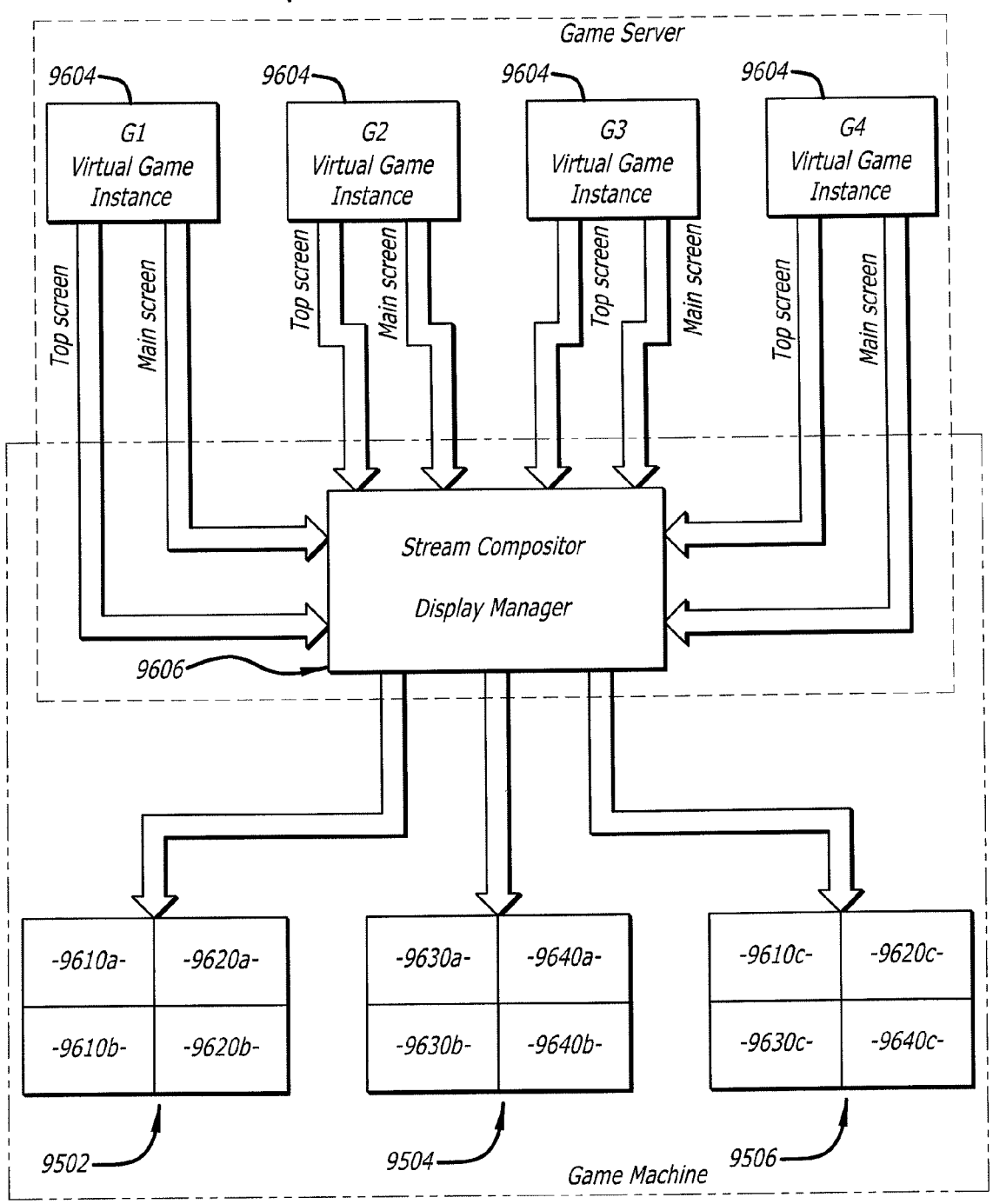
FIG. 96 illustrates a stream processing arrangement using a Display Manager.

FIG. 96 illustrates a gaming system 9600 that streams a plurality of games to gaming machine 9500 according to one embodiment. The game system 9600 includes a server 9602 that is in communication with the gaming machine 9500 (and/or other client device) over a communication network having a bandwidth. The gaming machine 9500 (and/or other client device), which is bound to receive graphical data from the server, may include a network interface, a decompression module for each display and/or each compressed data stream, video memory, a video encoder for each display, and displays 9502, 9504, and 9506. As disclosed above, display 9506 is a virtual deck.

The server 9602 may include software 9604 executable on one or more processors, one or more graphics processors, video memory associated with the one or more graphics processors, one or more compression modules, and a network interface. In other embodiments, the server 9602 streams a plurality of games to a plurality of gaming machines connected to a network.

The software 9604 may include software for one or more games. As shown in FIG. 96, the software 9604 includes gaming software for games G1-G4 (e.g., an executable for each game). In some embodiments, a processor, graphics processor, video memory, and compression module may be dedicated for each instance of gaming software. In other embodiments, one or more of the following may be dedicated for each instance of gaming software: a processor, graphics processor, video memory, and compression. For example, in some embodiments, a single processor may execute each instance of gaming software, but transmit graphical data to one or more graphics processors reserved for each of the games (i.e., four graphics processors, one for each game). Other embodiments may have different configurations of these and other components.

The one or more graphics processors receive graphical data generated as a result of the software 9604 being executed on the one or more processors. Upon receiving graphical data, at least one graphics processor renders the data into a frame of a particular format and may store the rendered frame in video memory. At least one compression module may then receive the frame for compression, and compresses (i.e., encode) the frame. Once the frame is compressed, the compressed frame may be sent to the network interface for transmission via a transport protocol over the communication network 9604 to the gaming machine 9500 (and/or other client device).

In some embodiments of the Multi-Game Action Button Deck in a Concurrent Gaming System, one or more system components may be added or removed to the embodiment described with reference to FIGS. 95 and 96. For example, in some embodiments, some or all of the graphical data generated at the server 9602 may not be compressed by a compression module prior to transmission to the gaming machine 9500. Therefore, the server may not include one or more compression modules. Otherwise stated, some or all of the graphical data may not be compressed after being rendered by a graphics processor.

In the embodiment of the Multi-Game Action Button Deck in a Concurrent Gaming System that is shown, the gaming machine 9500 includes a display manager 9606 (e.g., stream compositor). In other embodiments, the server 9602 may include one or more display managers instead of the gaming machine (e.g., one for each gaming machine). In yet other embodiments, a network component such as a router may include a display manager instead of the server or gaming machine. In yet further embodiments, the server 9602, gaming machine 9500, a network component, or combinations thereof may include a display manager.

The display manager 9606 conducts display management processing on graphical data, which may include rescaling (e.g., resizing) and repositioning (e.g., changing display area coordinates) the graphical data while maintaining the aspect ratio of the graphical data. For example, the display management processing may assemble or composite two or more streams of graphical data into a single stream of graphical data. Otherwise stated, the display management processing may take two frames of data and convert them into a single frame of data. In addition, the display manager 9606 may receive touch data (i.e., touch signals) from one or more of the displays 9502, 9504, and 9506; and route the touch data, and conduct coordinate transformations if necessary, to the processor executing the game that the touch data is associated with for further processing.

If the server 9602 transmits compressed graphical data, the gaming machine may first decompress the compressed graphical data so that uncompressed graphical data is input into the display manager 9606 for display management processing. In such an embodiment, the display manager rescales and/or repositions uncompressed graphical data.

To save valuable system resources, the server 9602 may include the display manager 9606 instead of the gaming machine. In such embodiments, uncompressed graphical data is processed by the display manager 9606 prior to the server transmitting it to the gaming machine 9500. The graphical data output by the display manager (e.g., assembled or composited game content from a plurality of games into one or more frames) may or may not be compressed prior to transmission to the gaming machine. Conducting display management processing at the server decreases the amount of data being transmitted over the network, whether the graphical data is compressed or uncompressed. Conducting display management processing at the server also decreases the amount of data being compressed at the server and decompressed at the gaming machine (if the graphical data is compressed prior to transmission over a network). In addition, the hardware in each gaming machine may be reduced. More specifically, rather than each gaming machine in the system having a display manager, the server functions as the display manager for each gaming machine.

Various embodiments of the Multi-Game Action Button Deck in a Concurrent Gaming System disclosed herein are examples and illustrate the system resources saved by including the display manager at the server side. In these embodiments, a gaming machine receives streamed game content for two different games. The streamed content may include a main display component and a virtual deck component. In a first embodiment, the gaming machine includes the display manager. In a second embodiment, the server includes the display manager. In yet another embodiment, the display manager is a separate component that is located between the server and the gaming machine.

Rather than decompressing each of the four streamed components (two for each game in this example), the display manager first assembles or composites the streams by, for example, resealing and repositioning them. After the display management processing is complete, the display management processor may output two streams. The first stream may include the main display component of both games, rescaled and repositioned such that the main display component for each game takes up one-half (this may be different based on the original size and aspect ratio of the graphical data) of the available display area, and are juxtaposed or adjacent on the main display. The second stream may include the virtual deck component of both games, rescaled and repositioned such that the virtual deck component for each game takes up one-half (this may be different based on the original size and aspect ratio of the graphical data) of the available display area, and are juxtaposed or adjacent on the virtual deck 9506.

The two streams output by the display manager may be decompressed by the gaming machine. In such an embodiment, the processing resources have effectively been reduced by 50% because only two streams need to be decompressed, as opposed to four streams.

One aspect of the Multi-Game Action Button Deck in a Concurrent Gaming System enables players to customize their concurrent gaming experience, making variations of bets to one or more games to suit their current betting strategy, without the limitation of requiring the same number of paylines and progression of paylines throughout the games being concurrently played. Another aspect of the Multi-Game Action Button Deck in a Concurrent Gaming System enables concurrent play of less than all of the games displayed at once (which is not typically possible with previous implementations). Additionally, the Multi-Game Action Button Deck in a Concurrent Gaming System enables different levels of bets for each game to be played. In still another aspect, the Multi-Game Action Button Deck in a Concurrent Gaming System enables a player to set the total number of credits to be played during a session and the ratio for each game (e.g., each of four games a 25%, one game at 70% and the another three games at 10% each, and the like).

Continuing, some embodiments of the Multi-Game Action Button Deck in a Concurrent Gaming System enable "gesturing" on the deck by the player to select games or other gaming parameters (e.g., a player may cross out a game that he does not want to play by drawing an "X" across the game with his finger, or the player may make swiping motions to select the games to be played, and the like). In some embodiments, the multiple games are synchronized with each other and in other embodiments the games are not synchronized with each other. In this regard, the multiple games may be initiated at the same time in some embodiments, and the multiple games may be initiated at different times in other embodiments.

Referring to the embodiment of the Multi-Game Action Button Deck in a Concurrent Gaming System shown in FIGS. 95 and 96, execution of the software for games G1-G4 generates separate streams of graphical data for each of the displays (i.e., the first display 9502, the second display 9504, and the virtual deck 9506). Without the display manager 9606, the gaming machine 9500 may receive four different streams of graphical data calling for the same graphical real estate (e.g., the entire display). Accordingly, the display manager 9606 manages the graphical real estate so that more than one game can be presented to the user at the same time, using one or more of the displays.

The display manager 9606 may receive graphical data streams 9610a, 9610b, and 9610c that are respectively associated with the first, second, and third display components of game G1. Without the display manager, graphical data streams 9610a, 9610b, and 9610c may, for example, be destined to be displayed on the entire first display 9502, the entire second display 9504, and the entire virtual deck 9506, respectively. The display manager 9606 may also receive graphical data streams 9620a, 9620b, and 9620c that are respectively associated with the first, second, and third display components of game G2. Without the display manager, graphical data streams 9620a, 9620b, and 9620c may, for example, be destined to be displayed on the entire first display 9502, the entire second display 9504, and the entire virtual deck 9506, respectively. The display manager 9606 also receives graphical data streams 9630a, 9630b, and 9630c that are respectively associated with the first, second, and third display components of game G3. Without the display manager, graphical data streams 9630a, 9630b, and 9630c may, for example, be destined to be displayed on the entire first display 9502, the entire second display 9504, and the entire virtual deck 9506, respectively. The display manager 9606 also receives graphical data streams 9640a, 9640b, and 9640c that are respectively associated with the first, second, and third display components of game G4. Without the display manager, graphical data streams 9640a, 9640b, and 9640c may, for example, be destined to be displayed on the entire first display 9502, the entire second display 9504, and the entire virtual deck 9506, respectively.

Figure 97:
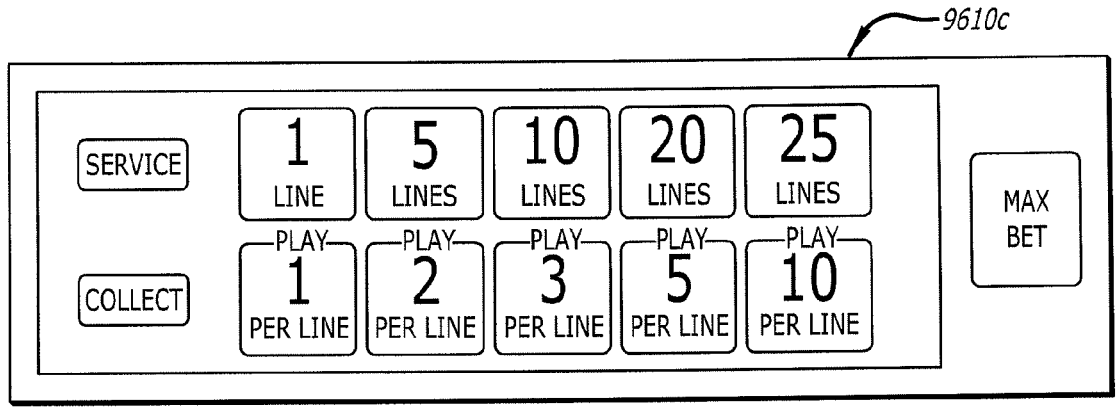
FIG. 97 illustrates an example of an existing IDeck configuration for game one and four (Mayan Treasures).

In some embodiments of the Multi-Game Action Button Deck in a Concurrent Gaming System, FIGS. 97-100 may illustrate examples of graphical data associated with graphical data streams 9610c, 9620c, 9630c, and 9640c presented on the virtual deck 9506. In one embodiment, games G1 and G3 may be different, independent instances of the same primary game. The server 9602 may execute the software for games G1 and G3 that results in the server outputting graphical data streams 9610c and 9630c. FIG. 97 shows an example of the graphical data stream 9610c or 9630c as it would be presented on the virtual deck 9506 if the gaming machine only presented game G1 or G3. Since games G1 and G3 are the same game in this embodiment, the same figure is used to illustrate two different streams of graphical data.

Figure 98:
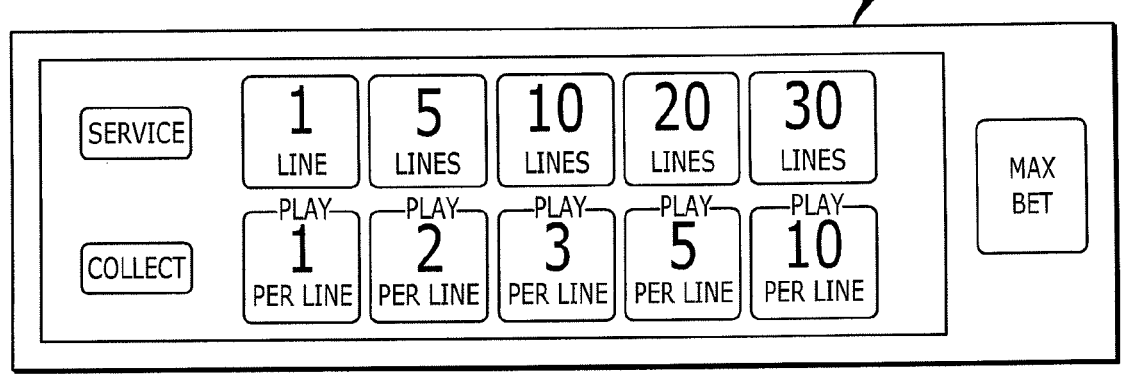
FIG. 98 illustrates an example of an existing IDeck configuration for game two (Lightning Sevens).
Figure 99:
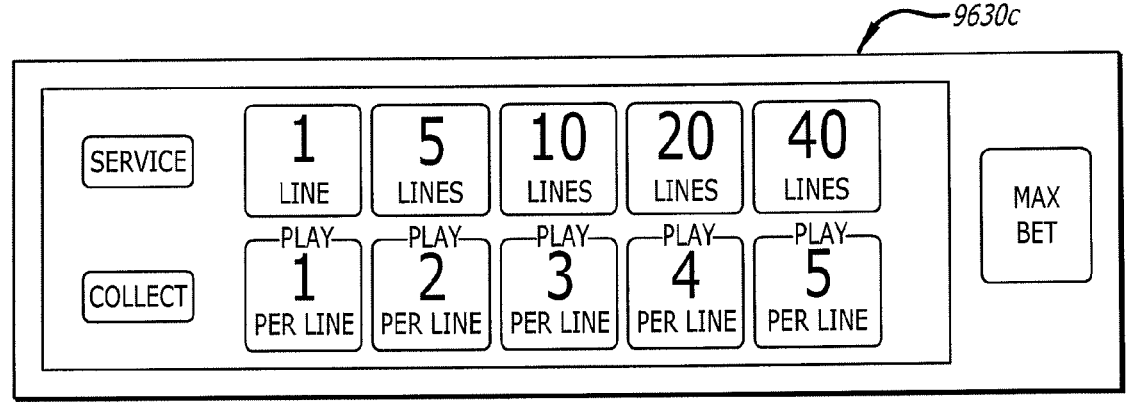
FIG. 99 illustrates an example of an existing IDeck configuration for game three (Total Blast).

The server 9602 may execute the software for game G2, which results in the server outputting graphical data stream 9620c. FIG. 98 shows an example of the graphical data stream 9620c as it would be presented on the virtual deck 9506 if the gaming machine only presented game G2. The server 9602 may execute the software for game G4, which results in the server outputting graphical data stream 9640c. FIG. 99 shows an example of the graphical data stream 9630c as it would be presented on the virtual deck 9506 if the gaming machine only presented game G3. FIGS. 97-99 are examples of selectable pay line and selectable bet configurations on the Multi-Game Action Button Deck in a Concurrent Gaming System.

Figure 100:
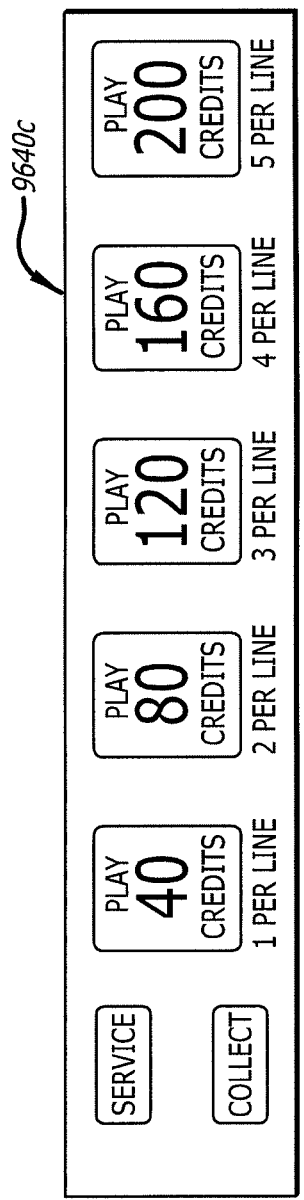
FIG. 100 illustrates an alternative existing iDeck configuration for game four (Total Blast).

Other embodiments may generate different graphical data. For example, FIG. 100 shows an alternative graphical configuration for game G4 that may be presented on the virtual deck 9506 if the gaming machine only presented game G4. More specifically, FIG. 100 illustrates an example of a max pay line and selectable bet configuration that requires the player of game G4 to play all play lines but enables the player to select his or her bet (i.e., credits per pay line).

In this embodiment of the Multi-Game Action Button Deck in a Concurrent Gaming System, games G1 and G3 may have 25 pay lines with the same pay line progression (1, 5, 10, 20, or 25 lines), minimum bet, maximum bet, and bet progression (1, 2, 3, 5, or 10 credits per line). Game G2 may have 30 pay lines with a pay line progression of 1, 5, 10, 20, or 30 lines, and a bet progression of 1, 2, 3, 5, or 10 credits per line. Game G4 may have 40 pay lines with a pay line progression of 1, 5, 10, 20, or 40 lines, and a bet progression of 1, 2, 3, 4, or 5 credits per line. In this embodiment, games G1 and G3 have a maximum bet of 250 credits (25 lines×10 credits per line), game G2 has a maximum bet of 300 credits (30 lines×10 credits per line), and game G4 has a maximum bet of 200 credits (40 lines×5 credits per line). In other embodiments, one or more games may be the same or different based on, for example, credit denomination, minimum bet, maximum bet, bet progression, themes, titles, game cycle, frame rate, number of pay lines, pay line progression, or the like.

Referring back to FIG. 96, the display manager 9606 may, for example, rescale and reposition one or more of the graphical data streams while maintaining the aspect ratio of each graphical data stream. In some embodiments, the aspect ratio of one or more graphical data streams may not be maintained. In the embodiment shown, the display manager has resealed and repositioned graphical data streams 9610a, 9610b, 9620a, and 9620b into a single graphical data stream that is transmitted to the first display 9502. Accordingly, instead of games G1 and G2 calling for the same graphical real estate on the first and second displays, the display manager has resized and repositioned both games such that the first and second display components for each game take up one-fourth (this may be different based on the original size and aspect ratio of the graphical data) of the available display area, and are juxtaposed or adjacent on the first display. The display manager has also resealed and repositioned graphical data streams 9630a, 9630b, 9640a, and 9640b into a single graphical data stream that is transmitted to the second display 9504.

Accordingly, instead of games G3 and G4 calling for the same graphical real estate on the first and second displays, the display manager has resized and repositioned both games such that the first and second display components for each game take up one-fourth (this may be different based on the original size and aspect ratio of the graphical data) of the available display area, and are juxtaposed or adjacent on the second display. The display manager has also resealed and repositioned graphical data streams 9610c, 9620c, 9630c, and 9640c into a single graphical data stream that is transmitted to the virtual deck 9506. Accordingly, instead of games G1-G4 calling for the same graphical real estate on the virtual deck 9506, the display manager has resized and repositioned the third display components of games G1-G4 such that the third display components for each game take up one-fourth (this may be different based on the original size and aspect ratio of the graphical data) of the available display area, and are juxtaposed or adjacent on the virtual deck 9506.

In other embodiments of the Multi-Game Action Button Deck in a Concurrent Gaming System, the display manager may rescale and/or reposition one or more graphical data streams differently than disclosed herein. For example, the display manager may assemble or composite one or more streams of graphical data such that a single display presents one, two, three, four, or more display components from one or more games. In one embodiment, the display manager may assemble or composite graphical data streams 9620*a*, 9620*b*, 9630*a*, 9630*b*, 9640*a*, and 9640*b* into a single graphical data stream that is transmitted to the first display 9502 (e.g. top display). Games G2, G3, and G4 may be vertically displayed such that game G2 is displayed on the left, game G3 is displayed in the middle, and game G4 is displayed on the right. The display manager may also assemble or composite graphical data streams 9610*a* and 9610*b* into a single graphical data stream that is transmitted to the second display 9504 (e.g. main display).

Figure 101:
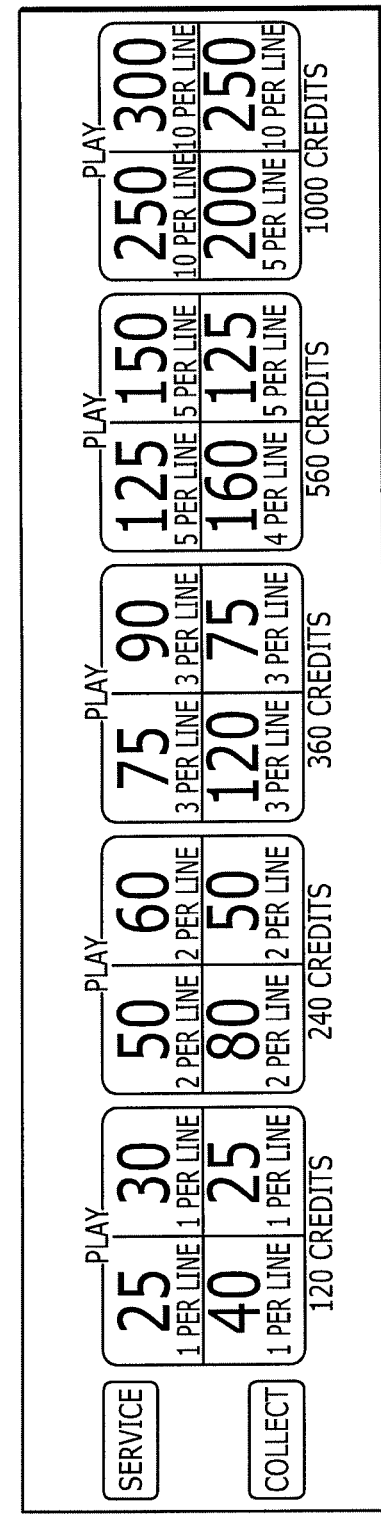
FIG. 101 illustrates an example of a Multi-Game Action Button Deck for four concurrent games.

FIG. 101 shows the basic arrangement of a Multi-Game Action Button Deck in a Concurrent Gaming System for concurrent wagering. This embodiment of the Multi-Game Action Button Deck 1010 has the same size and aspect ratio as FIG. 97-FIG. 100. As with FIG. 100, there are five buttons with which to place wagers on the Multi-Game Action Button Deck 1010. Each of these buttons includes four segments, corresponding to the games being concurrently played. In this embodiment of the Multi-Game Action Button Deck in a Concurrent Gaming System, the arrangement of games on the gaming machine displays is mirrored in the arrangement of segments within the Action Buttons. So in this embodiment, the line configuration for the "Mayan Treasures" game is reflected in the top left and bottom right segments of each Action Button, the line configuration for the "Lightning Sevens" game is reflected in the top right segment, and the line configuration for the "Total Blast" game is reflected in the bottom left segment.

Each individual Action Button is composed of the four bets that are found in the corresponding button shown in FIG. 100. Accordingly, pressing the left most Action Button in FIG. 100 causes a bet of 40 lines/1 credit to be placed on the Total Blast game. Similarly, pressing the left most Action Button in FIG. 101 also causes a bet of 40 lines/1 credit to be placed on the Total Blast game, bets of 25 lines/1 credit to be placed on both instances of the Mayan Treasures game, and bets 30 lines/1 credit to be played on the Lightning Sevens game.

In this scenario, the total bet would therefore be 40+25+25+30=120 credits, which is shown on the Action Button for player reference. In another embodiment of the Multi-Game Action Button Deck 1010 in a Concurrent Gaming System, the contents of the Action Button (which in the examples shown includes all information relevant to a bet) are replaced with a total value such as "Bet 120 credits." In this embodiment of the Multi-Game Action Button Deck 1010 in a Concurrent Gaming System, there would preferably be a touchscreen button available that would enable the player to toggle between a "more information" screen that shows all data, and a "less information" screen that shows just the betting information, e.g., "Bet 120 credits." Continuing, the progression of bets per line is reflected across the five buttons, e.g., the Mayan Treasure game and the Lightning Sevens game have a progression of 1-2-3-5-10 per line while the Total Blast game has a progression of 1-2-3-4-5 per line. When a player changes one or more of the games to be played, the values on the Multi-Game Action Button Deck 1010 reflect this change. Accordingly, the Multi-Game Action Button Deck 1010 allows any combination of any number of line/bet combinations to be played concurrently.

Figure 102:
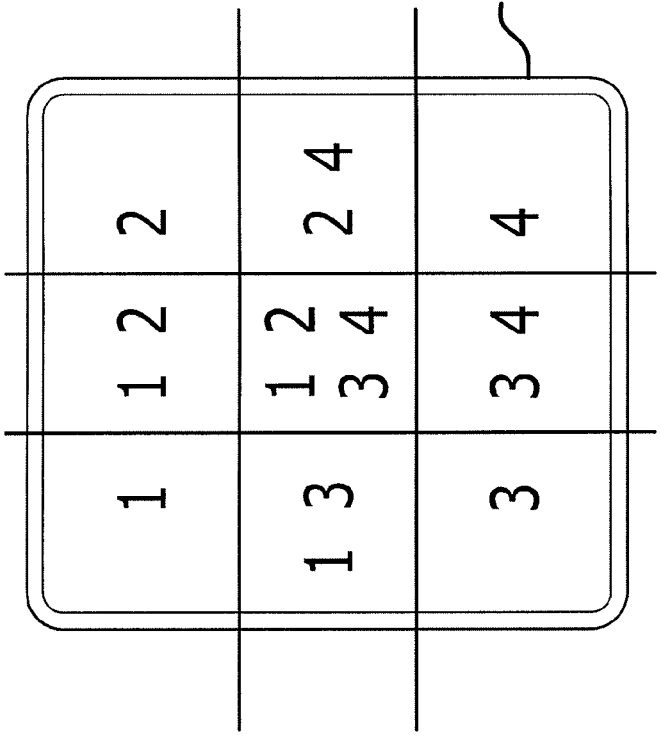
FIG. 102 illustrates touch areas for combined bets on multiple game play combinations.

FIG. 102 shows a further enhancement to the Multi-Game Action Button Deck 1010 in a Concurrent Gaming System. Conventional concurrent wager implementations do not allow a player to pick and choose precisely which game(s) they play for a particular spin. At best, players may be able to choose to play between 1 and 4 games, with the subset of eligible games fixed by the game machine software. In this embodiment of the Multi-Game Action Button Deck in a Concurrent Gaming System, the button on the Multi-Game Action Button Deck 1010 enables a player to determine which games are played. In one embodiment, concurrent games are numbered 1-4. In this embodiment, game 1 and 4 are the Mayan Treasures game, game 2 is the Lightning Sevens game, and game 3 is the Total Blast game.

Figure 103:
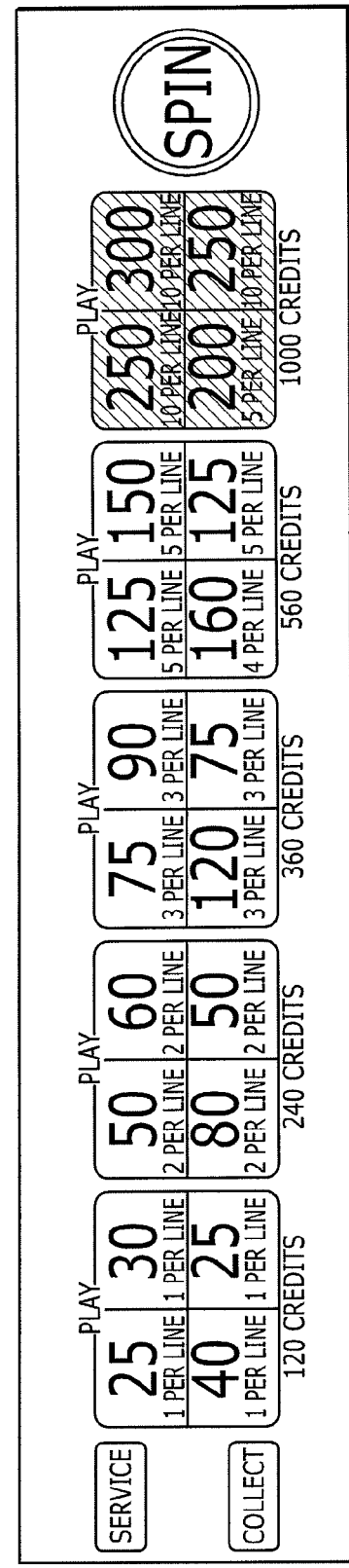
FIG. 103 illustrates the result of a touch in the center region of the Multi-Game Action Button Deck.
Figure 104:
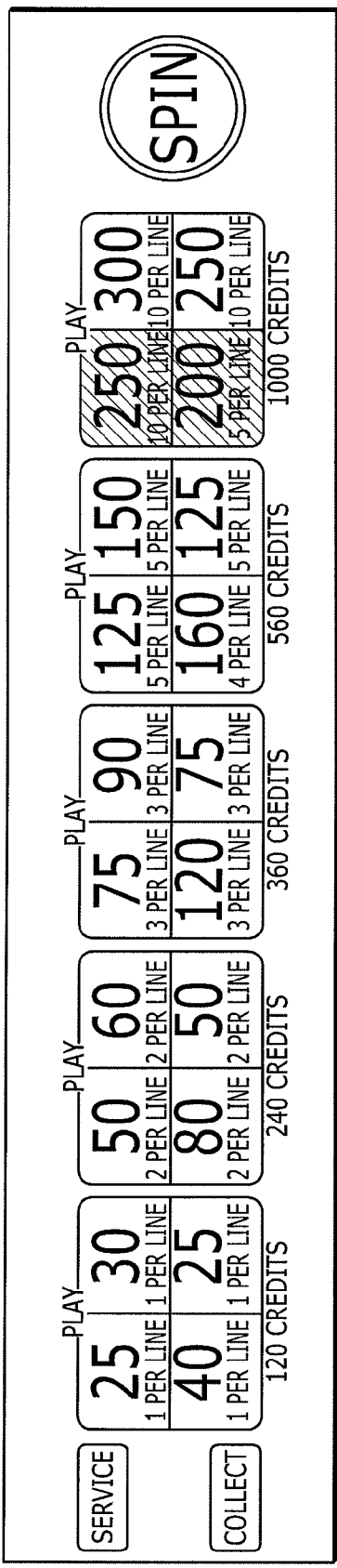
FIG. 104 illustrates the result of touch in the left-center region of the Multi-Game Action Button Deck.
Figure 105:
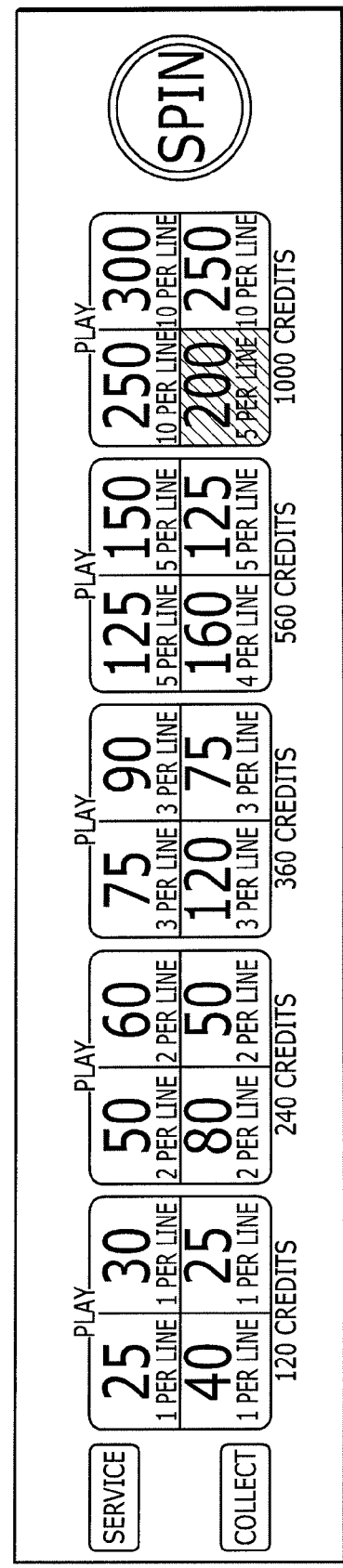
FIG. 105 illustrates the result of touch in the bottom left corner region of the Multi-Game Action Button Deck.

If a player touches the center of the Action Button 1020, which is shown within the black bars in FIG. 102 with the numbers "1 2 3 4," all 4 games would be immediately wagered upon. The result of this action is shown in FIG. 103. If, instead, the player were to touch the middle of the Action Button 1020, but towards the left hand side, then only games 1 and 3 would be wagered upon. The result of this action is shown in FIG. 104. Finally, if the player were to touch the bottom-left corner of the Action Button 1020, only game 3 would be wagered upon. The result of this action is shown in FIG. 105.

In one embodiment of the Multi-Game Action Button Deck 1010 in a Concurrent Gaming System, these rules are used across all five of the Action Buttons, giving the player 45 possible ways to wager at any one time. Since games may run asynchronously, it is possible for a player to start one game, and then while that game is playing, start another game. While a game is in progress, that specific game instance may not be restarted again by pressing the Action Button or a touch area that would normally commence the game.

Figure 106:
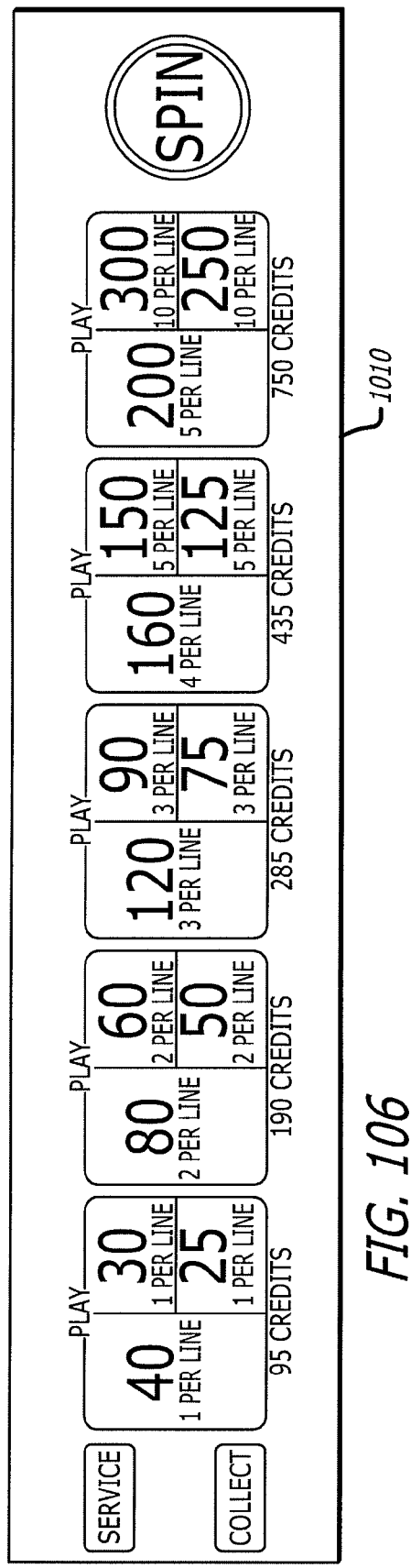
FIG. 106 illustrates an example of the Multi-Game Action Button Deck for three concurrent games.

FIG. 106 shows an embodiment of a Multi-Game Action Button Deck 1010 in a Concurrent Gaming System in which there are three games rather than four games running on the cabinet displays. Notably, in some embodiments, the arrangement of each Action Button mirrors the arrangement of games on the display. Additionally, concurrent games may be formatted to fit the displays of the gaming machine, and thus, be reflected in the Multi-Game Action Button Deck 1010.

Figure 107:
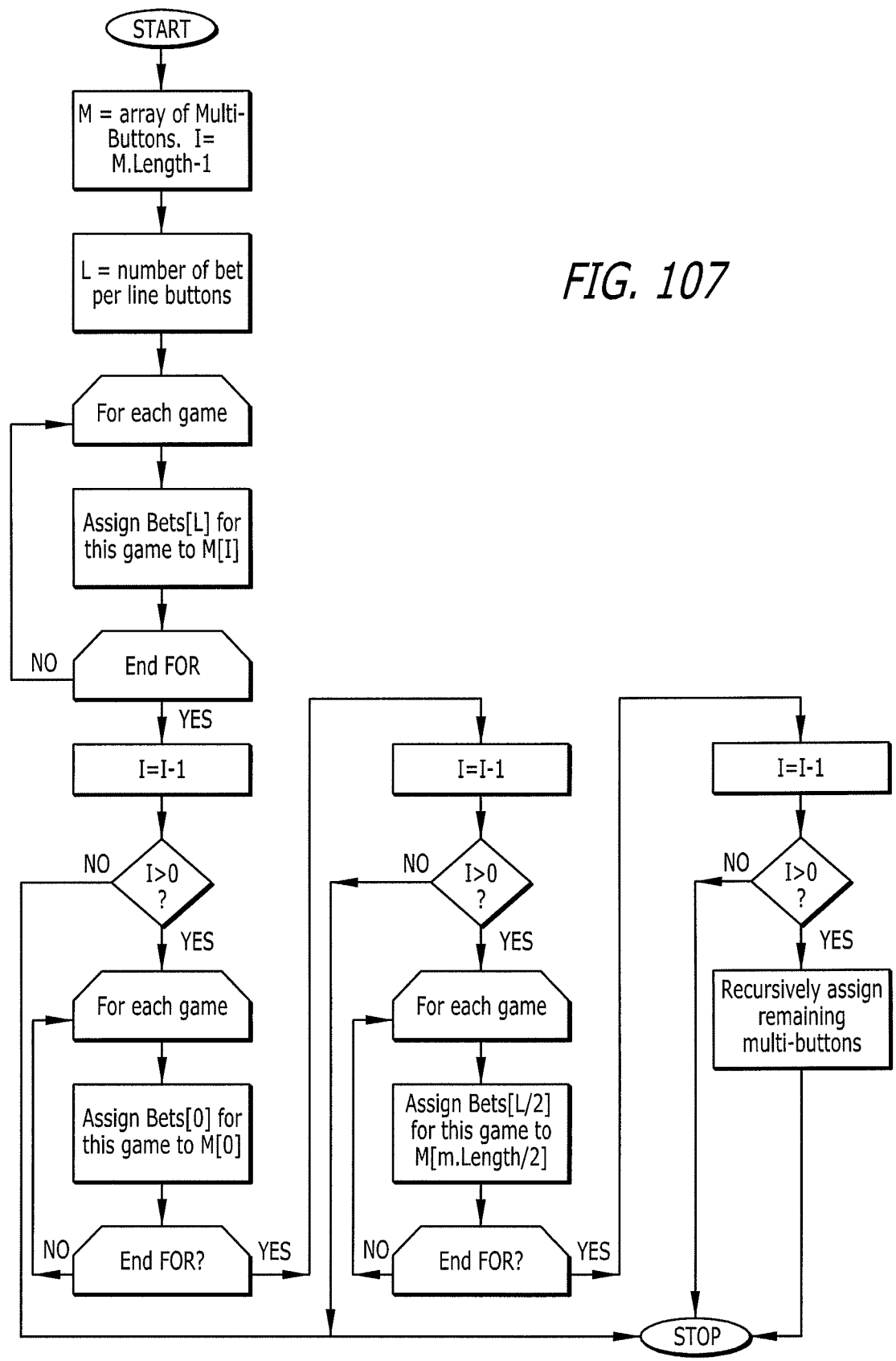
FIG. 107 illustrates a process to assign bet levels to multi action buttons on the Multi-Game Action Button Deck.

Additionally, the Multi-Game Action Button Deck in a Concurrent Gaming System does not require the same number of Multi-Game Action Buttons as compared to the original Action Buttons shown in FIG. 100. FIG. 107 shows a method of assigning original action button "bet per line" values to Multi-Action Buttons. This method includes the following steps: (1) assigning the maximum bet (so if only one Multi-Action Button is available it takes the maximum bet of each of the concurrent games); (2) assigning the minimum bet; (3) assigning a midpoint bet; and (4) recursively assigning any buttons remaining (i.e., the midpoint between the midpoint and the maximum is assigned to an action button, followed by the midpoint between the midpoint and the minimum. If more than five buttons were employed, further recursion would be used.).

FIG. 108 illustrates a further enhancement to the Multi-Game Action Button Deck 1010 in a Concurrent Gaming System. In FIG. 108, there are three Multi-Game Action Buttons rather than five Multi-Game Action Buttons. In addition to these three Multi-Game Action Buttons, there are also six "edit" buttons, which allow a player to modify a Multi-Action Button.

Figure 111:
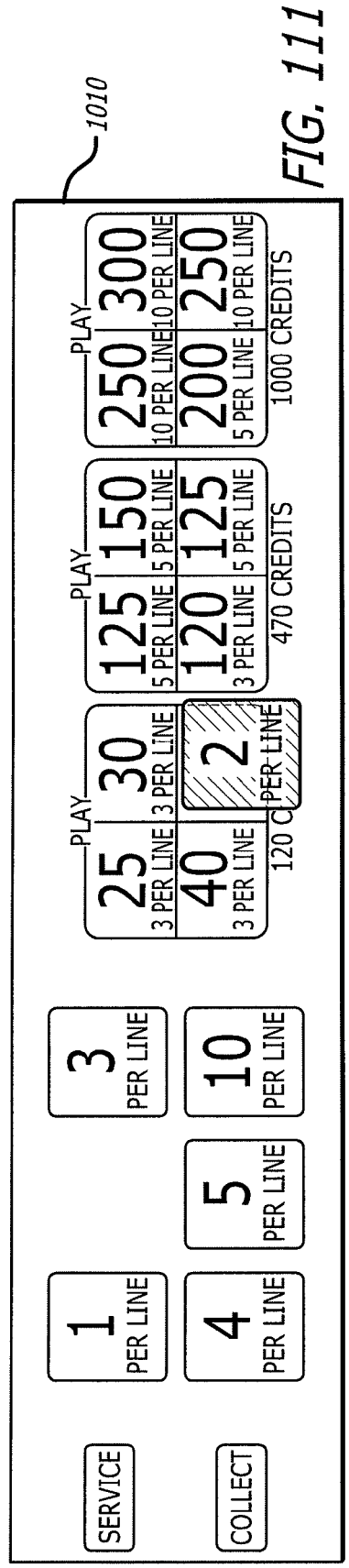
FIG. 111 illustrates a drop of an editing button icon on a multi-action button on the Multi-Game Action Button Deck.
Figure 112:
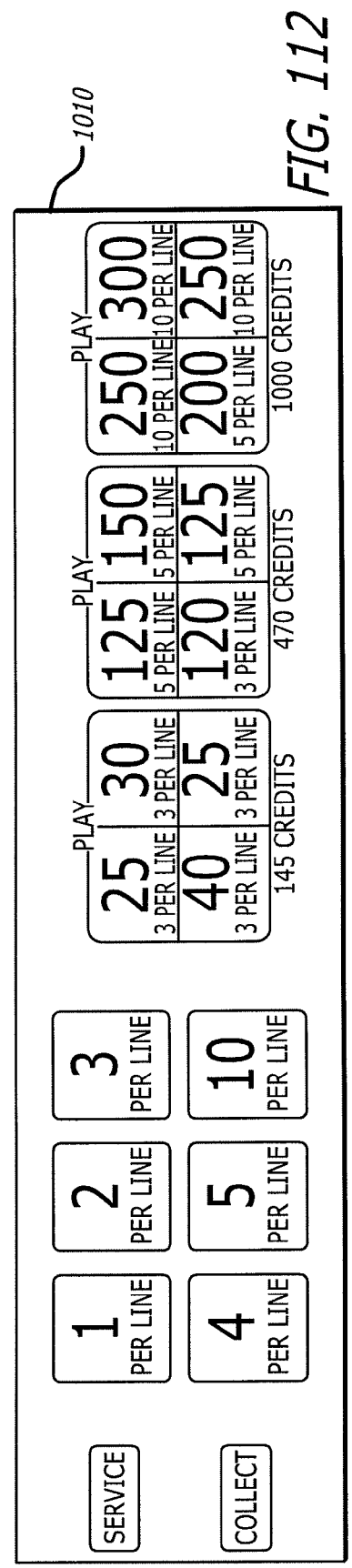
FIG. 112 illustrates the result of drop of an editing icon on a multi-action button on the Multi-Game Action Button Deck.

FIG. 109-FIG. 112 illustrate examples of how a player may edit a Multi-Game Action Button Deck 1010 in a Concurrent Gaming System. In this embodiment, a player wishes to modify the left most Action Button to increase the bet per line for game 4, the Mayan Treasures game, to 2 per line from 1 per line. Initially, the player touches the "2 per line" icon, as shown in FIG. 109. In one embodiment, the player keeps their finger on the touchscreen and moves their finger across to the bottom right segment of the left most action button, as shown in FIG. 110 and FIG. 111. The player then removes their finger from the touchscreen, which causes the "2 per line" to be applied to the relevant segment, as shown in FIG. 112. The new total bet for this Multi-Action Button is also updated to reflect the change.

In an alternative embodiment, once the player initially touches the "2 per line" icon, all of the Action Buttons become inactive for wagering purposes and a subsequent touch of an Action Button causes the "2 per line" to be applied to wherever the touch occurs.

These embodiments of the Multi-Game Action Button Deck 1010 in a Concurrent Gaming System disclosed herein have a customization ability that enables a player to quickly configure their preferred betting strategy, giving them maximum flexibility but without requiring complex interaction during normal play. In some embodiments, this betting strategy configuration state may be saved in a player tracking system (or other system), along with the current active games, when a player ends their session so that the betting strategy configuration may be retrieved when the player returns for subsequent game play.

Figure 113:
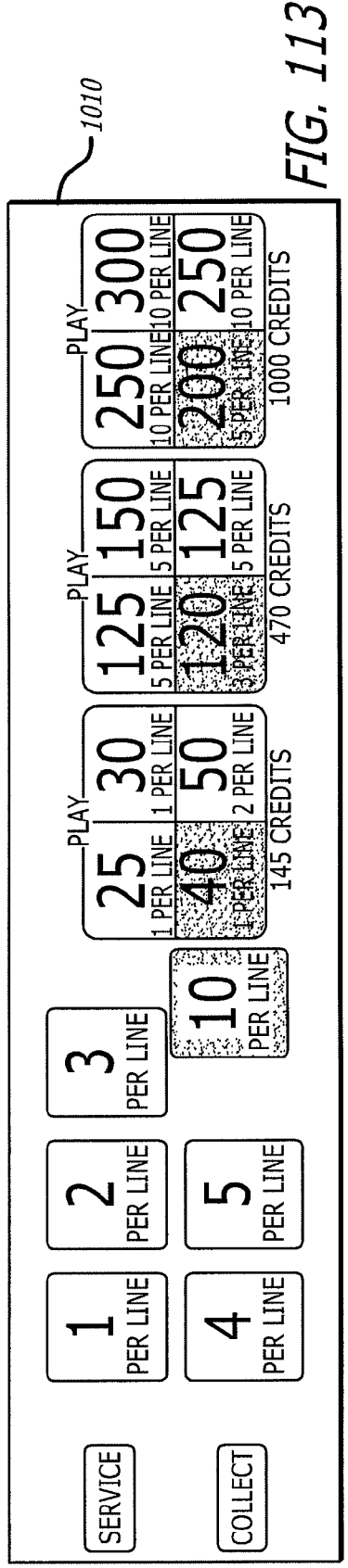
FIG. 113 illustrates a drag of an editing icon with unavailable drop-zones identified to user on the Multi-Game Action Button Deck.

FIG. 113 illustrates an embodiment of the Multi-Game Action Button Deck 1010 in a Concurrent Gaming System in which a player tries to apply a bet of "10 per line" to the Multi-Game Action Buttons. Since the maximum bet for the Total Blast game is "5 per line," the segments representing the Total Blast game are de-emphasized, to indicate to the player that dropping the "10 per line" icon on these segments will have no effect.

Figure 114:
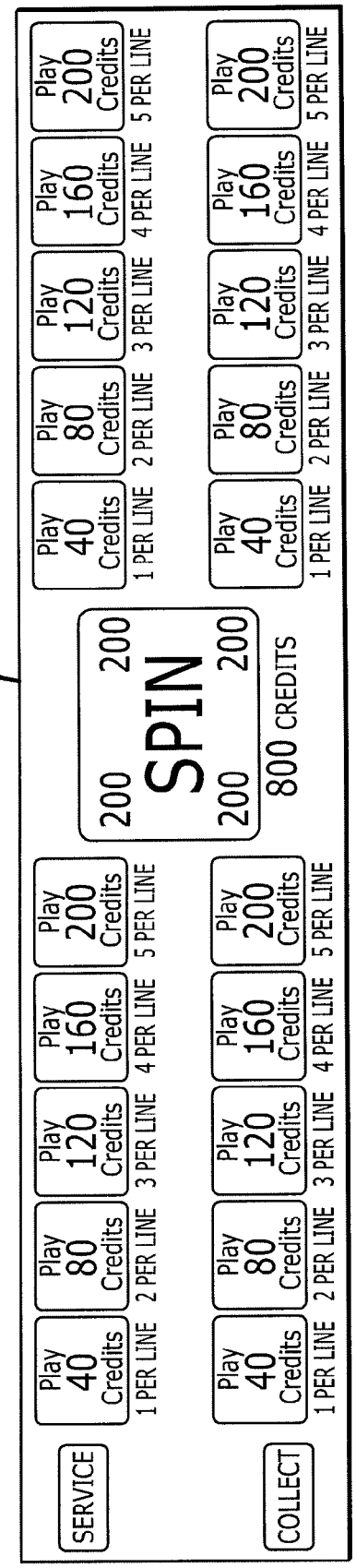
FIG. 114 illustrates an alternative arrangement of four iDeck (virtual button deck) displays.

Continuing, FIG. 114 shows an alternative embodiment of the Multi-Game Action Button Deck 1010 in a Concurrent Gaming System in which each of the virtual button deck streams (taken from FIG. 100) from the concurrently played games are rendered in the same arrangement as the games are displayed in the cabinet. In this embodiment, only one extra button (e.g., Spin) is used. This is the only button that causes a wager to be made in this embodiment. Notably, this "Spin" button may also be segmented, as shown in FIG. 102, to enable players to play less than all four games at once. In the example shown in FIG. 114, all four concurrent games are the Total Blast game; however, any of the game themes are eligible to be played. To modify a bet, a player must touch the smaller "play x credits" button, which does not cause the game to spin, as yet, but does cause the relevant bet amount in the corresponding segment of the "Spin" button to be updated. In addition, the text underneath the "Spin" button is updated to reflect the new total amount of bet that would be wagered once the "Spin" button is pressed.

Figure 115:
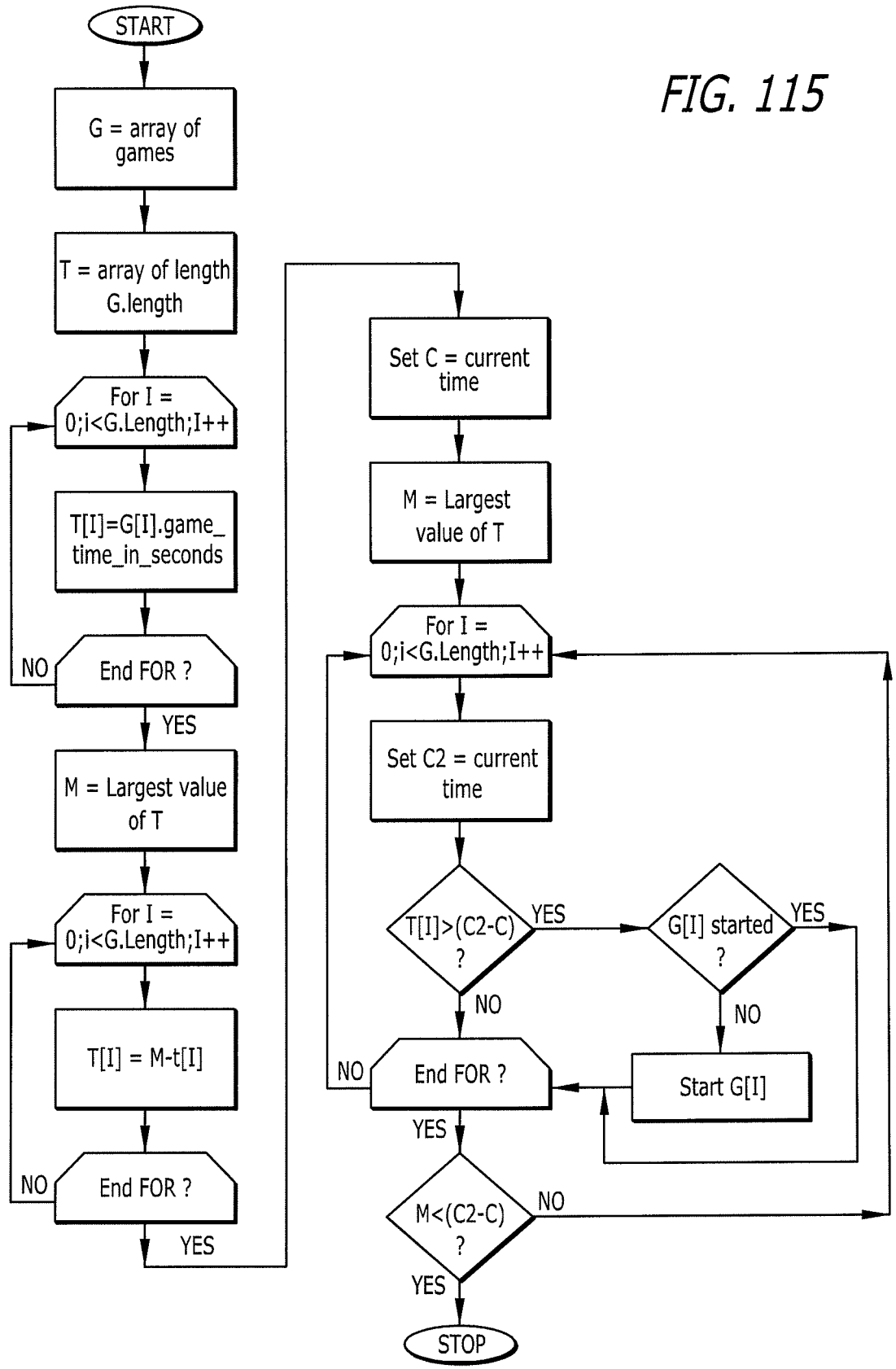
Figure 116:
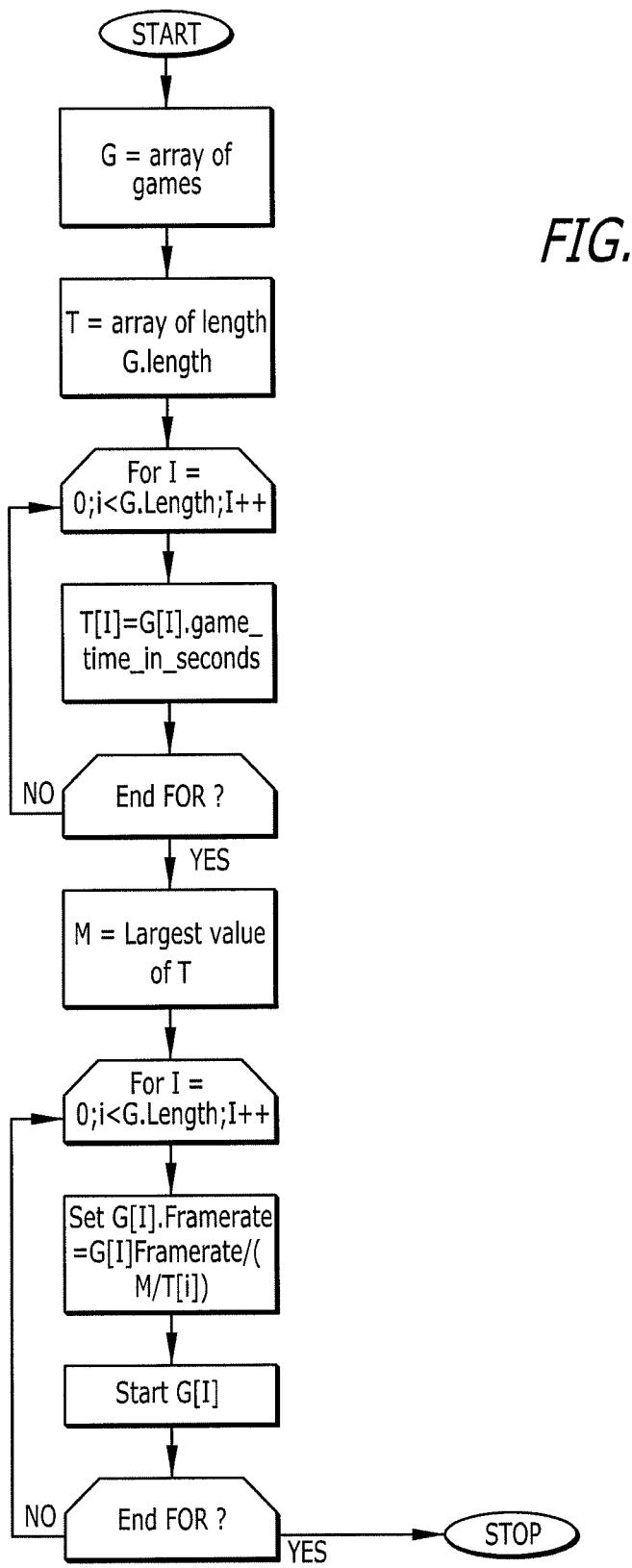

FIG. 115 and FIG. 116 show another aspect of one embodiment of the Multi-Game Action Button Deck in a Concurrent Gaming System. In this regard, an issue that has been problematic in the past with respect to having multiple different games played simultaneously is that each of these games was not originally designed to co-exist in a concurrent multi-play environment. For example, each game may have a different game cycle time. In an embodiment where there are two active games, with game A having a cycle time of four seconds and game B having a cycle time of only three seconds, there is a delay of a full second of time after game A finished before B finished. This delay may lead to player confusion and frustration.

Preferred embodiments of the Multi-Game Action Button Deck in a Concurrent Gaming System employ two approaches to address this issue. In FIG. 115, a first process employed by the Multi-Game Action Button Deck in a Concurrent Gaming System is shown that determines the game cycle length of each game to be played. This game cycle length information may be static (i.e., the game cycle length does not vary with respect to the game result), or this game cycle length information may be determined at each spin time if game cycle time was variable (i.e., the game cycle length varies with respect to the game result). An example of such a variable game cycle length would be if "anticipatory" reels are used where the $4^{th}$ and $5^{th}$ reels spin longer if a certain combination of symbols has been hit on reels 1-3.

In this process employed by the Multi-Game Action Button Deck in a Concurrent Gaming System, starting time offsets are created for each game to be simultaneously played by subtracting each game cycle time from the largest cycle time in the array (i.e., the starting time offset for one entry will always be zero). Accordingly, the process iteratively starts each game, waiting until each offset time has been met. The effect of this process from a player's perspective would be one game starting, followed by other games starting, until all of the games are active. In this scenario, all of the games finish at the exact same time.

Referring now to FIG. 116, an alternative is shown to the process of FIG. 115. In FIG. 116 the process employed by the Multi-Game Action Button Deck in a Concurrent Gaming System relies on the concurrent gaming system being able to manipulate the frame rate of display of each game. In some embodiments of the concurrent game system, this functionality is implemented at a low level without affecting game logic or existing approved binaries of games.

Continuing, in FIG. 116, each game cycle time is again determined; however, each game is started at the same time. In these embodiments, games with shorter cycles are slowed down, such that all concurrent game cycle times become the same length. Alternatively, all game cycle times may be adjusted to the shortest length of time by speeding up the frame rates of games with slower game cycles to match the fastest game cycle time.

When the embodiments of the Multi-Game Action Button Deck in a Concurrent Gaming System shown in FIG. 115 and FIG. 116 are implemented, the Multi-Game Action Button Deck enables the setting of limiting factors on starting time offsets, as well as frame rate increases or decreases (e.g., such as in the instances where game cycle times become much larger). An example of such a larger game cycle time would be when a dynamic game cycle adjustment is used and a particular game has a free game scenario. In this embodiment, it would not be preferable to slow down the other games, or start the other games later by significant amounts.

In some preferred implementations of the Multi-Game Action Button Deck in a Concurrent Gaming System, arbitrary concurrent games can be played, not limited to a particular line/bet configuration. Additionally, in some embodiment, the number of concurrent games to be played is not fixed. In another aspect, the logical arrangement of Action Buttons reflects the game arrangement on display(s). In other embodiments, players may play less than all of the concurrent games at one time. In still other embodiments, players may start games asynchronously. In yet other embodiments, players may customize the Action Buttons to their particular betting strategy. Finally, in some embodiments, games may finish concurrently after being started at staggered starting times or different frame rates. The current preferred implementation uses a standard Alpha 2 cabinet with a virtual button deck, and streaming technology such as H.264 video encoding to deliver game content from virtual machine instances running on a server.

Some preferred implementations of the Multi-Game Action Button Deck in a Concurrent Gaming System include the following elements: (1) Touchscreen buttons to initiate wagering on multiple games at once; (2) Buttons segmented in same arrangement as concurrent games are displayed; (3) Multiple touch areas of buttons control different combinations of games; (4) User configuration of buttons via drag and drop; and (5) Alignment of different game cycle times so that game cycle end times coincide.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and/or firmware would be well within the skill of one of ordinary skill in the art in light of this disclosure.

When logic is implemented as software and stored in memory, one skilled in the art will appreciate that logic or information can be stored on any computer readable medium for use by or in connection with any computer and/or processor related system or method. In the context of this document, a memory is a computer readable medium that is an electronic, magnetic, optical, or other another physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer readable medium" can be any means that can store, communicate, propagate, or transport the program associated with logic and/or information for use by or in connection with the instruction execution system, apparatus, and/or device. The computer readable medium can be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer readable medium, could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the above U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 60/130,368, filed Apr. 21, 1999; Ser. No. 60/259,658, filed Jan. 4, 2001; Ser. No. 60/296,866, filed Jun. 8, 2001; Ser. No. 60/300,253, filed Jun. 21, 2001; Ser. No. 60/716,538, filed Sep. 12, 2005; Ser. No. 60/791,549, filed Apr. 12, 2006; Ser. No. 60/791,554, filed Apr. 12, 2006; Ser. No. 60/791,398, filed Apr. 12, 2006; Ser. No. 60/791,513, filed Apr. 12, 2006; and Ser. No. 60/808,161, filed May 23, 2006; and U.S. nonprovisional patent application Ser. No. 09/474,858, filed Dec. 30, 1999, and issued as U.S. Pat. No. 6,460,848 on Oct. 8, 2002; Ser. No. 09/849,456, filed May 4, 2001, and issued as U.S. Pat. No. 6,652,379 on Nov. 25, 2003; Ser. No. 09/790,480, filed Feb. 21, 2001, and issued as U.S. Pat. No. 6,685,568 on Feb. 3, 2004; Ser. No. 10/017,276, filed Dec. 13, 2001; Ser. No. 10/885,875, filed Jul. 7, 2004; Ser. No. 10/902,436, filed Jul. 29, 2004; Ser. No. 10/981,132, filed Nov. 3, 2004; Ser. No. 10/934,785, filed Sep. 2, 2004; and Ser. No. 10/823,051, filed Apr. 13, 2004, filed are incorporated herein by reference, in their entirety.

From the foregoing, it will be appreciated that, although specific embodiments have been described herein for purposes of illustration, various modifications may be made without deviating from the spirit and scope of the teachings. Accordingly, the claims are not limited by the disclosed embodiments.

What is claimed:

1. A multi-game action button deck in a concurrent gaming system, the system comprising:
   a gaming machine in communication with a game server via a network, wherein the gaming machine includes one or more display areas;
   a display manager configured to display content related to one or more games to be played on the display areas of the gaming machine, wherein the content includes a first display area, a second display area, and a virtual button deck display area associated with the play of each game of the one or more games;

wherein the content includes streaming video content, and wherein the display manager resizes and repositions the streaming video content on the display areas of the gaming machine depending on the game themes that are selected and the number of games that are selected;

a multi-game action button displayed on the virtual button deck, wherein the multi-game action button is segmented in same arrangement as games to be concurrently played are displayed, wherein the multi-game action button has multiple touch areas to control different combinations of games, and wherein the system enables alignment of different game cycle times so that game cycle end times coincide; and a touch sensor configured to detect touch event information on touchscreen buttons to initiate wagering on multiple games at once, wherein the touch sensor sends the touch event information to the display manager, wherein the display manager conducts coordinate transformations and routes the touch event information to a processor executing the game;

wherein the touch sensor is configured to detect multiple touch gestures, wherein gestures include simultaneous touches by multiple fingers, consecutive touches by a single finger, touching and sliding of a finger, touching and sliding of multiple fingers, or combinations thereof.

2. The system of claim 1, wherein the display of the gaming machine is divided into four quadrants for potential concurrent game play of a separate game in each quadrant.

3. The system of claim 1, wherein the four quadrants for potential concurrent game play each receive a game to be displayed from separate streams of content.

4. The system of claim 1, wherein the games that are concurrently played are each separate game themes.

5. The system of claim 1, wherein the games that are concurrently played include separate game themes and separate instances of a same game theme.

6. The system of claim 1, wherein the selection of less than four games for concurrent game play results in the display area being redistributed for a lower number of games.

7. The system of claim 1, wherein the system enables games to be player-selected for concurrent game play with arbitrary game themes that are not mathematically related to each other.

8. The system of claim 1, wherein the system enables games to be player-selected for concurrent game play that are not limited to a particular line or bet configuration.

9. The system of claim 1, wherein the system enables a variable number of player-selected games to be selected for concurrent game play.

10. The system of claim 1, wherein a configuration of segments on an action button corresponds to a configuration of games on the display of the game machine.

11. The system of claim 1, wherein the system enables a number of player-selected games to be selected for concurrent game play that is less than all of the available concurrent games.

12. The system of claim 1, wherein the system enables players to initiate multiple concurrent games with different game cycle lengths that start asynchronously.

13. The system of claim 1, wherein the system enables players to initiate multiple concurrent games with different game cycle lengths that end asynchronously.

14. The system of claim 9, wherein the multiple concurrent games that start asynchronously finish concurrently after being started at staggered starting times.

15. The system of claim 9, wherein the multiple concurrent games that start asynchronously finish concurrently after being executed at different frame rates to coincide with the game cycle length of other concurrently played games.

16. The system of claim 1, wherein the system enables players to customize segments on an action button of the virtual button deck for a betting strategy.

17. The system of claim 1, wherein the system employs streaming technology of H.264 video encoding to deliver game content from virtual machine instances running on a server.

18. The system of claim 1, wherein the system enables players to customize segments on an action button of the virtual button deck via drag and drop gesturing motions.

19. The system of claim 1, wherein the display manager resizes and/or repositions the streaming video content of the concurrently played games in response to player performance.

20. The system of claim 1, wherein the display manager resizes and/or repositions the streaming video content of the concurrently played games in response to wager amount.

21. The system of claim 1, wherein the multiple touch gesturing is used to spin one or more wheels, spin one or more reels, turn a pay table virtual page, turn a game instruction related virtual page, or combinations thereof.

22. The system of claim 1, wherein the concurrent gaming system is configured cause the display manager to display the virtual game layouts at different orientations than previously displayed between portions of the games.

23. The system of claim 1, wherein the virtual button deck is customized based upon a player performance level.

24. The system of claim 1, wherein the virtual button deck is customized based upon a level of game play achieved.

25. The system of claim 1, wherein the virtual button deck is customized based upon a previous settings selected by the player.

26. The system of claim 1, wherein the virtual button deck is customized by adding, deleting, or modifying available functions on the virtual button deck.

27. A multi-game action button deck in a concurrent gaming system, the system comprising:

at least one gaming machine in communication with a game server via a network, wherein the gaming machine includes one or more display areas;

a display manager configured to display content related to one or more games to be played on the display areas of the gaming machine, wherein the content includes at least one game display area and a virtual button deck display area associated with each game;

wherein the display manager resizes and repositions the content on the display areas of the gaming machine depending on the game themes that are selected and the number of games that are selected;

a multi-game action button displayed on the virtual button deck, wherein the multi-game action button has multiple touch areas to control different combinations of games, wherein the virtual button deck is customized based upon a level of game play achieved; and a touch sensor configured to detect touch event information on touchscreen buttons to initiate wagering on multiple games at once, wherein the touch sensor sends the touch event information to the display manager, wherein the display manager conducts coordinate transformations and routes the touch event information to a processor executing the game.

28. A multi-game action button deck in a concurrent gaming system, the system comprising:
- at least one gaming machine in communication with a game server via a network, wherein the gaming machine includes one or more display areas;
- a display manager configured to display content related to one or more games to be played on the display areas of the gaming machine, wherein the content includes at least one game display area and a virtual button deck display area associated with each game;
- wherein the display manager resizes and repositions the content on the display areas of the gaming machine depending on the game themes that are selected and the number of games that are selected;
- a multi-game action button displayed on the virtual button deck, wherein the multi-game action button has multiple touch areas to control different combinations of games, wherein the virtual button deck is customized based upon a player performance level; and
- a touch sensor configured to detect touch event information on touchscreen buttons to initiate wagering on multiple games at once, wherein the touch sensor is configured to detect multiple touch gestures, wherein gestures include simultaneous touches by multiple fingers, consecutive touches by a single finger, touching and sliding of a finger, touching and sliding of multiple fingers, or combinations thereof.

* * * * *

UNITED STATES PATENT AND TRADEMARK OFFICE
CERTIFICATE OF CORRECTION

| | |
|---|---|
| PATENT NO. | : 8,951,121 B2 |
| APPLICATION NO. | : 13/631672 |
| DATED | : February 10, 2015 |
| INVENTOR(S) | : Martin S. Lyons, Bryan M. Kelly and Sean C. Martin |

Page 1 of 2

It is certified that error appears in the above-identified patent and that said Letters Patent is hereby corrected as shown below:

In the Specification

Column 1, In line 43, insert --.-- after "like"

Column 12, In line 18, replace "Mayan Treasures" with --MAYAN TREASURES®--

Column 12, In line 20, replace "Lightning Sevens" with --LIGHTNING SEVENS®--

Column 12, In line 22, replace "Total Blast" with --TOTAL BLAST®--

Column 12, In line 24, replace "Total Blast" with --TOTAL BLAST®--

Column 15, In line 3, delete "zone" after "of"

Column 15, In line 4, delete "a of" before "a single"

Column 16, In line 47, replace "in" with --an--

Column 27, In line 31, replace "1010R" with --1010r--

Column 36, In line 5, delete "." after "like"

Column 37, In line 4, before "are" add --s-- to "card"

Column 52, In line 63, insert --.-- after "like"

Column 83, In line 39, replace "Mayan Treasures" with --MAYAN TREASURES®--

Column 83, In line 41, replace "Lightning Sev-" with --LIGHTNING SEV- --

Signed and Sealed this
Twenty-eighth Day of July, 2015

Michelle K. Lee
*Director of the United States Patent and Trademark Office*

CERTIFICATE OF CORRECTION (continued)
U.S. Pat. No. 8,951,121 B2

Column 83, In line 42, replace "vens" with --ENS®--

Column 83, In line 43, replace "Total Blast" with --TOTAL BLAST®--

Column 83, In line 48, replace "Total Blast" with --TOTAL BLAST®--

Column 83, In line 52, replace "Mayan Treasures" with --MAYAN TREASURES®--

Column 83, In line 53, replace "Lightning Sevens" with --LIGHTNING SEVENS®--

Column 84, In line 1, replace "Mayan Treasures" with --MAYAN TREASURES®--

Column 84, In line 1, replace "Lightning Sevens" with --LIGHTNING SEVENS®--

Column 84, In line 21, replace "Mayan Treasures" with --MAYAN TREASURES®--

Column 84, In line 21, replace "Lightning" with --LIGHTNING--

Column 84, In line 22, replace "Sevens" with --SEVENS®--

Column 84, In line 22, replace "Total Blast" with --TOTAL BLAST®--

Column 85, In line 10, replace "Mayan Treasures" with --MAYAN TREASURES®--

Column 85, In line 40, replace "Total Blast" with --TOTAL BLAST®--

Column 85, In line 41, replace "Total Blast" with --TOTAL BLAST®--

Column 85, In line 55, replace "Total Blast" with --TOTAL BLAST®--